(12) United States Patent
Johnson et al.

(10) Patent No.: US 7,614,896 B2
(45) Date of Patent: Nov. 10, 2009

(54) SOLID WIRE MODULAR ELECTRICAL SYSTEM FOR OFFICE AREAS

(75) Inventors: Ross S. Johnson, Jenison, MI (US); Harold R. Wilson, Hudsonville, MI (US); Randy Borgman, Holland, MI (US); Richard D. Elushik, Zeeland, MI (US); Derek D. Crow, Wayland, MI (US); Dave Emery, North Muskegan, MI (US)

(73) Assignee: Haworth, Inc., Holland, MI (US)

( * ) Notice: Subject to any disclaimer, the term of this patent is extended or adjusted under 35 U.S.C. 154(b) by 0 days.

(21) Appl. No.: 11/173,935

(22) Filed: Jul. 1, 2005

(65) Prior Publication Data

US 2006/0024996 A1 Feb. 2, 2006

Related U.S. Application Data

(63) Continuation-in-part of application No. 11/036,756, filed on Jan. 14, 2005, now abandoned, which is a continuation of application No. PCT/US03/22278, filed on Jul. 15, 2003.

(60) Provisional application No. 60/396,863, filed on Jul. 15, 2002.

(51) Int. Cl.
*H01R 4/60* (2006.01)
(52) U.S. Cl. .................. 439/215; 439/731; 439/120
(58) Field of Classification Search ......... 439/119–121, 439/215, 731, 696, 687, 214, 216
See application file for complete search history.

(56) References Cited

U.S. PATENT DOCUMENTS 1,687,167 A 10/1928 Mann
1,903,833 A 4/1933 Nielsen
1,908,888 A 5/1933 Brooks
1,938,372 A 12/1933 Brudie
1,945,731 A 2/1934 Cohen (Continued)

FOREIGN PATENT DOCUMENTS

| CA | 662 907 | 5/1963 |
| GB | 1 172 511 | 12/1969 |
| GB | 2 067 363 A | 7/1981 |
| WO | WO 2004/057716 A1 | 7/2004 |

*Primary Examiner*—Felix O Figueroa
(74) *Attorney, Agent, or Firm*—Flynn, Thiel, Boutell & Tanis, P.C.

(57) ABSTRACT

A modular multi-component power distribution system is provided having a plurality of modular components which are configurable into a bus-bar based system, a flexible cable base system and a hybrid configuration wherein the bus-bar and flexible cable components are interconnected together. The components allow for configuration of the power distribution system into a variety of office systems including wall panel systems, desking or freestanding furniture systems and raised flooring systems either individually or in various combinations. The system components include a bus-bar-like power distribution assembly (PDA), branching connectors, flex connectors, which are useable to join power distribution assemblies together, and receptacles which are pluggable into either the power distribution assembly, the branching connectors or the flex connectors. Additionally, the power distribution assembly includes solid-wire electrical conductors which are accessible through multiple groups of plug openings to which any of the connectors and receptacles may be plugged. Still further, the flexible branching connectors are joinable serially together to distribute power and also may plug into the PDAs. The branching connectors further include at least one group of openings on each end to allow for the connection of additional system components like a branching connector or a receptacle.

18 Claims, 82 Drawing Sheets

U.S. PATENT DOCUMENTS

| | | |
|---|---|---|
| 1,966,379 A | 7/1934 | Dodge et al. |
| 1,988,627 A | 1/1935 | MacLellan |
| 2,000,243 A | 5/1935 | Manske |
| 2,029,019 A | 1/1936 | Dorsey |
| 2,038,107 A | 4/1936 | Harvey |
| 2,041,675 A | 5/1936 | Frank et al. |
| 2,042,105 A | 5/1936 | Kelley |
| 2,043,796 A | 6/1936 | Frank |
| 2,052,312 A | 8/1936 | Nielsen |
| 2,058,292 A | 10/1936 | Benander |
| 2,059,987 A | 11/1936 | Frank et al. |
| 2,073,535 A | 3/1937 | Kennedy |
| 2,076,558 A | 4/1937 | Hartman et al. |
| 2,088,845 A | 8/1937 | De Mask |
| 2,124,269 A | 7/1938 | Anderson et al. |
| 2,186,377 A | 1/1940 | Frank |
| 2,190,196 A | 2/1940 | Semenyna |
| 2,192,587 A | 3/1940 | Harvey |
| 2,239,652 A | 4/1941 | Morten et al. |
| 2,269,779 A | 1/1942 | Morten |
| 2,292,394 A | 8/1942 | O'Brien |
| 2,305,100 A | 12/1942 | O'Brien |
| 2,312,580 A | 3/1943 | O'Brien |
| 2,313,960 A | 3/1943 | O'Brien |
| 2,320,332 A | 5/1943 | Morten |
| 2,351,631 A | 6/1944 | O'Brien |
| 2,351,632 A | 6/1944 | O'Brien |
| 2,441,698 A | 5/1948 | Gerspacher et al. |
| 2,443,797 A | 6/1948 | Miller |
| 2,505,979 A | 5/1950 | Martin |
| 2,561,031 A | 7/1951 | Murphy |
| 2,574,075 A | 11/1951 | Weisler |
| 2,611,800 A | 9/1952 | Naughton |
| 2,611,801 A | 9/1952 | Hammerly et al. |
| 2,666,907 A | 1/1954 | Hensley |
| 2,669,632 A | 2/1954 | Hammerly |
| 2,671,887 A | 3/1954 | Wellman |
| 2,698,925 A | 1/1955 | Taylor |
| 2,720,632 A | 10/1955 | Stieglitz |
| 2,769,151 A | 10/1956 | Salomone |
| 2,988,617 A | 6/1961 | Graziosi |
| 3,009,011 A | 11/1961 | Fisher |
| 3,015,795 A | 1/1962 | Meacham |
| 3,072,736 A | 1/1963 | Wallace |
| 3,126,241 A | 3/1964 | Papalas |
| 3,171,702 A | 3/1965 | Schumacher et al. |
| 3,206,706 A | 9/1965 | Cataldo et al. |
| 3,248,576 A | 4/1966 | Russell |
| 3,263,131 A | 7/1966 | Rowe |
| 3,439,309 A | 4/1969 | Giger et al. |
| 3,464,052 A | 8/1969 | Hukin |
| 3,488,621 A | 1/1970 | Stevens |
| 3,559,149 A | 1/1971 | Shagena |
| 3,566,331 A | 2/1971 | Stanback et al. |
| 3,605,064 A | 9/1971 | Routh et al. |
| 3,710,302 A | 1/1973 | Shannon et al. |
| 3,715,627 A | 2/1973 | D'Ausilio |
| 3,731,256 A | 5/1973 | Hafer |
| 3,744,002 A | 7/1973 | Weimer et al. |
| 3,871,729 A | 3/1975 | Attema |
| 3,922,053 A | 11/1975 | Hafer |
| 4,037,900 A | 7/1977 | Schmidger |
| 4,176,902 A | 12/1979 | Bernstein |
| 4,203,639 A | 5/1980 | Vanden Hoek et al. |
| 4,235,495 A | 11/1980 | Propst et al. |
| 4,295,697 A | 10/1981 | Grime |
| 4,367,370 A | 1/1983 | Wilson et al. |
| 4,376,561 A | 3/1983 | Vanden Hoek et al. |
| 4,421,367 A | 12/1983 | Shannon et al. |
| 4,462,656 A | 7/1984 | Beyer |
| 4,477,131 A | 10/1984 | Joly |
| 4,494,808 A | 1/1985 | Widell et al. |
| 4,547,030 A | 10/1985 | Tanner et al. |
| 4,666,223 A | 5/1987 | Tillmann |
| 4,673,229 A | 6/1987 | Jorgensen et al. |
| 4,678,253 A | 7/1987 | Hicks et al. |
| 4,688,869 A | 8/1987 | Kelly |
| 4,705,334 A | 11/1987 | Slicer et al. |
| 4,713,918 A | 12/1987 | Cioffi |
| 4,714,431 A | 12/1987 | McGoldrick et al. |
| 4,752,233 A | 6/1988 | Morby et al. |
| 4,758,172 A | 7/1988 | Richards et al. |
| 4,775,328 A | 10/1988 | McCarthy |
| 4,781,609 A | 11/1988 | Wilson et al. |
| 4,820,177 A | 4/1989 | Slicer |
| 4,820,178 A | 4/1989 | Anderson et al. |
| 4,825,540 A | 5/1989 | Kelly |
| 4,897,048 A | 1/1990 | Liebon et al. |
| 4,948,380 A | 8/1990 | Dale |
| 4,952,164 A | 8/1990 | French et al. |
| 4,969,838 A | 11/1990 | Himes et al. |
| 4,975,070 A | 12/1990 | Gillatt |
| 5,024,610 A | 6/1991 | French et al. |
| 5,046,963 A | 9/1991 | Kelly |
| 5,052,937 A | 10/1991 | Glen |
| 5,053,637 A | 10/1991 | Dillard |
| 5,057,028 A | 10/1991 | Lemke et al. |
| 5,092,786 A | 3/1992 | Juhlin et al. |
| 5,092,787 A | 3/1992 | Wise et al. |
| 5,096,431 A | 3/1992 | Byrne |
| 5,096,433 A | 3/1992 | Boundy |
| 5,131,860 A | 7/1992 | Bogiel |
| 5,144,530 A | 9/1992 | Cohen et al. |
| 5,151,043 A | 9/1992 | Morgan |
| 5,158,472 A * | 10/1992 | Juhlin ........................ 439/215 |
| 5,164,544 A | 11/1992 | Snodgrass et al. |
| 5,192,217 A | 3/1993 | Wittmer |
| 5,203,712 A | 4/1993 | Kilpatrick et al. |
| 5,203,713 A | 4/1993 | French et al. |
| 5,214,314 A | 5/1993 | Dillard et al. |
| 5,236,370 A | 8/1993 | King et al. |
| 5,277,609 A | 1/1994 | Ondrejka |
| 5,295,847 A | 3/1994 | Ozaki et al. |
| 5,306,165 A | 4/1994 | Nadeau |
| 5,336,097 A | 8/1994 | Williamson et al. |
| 5,396,027 A | 3/1995 | Zemen |
| 5,411,408 A | 5/1995 | DiViesti et al. |
| 5,415,557 A | 5/1995 | Chapman et al. |
| 5,418,328 A | 5/1995 | Nadeau |
| 5,433,616 A | 7/1995 | Walden |
| 5,442,135 A | 8/1995 | Faulkner et al. |
| 5,451,173 A | 9/1995 | Mai |
| 5,466,889 A | 11/1995 | Faulkner et al. |
| 5,509,826 A | 4/1996 | White |
| 5,525,068 A | 6/1996 | Graham et al. |
| 5,564,950 A | 10/1996 | Loman et al. |
| 5,575,687 A | 11/1996 | Tsai |
| 5,595,495 A | 1/1997 | Johnson et al. |
| 5,603,621 A | 2/1997 | Elmouchi |
| 5,618,192 A | 4/1997 | Drury |
| 5,619,014 A | 4/1997 | Faulkner |
| 5,655,925 A | 8/1997 | Pon |
| 5,658,158 A | 8/1997 | Milan |
| 5,670,743 A | 9/1997 | Welch et al. |
| 5,697,806 A | 12/1997 | Whiteman et al. |
| 5,895,279 A | 4/1999 | Petrisko et al. |
| 5,899,773 A | 5/1999 | Cheng |
| 5,964,610 A | 10/1999 | McCoy |
| 5,967,818 A | 10/1999 | Carron et al. |
| 6,663,435 B2 | 12/2003 | Lincoln et al. |

* cited by examiner

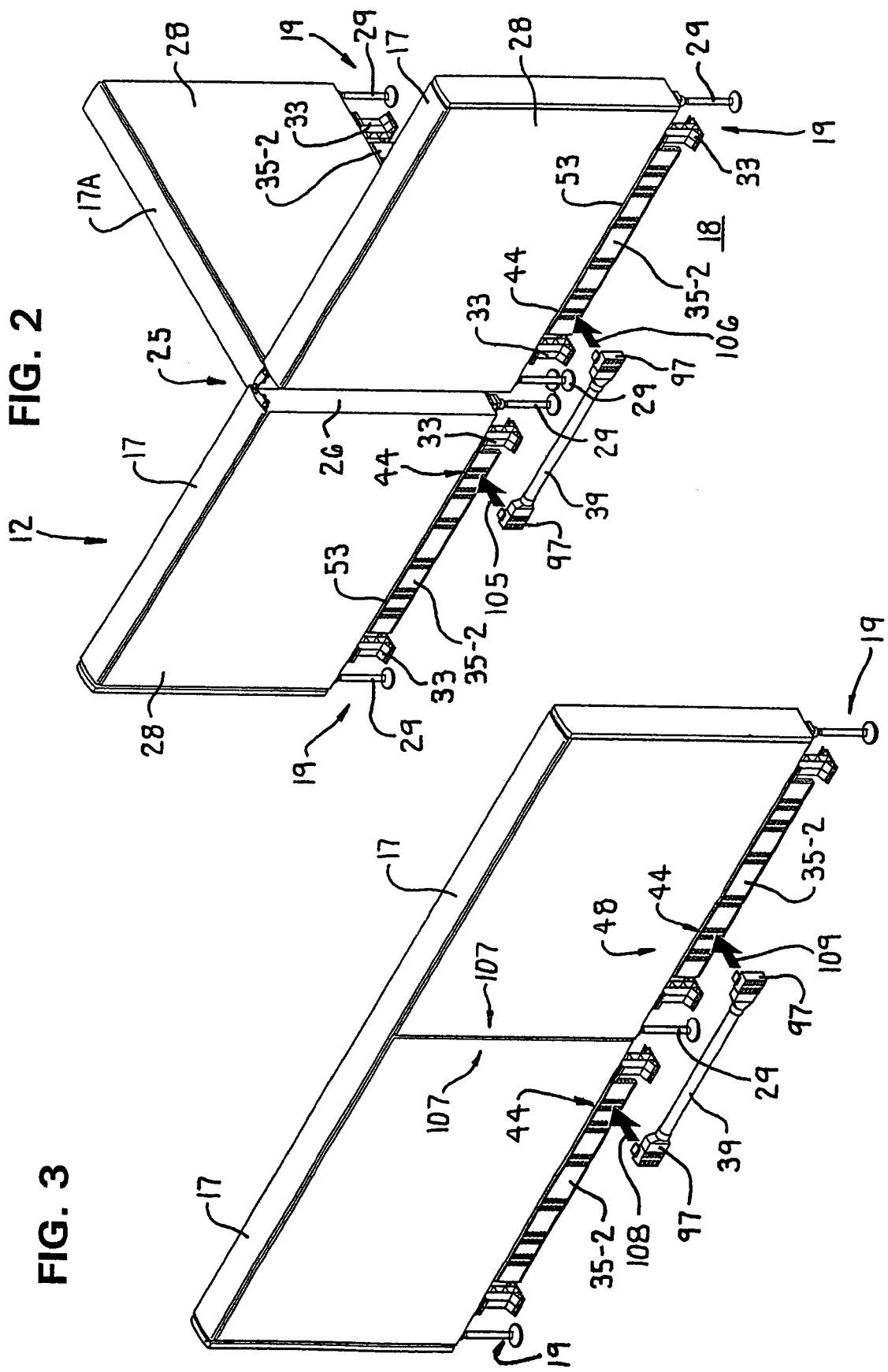

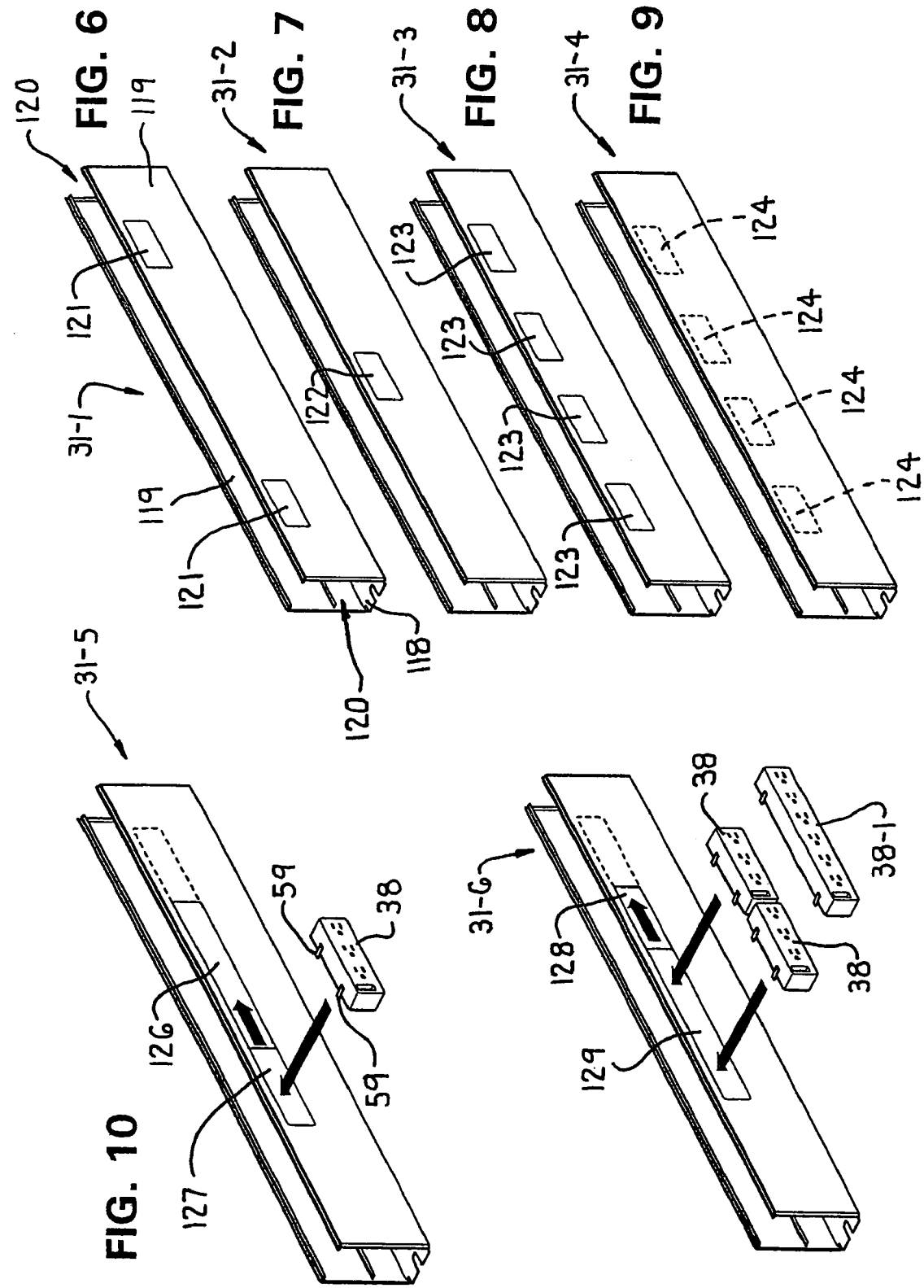

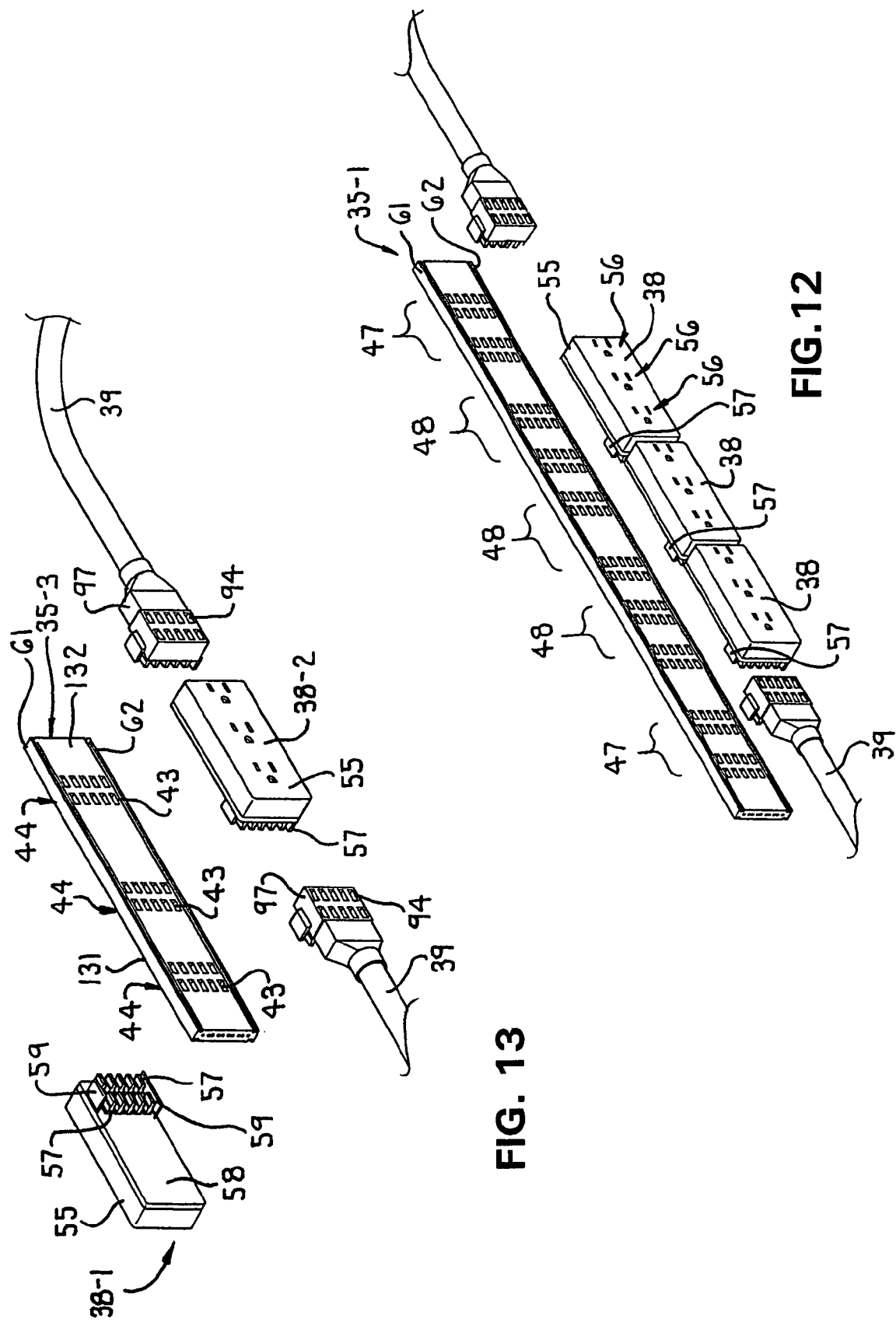

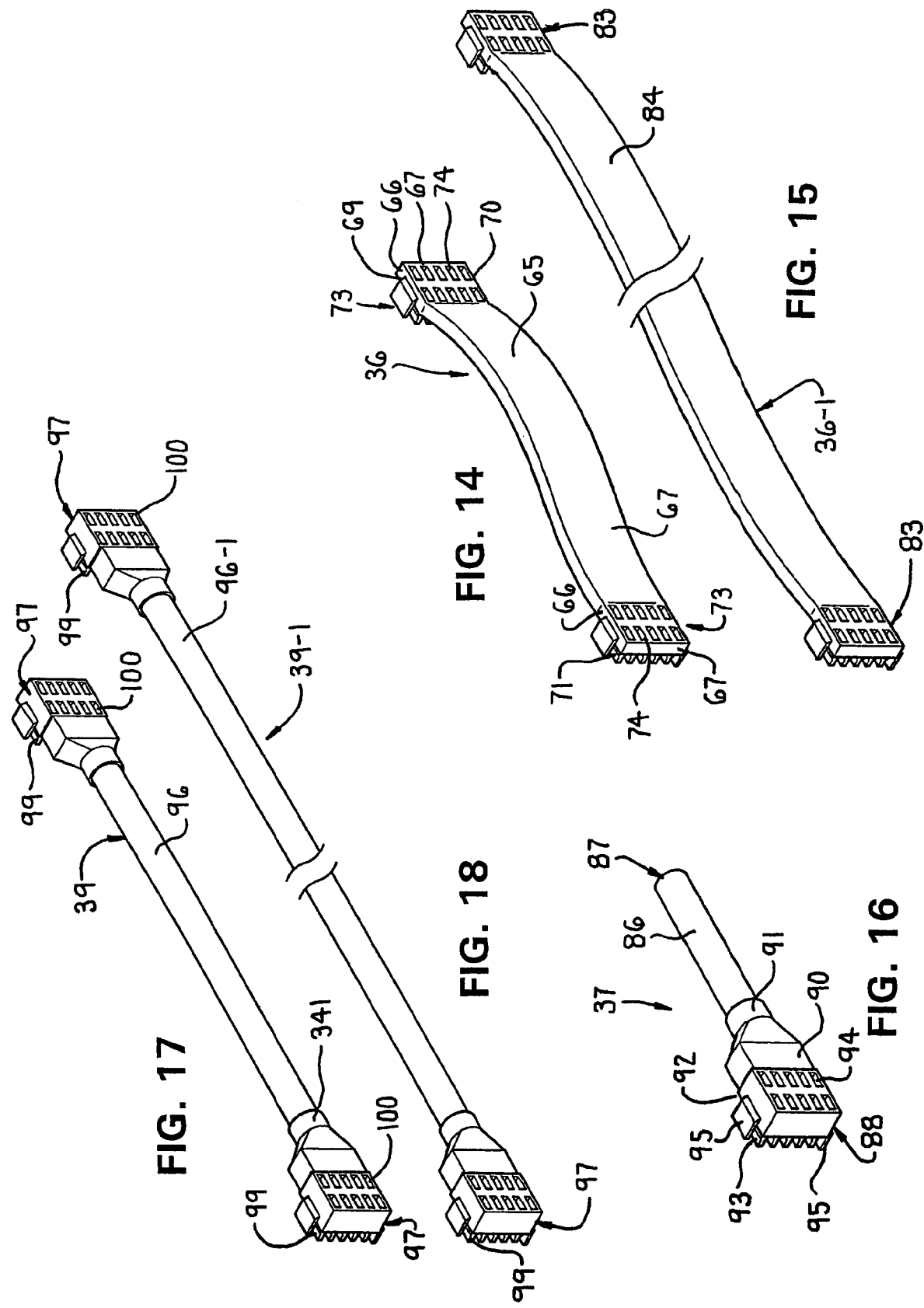

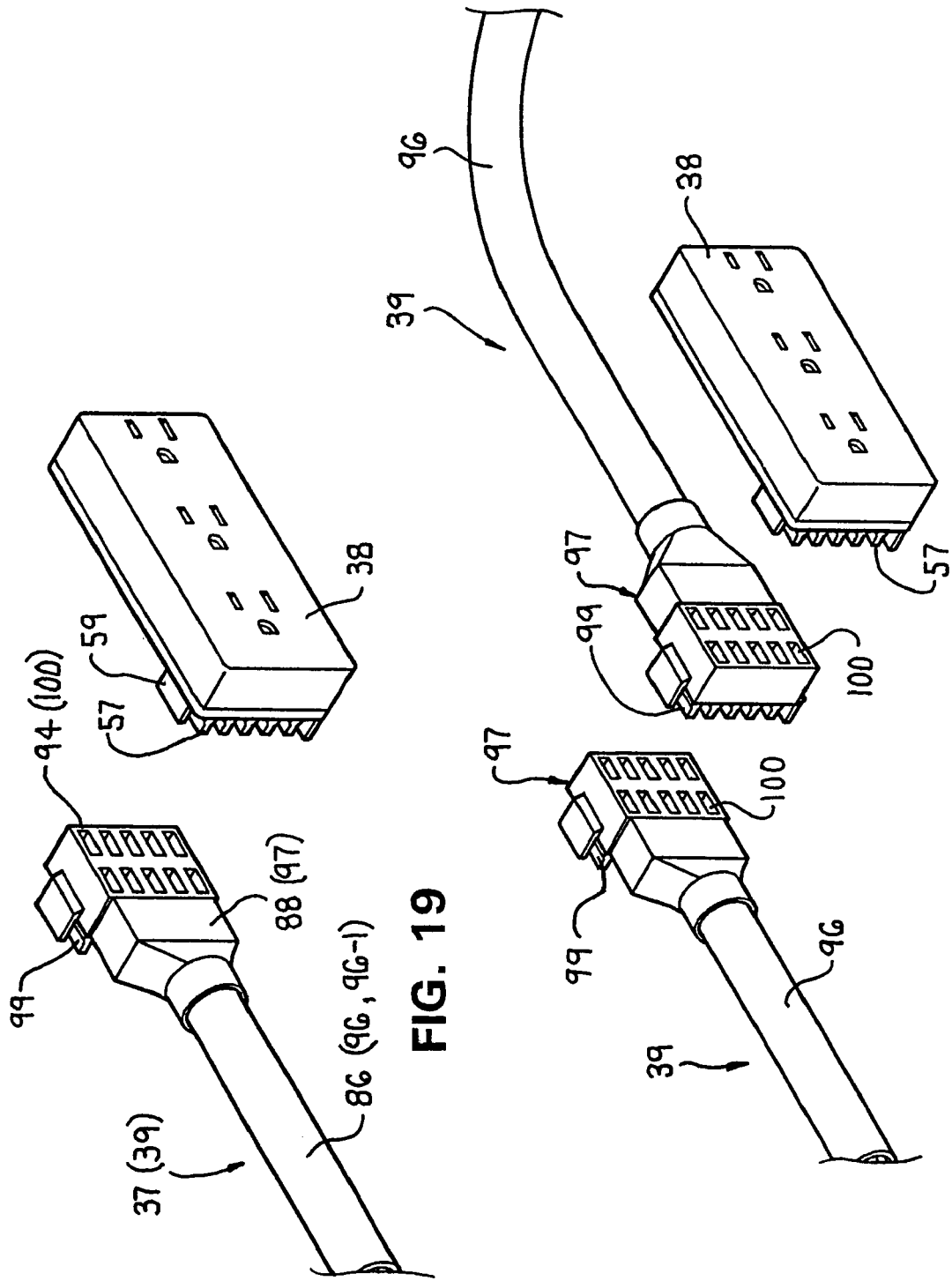

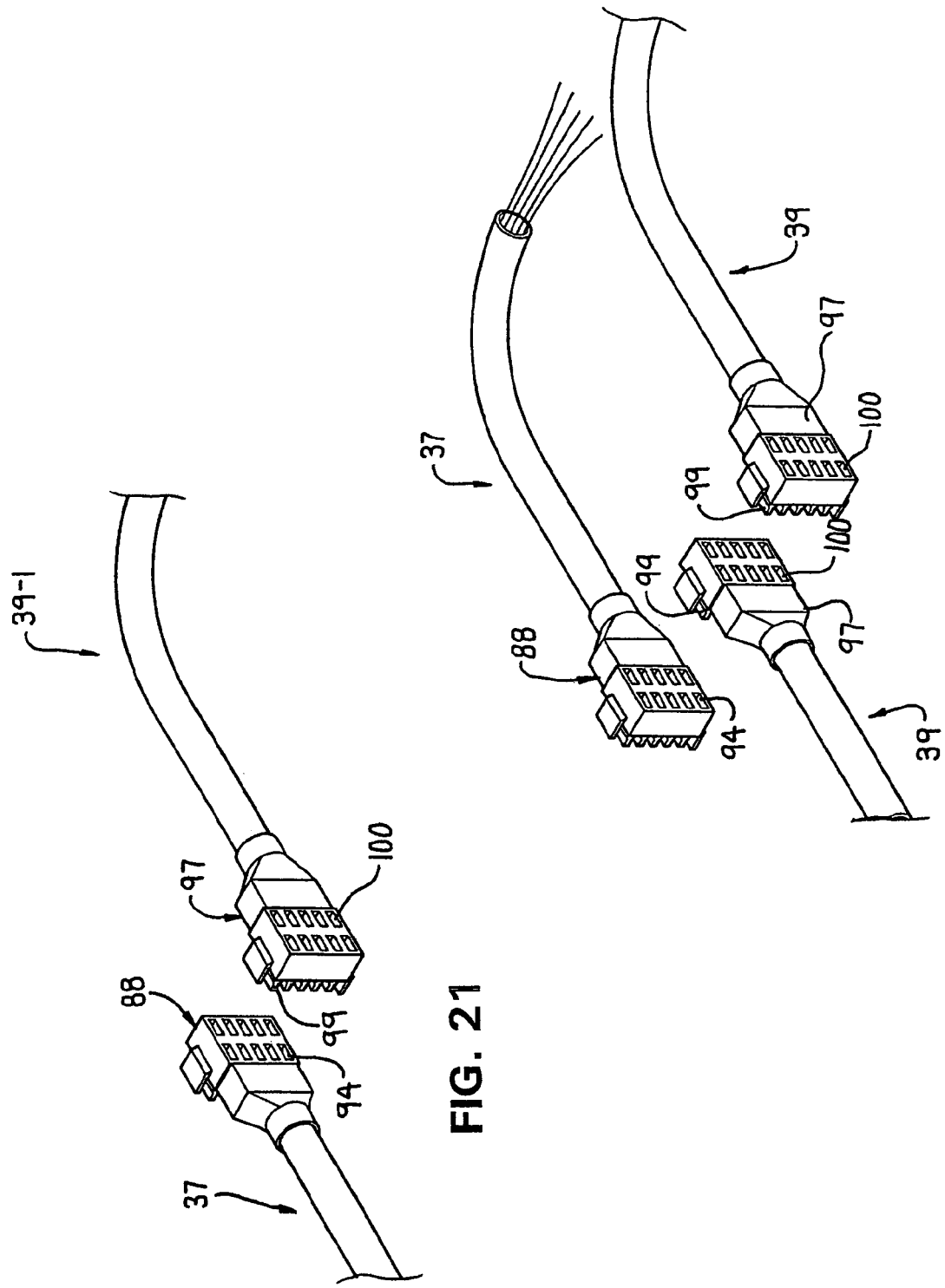

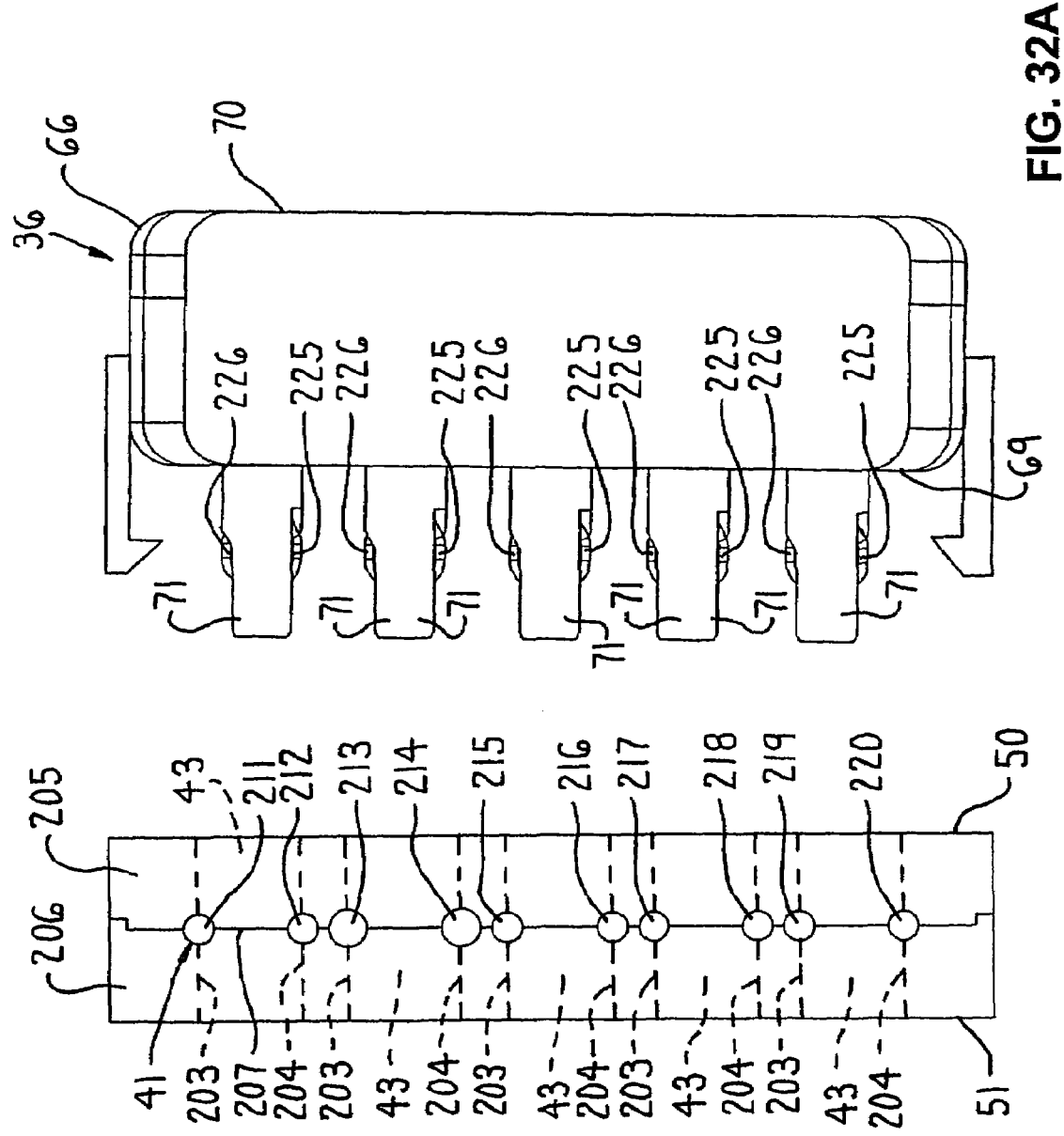

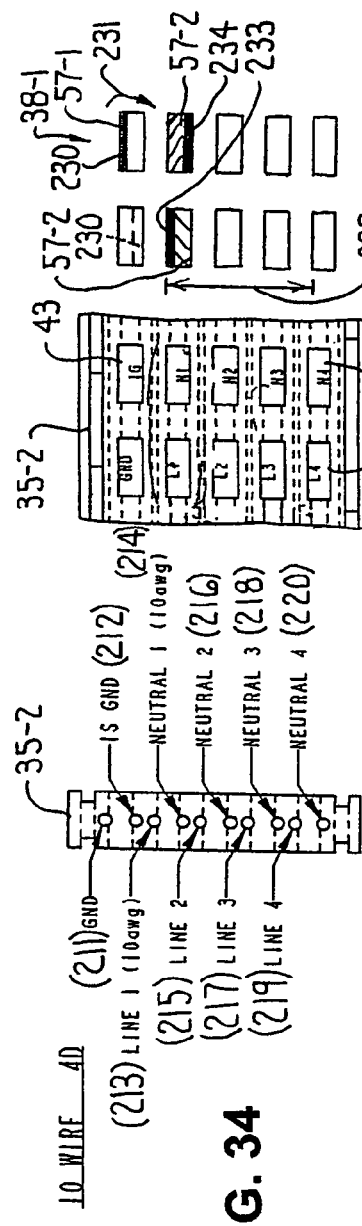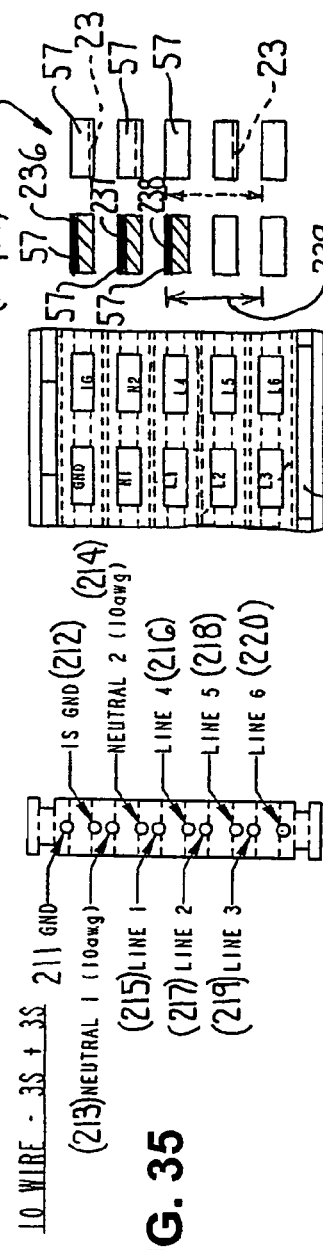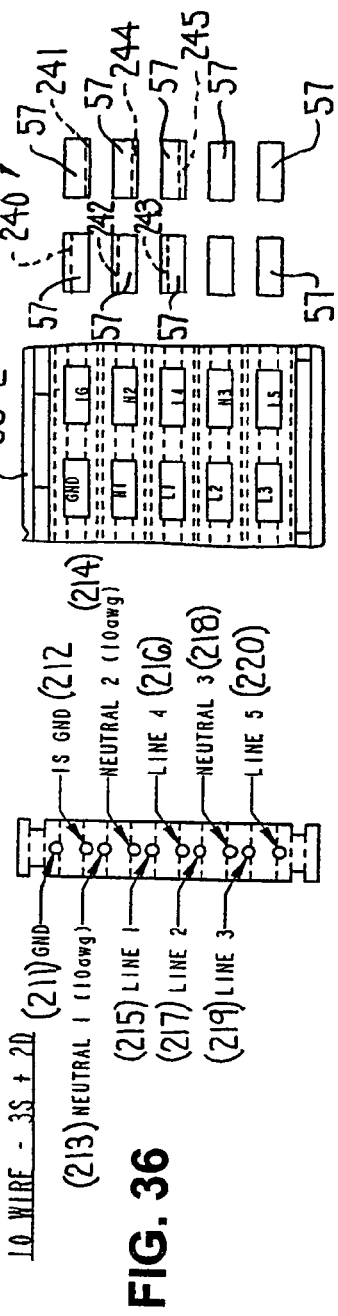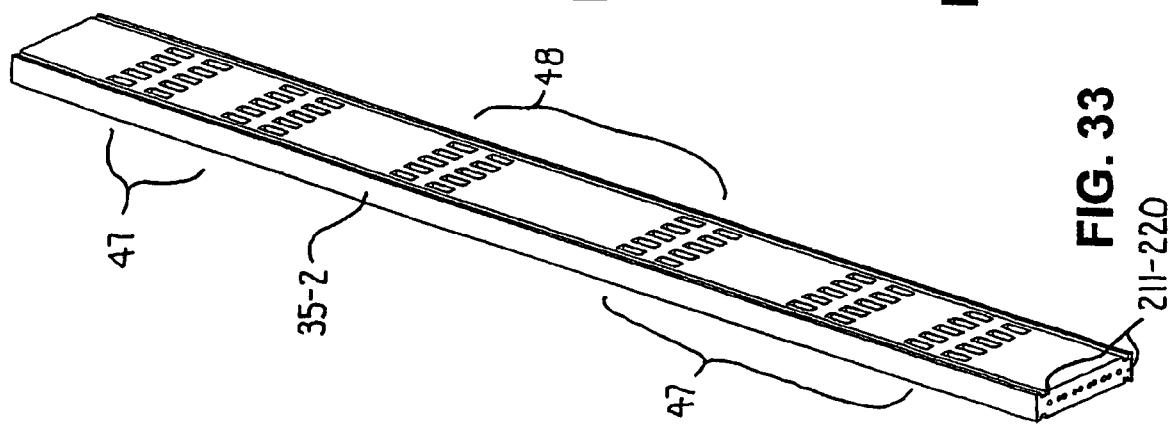
FIG. 34
FIG. 35
FIG. 36
FIG. 33

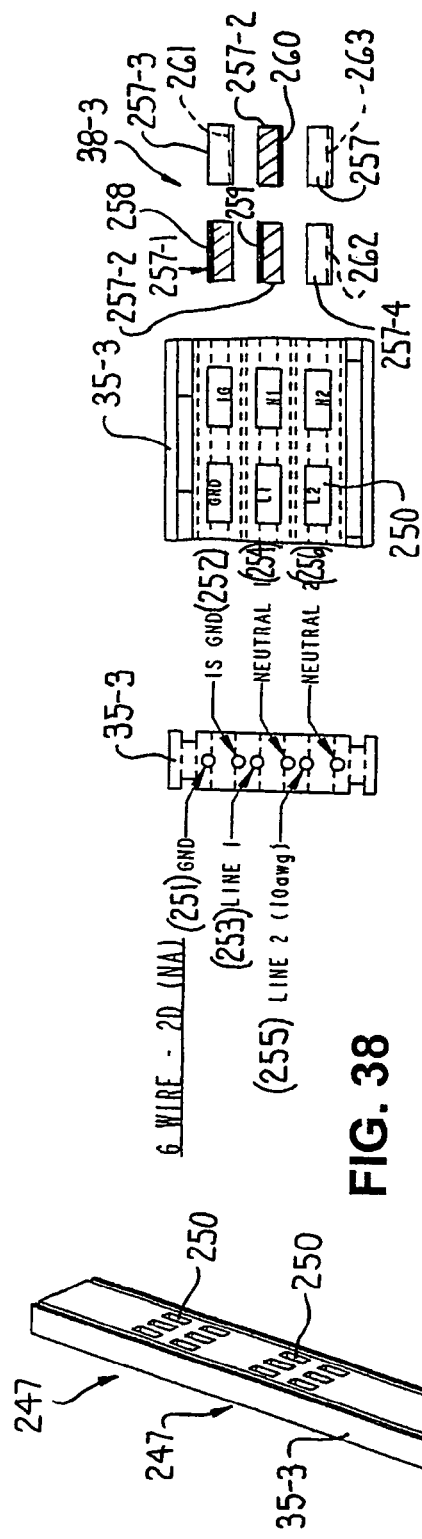
FIG. 38
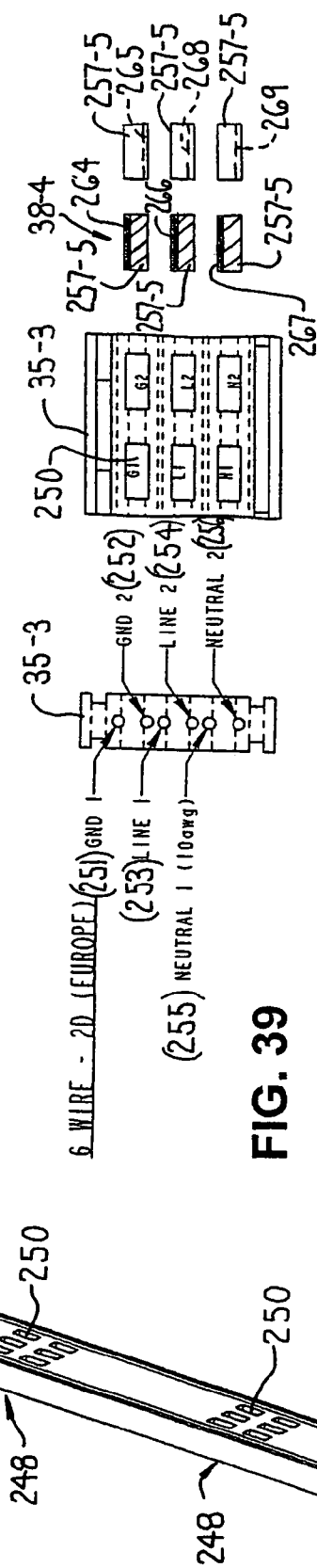
FIG. 39
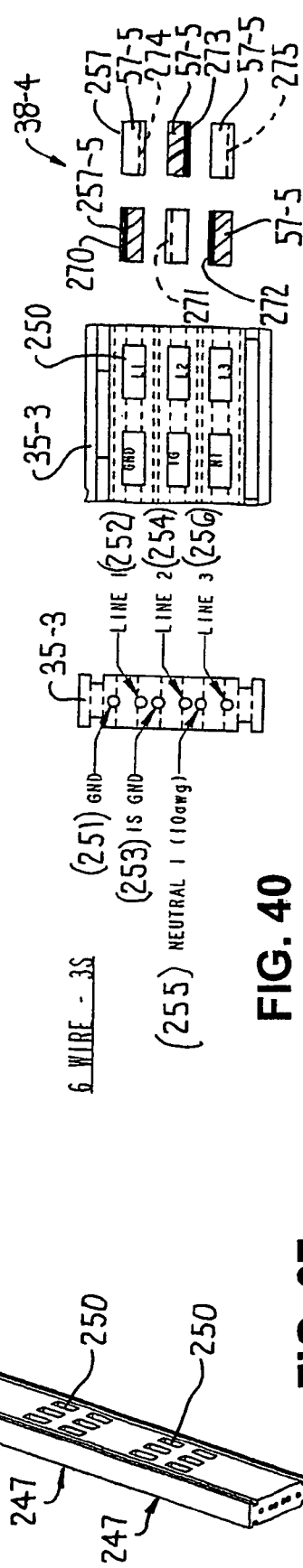
FIG. 40
FIG. 37

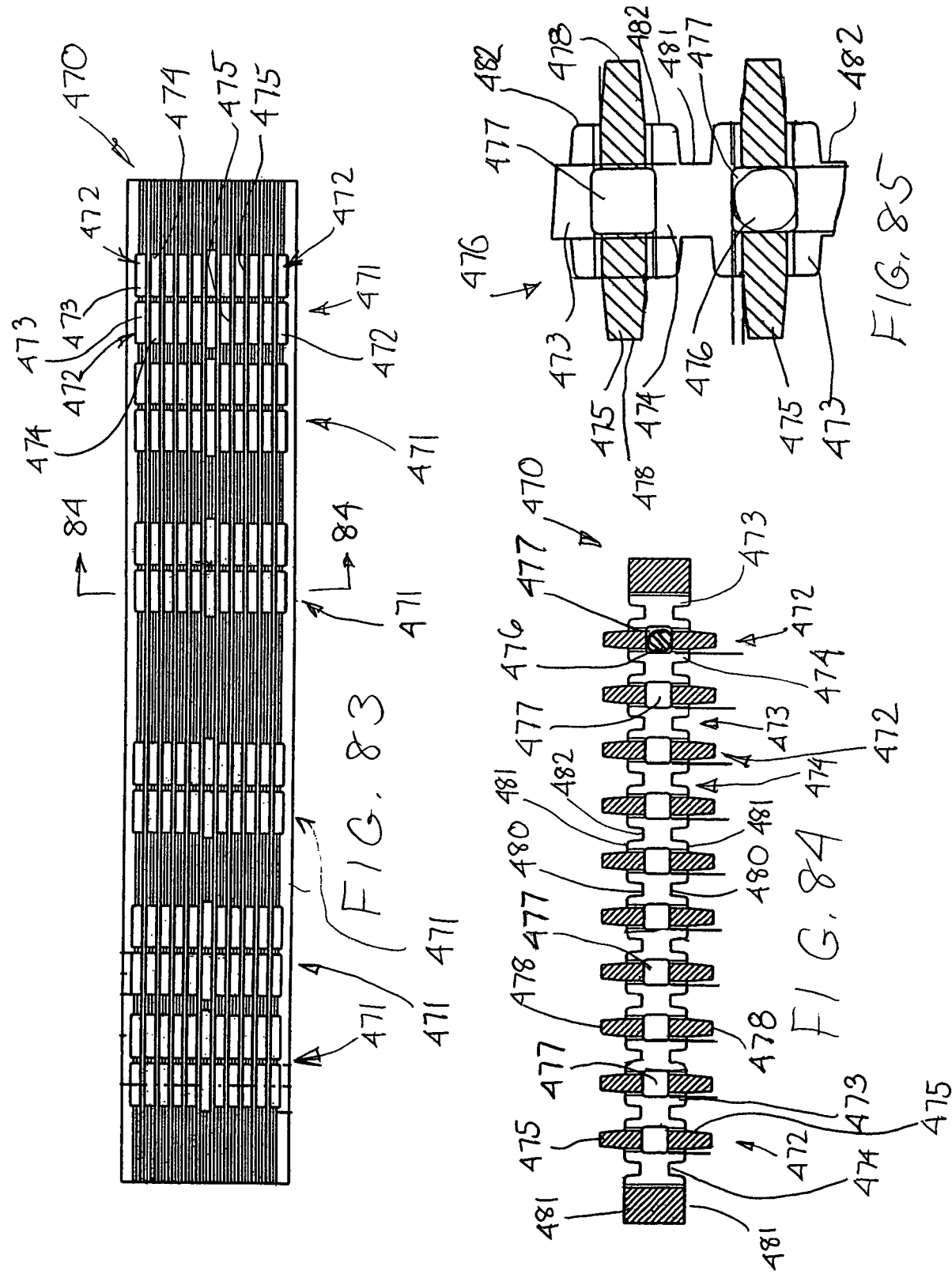

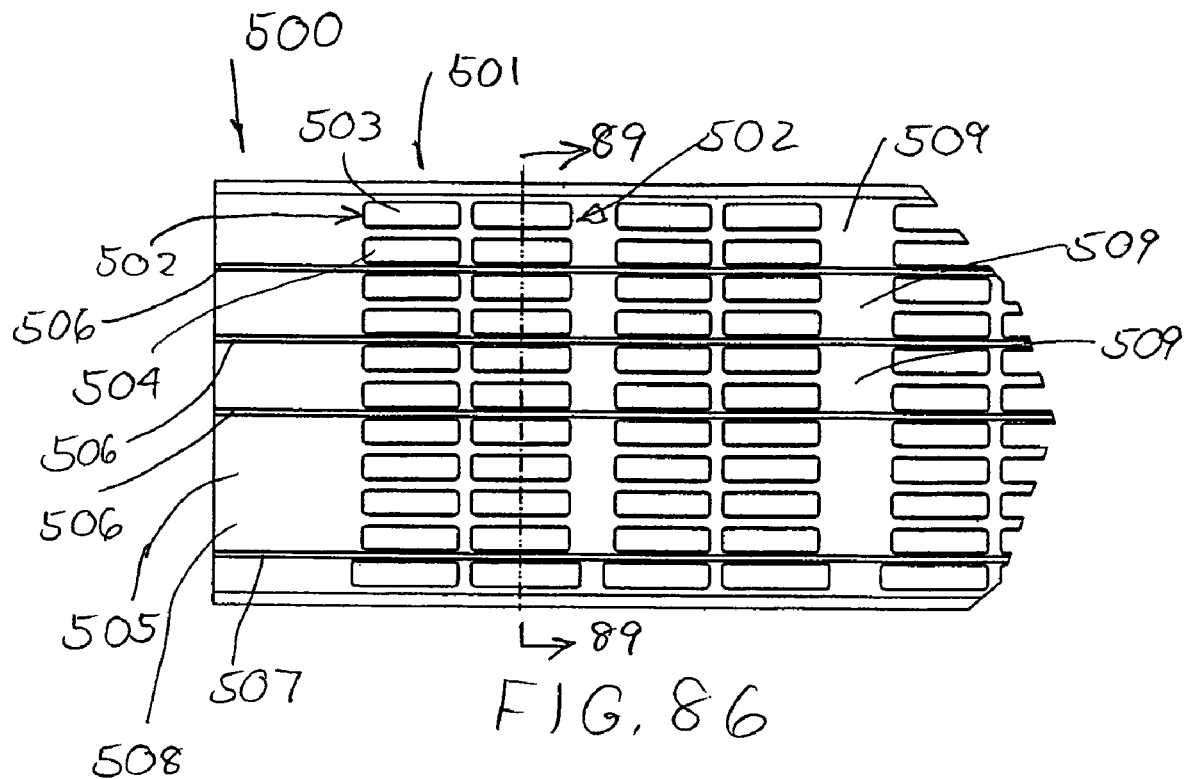
FIG. 86
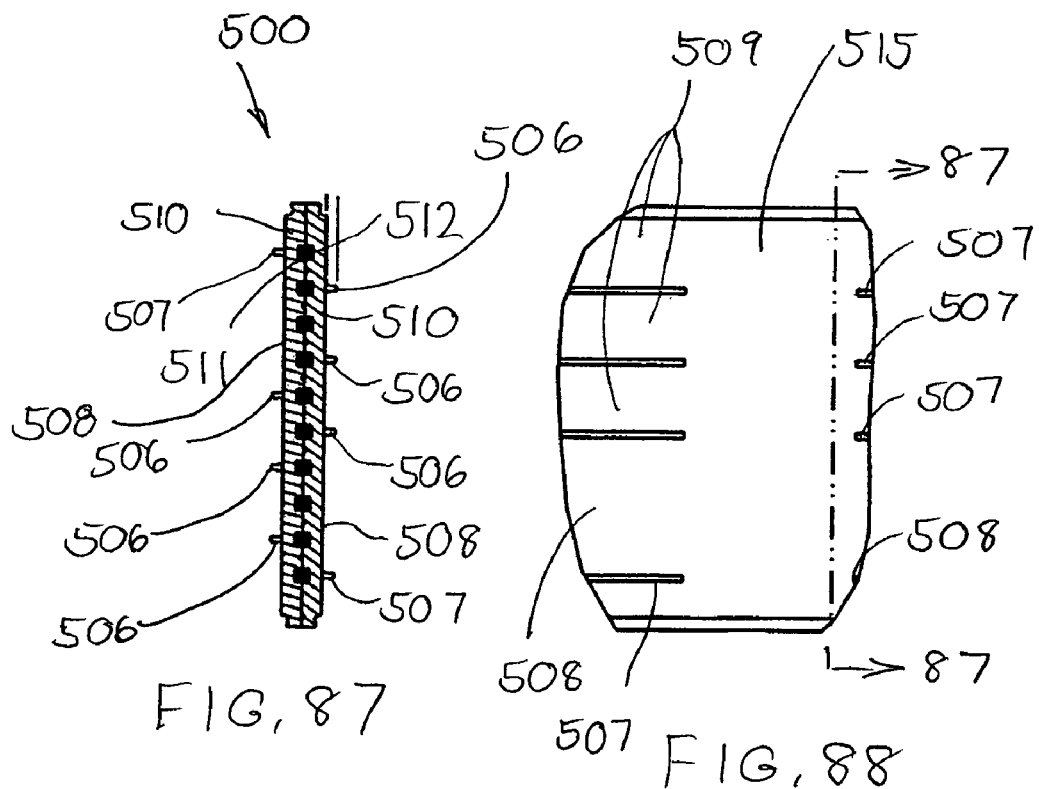
FIG. 87
FIG. 88

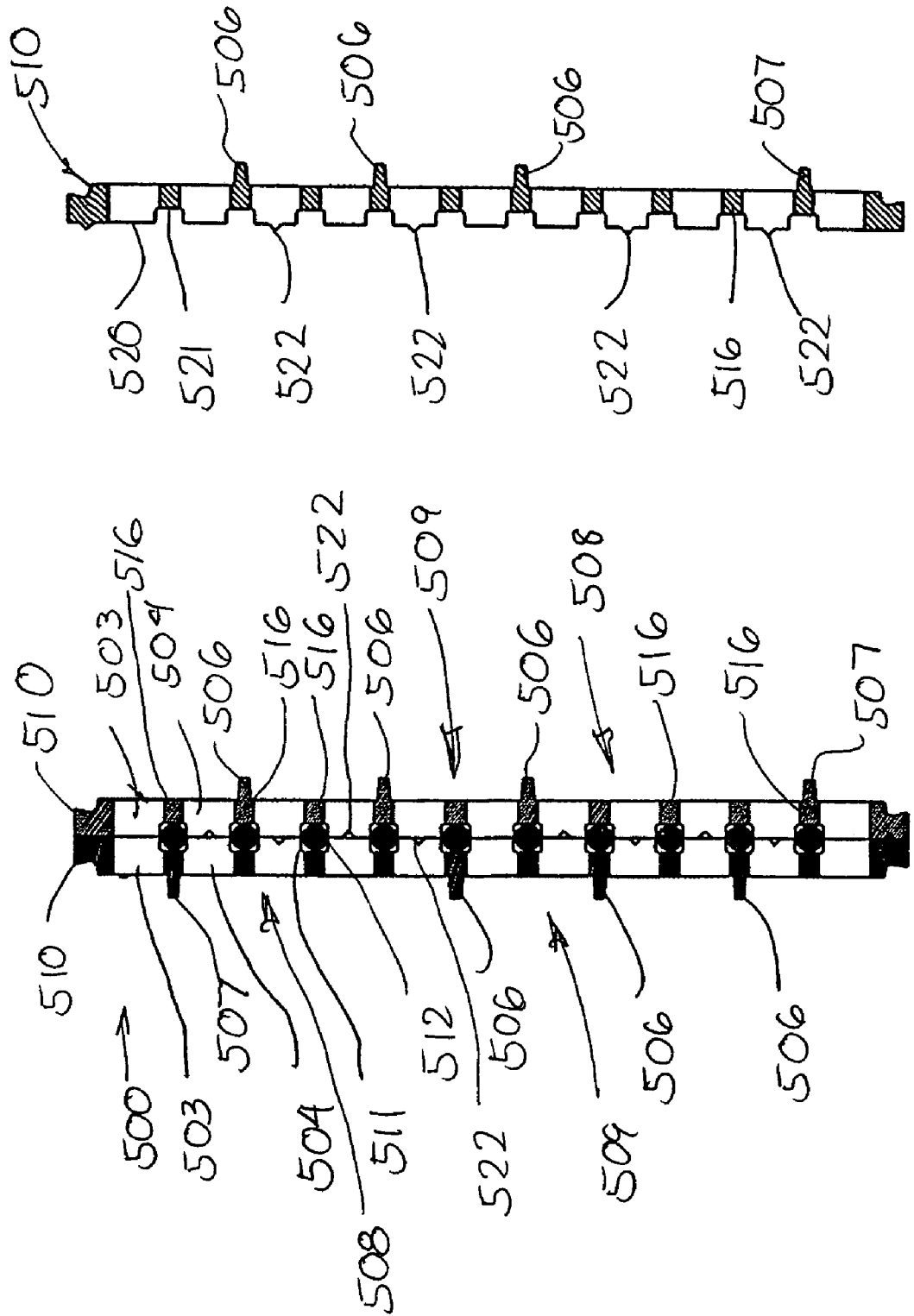

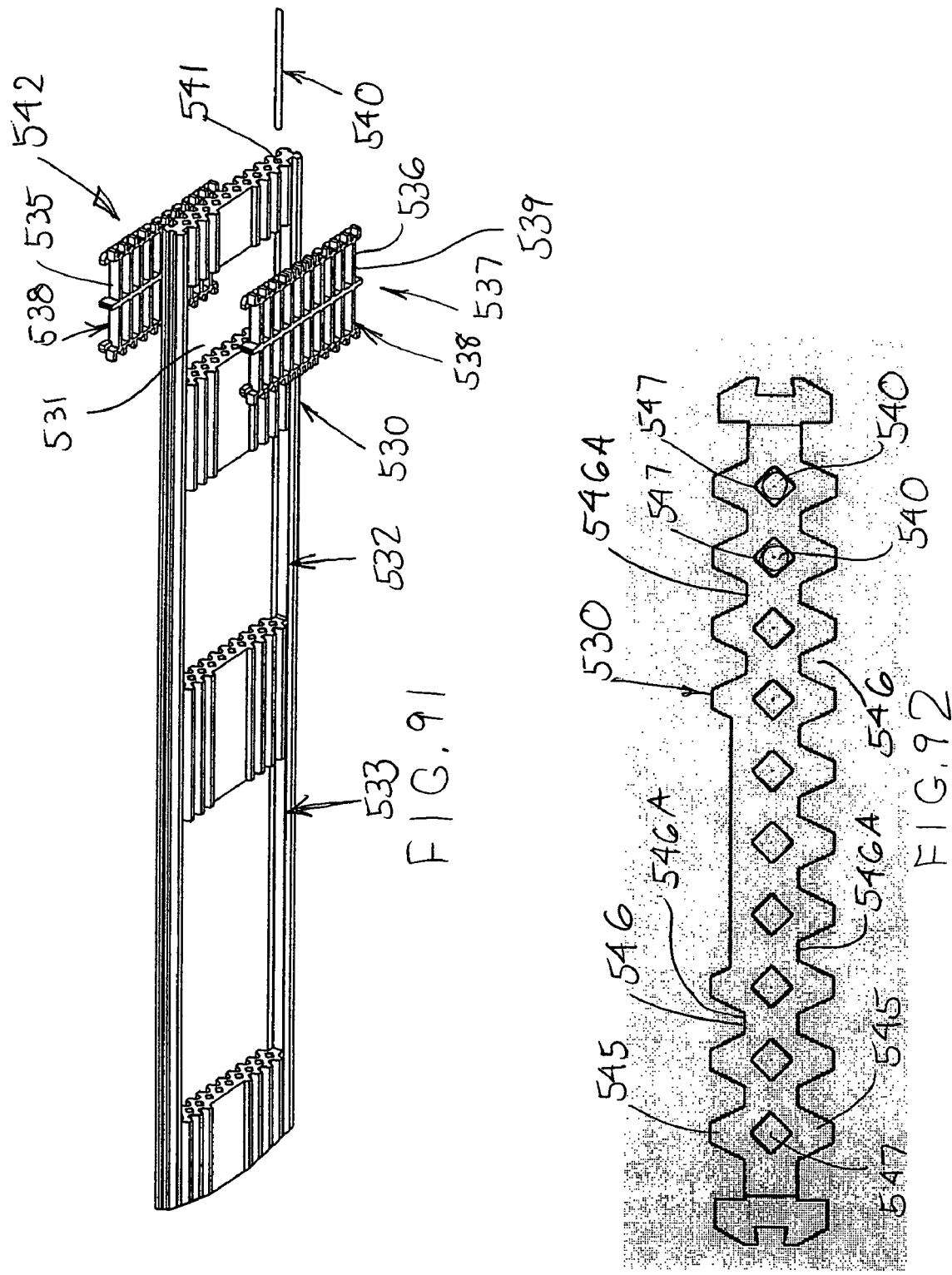

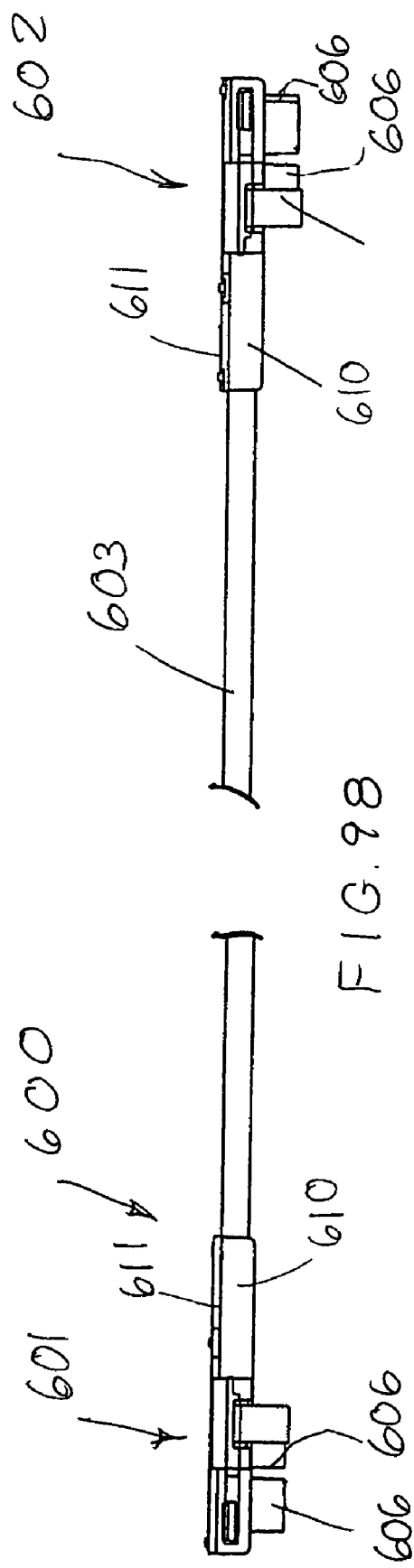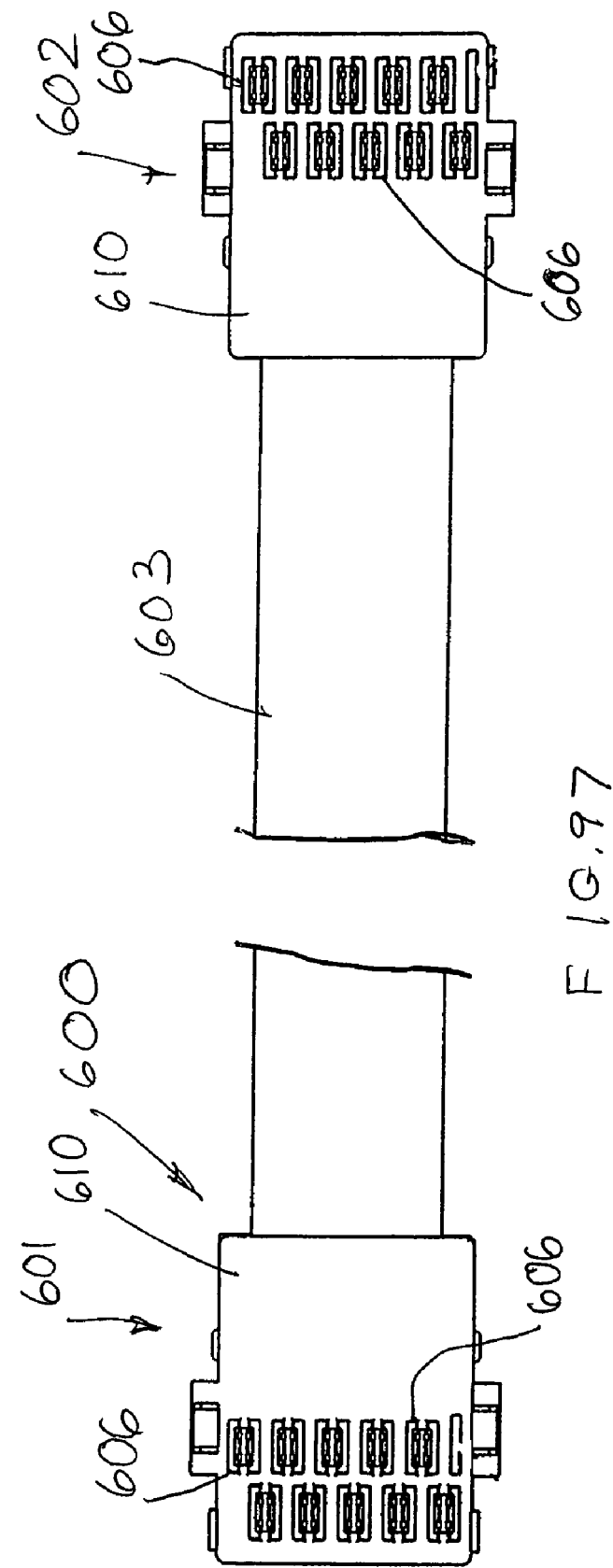
FIG. 97
FIG. 98

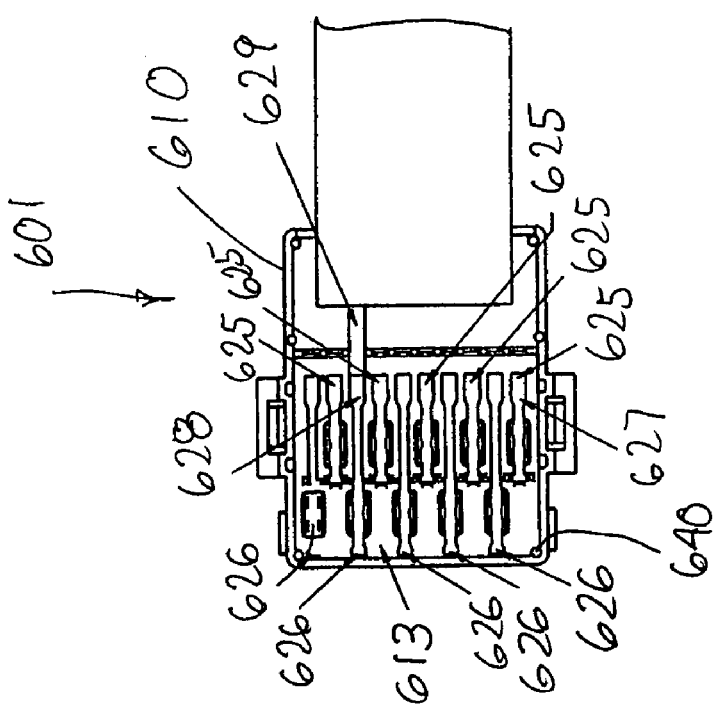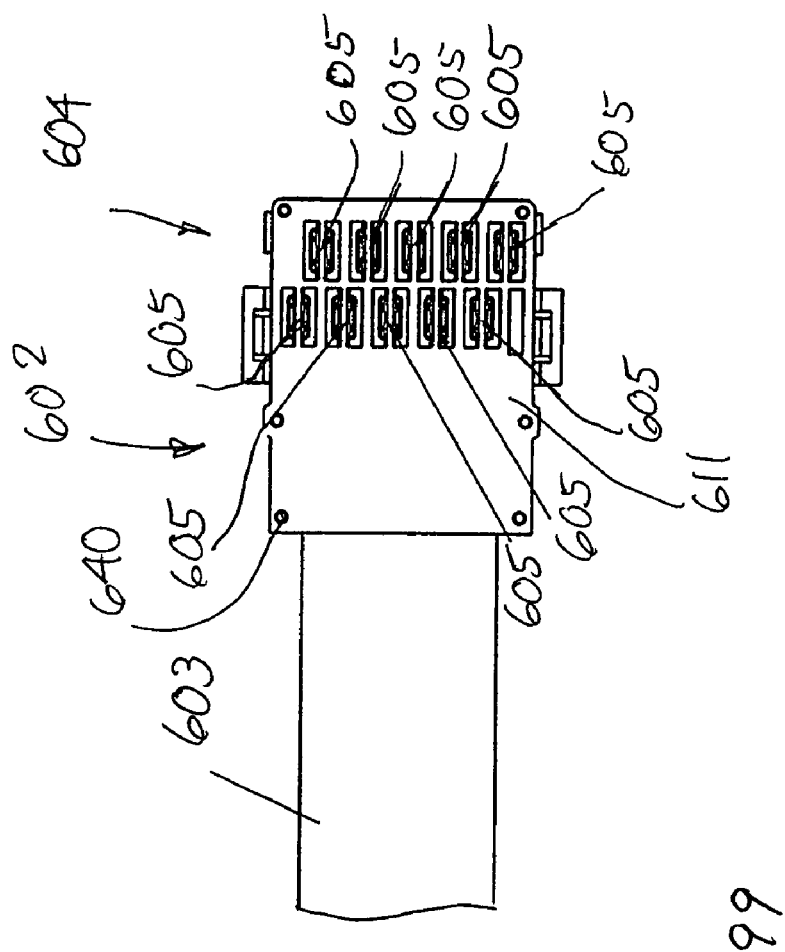
FIG. 99

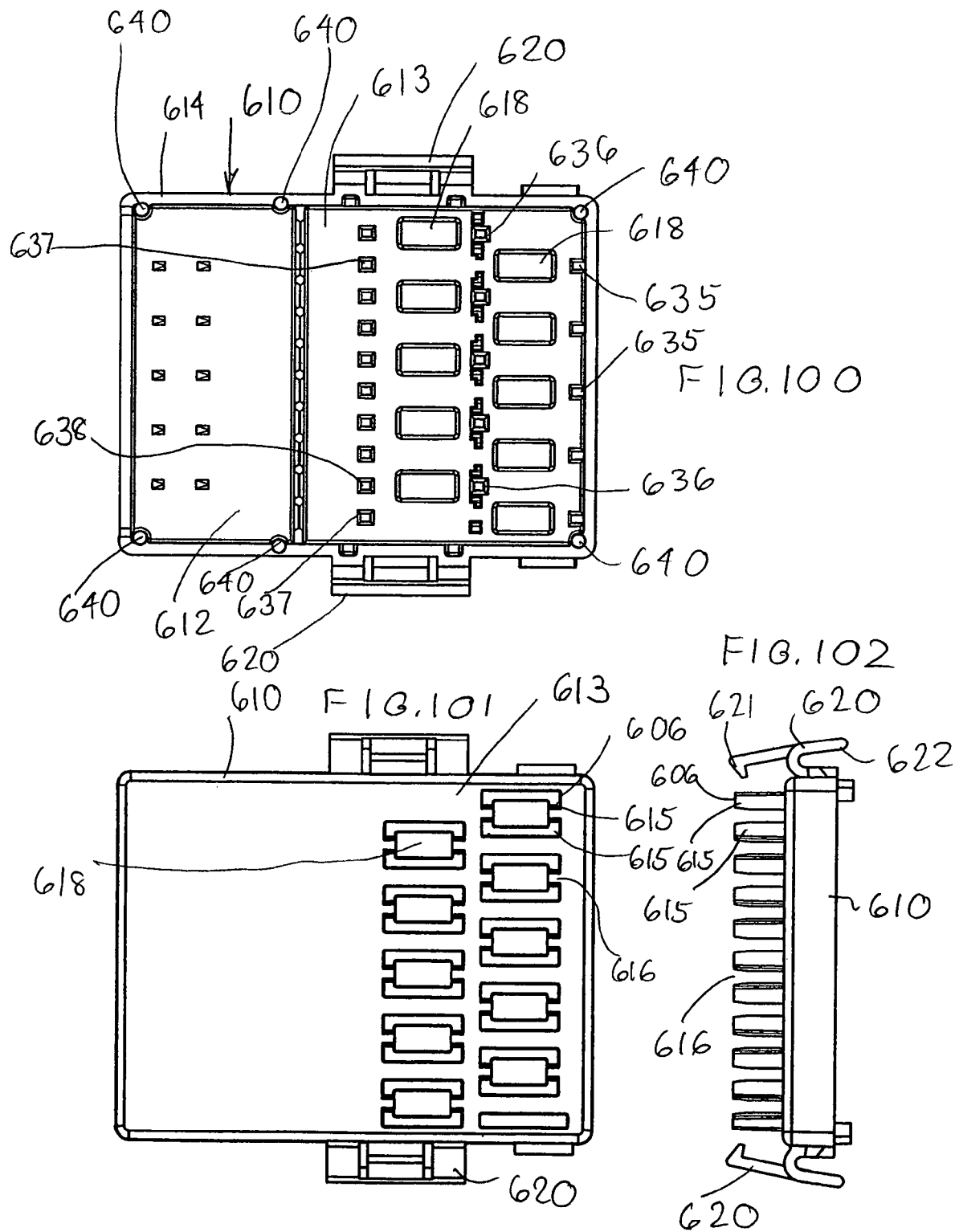

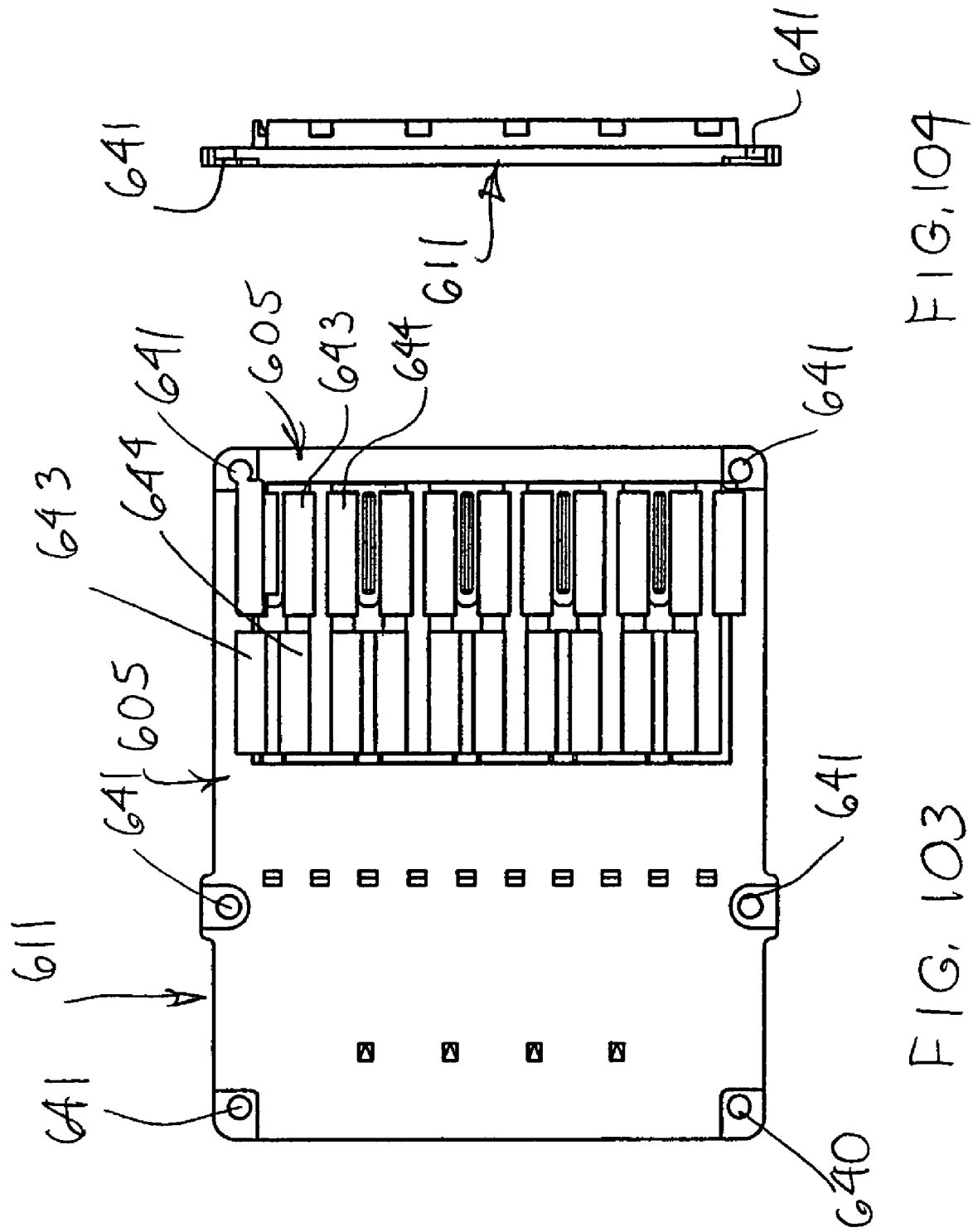

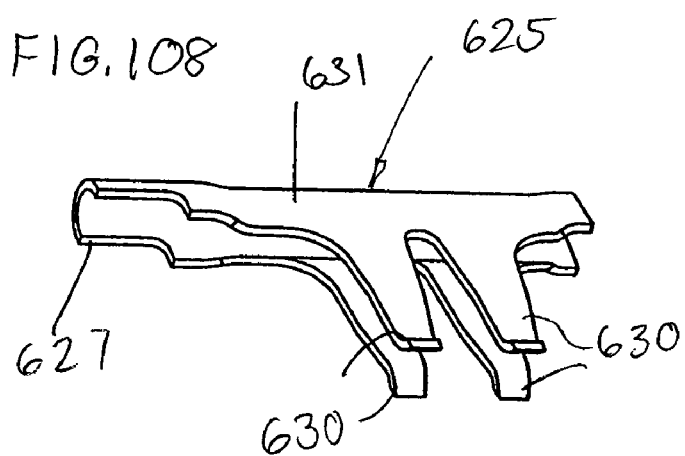
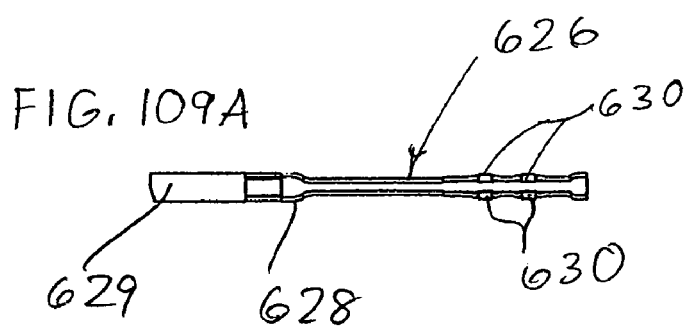
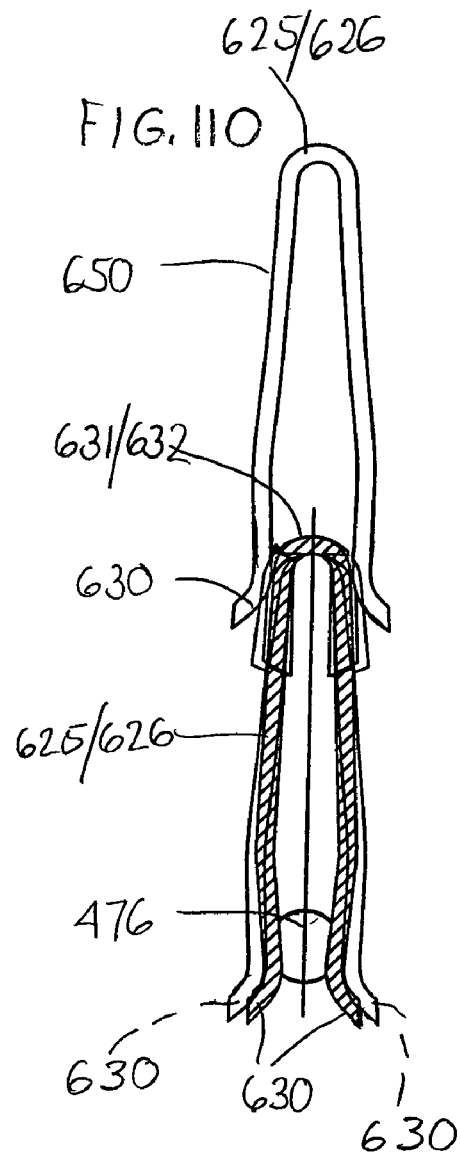
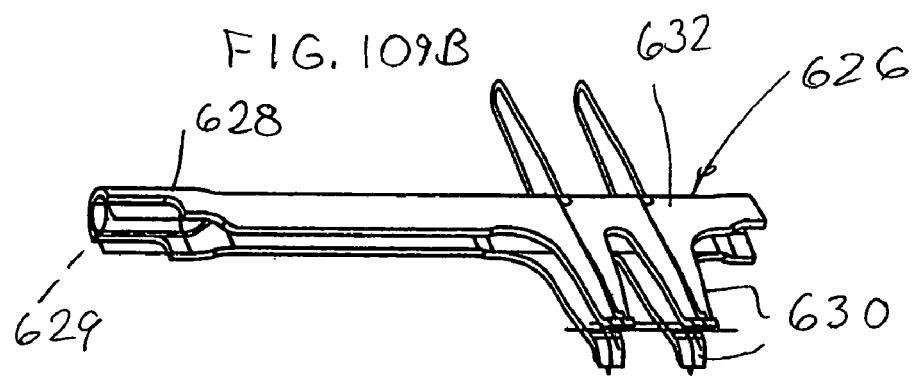

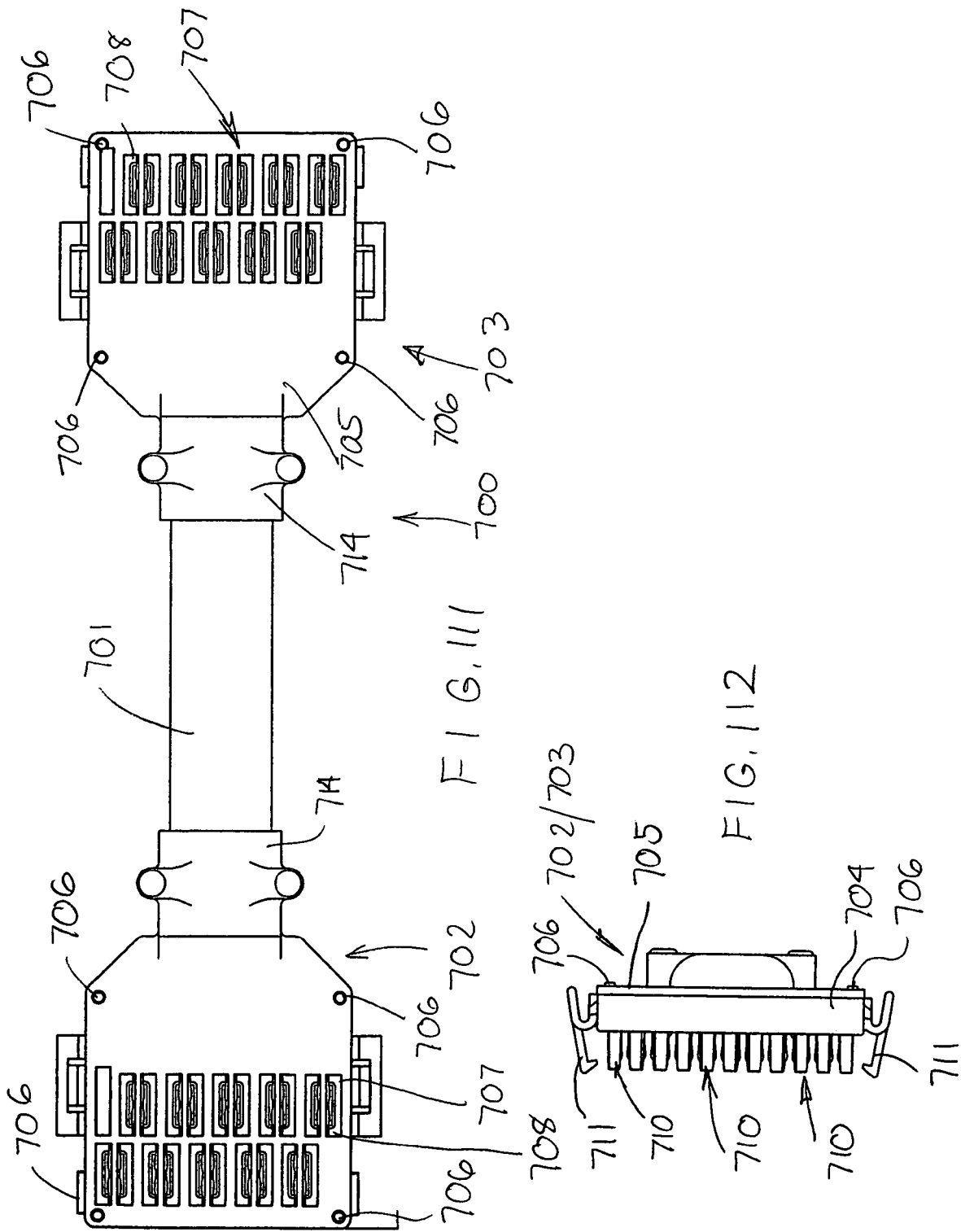

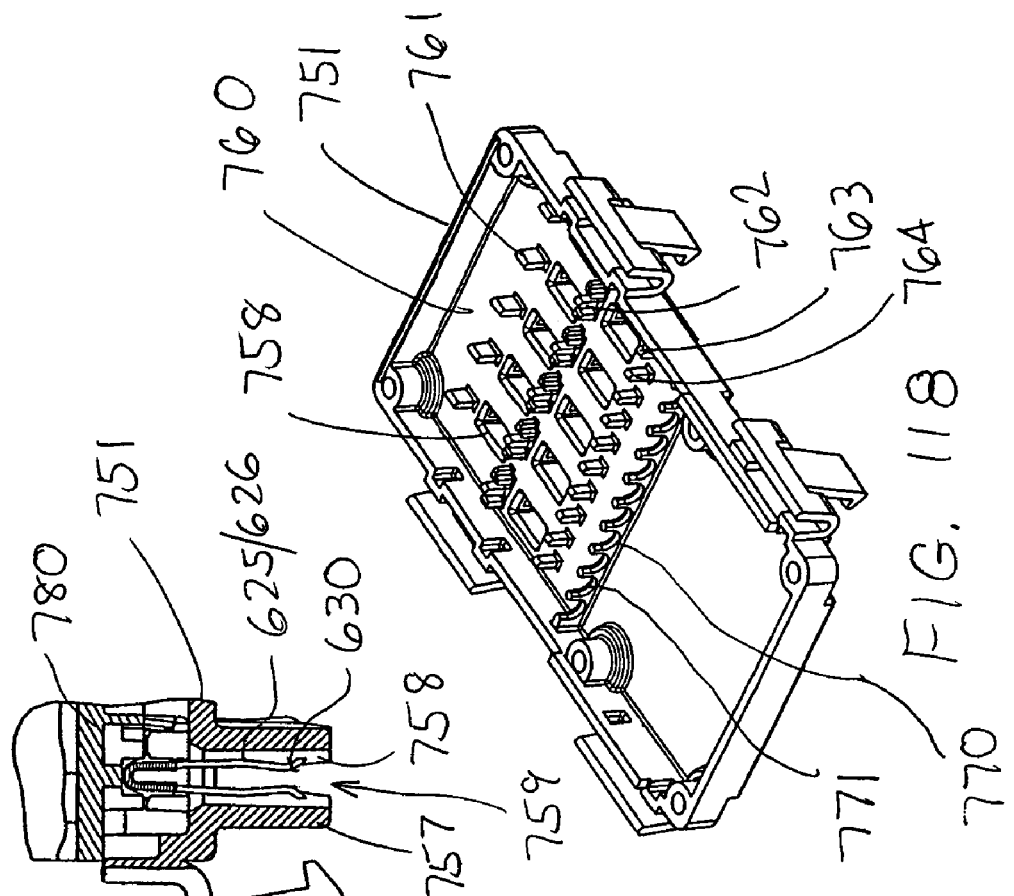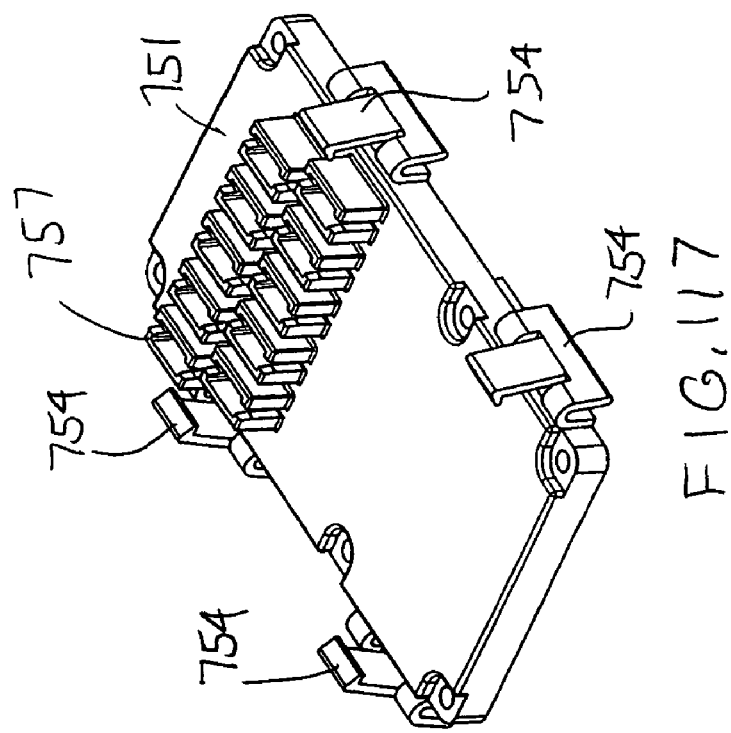

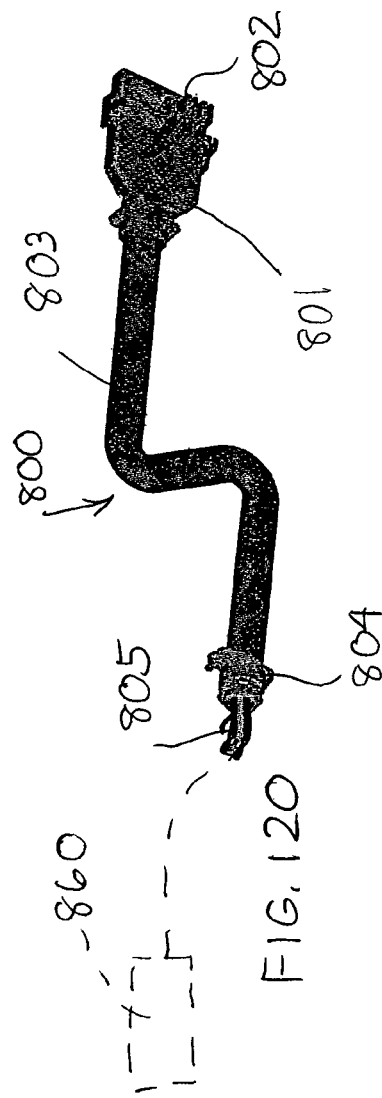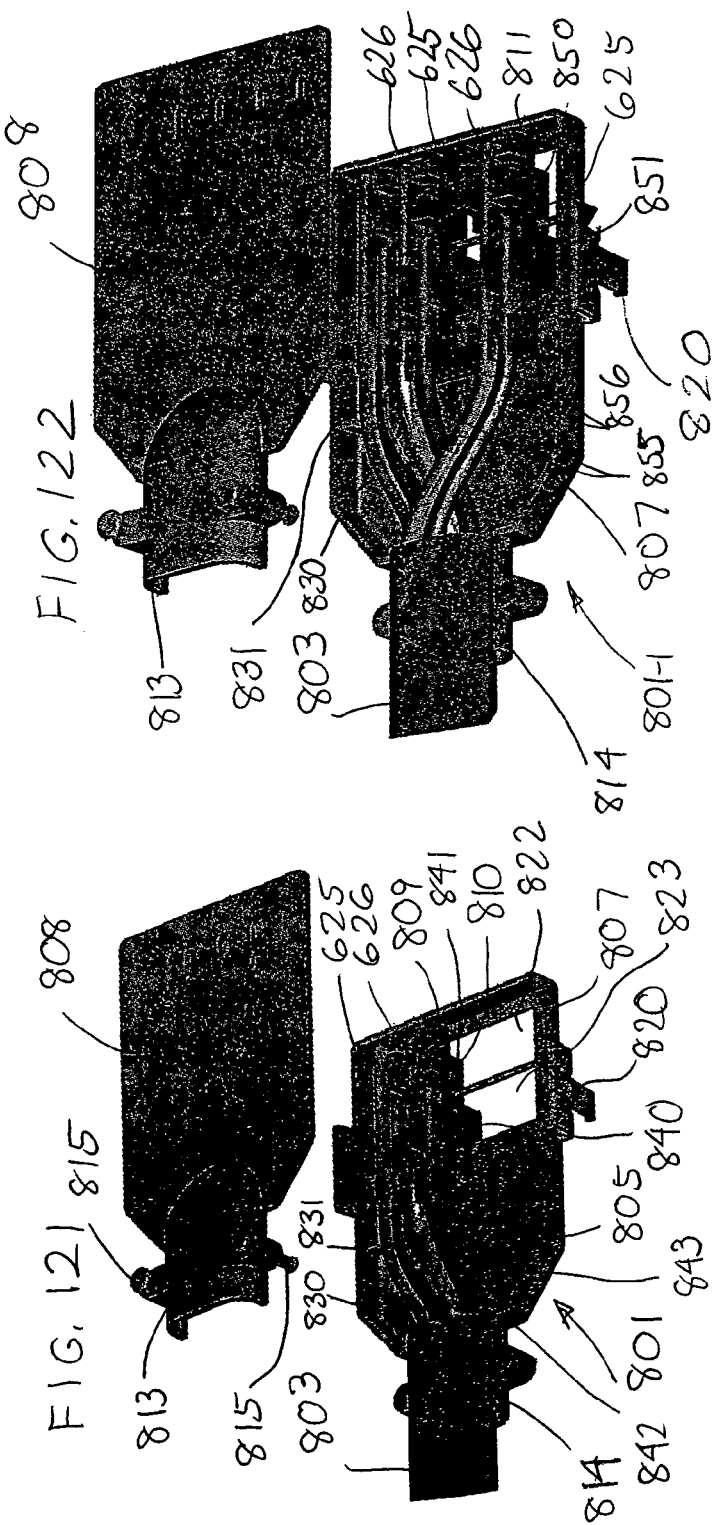

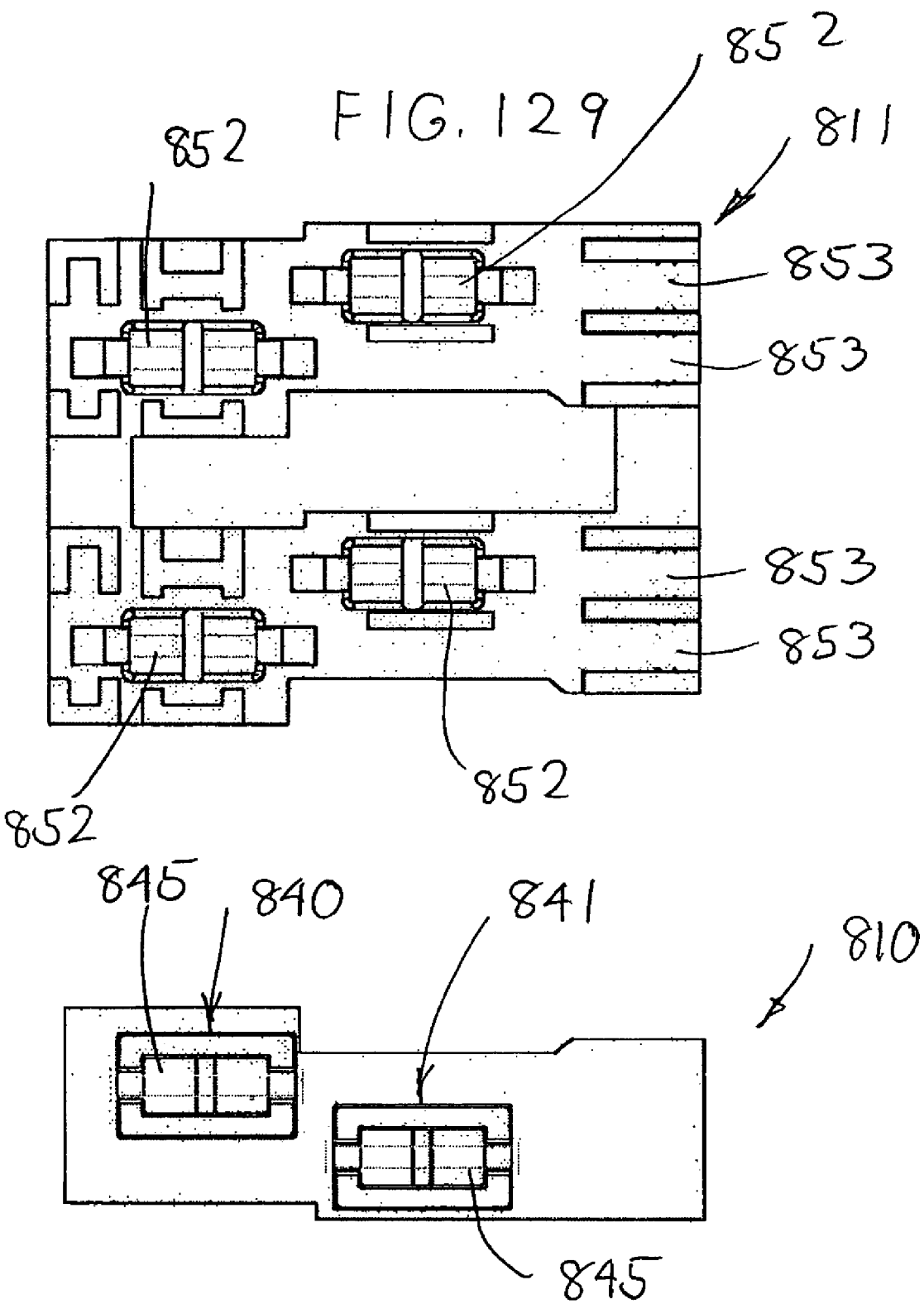

SOLID WIRE MODULAR ELECTRICAL SYSTEM FOR OFFICE AREAS

CROSS-REFERENCE TO RELATED APPLICATIONS

This application is a continuation-in-part of U.S. patent application Ser. No. 11/036,756, filed Jan. 14, 2005, now abandoned which is a continuation of PCT/US03/22278, filed Jul. 15, 2003, which claims priority of U.S. Provisional Patent Application No. 60/396,863, filed Jul. 15, 2002.

FIELD OF THE INVENTION

The invention relates to a modular electrical system for supplying power through an office area and more particularly, to an electrical power distribution system incorporating multiple modular components which are selectively configurable into a bus-bar based system and/or a cable based system.

BACKGROUND OF THE INVENTION

In office buildings, large open areas are often finished off to define an office environment configured for the specific needs of a business. This may be accomplished through combinations of different building systems such as raised floor systems, ceiling systems, wall panel systems, and desking or other furniture systems.

For example, space-dividing wall panel systems often are provided to subdivide a large office space into multiple, individual workstations. Each workstation includes various pieces of office equipment including computers, telephones and lighting wherein such equipment requires connection to power distribution systems as well as data distribution systems.

Such space-dividing wall systems include individual upright wall panels which are serially connected together to form the walls of the various workstations. Typically, such wall panels are provided with raceways extending therethrough in which power and communication cabling are laid.

While such wall panel systems perform the general function of sub-dividing a larger office area, a wide variety of wall panel systems are commercially available wherein the specific construction of these various wall panel systems differs from one system manufacturer to another. Further, each manufacturer also may manufacture and sell a variety of different wall panel systems as part of their product line.

In addition to wall panel systems, it is known to provide freestanding furniture systems such as arrangements of desks wherein each desk is adapted to support power and/or communication cabling systems thereon such as by raceways or cable hangers built onto the desks. As such, these desk systems may be used by themselves or if desired, in combination with wall panel systems.

Still further, the main office area typically includes a hard floor surface, such as a concrete surface covered by a suitable floor covering, wherein the above-described wall panel systems and desk systems are used directly thereon. To further enhance and simplify the routing of power and communication systems throughout the office area, it is known to provide raised floor systems which define a main floor area that is spaced above and overlies the pre-existing base floor of the office area. The raised floor area is covered with removable floor tiles and supports various furniture components thereon such as the desk systems and wall panel systems discussed above. A clearance space between the base floor and the raised floor tiles defines a raceway-like area wherein the floor tiles may be removed to permit the laying of power and communication cabling systems therein.

It is desirable therefore to provide data communication systems and power distribution systems which have significant flexibility for use with any or all of the above-described furniture systems.

As to power distribution systems, various power distribution systems are already in use. However, known power distribution systems may possess structural limitations which restrict the flexibility that such systems have for use with the various furniture systems discussed above. Accordingly, it is an object of the invention to provide an improved power distribution system which has significant flexibility and adaptability for use with a wide variety of building systems and, furthermore, has the capability to readily transition between the various building systems located in the office area.

The invention relates to a power distribution system comprising modular electrical components which are readily connectable together in multiple configurations depending upon the specific environment in which the power system will be used. The modular components include a solid wire power distribution assembly which forms a solid wire bus, a receptacle and flexible connector cables.

These modular components may be configured into a bus-bar based power system which is particularly suitable for use in raceways of wall panel systems or desk systems, or even a flexible cable based system for use by itself in wall panel, desk and raised floor systems. When transitioning between different building systems, for example, between the raceways of a raised floor system and a wall panel system supported thereon, a portion of the power system may be configured into a cable based system comprising flexible interconnected cables which may be used in a raised floor, wherein the flexible cables of the cable based system are then connected to a bus-bar based system that may supply power throughout the wall panel system.

The modular power system has significant flexibility and adaptability for use in most any combination of the above-described wall panel, raised floor, or desking system as well as other types of furniture systems, ceiling applications and the like.

Other objects and purposes of the invention, and variations thereof, will be apparent upon reading the following specification and inspecting the accompanying drawings.

BRIEF DESCRIPTION OF DRAWINGS

FIG. 2 is a perspective view of the wall panels arranged in a three-way T-connection having a bus-bar based configuration disposed in wall panel raceways.

FIG. 3 illustrates the wall panels of FIG. 2 reconfigured in a two-way, linear connection with the existing power system components modified to accommodate this connection.

FIG. 6 is a perspective view of a fixed raceway cover having two receptacle ports formed therein FIG. 7 is a perspective view of a further fixed raceway cover having a single receptacle port formed therein.

FIG. 8 is a perspective view of a further fixed raceway cover having four receptacle ports therein.

FIG. 9 is a perspective view of a further raceway cover having removable receptacle ports therein.

FIG. 10 is a perspective view of an adjustable raceway cover adapted to accommodate a single receptacle.

FIG. 11 is a perspective view of an adjustable raceway cover adapted to accommodate two single receptacles or a single double-width receptacle.

FIG. 12 is a perspective view of a bus-bar like power distribution assembly in combination with multiple receptacles and connector cables.

FIG. 13 is a perspective view of the components of the power system including a power distribution assembly, flexible branching connectors and multiple receptacles.

FIG. 14 is a perspective view of a standard flex connector.

FIG. 15 is a perspective view of an extended length flex connector.

FIG. 16 is a perspective view of an in-feed cable.

FIG. 17 is a perspective view of a standard branching connector.

FIG. 18 is a perspective view of an extended length branching connector.

FIG. 19 is a perspective view of a receptacle being connected to a branching connector.

FIG. 20 is a perspective view of a pair of branching connectors being joined with a receptacle.

FIG. 21 is a perspective view of a pair of branching connectors being joined together.

FIG. 22 is a perspective view of two branching connectors and an in-feed cable being interconnected together.

FIG. 32A is an end elevational view of the power distribution assembly and connector plug.

FIG. 33 is a perspective view of a ten-wire power distribution assembly.

FIG. 34 diagrammatically illustrates a first ten-wire circuit configuration for the power distribution assembly.

FIG. 35 diagrammatically illustrates a second ten-wire circuit configuration.

FIG. 36 diagrammatically illustrates a third ten-wire circuit configuration.

FIG. 37 is a perspective view of a six-wire power distribution assembly.

FIG. 38 diagrammatically illustrates a first six-wire circuit configuration.

FIG. 39 diagrammatically illustrates a second six-wire circuit configuration.

FIG. 40 diagrammatically illustrates a third six-wire circuit configuration.

FIG. 83 is a front view of an extruded, one-piece power distribution assembly.
FIG. 84 is a side cross sectional view of the power distribution assembly as taken along line 84-84 of FIG. 83.
FIG. 85 is an enlarged partial view of the side cross section.
FIG. 86 is a partial front view of an extruded, two-piece power distribution assembly.
FIG. 87 is an end cross sectional view of the power distribution assembly as taken along line 87-87 of FIG. 88.
FIG. 88 is an enlarged front view of a portion of the power distribution assembly.
FIG. 89 is an end cross sectional view as taken along line 89-89 of FIG. 86.
FIG. 90 is a cross sectional view of one of the extrusion halves.
FIG. 91 is an isometric view of an extruded multi-component power distribution assembly having inserts which define groups of openings.
FIG. 92 is an end view of the power distribution assembly.
FIG. 97 is front view of a further flex connector.
FIG. 98 is a bottom view of the flex connector.
FIG. 99 is a back view of the flex connector with a top cover removed from one end thereof.
FIG. 100 is a front view of the connector housing.
FIG. 101 is a back view of the connector housing.
FIG. 102 is an end view of the connector housing.
FIG. 103 is an inside view of the housing cover.
FIG. 104 is an end view of the housing cover.
FIG. 108 is an isometric view of a short quad-point terminal or contact.
FIG. 109A is a bottom view of a long terminal.
FIG. 109B is an isometric view of the long terminal.
FIG. 110 is an end cross sectional view of the terminals diagrammatically illustrating a PDA conductor inserted therein as well as a further terminal engaged therewith.
FIG. 111 is an inside view of a conduit-type connector.
FIG. 112 is an end view of the conduit-type connector.
FIG. 117 is an isometric view of the bottom in-feed housing.
FIG. 118 is an inside view of the bottom housing.
FIG. 119 is a partial cross sectional view of the in-feed housing.
FIG. 120 is an isometric view of a selectable jumper cable.
FIG. 121 is an exploded view of the end connector on the selectable jumper in a single slider version.
FIG. 122 is an exploded view of a double slider version.
FIG. 129 is a top view of the double slider block.
FIG. 130 is a bottom view of the single slider block.

Figure 1:
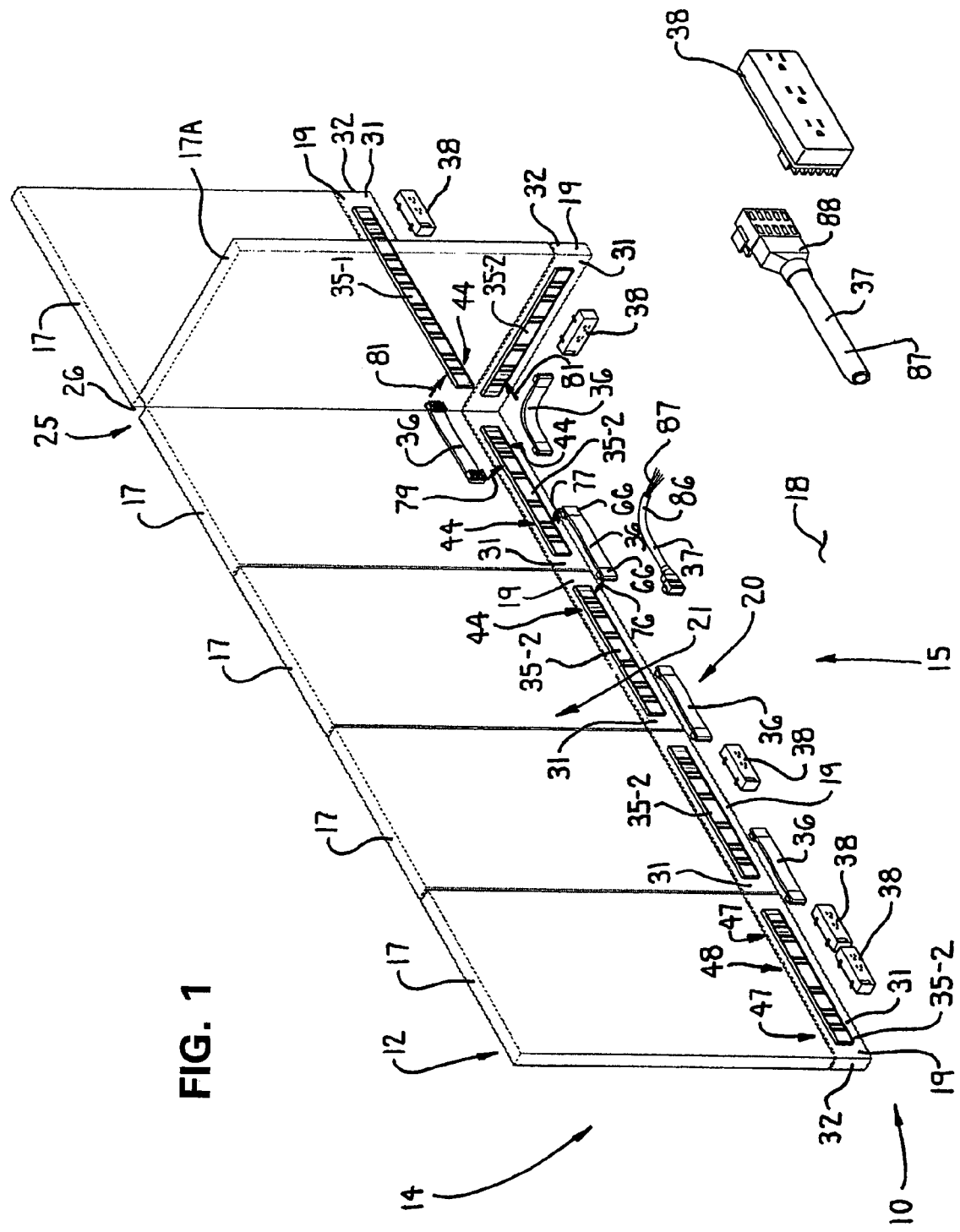
FIG. 1 is a perspective view of a space-dividing wall panel system having modular components of the inventive power distribution system arranged in a bus-bar based configuration.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

I. System Overview

Referring to FIG. 1, components of a modular multi-component power distribution system 10 are illustrated in use within a wall panel system 12. The wall panel system 12 is used to subdivide an open office area 14 into individual subdivided areas 15 such as for walkways, individual work stations and the like.

Generally, the wall panel system 12 includes a plurality of individual space-dividing wall panels 17 that are disposed in load bearing relation on a floor surface 18. Each wall panel 17 includes a horizontally elongate raceway 19 which in the illustrated arrangement is located at the base of the wall panel 17 as indicated by reference arrow 20 but which also may be located at other heights such as beltline height as indicated by reference arrow 21. The position of the raceways 19 at beltline and/or base height or at any other location within the wall panel is known and further disclosure as to the position of the raceways is not required herein.

Each raceway 19 defines a longitudinal passage extending between the opposite ends of each respective wall panel 17 and opens sidewardly in communication with the raceways 19 of each serially adjacent wall panel 17. As such, the serially aligned raceways 19 allow for the passage of cabling along the lengths of the interconnected wall panels 17.

As seen in FIG. 1, one of the wall panels 17A is interconnected with a pair of additional wall panels 17 through a three-way connection 25. In the specific three-way connection of FIG. 1, the serially adjacent wall panels 17 are separated by a vertically elongate gap 26 wherein one of the sides of the gap 26 is defined by the end of the wall panel 17A oriented perpendicular to the serially-adjacent wall panels 17. If desired, a further wall panel (not illustrated) could be positioned adjacent to the gap 26 on the side opposite to the perpendicularly positioned wall panel 17A to form a four-way connection.

Referring to FIG. 2, the wall panel system 12 illustrates the wall panels 17 and 17A oriented in the three-way connection 25 with the gap 26 formed therebetween. Each wall panel 17 includes a vertically enlarged panel body 28 which is supported on the floor 18 by a pair of support legs or glides 29 which project downwardly and are disposed in load bearing relation with the floor 18. The panel body 28 thereby is spaced vertically from the floor 18 such that the open area disposed therebetween defines the raceway 19.

The raceway 19 for each wall panel 17 extends horizontally between the support legs 29 so as to open horizontally from the opposite ends. As such, the opposite ends of the multiple raceways 19 defined by the panels 17 and 17A are in open communication with each other to allow cabling to be routed between the individual wall panels 17 and 17A.

As generally illustrated in FIG. 1, each wall panel 17 also includes a raceway cover 31 which encloses the opposite side faces of the raceway 19 while still defining an opening 32 at each opposite end of the panel 17 or 17A. While the raceway covers 31 are omitted in FIG. 2, the raceway covers 31 are mounted to the panel body 28 by cover connector brackets 33 which project downwardly. The raceway covers 31 are adapted to be snap-connected to the brackets 33 in a conventional manner.

Furthermore as to FIGS. 1 and 2, the modular power distribution system 10 is illustrated therein in an exemplary configuration. As will be understood from the following discussion, the power distribution system 10 is formed of multiple components which provide a high degree of flexibility to allow the power distribution system 10 to be adapted for use in multiple building systems and furniture configurations.

Figure 24:
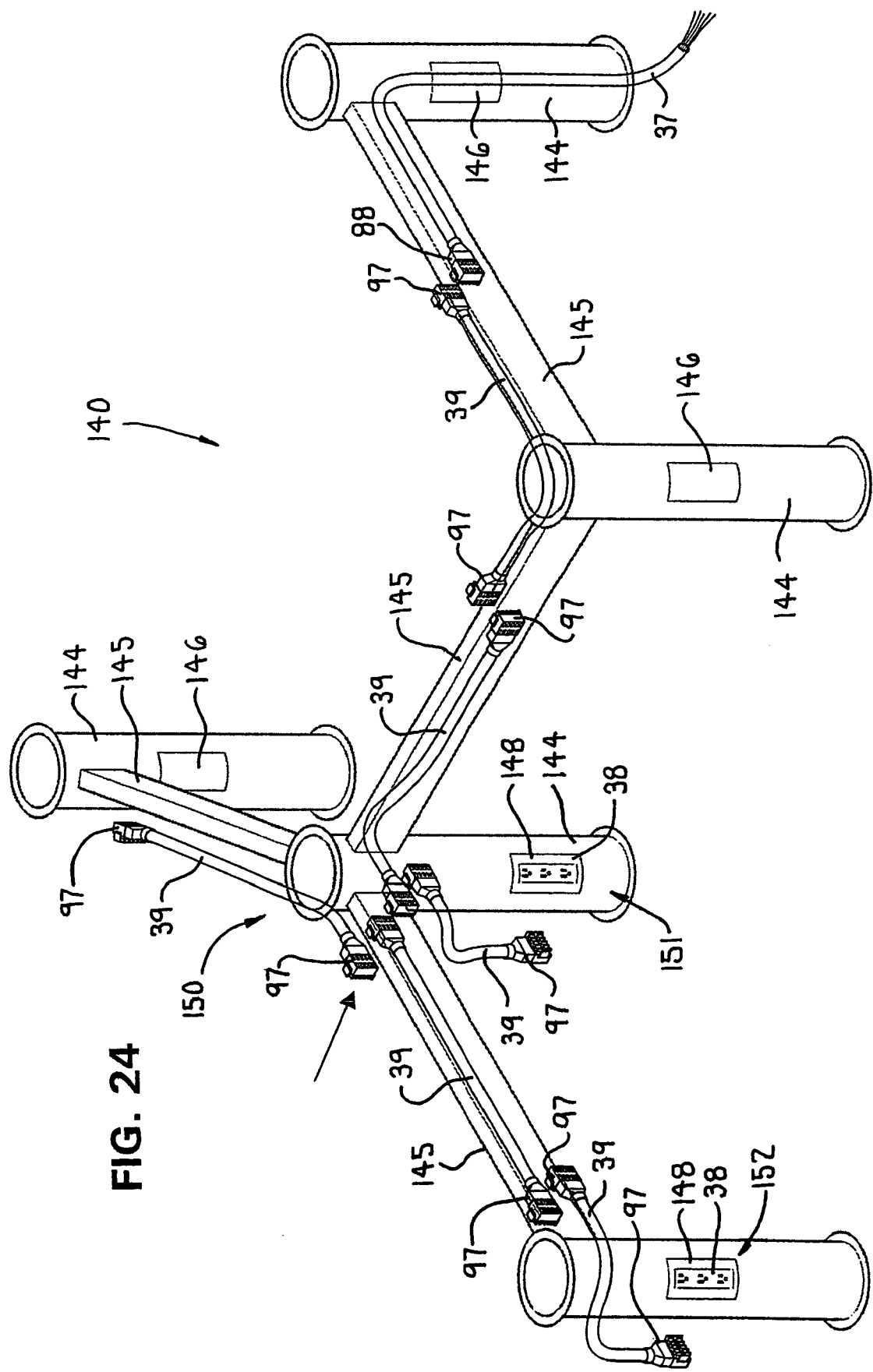
FIG. 24 is a perspective view illustrating a flexible cable based system installed in a space-dividing beam system.

As seen in FIG. 1, a number of the components of the power distribution system 10 are illustrated including a distribution assembly 35 (herein "PDA") which is formed as a sold wire bus-bar, a flex-type connector 36, a flexible in-feed cable 37 and a plurality of receptacles 38. These components are configured in a bus-bar based configuration. As seen in FIG. 2, the power distribution system 10 further includes flexible branching cables 39 which may perform a function similar to the flex connectors 36 but also may be used as the base component for forming a flexible cable based configuration, for example, as illustrated in FIG. 24.

Figure 29:
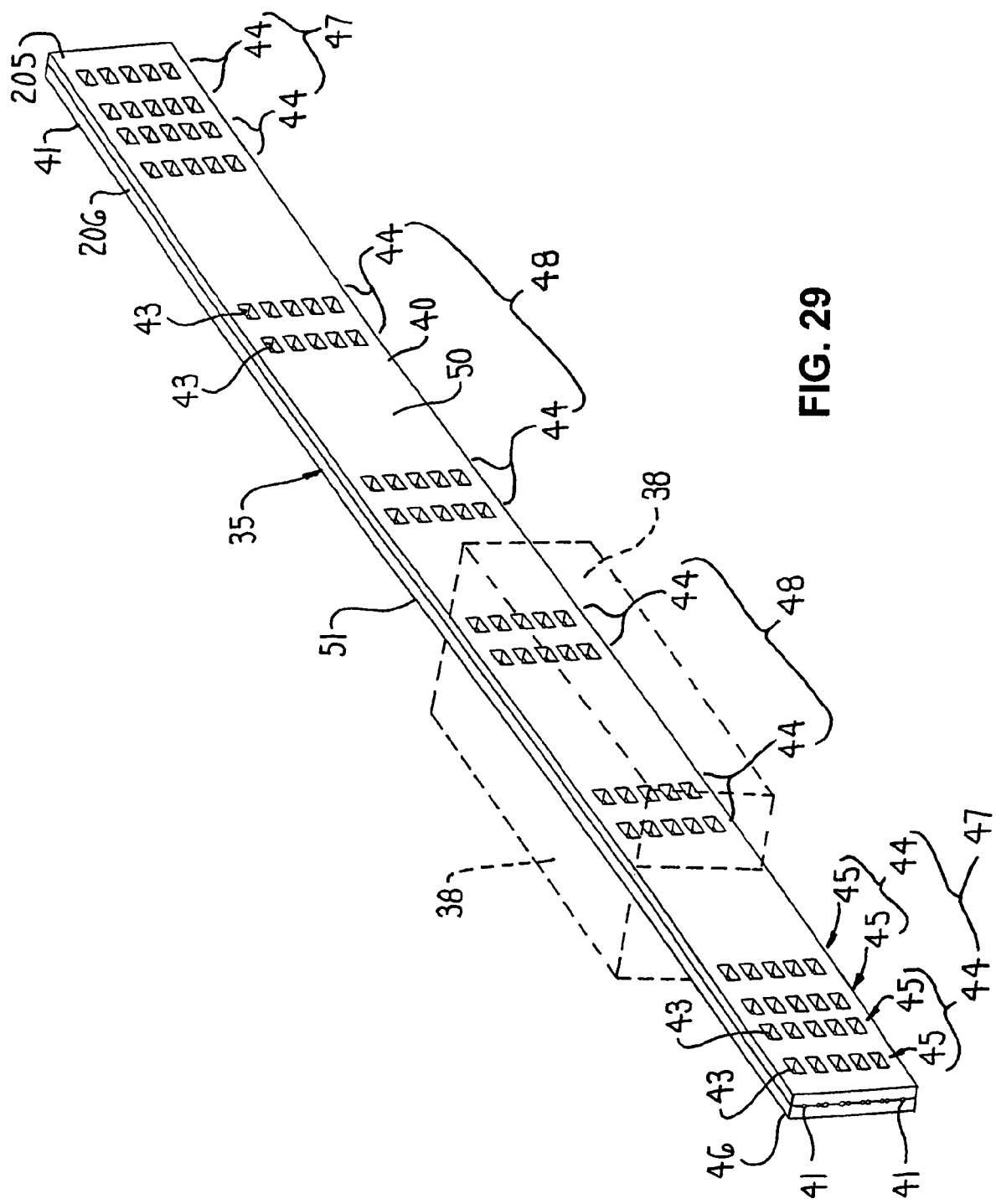
FIG. 29 is a perspective view of a power distribution assembly having receptacles illustrated in phantom outline.
Figure 30:
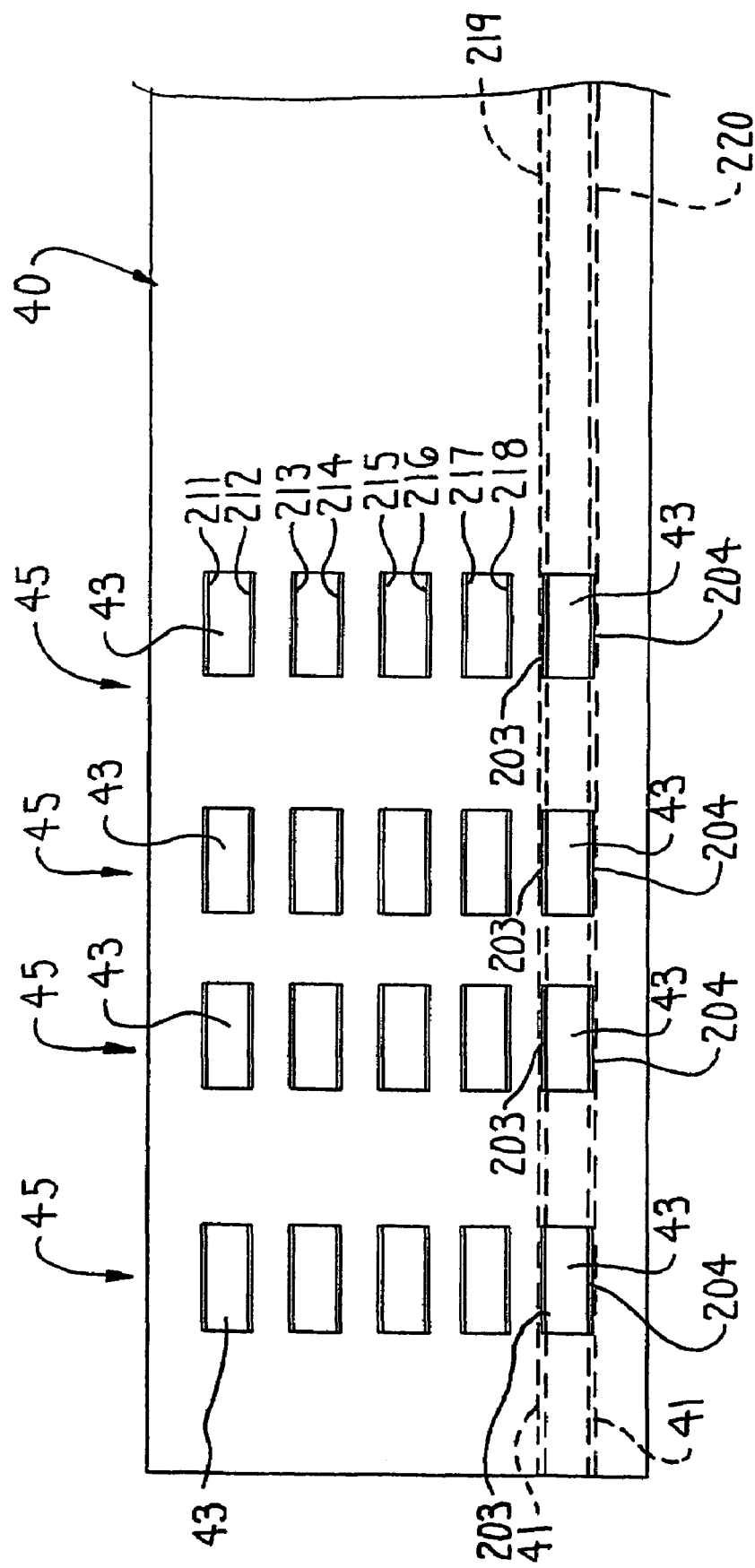
FIG. 30 is an enlarged front view of one end of the power distribution assembly.

In the bus-bar based configuration, a PDA 35 is suspended within the raceway 19 of each wall panel 17 or 17A. The PDA 35 is functionally similar to a bus bar as illustrated in FIGS. 29 and 30. As will be described in further detail herein, the PDA 35 has an extruded construction formed by an insulative casing 40 which has a plurality of parallel, vertically spaced apart electrical conductors 41 which are embedded within the casing 40 and extend longitudinally along the entire length thereof. The conductors 41 define multiple electrical circuits for distribution throughout the office area 14 wherein the conductors 41 define multiple circuits of line, neutral and ground wires.

To provide access to the conductors 41 and permit the connection of system components thereto, the casing 40 is formed with a pre-defined pattern of plug openings 43 wherein the plug openings 43 have portions of the conductors 41 exposed therein. The plug openings 43 are grouped into multiple groups of openings 43 wherein each group 44 is defined by a pair of vertical rows 45 of vertically spaced apart openings 43. Each opening group 44 is adapted to be connected to one of the aforementioned system components, namely a flex connector 36, an in-feed cable 37 or a receptacle 38.

More specifically, two opening groups 44 are provided at each of the opposite ends 46 and 47 of the casing 40. Each end pair 47 of groupings 44 is intended to be connected to one of the flex connectors 36, the in-feed cable 37 or the branching connector 39 which allows for the construction of an electrical power distribution system extending throughout the office area 14 which comprises multiple electrical circuits.

Each PDA 35 further includes at least one interior pair 48 of groupings 44 to which receptacles 38 may be connected. As seen in phantom outline in FIG. 29, one of the opening groups 44 in an interior pair 48 allows for a receptacle 38 to be plugged into and connected to one face 50 of the casing 40 while the other group 44 of the same interior pair 48 allows for another receptacle 38 to be plugged into the opposite casing face 51. As such, during installation, the receptacles 38 may be positioned on any of the PDAs 35 on either side thereof to supply power to specific work areas. As seen in FIG. 29, the illustrated PDA 35 is provided with a second interior grouping pair 48 which provides an additional pair of mounting locations for a further receptacle 38 (not illustrated).

The following provides an overview of the individual components of the power distribution system 10, particularly as to the general structure and function of these components.

Referring to FIG. 12, a PDA 35-1 is illustrated which is formed the same as the PDA 35 (FIG. 29) except that the PDA 35-1 includes three interior grouping pairs 48 between the end grouping pairs 47. This specific PDA 35-1 is illustrated in the endmost wall panel 17 of FIG. 1. Additional PDAs 35-2 are illustrated in the remaining wall panels 17 of FIG. 1. These PDAs 35-2 have the same basic construction as the PDAs 35 and 35-1 except that a single interior grouping pair 48 is provided thereon between the end grouping pairs 47.

In FIG. 1, the PDAs 35-1 and 35-2 are affixed to a bottom edge 53 of the panel body 28 so as to be suspended downwardly therefrom within the raceway 19. Each PDA 35-1 and 35-2 extends longitudinally along a substantial length of the panel body 28 and in the illustrated embodiment is disposed longitudinally between the raceway cover brackets 33. The PDAs 35-1 and 35-2 are relatively rigid and axially elongate so as to provide fixed mounting locations for the receptacles 38. Since the PDAs 35-1 and 35-2 are rigidly connected to the frame structure of the respective wall panel 17, each PDA 35-1 and 35-2 therefore is movable in unison with the wall panel 17 during initial assembly and subsequent reconfiguration of the wall panel 17. The PDAs 35-1 and 35-2 are adapted to be enclosed within the raceways 19 by the raceway cover 31.

By the use of multiple PDAs 35, multiple mounting locations are provided for the receptacles 38 to allow the receptacles 38 to be positioned in any work station 15 at a location which is most desirable for use by an office worker. In this regard, the receptacles 38 can be readily connected to one of the groupings 44 of the interior grouping pairs 48 not only at different longitudinal positions along a series of PDAs 35, but also on opposite sides of the individual PDAs 35.

As to the receptacles 38 (FIG. 12), these components generally have a receptacle housing 55 through which a plurality of three-prong outlets 56 are arranged. The outlets 56 open forwardly for access from the work station 15, and when mounted to a PDA 35, the receptacles 38 project through the raceway cover 31 as described in further detail herein.

To rigidly support the receptacle 38 on the PDA 35 and also electrically connect the receptacle 38 to the conductors 41 encased within the PDA 35, each receptacle 38 includes two aligned rows of posts 57 which project rearwardly from a back face 58 of the receptacle housing 55. The posts 57 are aligned horizontally and vertically with each other to define two aligned vertical rows of the posts 57. Each post 57 is adapted to be tight-fittingly inserted within a respective one of the plug openings 43 formed in a PDA 35. Further, each post 57 has an exposed electrical contact that is adapted to electrically connect to and abut against a respective one of the conductors 41 which is exposed within the plug opening 43. Due to the tight fitting engagement of the posts 57 within the plug openings 43, the cooperating plug parts of the posts 57 and the openings 43 not only allow for electrical connection of the receptacle 38 to the conductors 41 but also provide mechanical support to the receptacle 38.

The posts 57 also are readily disengaged from the grouping 44 to which the receptacle 38 is connected to allow for relocation of the receptacle 38 at a different location on one PDA 35 or a different location on a different PDA 35. To prevent inadvertent disengagement of the receptacle 38, locking parts are provided thereon such as hook-like locking flanges 59 (FIG. 10) which are adapted to snap over and grip onto the upper and lower edges 61 and 62 of the PDA 35.

The posts 57 are located at a longitudinally offset position on the receptacle backface 58, preferably near one end thereof. As such, the receptacle 38 can be mounted to one casing face 50 (FIG. 29) by insertion of the post 57 in one grouping 44 of an interior grouping pair 48. The same receptacle 38 can be positioned on the opposite casing face 51 merely by rotating the receptacle 38 one hundred eighty degrees about a vertical axis such that the posts 57 engage the other grouping 44 of the same interior grouping pair 48. Since the receptacle 38 mounts to a different grouping 44 depending on which side of the PDA 35 that the receptacle 38 is mounted, two receptacles 38 can be mounted in back-to-back relation as seen in FIG. 29 so that receptacles 38 are aligned with each other.

In addition to the above components, the power distribution system 10 further includes components for interconnecting each PDA 35 with an adjacent one of the PDAs 35 so as to define continuous electrical circuits extending throughout the office area 14. In a wall panel based arrangement such as in FIGS. 1, 4 and 5, the primary component is the flex connector 36 which connects serially between a pair of PDAs 35.

Referring to FIG. 14, the flex connector 36 includes a bendable conductor body 65 which terminates at its opposite ends in connector plugs or terminal units 66. The conductor body 65 is relatively rigid in the vertical direction but is bendable in the horizontal direction. The conductor body 65 is formed of an extruded insulative cover 67 in which a plurality of flexible electrical conductor wires extend. The conductor body 65 is mechanically interconnected with the connector plug 66 wherein the conductor wires therein electrically connect to electrical contacts in the connector plugs 66.

Each connector plug 66 includes an outer terminal or plug housing 67 having an interior face 69 and an exterior face 70. The interior face 69 includes a plurality of plug posts 71 which are arranged in two vertical rows of horizontally aligned posts in the same arrangement as the receptacle posts 57 described above. The posts 71 are adapted to be inserted into the openings of a corresponding one of the opening groups 44 in the PDA 35. The posts 71 when engaged with a grouping 44 of plug openings 43 electrically connects the flex connector 36 to the PDA 35 and when the opposite ends of the flex connector 36 are joined to a pair of PDAs 35, the electrical circuits extend continuously from one PDA 35 to a serially adjacent PDA.

In addition to the posts 71 on the interior face 69, the exterior face 70 of each connector plug 66 includes a further grouping 73 of plug openings 74. The plug openings 74 in each grouping 73 are arranged in two vertical rows wherein each individual plug opening 74 is horizontally aligned with an adjacent opening 74 in an adjacent row thereof. Each contact post 71 includes an exposed contact adapted to be engaged with a conductor of another component of the power distribution system 10 such as the PDA 35. The plug opening 74 also provides access to the same contact of the post 71. Thus, the electrical circuit completed between the connector plug 66 and a system component such as the PDA 35 may be further branched off or extended by plugging an additional system component into the grouping 73 of openings 74.

In a general sense, each connector plug 66 therefore has a first type of connector part, namely the posts 71 which define male connector parts, and a second type of connector part, namely the openings 74 which define female connector parts. The first and second types of connector parts thereby are different types which are configured to mate with each other. The male connector parts on the connector plug 66 connect to the female connector parts on another system component, while the female connector parts on the same connector plug 66 allow for the connection of another system component thereto through the male connector parts on the other system component. As such, each connector plug 66 has male connector parts and female connector parts which allows for stacking of multiple system components together.

When interconnecting PDAs 35 together, the flex connector 36 preferably is connected between two PDAs 35 by connecting each end of the flex connector 36 to one of the groupings 44 on a respective PDA 35.

Preferably as to the length of the flex connector 36, the length thereof is such that when two serially adjacent wall panels 17 abut against each other as seen in FIG. 1, the left connector plug 66 plugs into a right, endmost grouping 44 as indicated by reference arrow 76 on one PDA 35, while the right connector plug 66 plugs into a right grouping of a second, serially adjacent PDA 35.

Preferably, the spacing between the groupings 44 on each end grouping pair 47 of the PDAs 35 is dimensioned such that for a three-way connection as seen in FIG. 1, the same flex connector 36 is usable therewith. For a three-way connection, a serially adjacent pair of wall panels 17 are spaced apart from each other to define the gap 26 which gap has a width which corresponds to the thickness of the return wall panel 17A oriented perpendicular thereto. The spacing of the groupings 44 in each end group pair 47 corresponds to the spacing of the gap 26. Thus, in a three-way connection, the left connector plug 66 of a flex connector 36 is plugged into the right endmost grouping 44 of one PDA 35 as identified by reference arrow 79, and also plugs into the left endmost grouping 44 of a serially adjacent PDA 35-1 as indicated by reference arrow 80.

Accordingly, the same standard flex connector 36 may be used at the junction between each pair of wall panels 17, whether a two-way in-line connection, a three-way connection, or a four-way connection. Further, for the return wall 17A which is oriented perpendicular to a wall panel 17 in the three-way connection, a PDA 36 may be bent at a right angle and plugged in appropriate groupings 44 in the same manner as in the two-way connection described above, as indicated by reference arrows 79 and 81.

Referring to FIG. 15, an alternate flex connector 36-1 may be provided which is formed with a conductor body 84 which has a longer length as compared to the flex connector 36 of FIG. 14. The connector ends include connector plugs 83 which are identical to the connector plugs 66 described above.

As to the in-feed cable 37 illustrated in FIGS. 1 and 16, a length of flexible multi-conductor cabling 86 is provided which has a first end 87 which connects to a power supply.

The cabling 86 defines a plurality of electrical circuits and has a cable plug 88 at the free end 89 thereof.

The cable plug 88 includes a plug housing 90 which connects to the cabling end 89 by a collar 91. The housing 90 further has an interior face 92 from which projects a plurality of contact posts 93. The contact posts 93 are formed the same as the above-described posts 71 in the flex connector 36. The posts 93 have exposed contacts which are adapted to electrically connect to the conductors in the PDA 35. For the in-feed cable 37, however, the electrical circuits are supplied to the flex connector 36 as generally illustrated in FIG. 1 and they supply electrical power to the PDA 35 when connected thereto. It will be understood that the in-feed cable 37 also may supply the electrical circuits to any of the other system components including the flex connector 36 or the branching connector 39.

The in-feed plug housing 90 includes a grouping of plug openings 94 which define female connector parts that are adapted to connect, for example, to the posts 57 of the receptacle 38 or to the posts 71 of the flex connector 36. The openings 94 are arranged in the same configuration of two parallel vertical rows wherein each individual opening 94 aligns horizontally with an adjacent opening 94. The cable plug 88 also includes a pair of locking flanges 95 which snap-lockingly engage with another system component, such as to the upper and lower edges 60 and 61 of the PDA 35 to which the in-feed cable 37 is connected.

Referring to FIG. 17, a branching connector 39 is illustrated. The branching connector 39 has an intermediate cable 95 which is flexible and includes a plurality of conductor wires adapted to carry the circuits therethrough. The opposite ends of the intermediate cable 95 has connector plugs 97 connected thereto which connector plugs 97 are formed identical to the cable plug 88 of the in-feed cable 37. Each connector plug 97 has a configuration of contact posts 99 arranged in two vertical, sidewardly aligned rows like the other connector plugs described above. Also, plug openings 100 are arranged in the same pattern of sidewardly aligned rows and align respectively with the posts 99.

In FIG. 18, an alternative branching connector 39-1 is illustrated. The branching connector 39-1 has the identical connector plugs 97 at the opposite ends thereof with the intermediate cable 96-1 having a substantially longer length than the cable 96. The extended length cable 96-1 may be formed of any length but preferably has a large length so as to span large distances without the necessity of using multiple branching connectors 39.

Generally with the above-described components, a wide variety of cabling configurations may be constructed in order to accommodate the specific structural limitations of different building systems such as furniture, wall and floor systems. The following describes exemplary applications for the power distribution system 10. In many figures, the components are illustrated disconnected for clarity, it being understood that they physically connect together in use, for example, as illustrated in FIGS. 25, 26, 27, 28, 31 and 32B.

II. System Applications

Referring to FIG. 2, the wall panels 17 and 17A are arranged in a three-way configuration. In this arrangement, PDAs 35 are suspended from the wall panels 17 and 17A within the raceways 19. These PDAs 35 are joined together by system connectors such as the branching connector 39. The branching connector 39 has the same modular length as the flex connector 36 described above relative to FIG. 1. Therefore, in a three-way panel arrangement, the connector plugs 97 of the branching connector 39 connect to the endmost opening groupings 44 of two PDAs 35-2 as indicated by reference arrows 105 and 106.

Should the return wall 17A be removed such as during redesign of an office area 14, the remaining serially-aligned wall panels 17 may be slid together as indicated by reference arrows 107 in FIG. 3. While the PDAs 35-2 are now located closer together, the same branching connector 39 may be used.

In particular, the left connector plug 97 connects to the endmost PDA grouping 44 of one PDA 35 as indicated by reference arrow 108, while the right connector plug 97 connects to the right grouping 44 of the end grouping pair 48 as indicated by reference arrow 109. When installed, the branching connector 39 spans two serially-adjacent raceways 19 by extending over one facing side of the support leg 29.

As can be seen, the combination of PDAs 35 and branching connectors 39 provides significant flexibility in wall panel systems. Such flexibility may also be provided by the use of flex connectors 36 instead.

Figure 4:
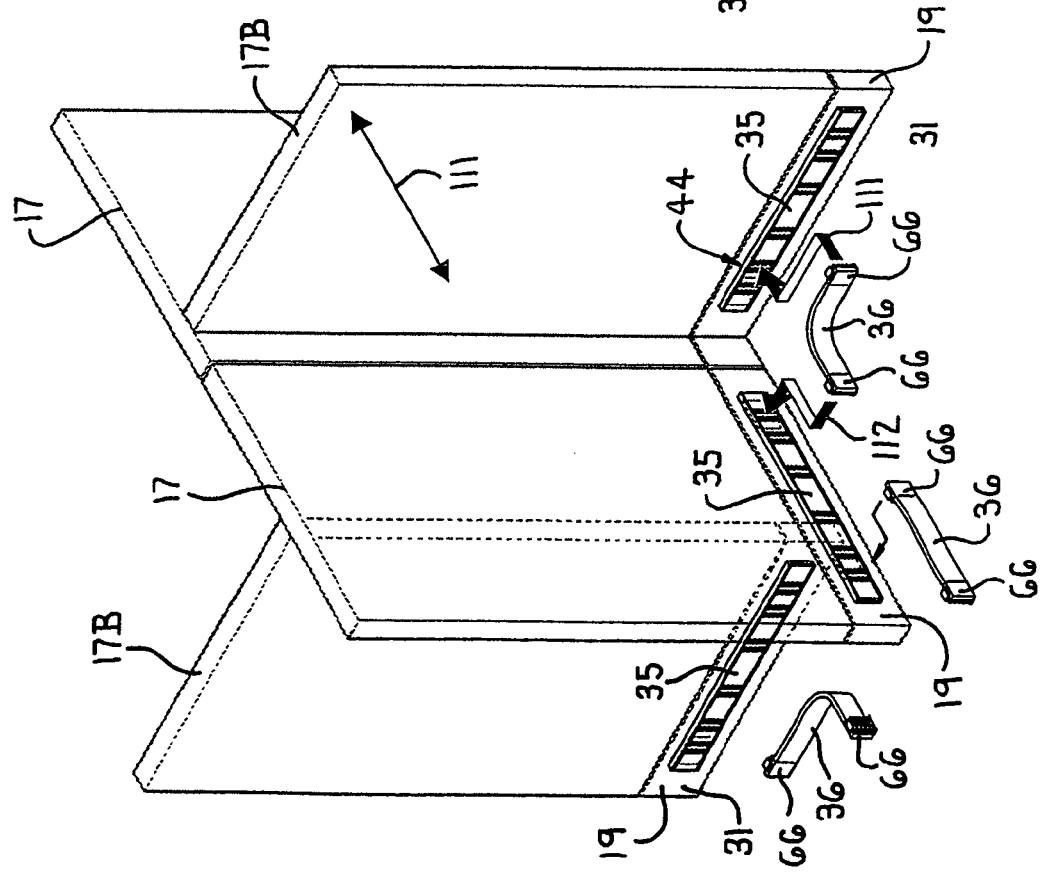
FIG. 4 is a perspective view illustrating an off-modular wall panel arrangement and a bus-bar based electrical system in one configuration.

In a further wall panel application, FIG. 4 illustrates a pair of serially-aligned wall panels 17 disposed in end-to-end relation. A pair of additional return wall panels 17B are mounted on opposite sides of the wall panels 17 in perpendicular relation thereto. Each wall panel 17 or 17B includes a PDA 35 mounted within the raceway 19 thereof.

One of the return wall panels 17B is diagrammatically illustrated as being slidable along a face of the wall panels 17 through multiple off-modular positions as indicated by reference arrow 111. In the position in FIG. 4, the PDA 35 of the wall panel 17B is electrically connected to an adjacent PDA 35 by a flex connector 36. The connector plug 66 connects to the return wall PDA 35 by insertion into the right opening grouping 44 as indicated by reference arrow 111, while the opposite end connector plug 66 plugs into the endmost grouping 44 on the adjacent PDA 35 as indicated by reference arrow 112.

A further flex connector 36 is provided at the end of the wall panel 17 to supply the electrical circuits thereto. A further flex connector 36 connects the other return wall panel 17B to the left wall panel 17 similar to the connection between the front wall panel 17B and the right wall panel 17 described above.

Figure 5:
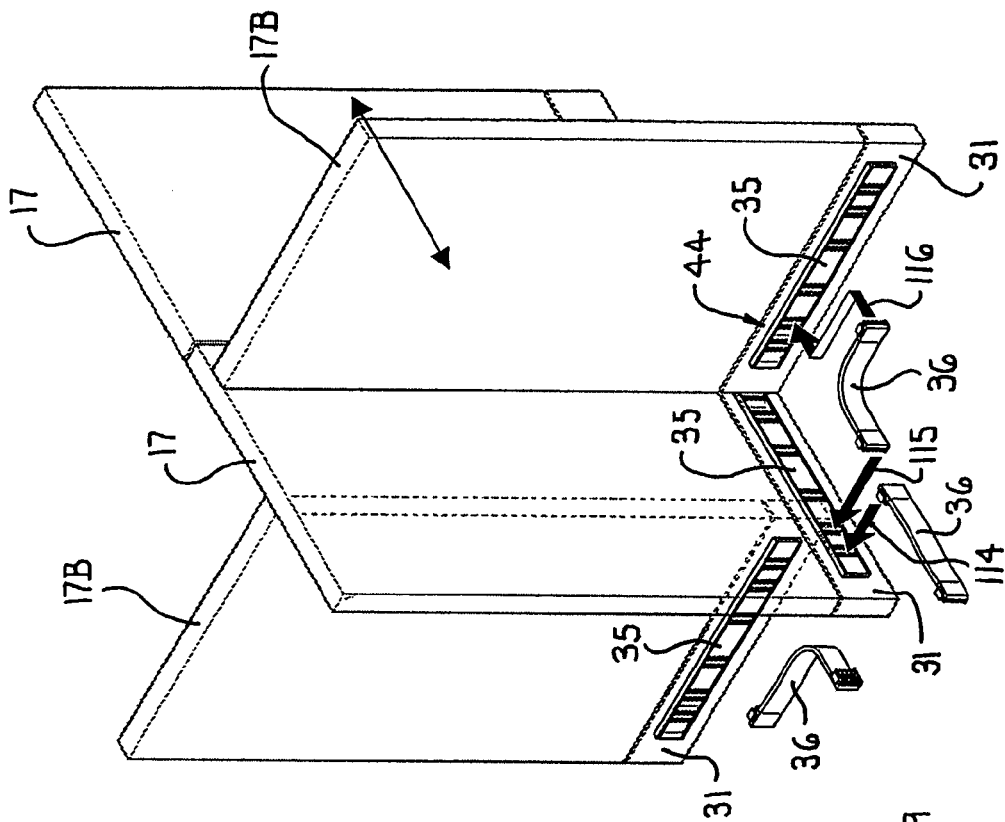
FIG. 5 is a perspective view of the bus-bar based configuration in a modified configuration during off-modular adjustment of the wall panels.

Referring to FIG. 5, the system components allow the return wall panel 17B to be slid to a new off modular position. In particular, the supply flex connector 35 on the left and connects directly to the endmost PDA grouping 44 as indicated by reference arrow 114. Directly adjacent thereto, the flex connector 36 for the return wall 17B is connected to the right grouping 44 of the end grouping pair 47 as indicated by reference arrow 115. The opposite end of this flex connector 36 remains connected to the right end pair grouping 44 of the return wall PDA 35 as indicated by reference arrow 116.

Once the system components are installed in the wall panels 17 and 17B, a suitable number of receptacles 38 are mounted to the PDAs 35, and the components are enclosed by the raceway covers 31, which are depicted in FIGS. 4 and 5 as being transparent for illustrative purposes. The receptacles 38, however, remain accessible through the raceway covers 31 so that electrical equipment, such as computers and the like, may be connected thereto.

FIGS. 6-9 illustrate four variations of raceway covers 31. In particular, the raceway cover 31-1 of FIG. 6 has a bottom wall 118 and a pair of side walls 119 projecting upwardly therefrom. The side walls 119 snap onto the cover brackets 33 wherein the side walls 119 enclose the respective raceway 19 while the opposite open ends 120 thereof remain open to permit cabling to extend from one wall panel 17 to the next. The side walls 119 further include fixed receptacle openings 121 on the opposite side walls 119 through which the receptacles 38 may project.

As to FIG. 7, the raceway cover 31-2 therein has a single, central receptacle opening 122 on each side wall, while the cover 31-3 of FIG. 8 has four (4) such openings 123 through the opposite sides. In FIG. 9, the openings 124 of the cover 31-4 are provided on each side and defined by perforated knockouts. FIG. 10 illustrates a cover 31-5 which has a slidable door 126 which permits the size of the opening 127 to be adjusted, for example, to accommodate a single receptacle 38. The cover 31-6 of FIG. 11 has a door 128 which allows the size of the opening 129 to be adjusted to accommodate one or more single receptacles 38 or a double width receptacle 38-1.

Referring to FIG. 13, the system components also may be combined with a short PDA 35-3 interconnecting two branching connectors 39. The PDA 353 differs in that the length thereof is relatively short and only three groupings 44 of plug openings 43 are provided thereon. The end groupings 44 may be connected to the branching connectors 39 to electrically and mechanically connect all of these components together. One receptacle 38-1 may be mounted on the back face 131 of the PDA 35-3 by connection to the middle grouping 44. Another receptacle 38-2 may be mounted to the front face 132. Since only one receptacle 38 may be mounted directly within a single grouping 44, the second receptacle 38-2 could be mounted to the connector plug 97 on either of the branching connectors 39 by plugging the receptacle posts 57 within the group of openings 94 on the connector plug 97.

While the above configurations use a PDA 35 therewith, the in-feed cable 37, the receptacles 38 and the branching connector 39 may be used independently of the PDA 35. For example, in FIG. 19, the receptacle 38 may be connected to a connector plug which may be a cable plug 88 of an in-feed cable 37 or a connector plug 97 of a branching connector 39. In particular, the contact posts 57 may be plugged into the openings 94 or 100 to mechanically and electrically connect the receptacle 38 thereto. The locking flanges 59 on the receptacle 38 removably engage the cable plug 88 or connector plug 97 to prevent inadvertent disengagement of the receptacle 38.

As to FIG. 20, the connector plug 97 of two adjacent branching connectors 39 may be connected together in stacked relation by engaging the male connector parts, namely the posts 99, of one connector plug 97 with the female connector parts, namely the group of openings 100, of the other connector plug 97. A receptacle 38 may be connected to or stacked on the upper connector plug 97 by engaging its male connector parts, namely the contact posts 57 with the female connector parts, i.e. the openings 100, of the connector plug 97. Therefore, the branching connectors 39 are interconnected to define an elongate cabling assembly while the connector plugs 97 define a receptacle mounting location.

In FIG. 21, the components may include the in-feed cable 37 and an extended branching cable 39-1 wherein the respective cable plug 88 and connector plug 97 are interconnected together by plugging of the posts 99 into the openings 94.

As to FIG. 22, an alternate arrangement of components may be stacked together. In particular, the in-feed cable 37 has live electrical circuits supplied to the cable plug 88 which circuits are accessible through the openings 94. Two additional branching connectors 39 are connected thereto. Since the connector plug 97 and cable plug 88 are all non-handed, one branching connector 39 may be oriented so as to extend to the left in one downstream direction, while the other branching connector 39 extends to the right in an opposite downstream direction. Each branching connector 39 is connected to the in-feed cable 37 due to the interconnection of the posts 99 and openings 100.

Referring to FIGS. 23-28, the power distribution system 10 is usable in multiple different wall, furniture and floor systems, either individually or in combinations of such systems. FIGS. 23-28 illustrate representative installations for such wall, furniture and floor systems, and it will be understood that the inventive power distribution system 10 has significant flexibility not only for use as illustrated but also for use in a variety of configurations.

Figure 23:
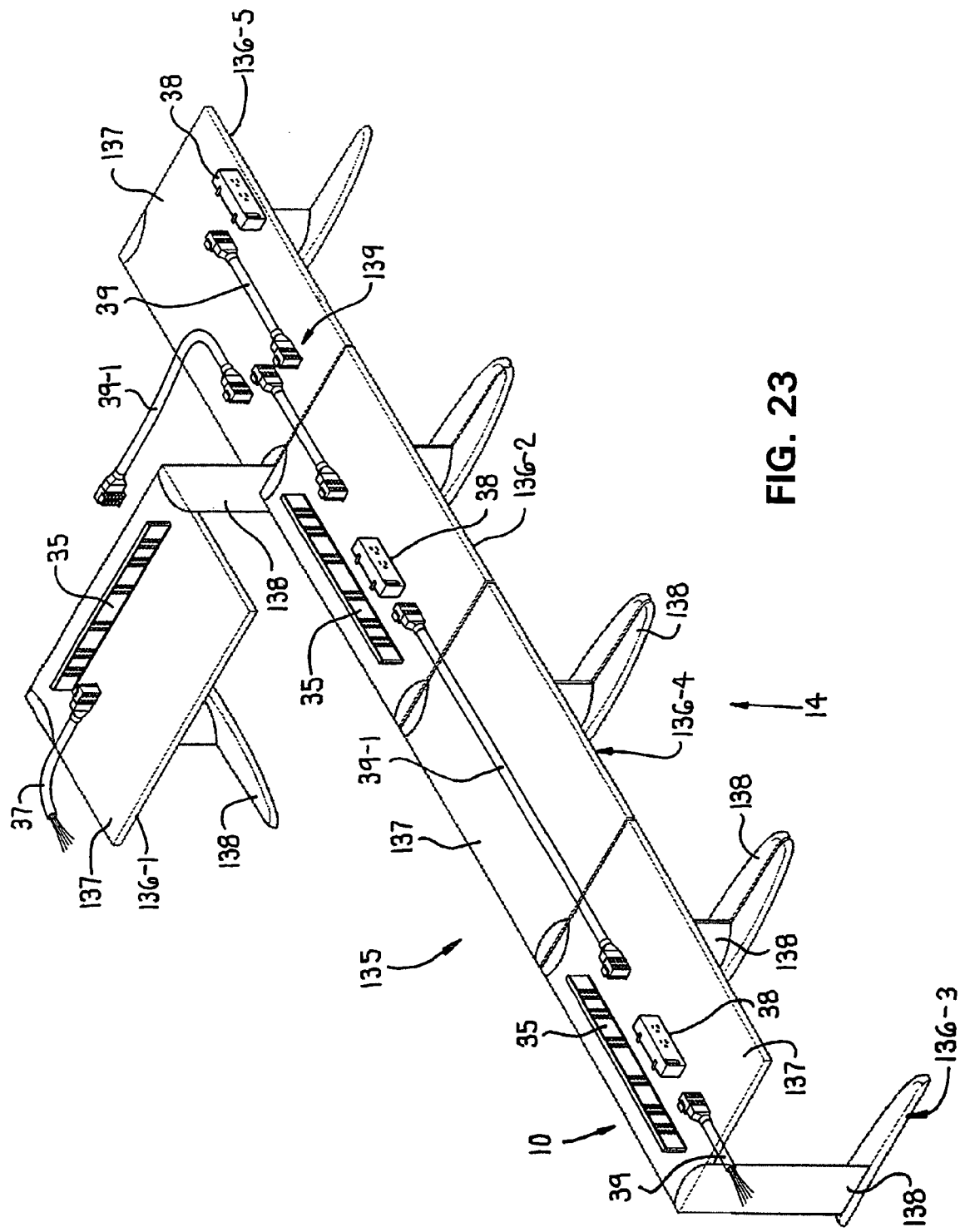
FIG. 23 is a perspective view of the power distribution system defining a bus-bar based configuration for use in a desking system.

In FIG. 23, a desking system 135 is illustrated, which comprises a plurality of individual desks 136. Each desk 136 includes a work surface 137 which is supported by a pair of legs 138.

Most of the desks 136 are positioned in end-to-end relation although one desk identified by reference numeral 136-1 is oriented transverse thereto. This desk 136-1 has a PDA 35 suspended from an underside of the work surface 137 wherein an in-feed cable 37 is connected to the PDA 35.

Additional desks 136-2 and 136-3 also have PDAs 35 suspended therefrom. The PDA 35 on the desk 136-1 is connected to the PDA 35 on the desk 136-2 which in turn is connected to the PDA 35 on the desk 136-3 by three extended branching connectors 39-1. The first two branching connectors 39-1 are connected serially together and bent around the corner defined between the desks 1361 and 136-2. The third branching connector 39-1 spans or extends entirely across the desk 136-4 which is disposed between the desks 136-2 and 136-3. Another branching connector 39 is connected to the end of the PDA 35 on the end desk 136-3 and provides electrical power to other locations in the office area 114.

To provide outlets for the individual offices, a plurality of receptacles 38 are provided. As seen on the desks 136-2 and 136-3, a receptacle 38 may be connected to any PDA 35, on either face thereof. As such, the receptacles 38 are located below the work surface 137 and are therefore hidden from sight.

Also, a receptacle 38 may be connected to the system in a tethered configuration. In particular, a branching connector 39 is connected between the receptacle 38 and the junction 139 of the two serially-connected branching connectors 39. As such, the receptacle 38 may be positioned at a selected location under the worksurface 137 of the desk 136-5, and therefore is not confined to a specific location dictated by the position of the PDA 35.

In FIG. 24, a post-and-beam space-dividing system 143 is illustrated. This system 143 is defined by vertical posts 144 which serve as legs for horizontal beams 145. The posts 144 and beams 145 are hollow so as to define vertical and horizontal raceways. The posts 144 further include a utility port 146 which is adapted to accommodate a receptacle 38 and a faceplate 148 therefor.

The power distribution system 10 is configured in FIG. 24 in a cable based arrangement which does not use any PDAs therein. Rather, the system 10 is constructed solely of branching connectors 39, receptacles 38 and an in-feed cable 37. The in-feed cable 37 is fished through the post 144 and partially along the length of a beam 145. Branching connectors 39 are connected serially thereto so as to extend along the length of the beams 145. At the cable junction 150, two downstream branching connectors 39 are connected to and extend away from an upstream branching connector 39 generally in a Y configuration.

Also at the junction 150, another branching connector 39 is provided to define a jumper or tether for supplying electrical circuits to the receptacle 38 located in the post 144 at location 151.

At the end post 144 at location 152, another branching connector 39 is fished through the beam 145 and post 144, the free end of which is connected to the receptacle 38.

Figure 25:
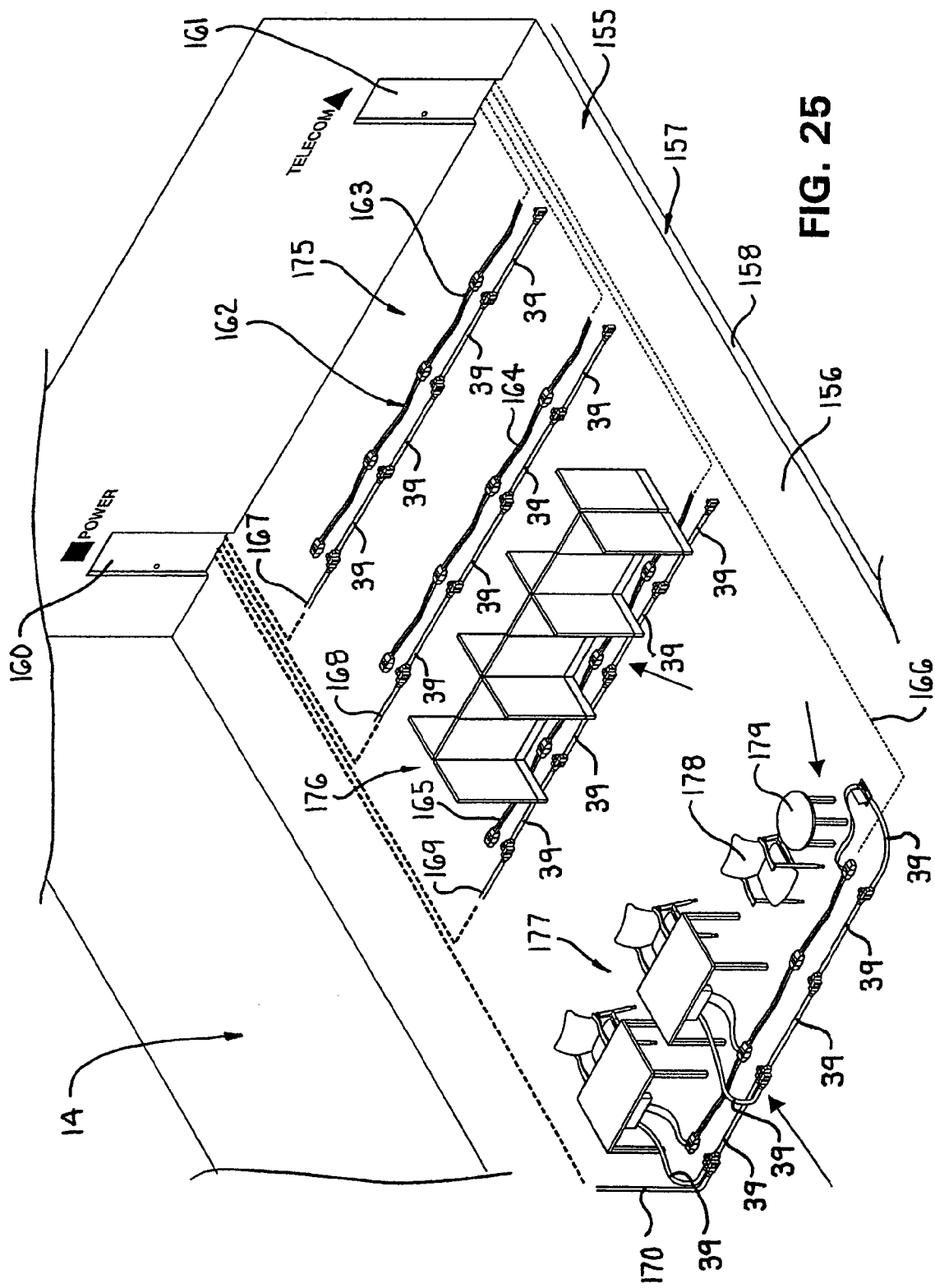
FIG. 25 is a perspective view illustrating the modular power distribution system and a data distribution system installed in a raised-floor system.

In a more comprehensive application, as illustrated in FIG. 25, it is known to first outfit an office space 14 with a raised floor system 155. Raised floor systems are well known, and typically include removable floor tiles 156 which enclose a raceway space 157 defined vertically between the floor tiles 156 and the base floor surface 158.

The office space 14 also may include a power closet 160 and a telecommunications closet 161 which supply the entire office space or building. As such, a modular telecommunications cabling system 162 runs from the telecommunications closet 161 in multiple cable runs 163, 164, 165 and 166. Also multiple cable runs 167, 168, 169 and 170 of the power cabling are provided.

In this example, the power cable runs 167-170 are defined by a cable based arrangement of serially connected branching connectors 39. Generally, the telecommunication runs 163 and 164 and the power runs 167 and 168 extend through the raceway space 157 and supply data and power circuits to an open floor space 175.

The data run 165 and the power run 169 extend below and supply a wall panel system 176 disposed on top of the raised floor system 155. The remaining data run 166 and power run 170 supply a desk system 177 and additional freestanding furniture components, namely a side chair 178 and a table 179.

Figure 26:
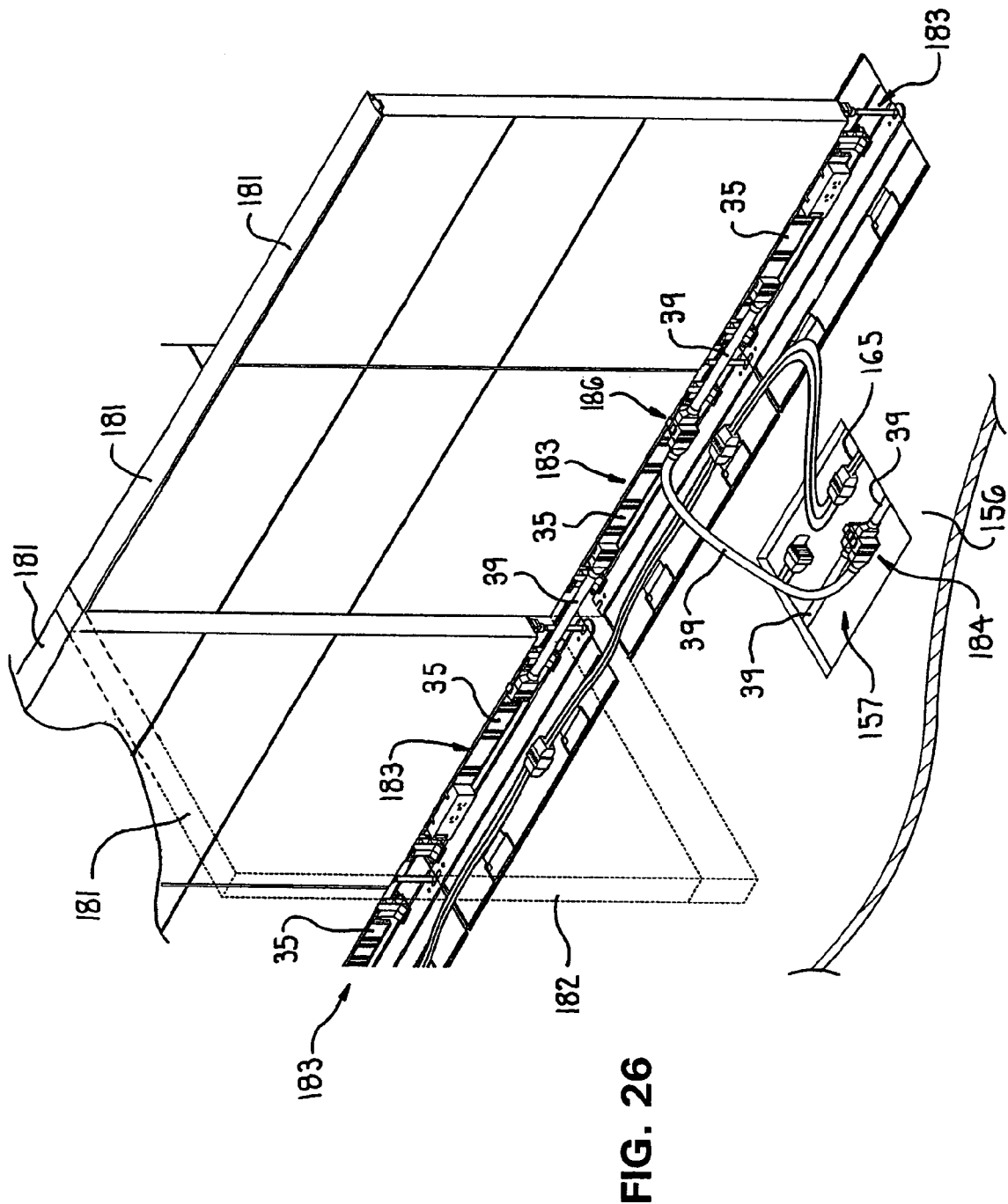
FIG. 26 is a perspective view illustrating the power distribution system installed in a raised-floor system and a wall panel system supported thereon.

Referring more particularly to FIG. 26, the wall panel system 176 includes a plurality of wall panels 181 wherein one of the wall panels 181 defines a return wall 182. As described previously, each wall panel 181 has a raceway 183 extending longitudinally along the bottom edge thereof. The power distribution system 10 is configured for this application in a hybrid arrangement of a bus-bar based arrangement for the wall panels 181 and a cable based arrangement for the raised floor system 155.

In the floor raceway 157, a plurality of branching connectors 39 are connected serially together, with a further branching connector 39 being connected thereto at the cable junction 184 and extending out of the floor raceway 157 through an access opening 185 formed by removal of a floor tile. This branching connector 39 extends into a panel raceway 183 at location 186.

In the wall panel raceways 183, each panel 181 has a PDA 35 suspended therefrom wherein serially-adjacent PDAs 35 are connected together by a branching connector 39. Further, the branching connector 39 extending from the floor is connected to the panel raceway cable components by connecting the end of this branching connector 39 to one of the branching connectors 39 connecting the PDAs 35 together at location 186.

Figure 27:
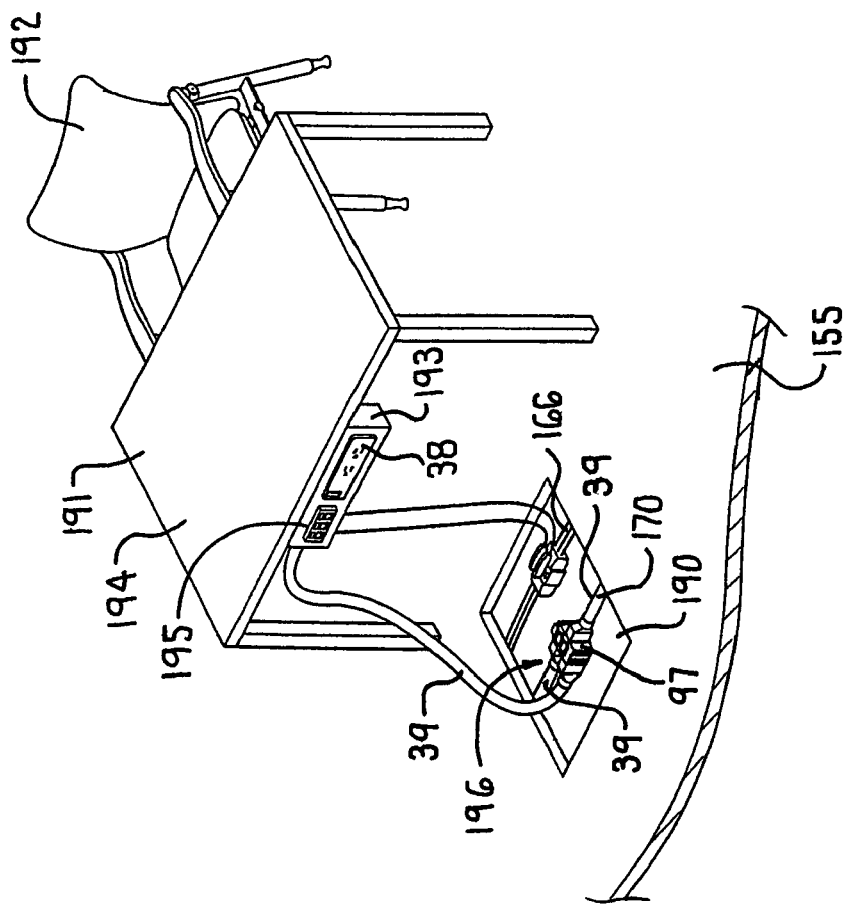
FIG. 27 is a perspective view illustrating a desk arrangement positioned on a raised floor system having the power distribution system and a data distribution system provided therein.

Referring to FIG. 27, the power run 170 and the data run 166 are exposed through an access opening 190 created in the raised floor system 155 by removal of a floor tile. This access opening 190 is located adjacent to a desking system 177, which desking system includes a desk 191 and a chair 192 disposed adjacent thereto. The desk 191 has a receptacle housing 193 mounted near a front edge of a worksurface 194. The housing 193 includes a power receptacle 38, as well as a multi-port data receptacle 195. A branching connector 39 has one end connected to a junction 196 defined between two branching connectors 39. The connector port 97 is connected at the cable junction 196 in stacked relation. The upper end of the cable 39 is connected to the receptacle 38 in substantially the same manner as that illustrated in FIG. 19.

Figure 28:
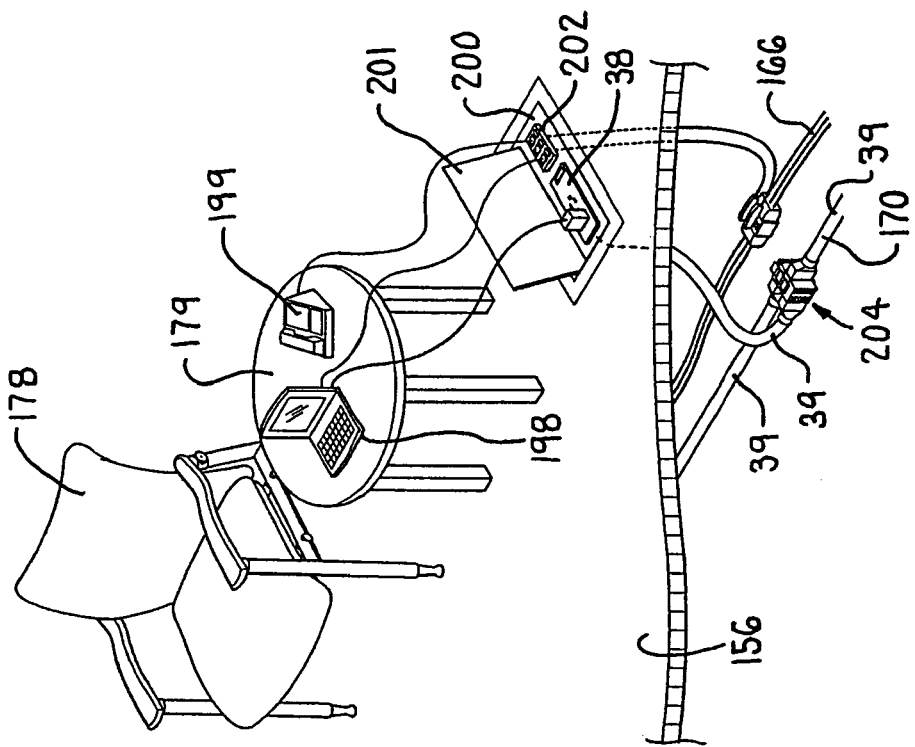
FIG. 28 is a perspective view illustrating the power distribution system in a raised floor system having receptacles accessible through a floor-mounted outlet box.

Referring to FIG. 28, the side chair 178 and the table 179 are illustrated with a laptop computer 198 and a telephone 199 disposed thereon. In this arrangement, the data run 166 and power run 170 are connected to a floor-mounted junction box 200. The junction box 200 includes an access door 201, which closes flush with the floor tiles 156. The junction box 200 further includes a data run 202 and a power receptacle 38.

The power run 170 has two branching connectors 39 interconnected together to define a junction 204, to which is connected a further branching connector 39, which extends upwardly and is connected to the power receptacle 38 in the junction box 200.

III. System Components

More particularly, as to the PDA 35, FIG. 29 illustrates one configuration for a power distribution assembly having end grouping pairs 47 and two interior grouping pairs 48. The two interior grouping pairs 48 provide two different mounting locations for receptacles 38 wherein one opening group 44 of an interior pair 48 permits mounting of the receptacle 38 on one side of the PDA 35, while the other opening group 44 of the same interior pair 48 permits the receptacle 38 to be mounted to the opposite side thereof. As discussed above, the plug openings 43 of each group 44 are arranged in two vertical rows 45, which rows 45 are aligned horizontally with each other. In other words, each plug opening 43 is aligned horizontally with another plug opening 43 in side-by-side relation.

The plug openings 43 have a rectangular shape and project through the entire thickness of the PDA casing 40 so as to open from the opposite casing faces 50 and 51. This allows a system component such as any of the connector plugs 83 or 97, or cable plug 88, to be plugged therein through either one face 50 or the other face 51, as illustrated in FIGS. 29 and 32A. Each opening 43 is defined vertically by an upper edge 203 and a lower edge 204.

The casing 40 is defined by casing halves 205 and 206, which are interconnected together in facing relation to define an interface 207 therebetween. The conductors 41 are sandwiched between the casing halves 205 and 206, as illustrated in FIG. 32A and furthermore, extend longitudinally along the entire length of the PDA 35.

More specifically, as to the conductors 41, the construction of the PDA 35 illustrated in FIG. 29 has 10 conductors or wires 41 and is thereby referenced as a ten-wire configuration. The conductors 41 are arranged in vertically spaced relation wherein each pair of conductors 41 has a vertical spacing which corresponds to the vertical size of the opening 43 as defined between the upper and lower edges 203 and 204.

As illustrated in FIG. 32A, each opening 43 provides access to an exposed portion of a pair of conductors 41. Specifically, each of the upper and lower edges 203 and 204 has one of the conductors 41 projecting vertically into the open area of the opening 43. The conductors 41 are specifically identified by reference numerals 211-220, with conductors 211, 212 and 215-220 being 12-gauge conventional conductor wire formed of. The conductors 213 and 214 in this illustrated construction are formed of 10-gauge wire to provide a higher capacity, particularly where the conductors 213 and 214 are configured for use as a neutral wire which serves multiple circuits. A more detailed discussion of the assignment of ground, neutral and line wires is discussed in further detail hereinafter. It will be understood that all of the wires may be formed of the same wire gauge, or that different gauges and compositions of wires could be used.

Referring to FIG. 30, each of the conductors such as conductors 219 and 220, which are illustrated in phantom outline, extend along the casing 40 with horizontally spaced apart portions of each conductor being exposed along multiple openings 43. For example, four vertical rows 45 of openings 43 are illustrated, which define the end grouping pairs 44. The four lowermost openings 43 of the rows 45 are horizontally aligned with each other such that each conductor 219 and 220 extends across all of the horizontally aligned openings 43. Each conductor 219 and 220 has portions thereof which are accessible from the openings 43, specifically along the upper and lower edges 203 and 204 thereof. Thus, each opening 43 has an exposed conductor portion of the conductor 219 along the upper edge 203 and a conductor portion of the conductor 220 exposed along the lower edge 204.

In view of the foregoing, each vertical row 45 of openings 43 provides access to all of the conductors 211 to 220, and as such, the two rows 45 of each opening group 44 provide two different access locations for each conductor. Generally, each horizontally aligned pair of posts has the electrical contacts thereof facing in opposite vertical directions such that, when one of the system components, such as the flex connector, branching connector or receptacle is plugged into an opening group 44, only one of the exposed conductor portions of the conductors 211 and 212 for a single opening 43 is connected to a port.

Figure 31:
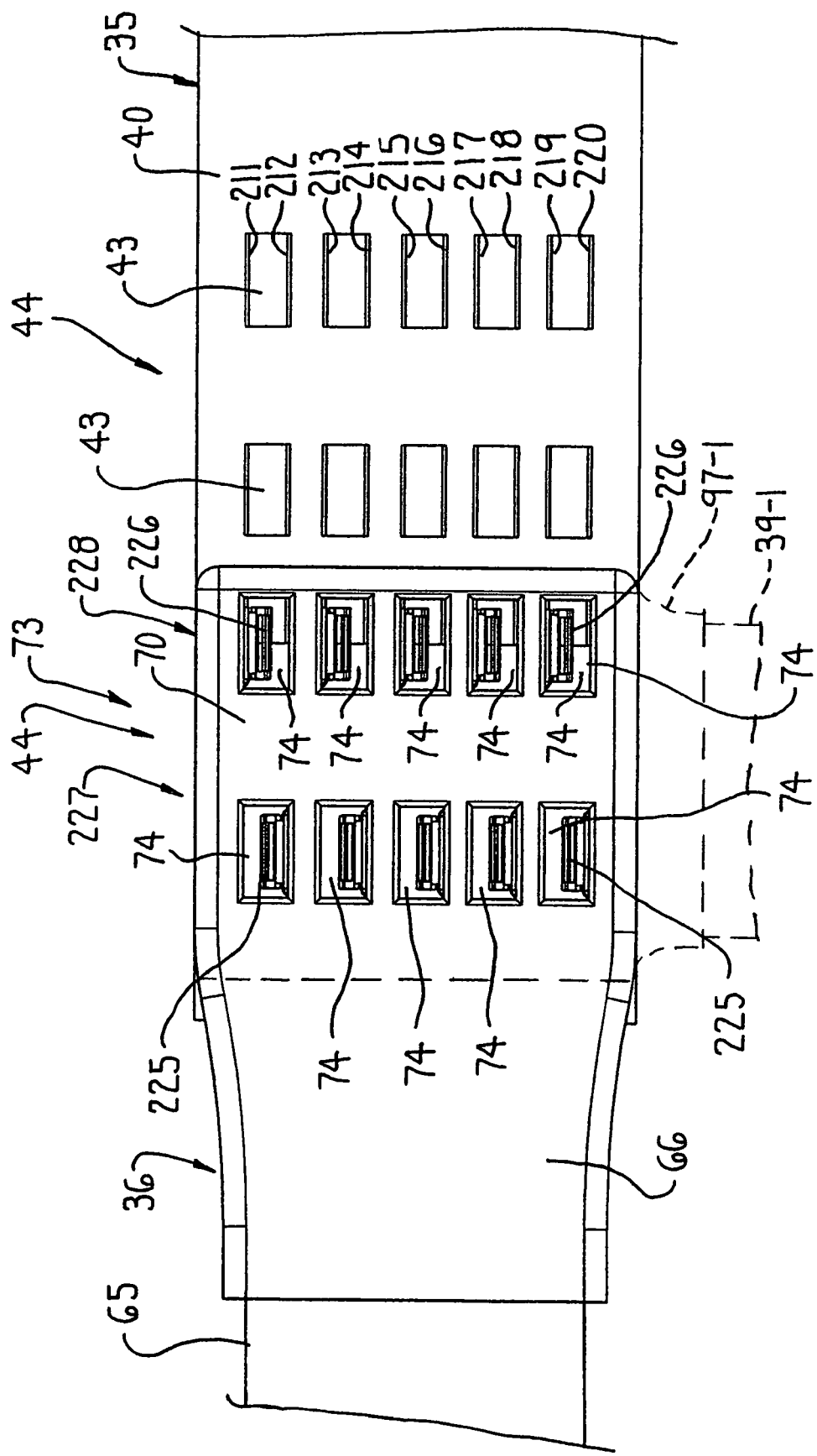
FIG. 31 is a front view illustrating the power distribution assembly interconnected with a connector plug of a flex connector.

More particularly as to FIGS. 31 and 32A, the connector plug 66 of a flex connector 36 is illustrated therein. The plug 66 includes the grouping 73 of openings 74 in the exterior face 70. Each opening 74 has an electrical contact 225 or 226 accessible therethrough to permit connection of another system component to the flex connector 36 if desired. As illustrated, the contacts 225 and 226 are located at alternating positions for each horizontally aligned pair of openings 74. In other words, contacts 225 of one vertical row 227 are located vertically on one side of the openings 74, while the contacts 226 of an associated second row 228 of openings 74 are positioned on the opposite vertical side of these openings 74.

Referring to FIG. 32A, posts 71 project from the interior face 69 of the connector plug 66. While two rows of posts 71 are provided which align with the openings 74 illustrated in FIG. 31, only one row of posts 71 is seen in the end view of FIG. 32A. In this visible row of posts 71, the above-described electrical contacts 225 project downwardly therefrom. The contacts 226 for the adjacent row of posts can also be seen and these project upwardly.

Figure 32B:
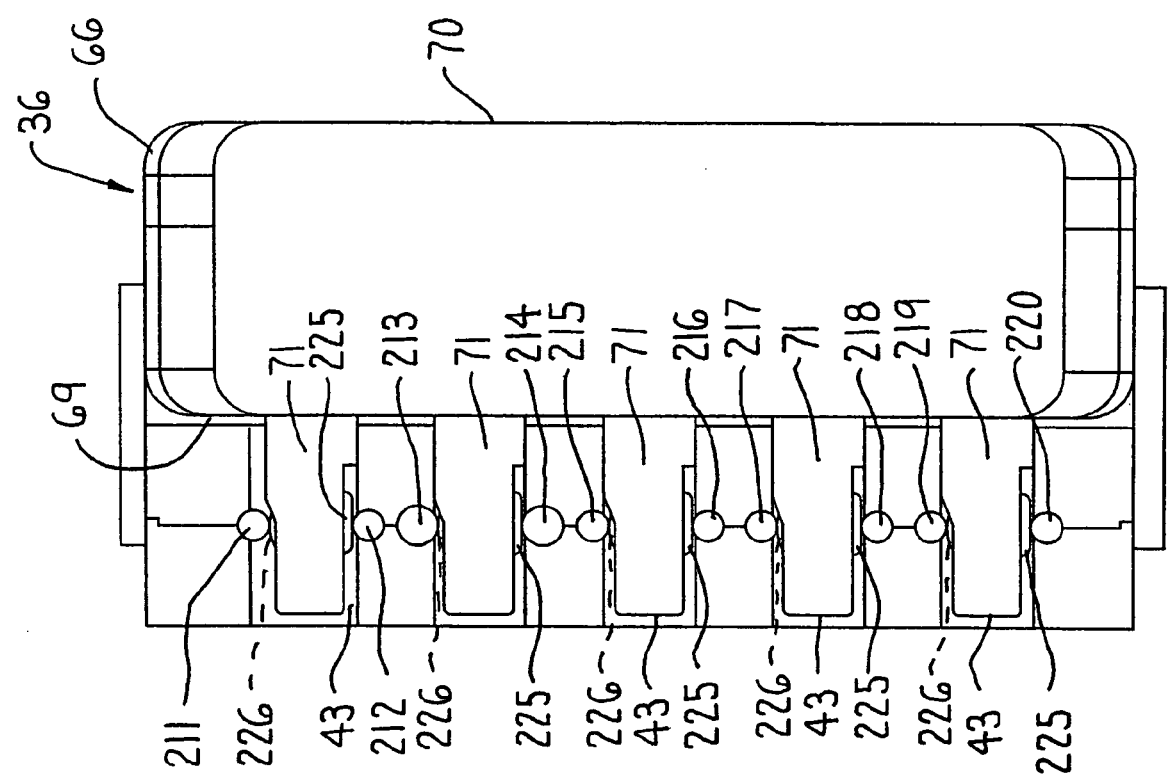
FIG. 32B is an end view of the power distribution assembly and connector plug of FIG. 32A plugged together.

As such, when the posts 71 are plugged into the PDA openings 43 as illustrated in FIG. 32B, the contact 225 in the uppermost left opening 43 mechanically contacts the conductor 212 to complete an electrical circuit therebetween. Further, the sidewardly adjacent contact 226 contacts the conductor 211 in the uppermost right opening 43. In this manner, all of the contacts 225 and 226 contact all of the conductors 211 to 220.

With this arrangement, the flex connector 36 and the in-feed cable 37 in the identical manner plug into and thereby electrically connect to all of the conductors 211 to 212. The receptacles 38 connect through a similar connection but connect to less than all of the conductors 211 to 220 as will be described herein.

Referring to FIG. 33, a PDA 35-2 is illustrated which has an end pair 47 of opening groups 44 and a single interior pair 48 of opening groups 44. The PDA 35-2 has a ten-wire configuration which corresponds to the ten-wire configuration of FIG. 32A.

As described below, the actual circuits defined by the ten conductors 211-220 can be readily varied depending upon the arrangement of circuits defined in the in-feed cable 37, wherein in-feed arrangement is defined by and can be varied by the connection of the in-feed cable 37 to the wiring closet 160 (FIG. 25).

More particularly, the circuit configuration of FIG. 34 has the ten solid-wire conductors 211-220 configured into four dedicated circuits of one line and one neutral, plus a ground and an isolated ground. Specifically, conductor 211 defines a ground, while conductor 212 serves as an isolated ground. Conductors 213, 215, 217 and 219 serve as line 1, line 2, line 3 and line 4 of the four dedicated circuits, while conductors 214, 216, 218 and 220 serve as neutral 1, neutral 2, neutral 3 and neutral 4. Notably, circuit 1 which comprises line 1 (213) and neutral 1 (214) is a higher capacity circuit since conductors 213 and 214 are 10 gauge wire rather than 12 gauge wire.

Since the flex connector 36 and branching connector 39 connect to all conductors 211 to 220 when plugged in the PDA 35, the same circuit configuration is distributed throughout all of the PDAs 35 or any flex connectors 36 or branching connectors 39 connected thereto as in FIGS. 1-5, 12 and 13. It will be understood that the front view of FIG. 34 illustrates the line, neutral and ground conductors and that this diagram also applies to the openings 74 of the flex connectors 36 or the openings 94 of the branching connectors 39. Furthermore, this diagram also applies to the arrangement of circuits in the system application of FIG. 24. While the following discussion of circuits is directed primarily to the PDA 35, this discussion of the arrangement of the circuit and the connection of receptacles 38 thereto also applies to the other system components.

FIG. 34 further includes a diagrammatic representation of a receptacle 38 and in particular, a variation of a receptacle identified by reference numeral 38-1. The receptacle 38-1 is illustrated in greater detail in FIGS. 60-65.

Generally as to FIG. 34, the receptacle 38-1 has an upper post 57-1 which includes an electrical contact 230 exposed on one side thereof similar to the contacts 225 or 226 described above. The post 57-1 further is rotatable as indicated by reference arrow 231 to reorient the contact 230 from an upward facing orientation as illustrated in solid outline to a downward facing orientation as indicated in phantom outline. Accordingly, the post 57-1 fits into the upper right PDA opening 43 wherein the contact 230 either contacts the ground conductor 211 or the isolated ground conductor 212 which thereby defines to what type of ground that the receptacle 38-1 is connected to.

The receptacle 38-1 also includes a pair of movable posts 57-2 which move in unison along a vertical path 232. The posts include respective contacts 233 and 234 which face upwardly and downwardly in opposite directions so as to engage the conductors of a horizontally aligned pair of openings. For example, at the upper end of the slide path 232, the contacts 233 and 234 engage the conductors 213 and 214 so that the receptacle 38-1 is connected to circuit 1 or more particularly, to line 1 and neutral 1. The posts 57-2 can be slid downwardly to alternately connect to any of line 2/neutral 2, line 3/neutral 3 or line 4/neutral 4.

In FIG. 35, an alternate circuit arrangement is illustrated for the same PDA 35-2. This arrangement comprises two neutrals wherein three lines share each neutral. Specifically, conductors 211 and 212 serve as ground and isolated ground, while the heavy gauge conductors 213 and 214 serve as neutral 1 and neutral 2. Conductors 215, 217 and 219 serve as lines 1, 2 and 3 which share neutral 1, while conductors 216, 218 and 220 serve as lines 4, 5 and 6 which share neutral 2.

A modified receptacle 38-2 is diagrammatically illustrated. This receptacle 38-2 has four fixed posts 57 formed the same as posts 57 described herein. The upper pair of posts 57 are provided with an electrical contact 236 either in an upward facing position illustrated in solid lines to connect to the ground conductor 211 or a downward facing position such as illustrated in phantom outline to connect to the isolated ground conductor 212. Alternatively, a rotatable post 57-1 could also be used.

The second pair of posts 57 also are prewired with an electrical contact 237 either in an upward facing orientation for connection to neutral 1, or a downward facing position for neutral 2. A slidable pair of posts 57-3 and 57-4 are provided which are similar to the posts 57-2 and slid vertically along slide path 239. In this arrangement, a contact 238 may be provided in the post 57-3 to selectively connect to any one of the line 1 conductor 215, the line 2 conductor 217 or the line 3 conductor 219. Alternatively, the contact 238 may be installed in the post 57-4 to connect to any one of the line 4 conductor 216, the line 5 conductor 218 or the line 6 conductor 220.

Referring to FIG. 36, a further circuit arrangement is illustrated wherein three shared circuits and 2 dedicated circuits are provided. Specifically, conductors 211 and 212 define a common ground and an isolated ground, while line 1, line 2 and line 3 conductors 215, 217 and 219 are associated with neutral 1 conductor 213. Further, the two dedicated circuits are defined by neutral 2 conductor 214 which is associated with line 4 conductor 216 and neutral 3 conductor which is associated with line 5 conductor 220.

The receptacle 38 is diagrammatically illustrated. This receptacle 38 has two vertical rows of fixed posts 57 which are prewired during manufacture depending upon the specific circuits that the receptacle 38 is being connected to. For example, either contact 240 or contact 241 is provided depending upon the type of ground connection required. Also, contact 242 could be provided in combination with another contact 243 for use of one of the shared circuits. In the illustrated arrangement, contact 242 connects to neutral 1 conductor 213 while contact 243 connects to line 1 conductor 215, although contact 243 could be repositioned for connection to conductor 217. Alternatively, two alternate contacts 244 and 245 could be provided to connect to one of the two dedicated circuits. As illustrated, contacts 244 and 245 connect respectively to neutral 2 conductor 214 and line 4 conductor 216.

Referring to FIGS. 37-40, the PDA 35-3 therein is formed in a six-wire configuration. The PDA 35-3 has end opening groups 247 and intermediate receptacle groups 248. The PDA 35-3 is formed substantially the same as the PDA 35-2 except that only six conductors 251-256 are provided. Otherwise, the position of the conductors 251-256 in the openings 250 is structurally and functionally the same as the conductors 211-220 in openings 43.

As to FIG. 38, the conductors 251-256 serve as a ground, an isolated ground and two dedicated circuits. The receptacle 38-3 could have a variety of constructions. For example, post 257-1 has contact 258 therein and could be rotatable so that contact 258 connects to either of ground conductors 251 or 253. In this arrangement, posts 257-2 have contacts 259 and 260 and are slidable for connection to either circuit 1, i.e. line 1/neutral 1, or circuit 2, i.e. line 2/neutral 2.

Alternatively, all of posts 257-1 and 257-2 as well as posts 257-3 and 257-4 could be fixed posts like in the receptacle 38. As such, contact 261 could be provided instead of contact 258, while contacts 262 and 263 could be provided instead of contacts 259 and 260 so as to connect to circuit 2, i.e. line 2/neutral 2.

FIG. 39 illustrates a variation of a two dedicated circuit arrangement where neutral 1 conductor 255 is 10 gauge wire instead of 12 gauge wire. In this arrangement, the posts 257-5 are fixed and prewired with either contact 264 or 265 to define the ground type, and contacts 266/267 for line 1/neutral 1, or contacts 268/269 for line 2/neutral 2.

FIG. 40 illustrates a configuration with three shared circuits in which conductors 251 and 253 define ground wires, while conductor 255 serves as a neutral and conductors 252, 253 and 254 serve as line wires 1, 2 and 3. The ground is selected by providing contacts 270 or 271 in one of the posts 257-5, and the neutral is selected by providing contact 272. The line is selected by providing contact 273 for line 1 or alternatively contacts 274 or 275 for lines 2 or 3 respectively.

It will be understood that the above-described ten-wire and six-wire arrangements can be modified depending upon how the ground, neutral and line connections are supplied to the PDA by an in-feed cable 37. Further, different numbers of conductors may be provided using the same structural and functional features of the inventive power distribution system.

Referring to FIGS. 41-45, the manufacturing process for forming the PDAs is readily adaptable to forming the PDAs with different numbers of conductors, such the ten-wire and six-wire systems. Further, the different patterns of openings in these two systems can be readily modified through the manufacturing process to form different numbers of openings and different layouts thereof.

Generally in this process, the PDAs 35 are formed in a continuous length with the pattern of openings 43 being punched depending upon the specific type of PDA being formed, i.e. depending upon the number of opening groups 44 being provided. Thereafter, the length of PDA material is cut to the specific length required. This provides an improved manufacturing process with increased efficiency which thereby reduces the costs associated with the power distribution system 10.

Figure 41:
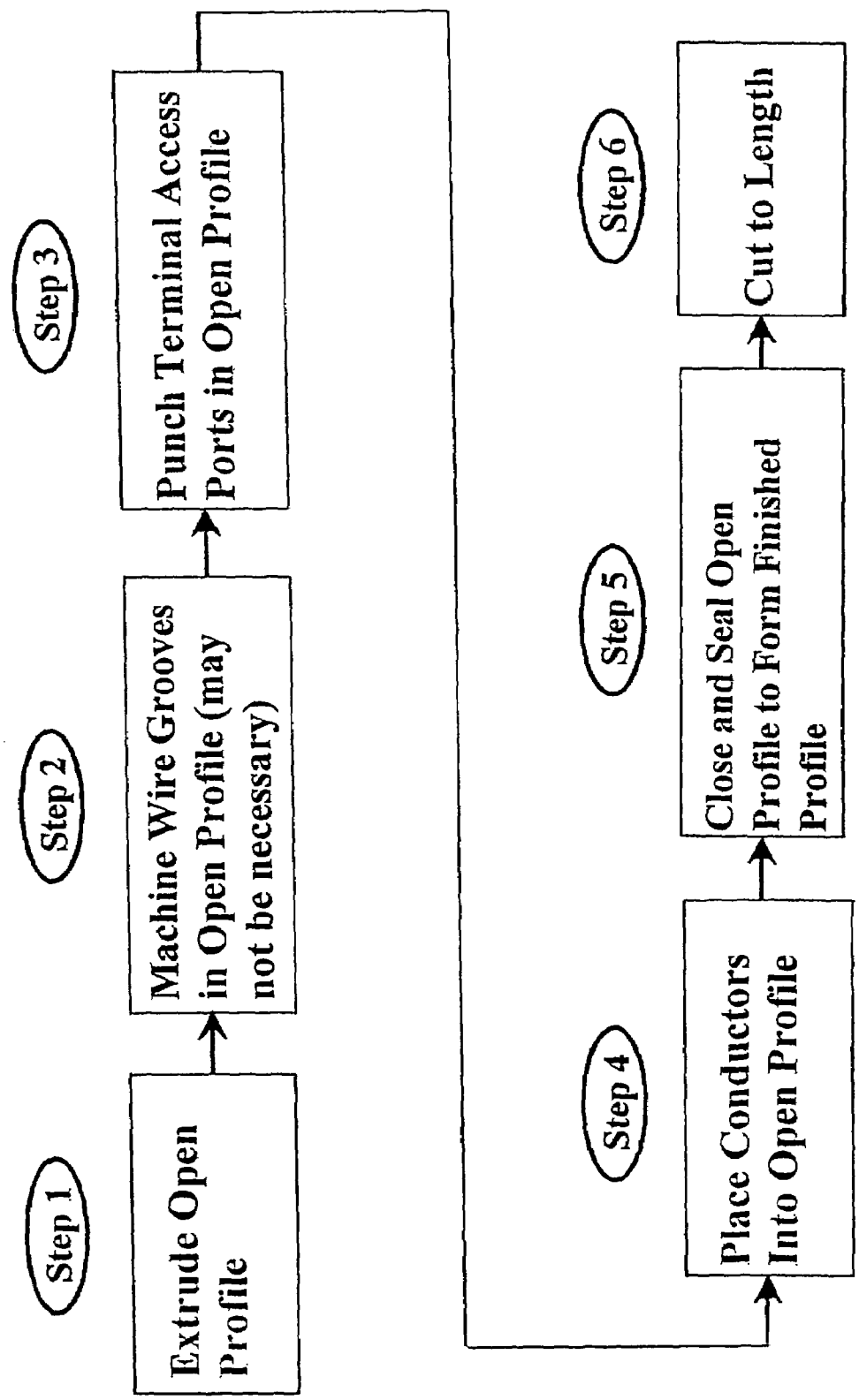
FIG. 41 is a block diagram of a manufacturing process for forming a power distribution assembly.

More specifically, FIG. 41 illustrates the multiple steps involved in the process with FIGS. 42-45 structurally illustrating process steps 1, 2, 4 and 5 respectively.

Figure 42:
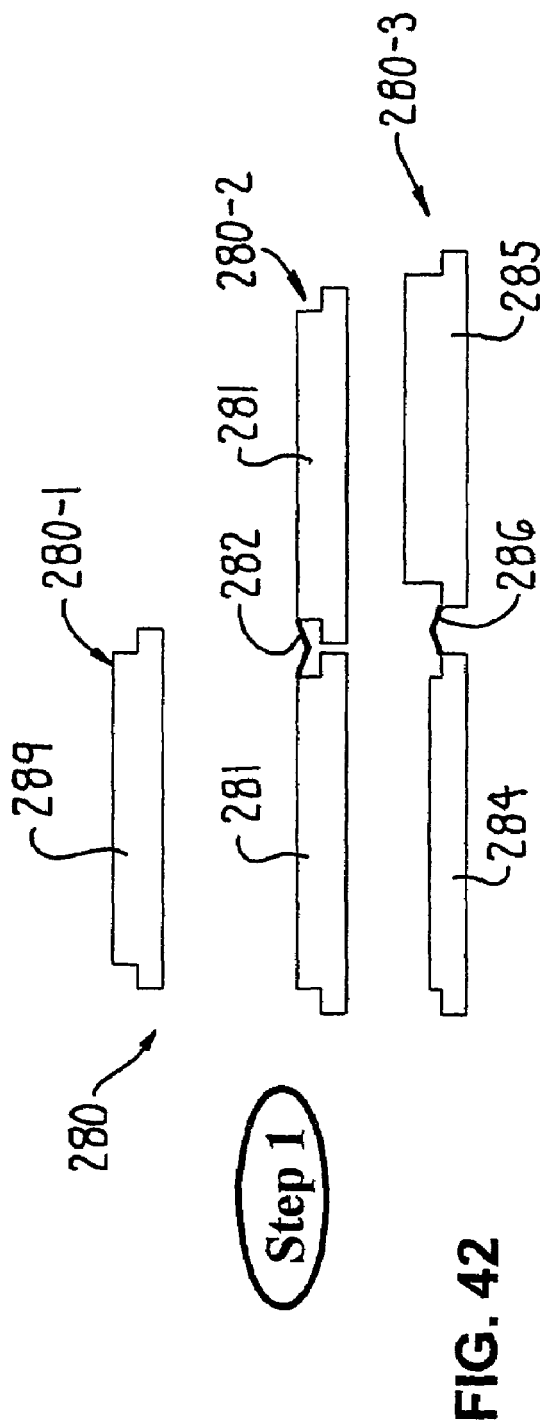
FIG. 42 is a diagrammatic end view of extrusion profiles for step 1 of the manufacturing process.

Referring to FIGS. 41 and 42 which relate to process step 1, this first step involves extruding a profile 280 for the PDA 35 in a continuous extrusion process. The PDA profile 280 is formed of an insulative, relatively rigid material such as plastic. This initial profile 280 may have different configurations including a single common profile 280-1 which is used in pairs to define both halves of the casing 40. This would require two extrusion processes or a single process from which two halves would be formed.

The profile 280-2 could also be formed having two mirror image profile halves 281 which are joined together by a flexible web 282 that defines a hinge about which the profile halves 281 are folded together. The following discussion is directed to profile 280-2 although it is understood that providing two profiles 280-1 is substantially the same as profile 280-2 except that web 282 is not present. Thus, the following discussion of profile 280-2 also applies to profile 280-1.

The profile 280-3 could be formed which has two different half profiles 284 and 285 which also are joined by a flexible web 286. One profile half 285 has a greater thickness.

Figure 43:
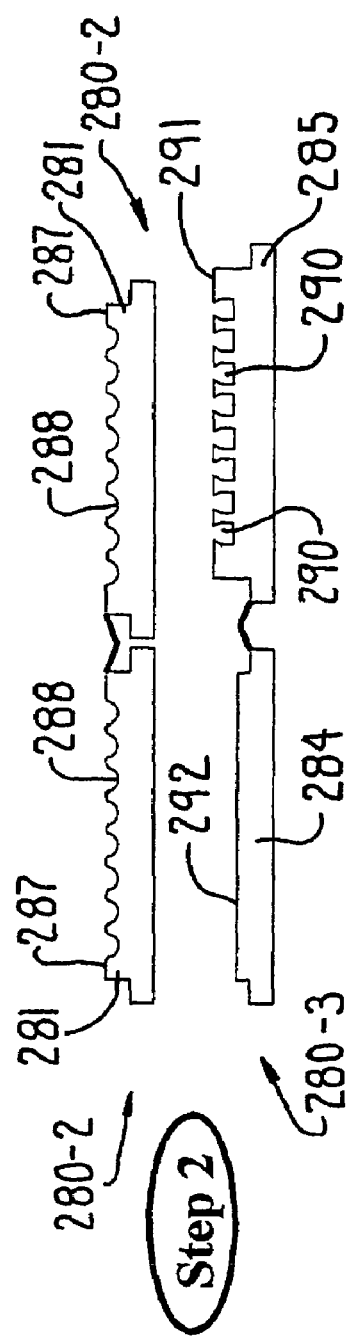
FIG. 43 is a diagrammatic end view of the extrusion profiles during step 2 of the manufacturing process.
Figures 44, 45:
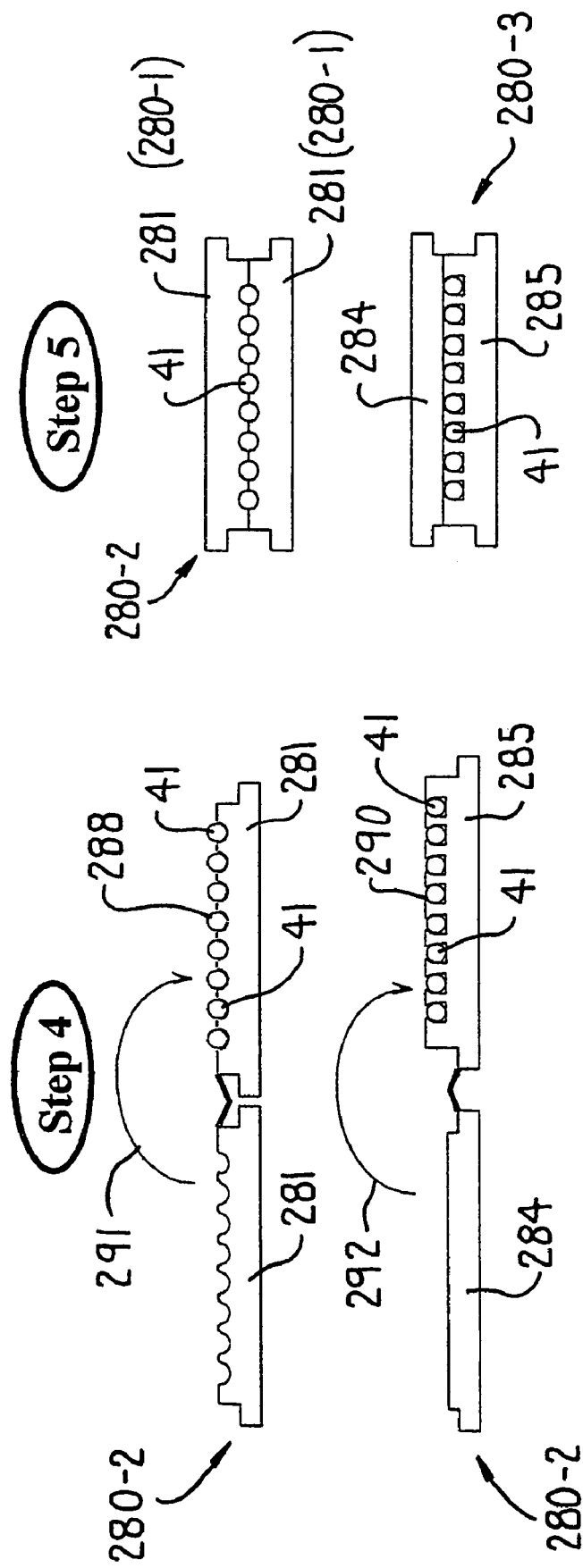
FIG. 44 is a diagrammatic end view of the extrusion profiles during step 4 of the process.
FIG. 45 is a diagrammatic end view of the completed PDA housing during step 5 of the manufacturing process.

In Step 2, wire or conductor grooves are formed into the profile 280 for accommodating conductors 41. Referring to FIG. 43, the two profile halves 281 have inside faces 287 into which are formed partial-depth grooves 288. The grooves 288 extend longitudinally and are parallel to each other. These same grooves 288 would also be machined into the face 289 of the profile 289.

While the grooves 288 are configured to accommodate half the thickness of a conductor 41, full-depth grooves 290 are provided in parallel relation in the interior face 291 of the profile half 285. The depth of the grooves 290 accommodates the entire thickness of a conductor conductors 41, such that the interior face 292 of the profile half 284 does not require grooves to be machined therein. Further, the grooves 290 have features therein such as a narrow width opening which allows the conductors to be positively secured therein such as by a snap fit.

Step 2 is optional in that the grooves could be formed during extrusion, rather than by a separate machining process.

In Step 3, the pattern of openings 43 or 250 are punched into the two profiles which make up the PDA. The number of opening groups 44 and the specific arrangement of openings 43 such as in two vertical rows may be varied. For example, groups 44 may be punched to form a PDA 35, which has two interior pairs 48 of groups 44, or a PDA 35-2 which has a single interior pair 48.

In Step 4, the conductors 41 are positioned in the open profile, for example in the grooves 288 of profile 280-2. The empty profile half 281 is hence positioned for folding. For profile 280-3, the conductors 41 are fitted into the grooves 290 with the profile half 284 positioned for folding generally in the direction of arrow 292. In Step 4, the conductors 41 are formed as a continuous length of solid conductor wire which is laid continuously into the groves 288 or 290.

In Step 5, the profile halves are then folded one onto the other at which time the two halves are sealed together to form the finished profile of the PDA. However, the profile still has a continuous length.

In Step 6, the finished profile is cut to length by severing sections from the finished profile to form a finished PDA 35. The finished length of the PDA 35 corresponds to the specific pattern of opening groups 44 punched therein. Thus, any of the PDAs 35, 35-1 or 35-2 may be formed from the same process by varying the pattern of groups 44 and severing the finished profile at the length corresponding to the specific pattern applied thereto. This severing steps cuts through the insulative material as well as the conductors 41. With this manufacturing process, the PDAs 35 may be cost-effectively produced primarily by extruding the components in a continuous operation.

Figure 46:
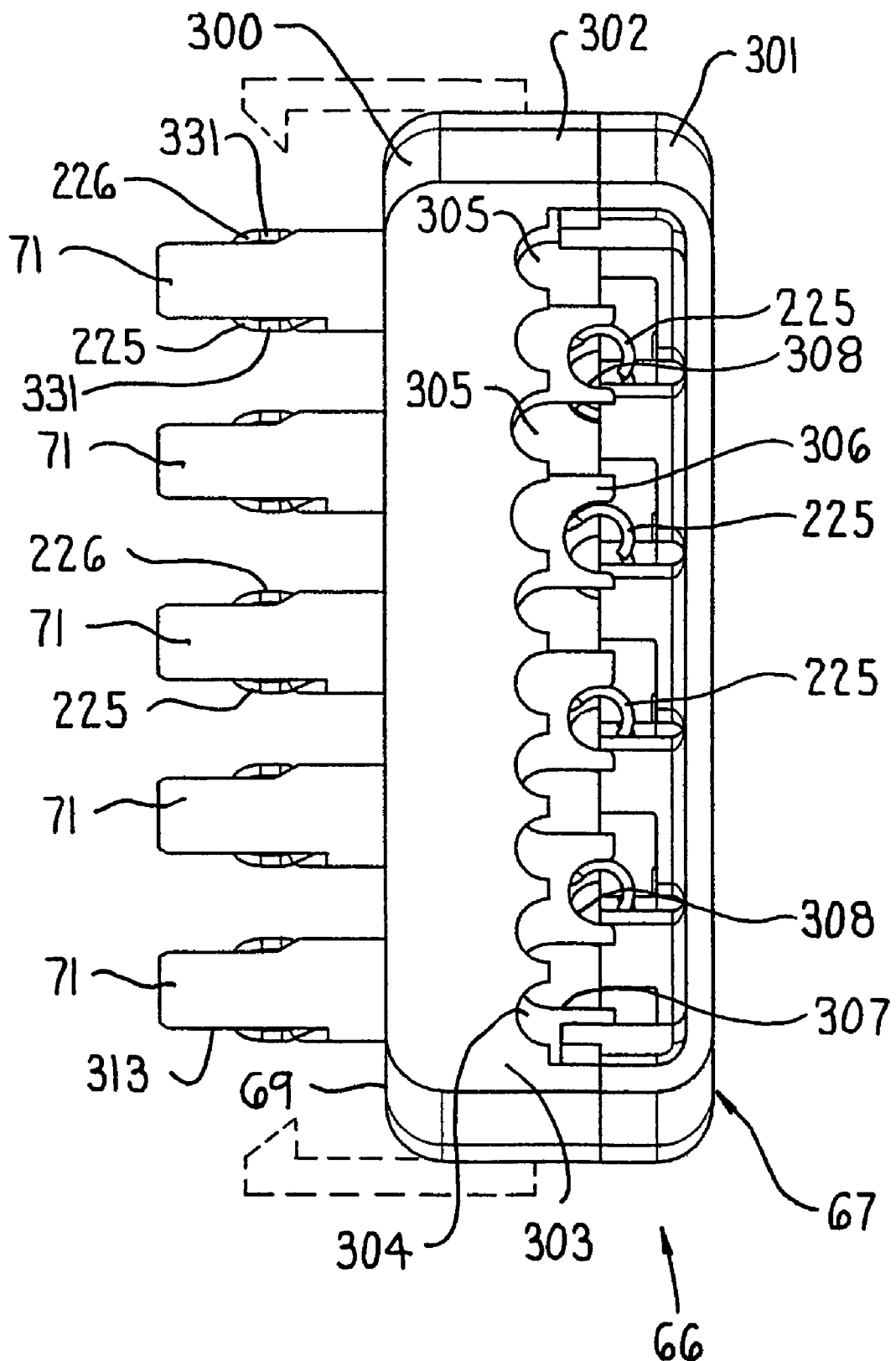
FIG. 46 is an end view illustrating one connector plug of a flex connector.

Turning to the specific construction of the flex connector 36, the plug housing 67 of the connector plug 66 is formed by a housing base 300 and a cover 301 as seen in FIG. 46. The base 300 has a side wall 302 and an end wall 303 which connects to the conductor body 65.

The end wall 303 has an open slot 304 which includes a plurality of conductor seats 305 formed as a half-circle to receive the individual conductors or wires of the conductor body 65. The base 300 includes a first interior wall 306 which includes deep conductor seats 307 and shallow conductor seats 308. A second interior wall 310 includes further conductor seats 311 for those conductors extending to this point.

Figure 53:
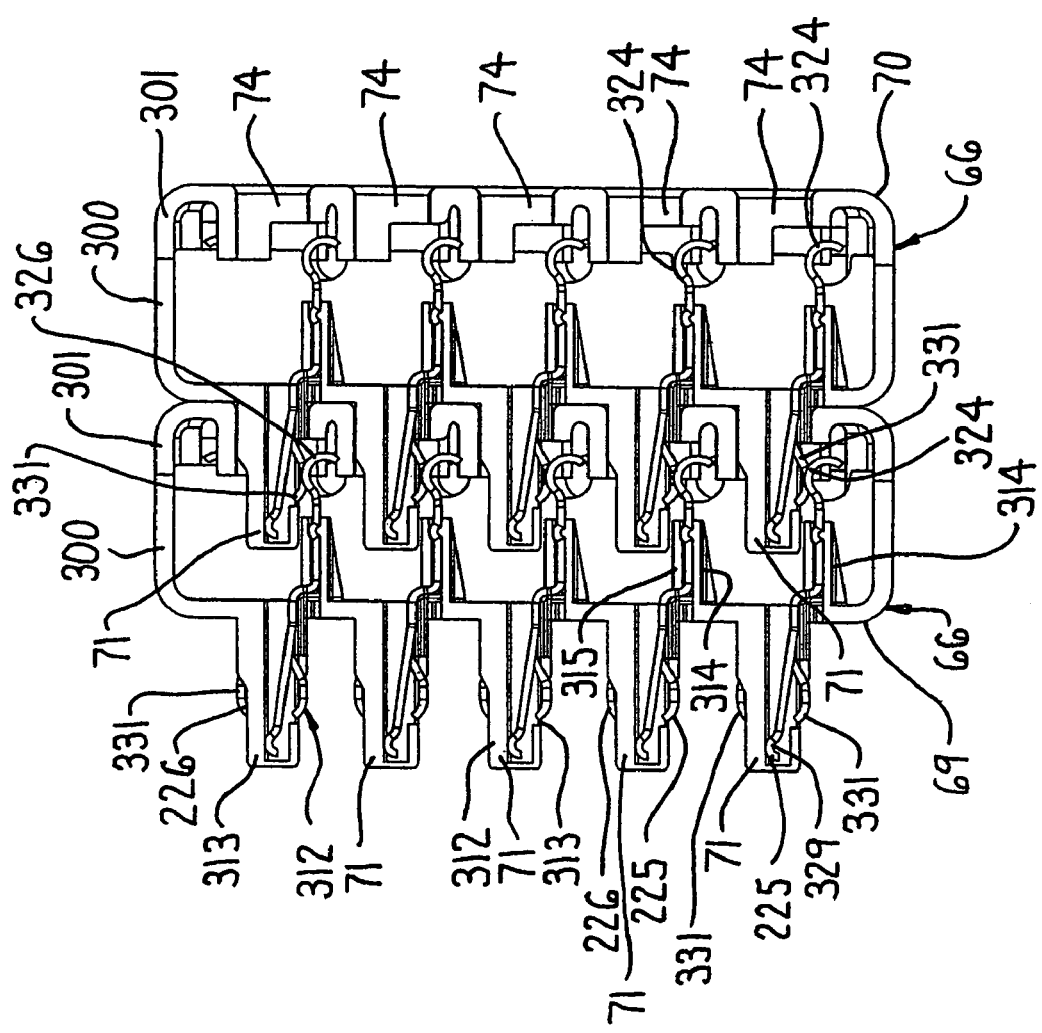
FIG. 53 is a side cross-sectional view of a pair of connector plugs joined together.
Figure 54:
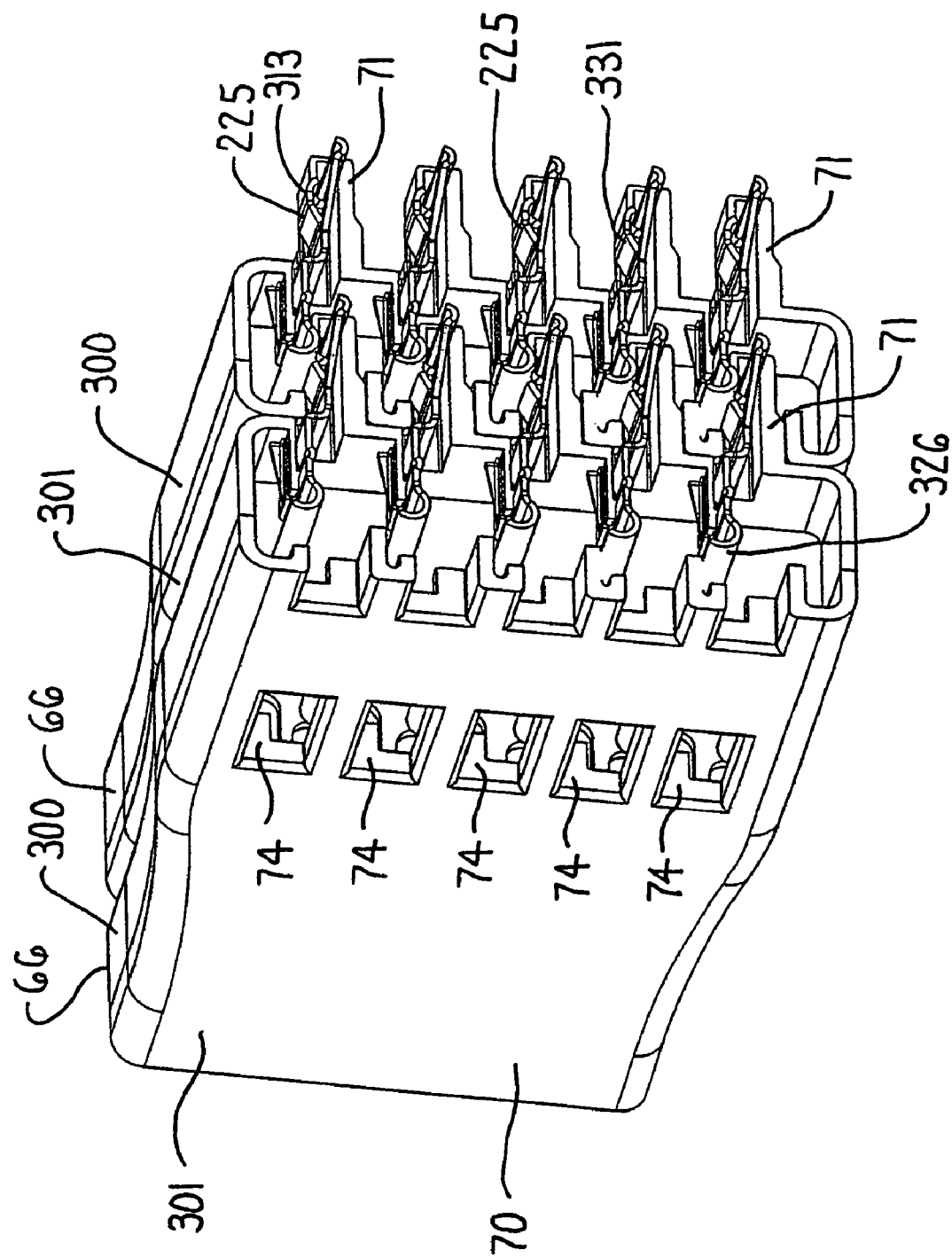
FIG. 54 is a perspective view of the pair of the joined connector plugs of FIG. 53.

The base 300 further includes the posts 71 projecting from the interior face 69 in two vertical rows. Referring to FIG. 53, each post 71 has a wall 312 which is open on one side 313 to allow the electrical contact 225 or 226 to project therethrough. The posts 71 in one row are reverse oriented or formed identical but opposite to the other row. As such the open sides 313 open upwardly for one row of posts 71 and open downwardly for the other row of posts 71.

The post 71 is hollow and receives the contact 225 or 226 therein. Each post 71 opens into the interior of the base 300 and has a mounting flange 314 projecting upwardly from the bottom wall 315. The flanges 314 for one vertical row of posts 71 are reverse oriented relative to the flanges 314 for the other row of posts 71. The flanges 314 include guide slots 315 and a locator block 316.

Each mounting flange 314 includes one of the contacts 225 or 226 therein. The contacts 225 and 226 are identical to each other but identified by different reference numerals for reference purposes. Thus, the following description of contact 225 applies equally to contact 226.

Figure 51:
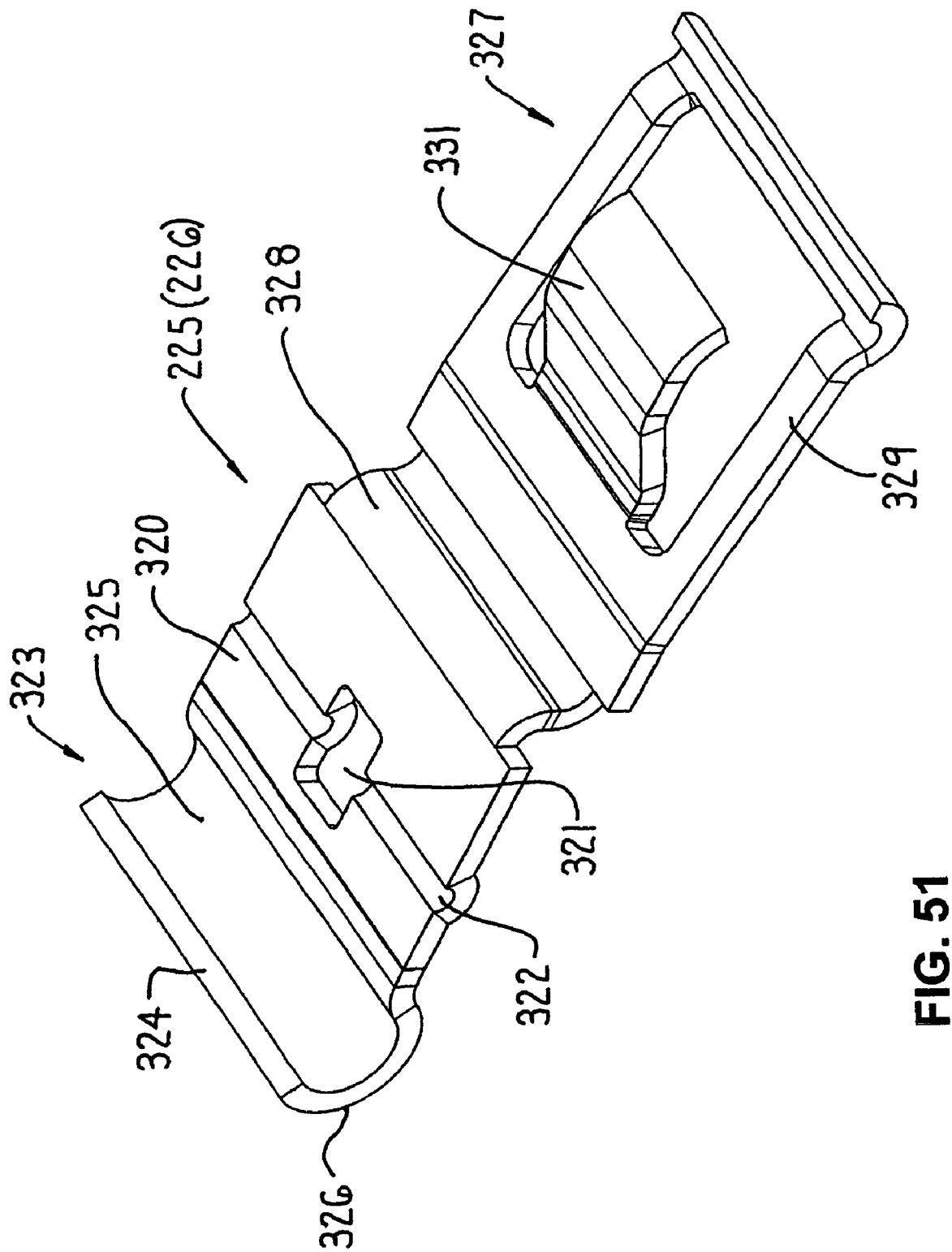
FIG. 51 is a perspective view of an electrical contact.
Figure 52:
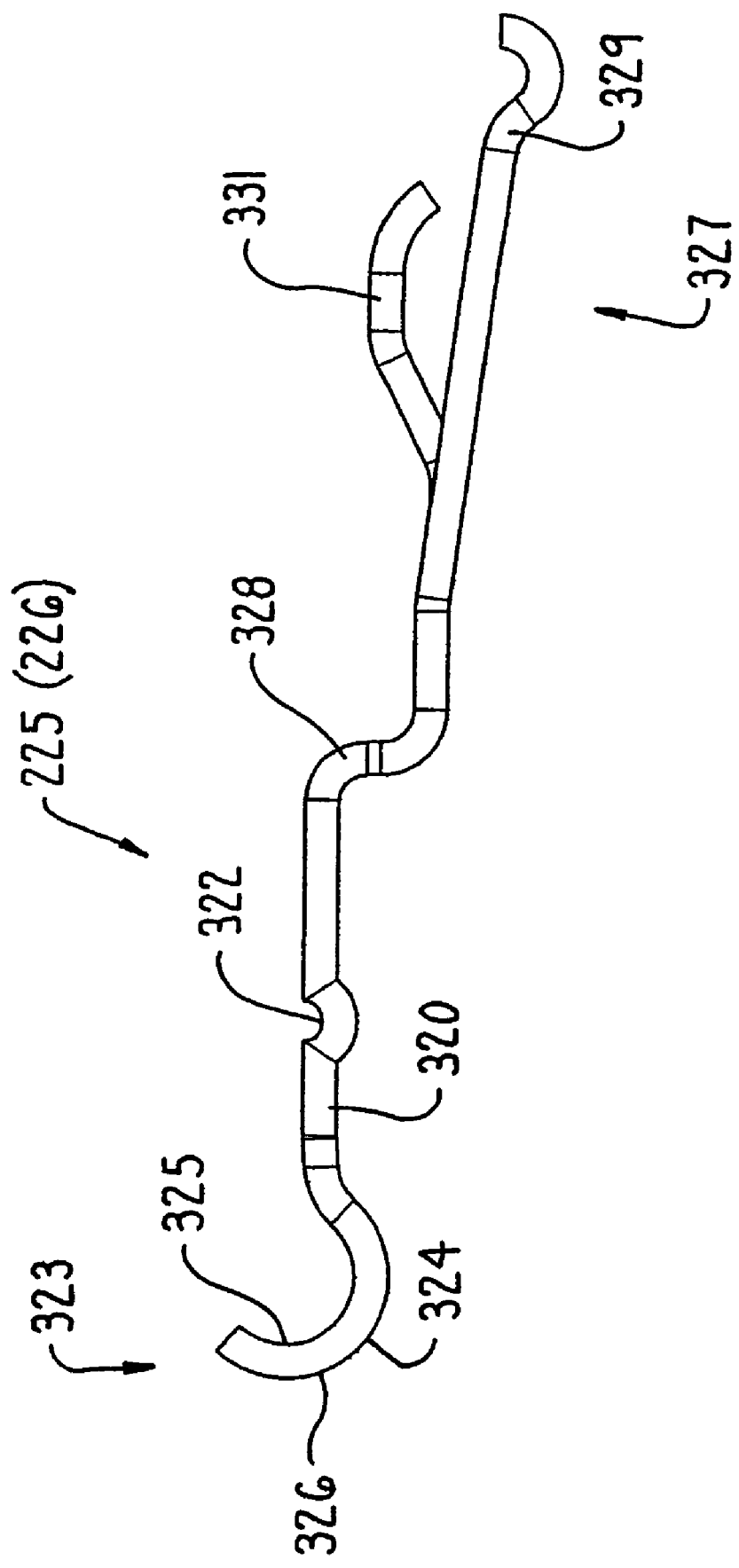
FIG. 52 is a side view of the electrical contact.

Referring to FIGS. 51 and 52, the contact 225 has a mounting plate 320 at one end which is formed with a locator window 321 and a channel 322 therein. An upper end 323 of the contact 225 has a semi-cylindrical conductor mount 324, the interior surface 325 of which is adapted to have a conductor affixed thereto. The outer surface 326 defines an electrical contact surface.

A lower end 327 has an offset connector section 328 and a support leg 329 projecting downwardly therefrom in cantilevered relation. The support leg 329 has a rectangular opening 330 from which projects an electrical contact finger 331.

Figure 49:
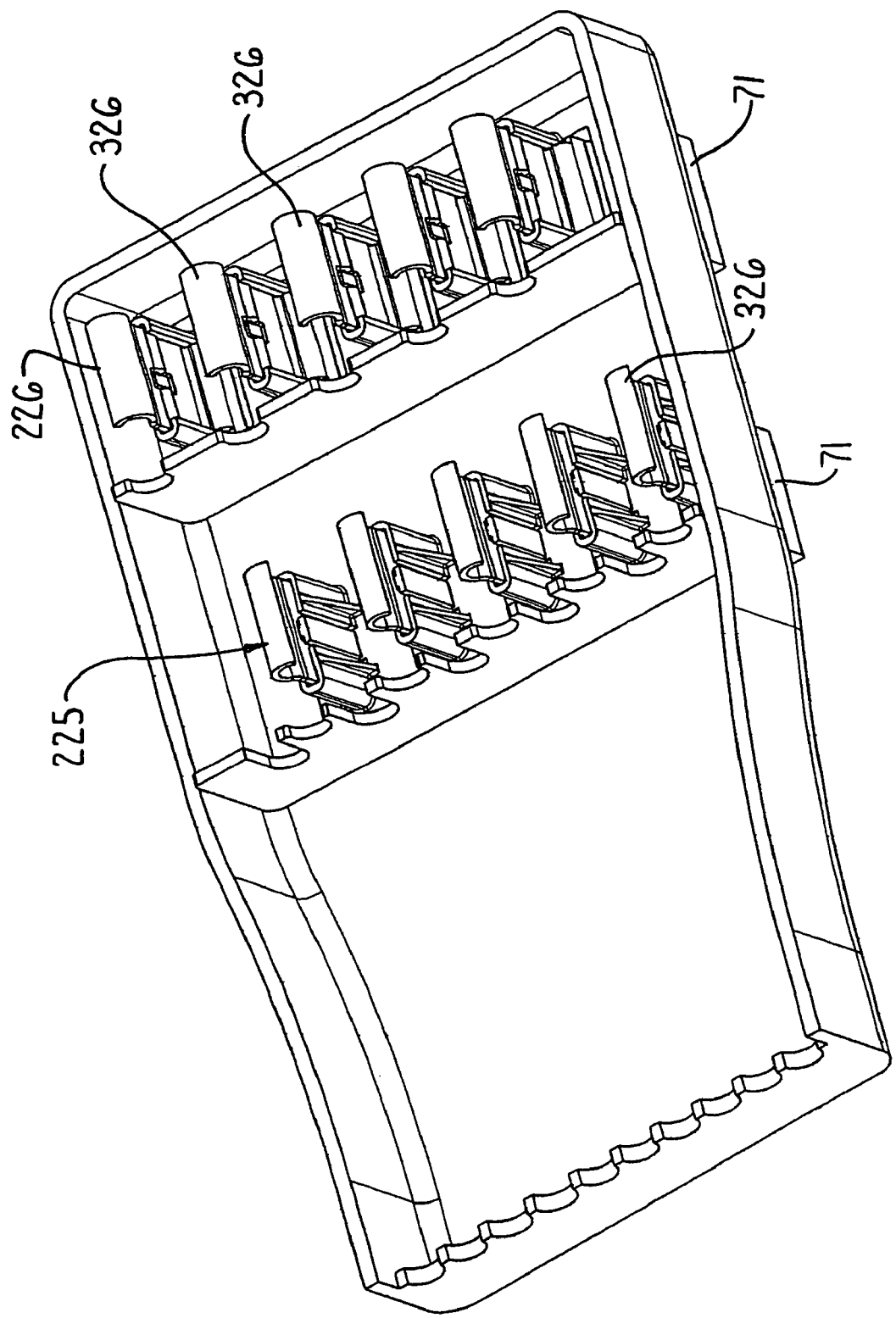
FIG. 49 is a rear perspective view of a plug housing assembly illustrating the plug housing having electrical contacts disposed therein.
Figure 50:
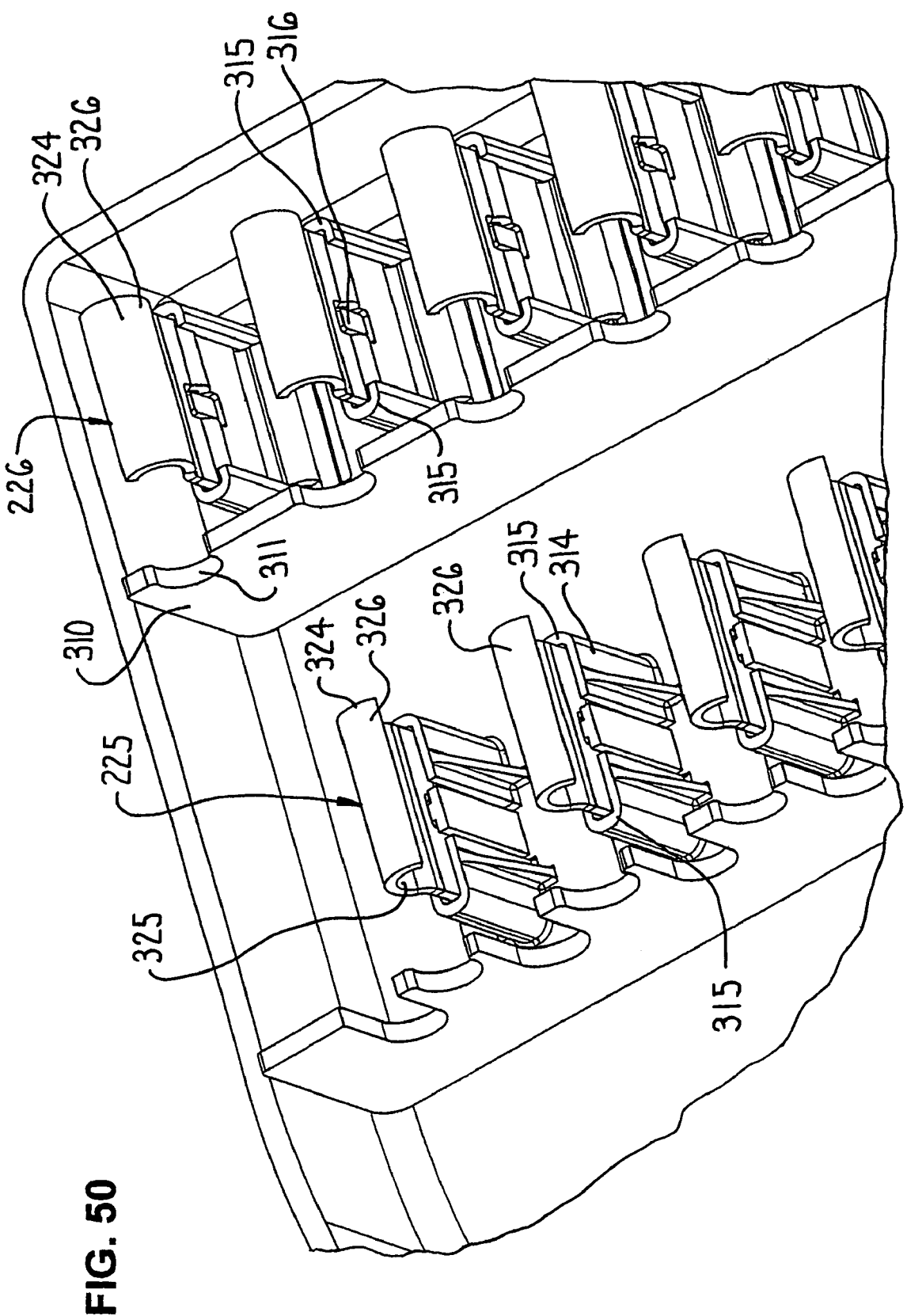
FIG. 50 is an enlarged perspective view of the plug housing assembly.

Referring to FIGS. 49, 50 and 53, each contact 225 or 226 is fixedly mounted to one of the mounting flanges 314 by inserting the lower contact end 327 downwardly into the post 71. The lower end 327 slides through the slots 315 until the locator block 316 snaps into the locater window 321 on the contact. The lower end 327 projects into the post 71 wherein the support leg 329 abuts against an inside surface thereof and the contact finger 331 projects through the open side 313 of the post 71.

Further, the conductor mount 324 projects from the mounting flange 314 for connection to the individual wires of the conductor body 65 such as by soldering. As such, the conductors are electrically connected to the contact 225 whereby contact between the contact finger 331 and a respective PDA conductor such as seen in FIG. 32B completes an electrical circuit therebetween.

Figure 47:
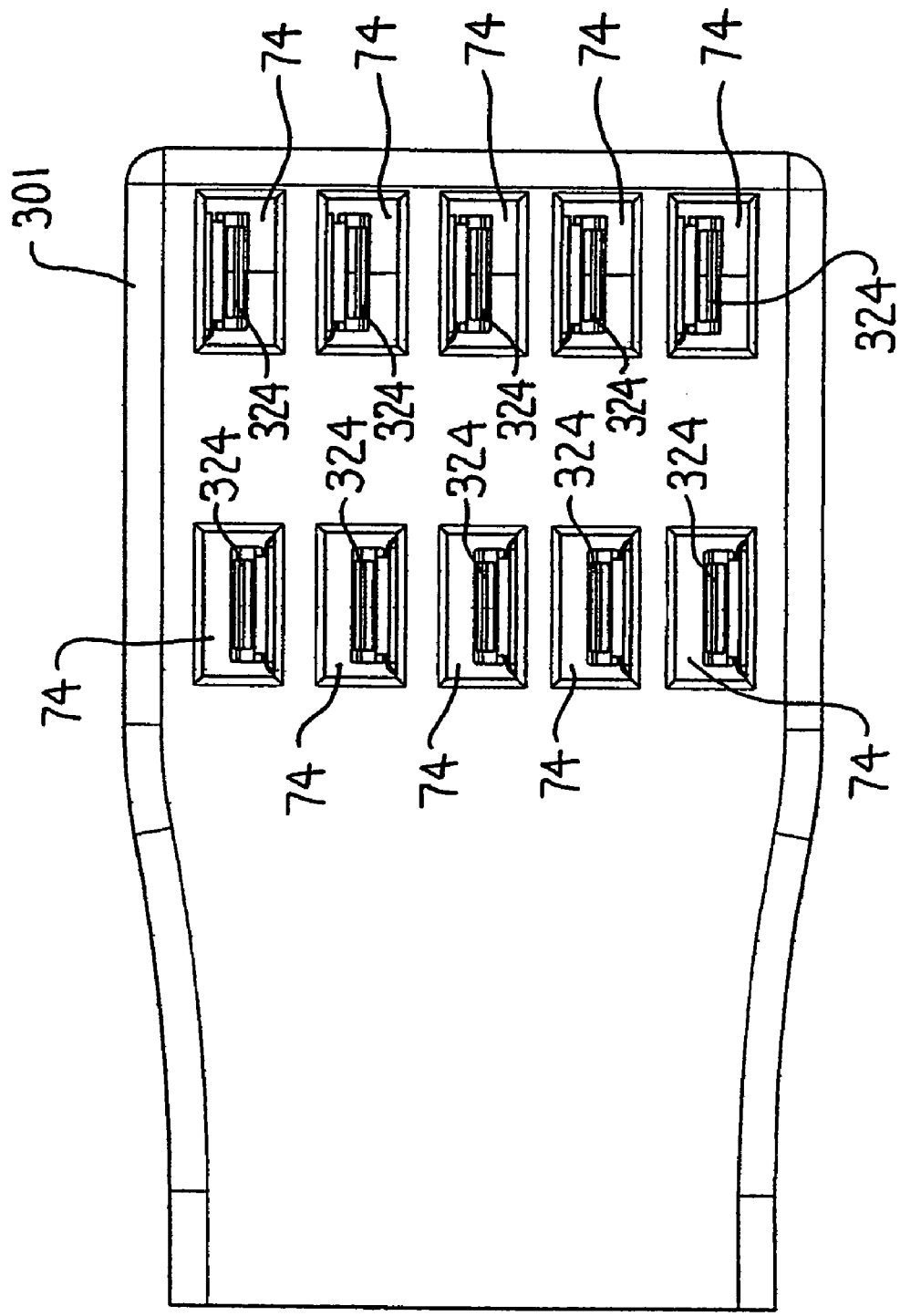
FIG. 47 is a front view of the connector plug.
Figure 48:
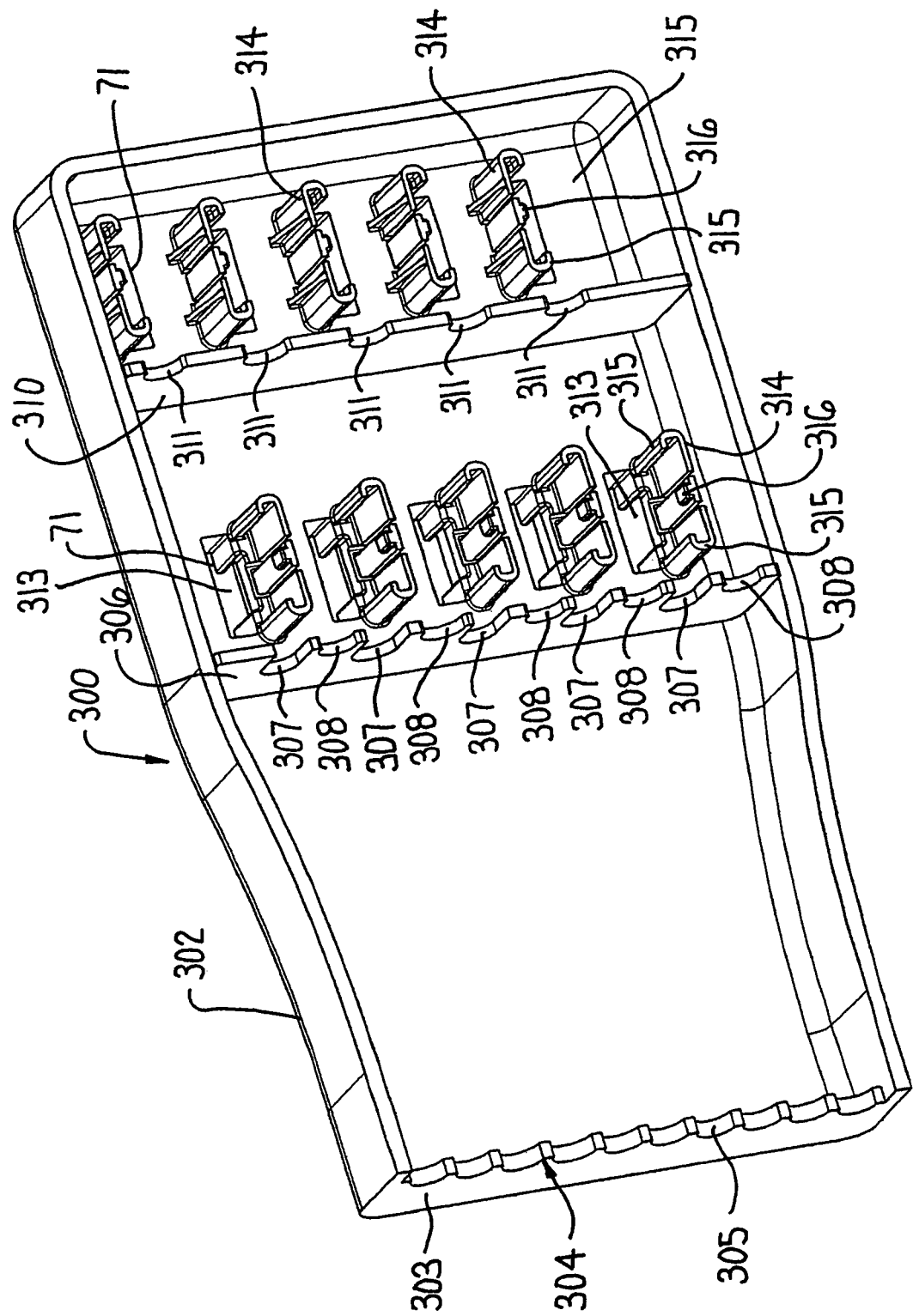
FIG. 48 is a rear perspective view of the interior of a plug housing for the connector plug.

Also, the contact surface 326 faces upwardly and sidewardly. To provide access thereto, the cover 301 has the openings 74 formed therein as seen in FIG. 47. The openings 74 are arranged in two vertical rows and open downwardly directly above the contact surface 326 as seen in FIGS. 47 and 53 such that the contacts 225 and 226 are accessible through the openings 74.

Therefore, one connector plug 66 may be plugged into another connector plug 66 for example as seen in FIGS. 20-24. As such the contact finger 331 of the outer plug 66 abuttingly contacts the contact surface 326 of the contact 225 or 226 of the inner plug 66. This thereby completes the electrical connection therebetween.

Figure 55:
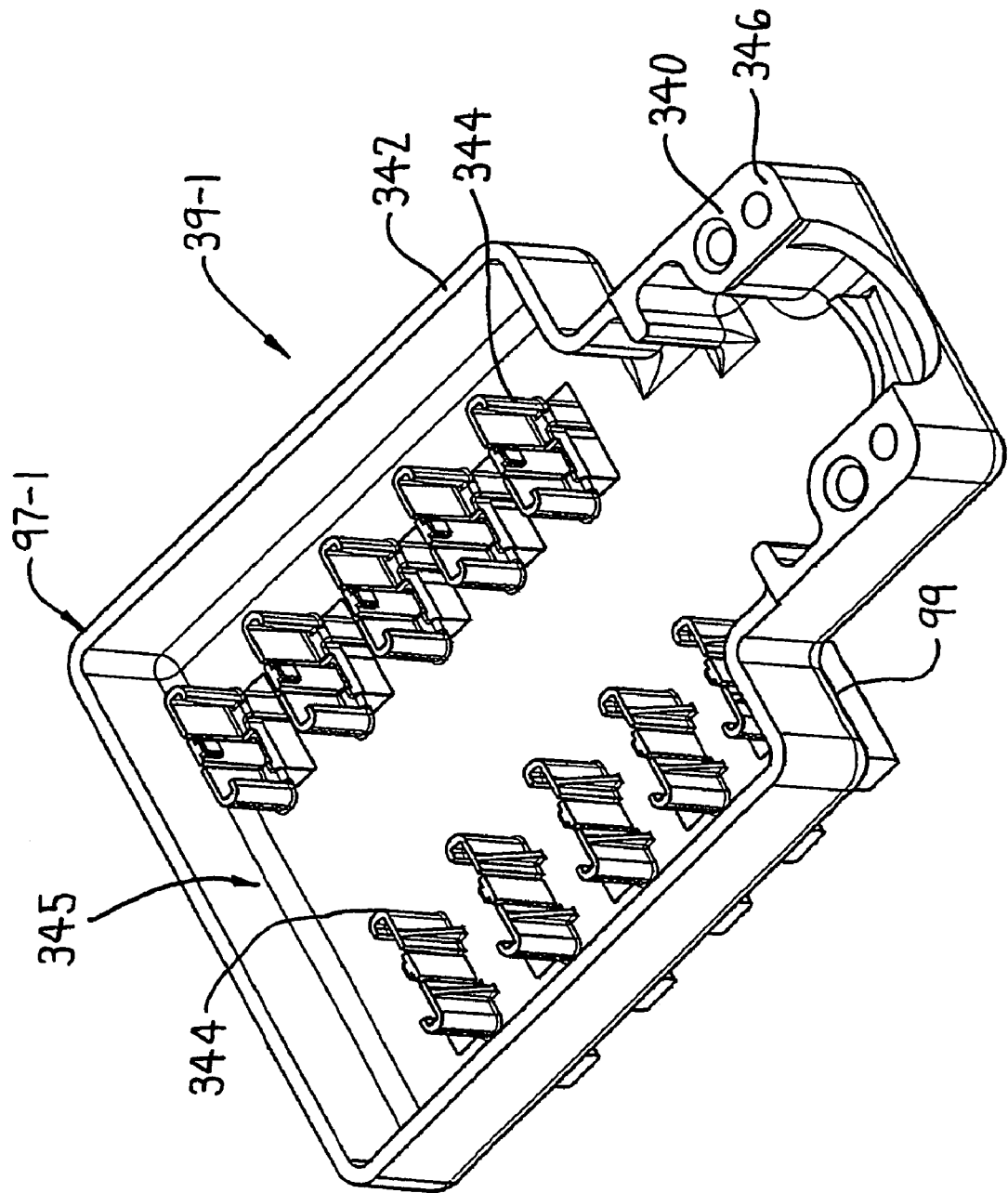
FIG. 55 is a perspective view of a plug housing for a branching connector.
Figure 56:
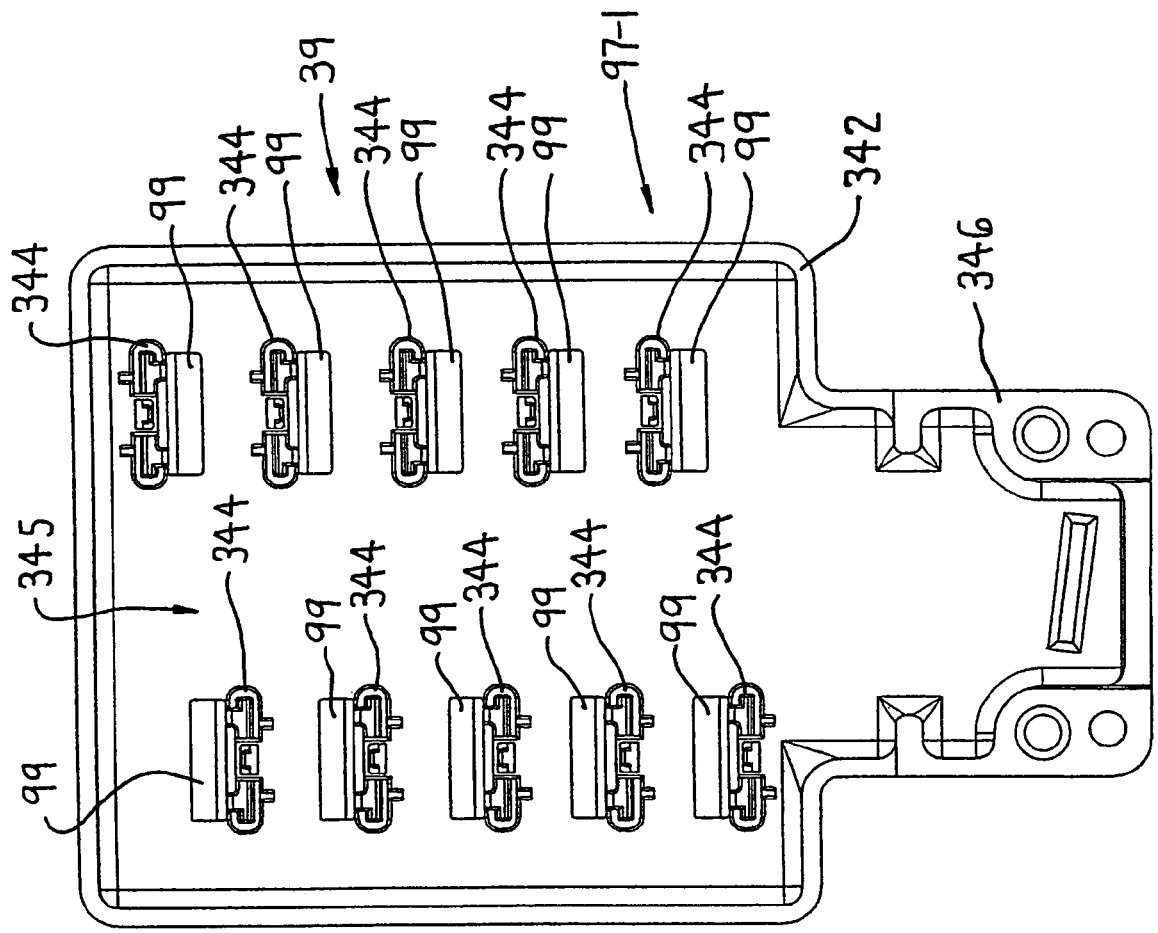
FIG. 56 is a plan view of the branching connector plug housing.
Figure 57:
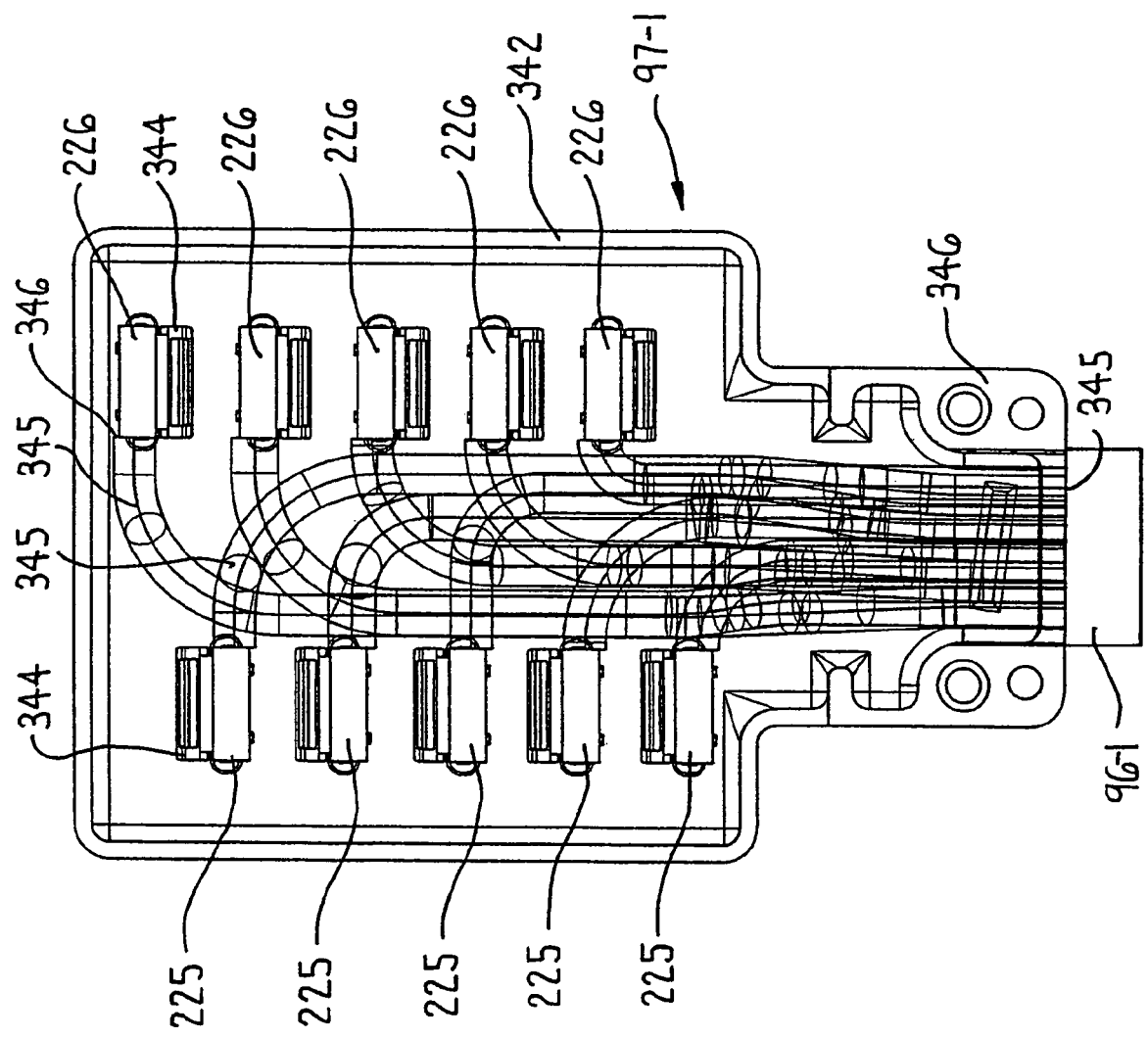
FIG. 57 is a plan view of the branching plug housing having wires illustrated therein.

Referring to FIGS. 55-57, a variation of one of the plugs 97-1 for a branching connector 39-1 is illustrated. This plug 97-1 is formed identical to the plug 97 except that the cable fitting 340 is oriented at a right angle as compared to the cable fitting 341 (FIG. 17) of the plug 97. This plug 97-1 extends vertically from a PDA 35 as seen in phantom outline in FIG. 31 which is more suitable for use in a raised floor application since the branching connector 39-1 does not require bending.

The plug 97-1 has a housing base 342 and a cover (not illustrated) constructed similar to the cover 301 discussed above. The base 342 is functionally the same as the base 300 in that posts 99 project downwardly therefrom, and mounting flanges 344 project into the base interior 345. The posts 99 and flanges 344 are formed identical to the posts 71 and mounting flanges 314 described above and thus, a detailed discussion is not required.

Generally, the posts 99 and flanges 344 are arranged in two vertical rows wherein the posts 99 of each row are horizontally aligned with the posts 99 of the adjacent row. As seen in FIG. 57, contacts 225 and 226 are supported in the mounting flanges 344 while conductor wires 345 extend into the housing base 342. The free end 346 of each wire 345 fits in the conductor mount 324 and is mechanically and electrically connected thereto such as by soldering. The housing base 342 also includes a cable fitting 346 in which the cable 95-1 is fixed when the cover is secured in place.

Figure 58:
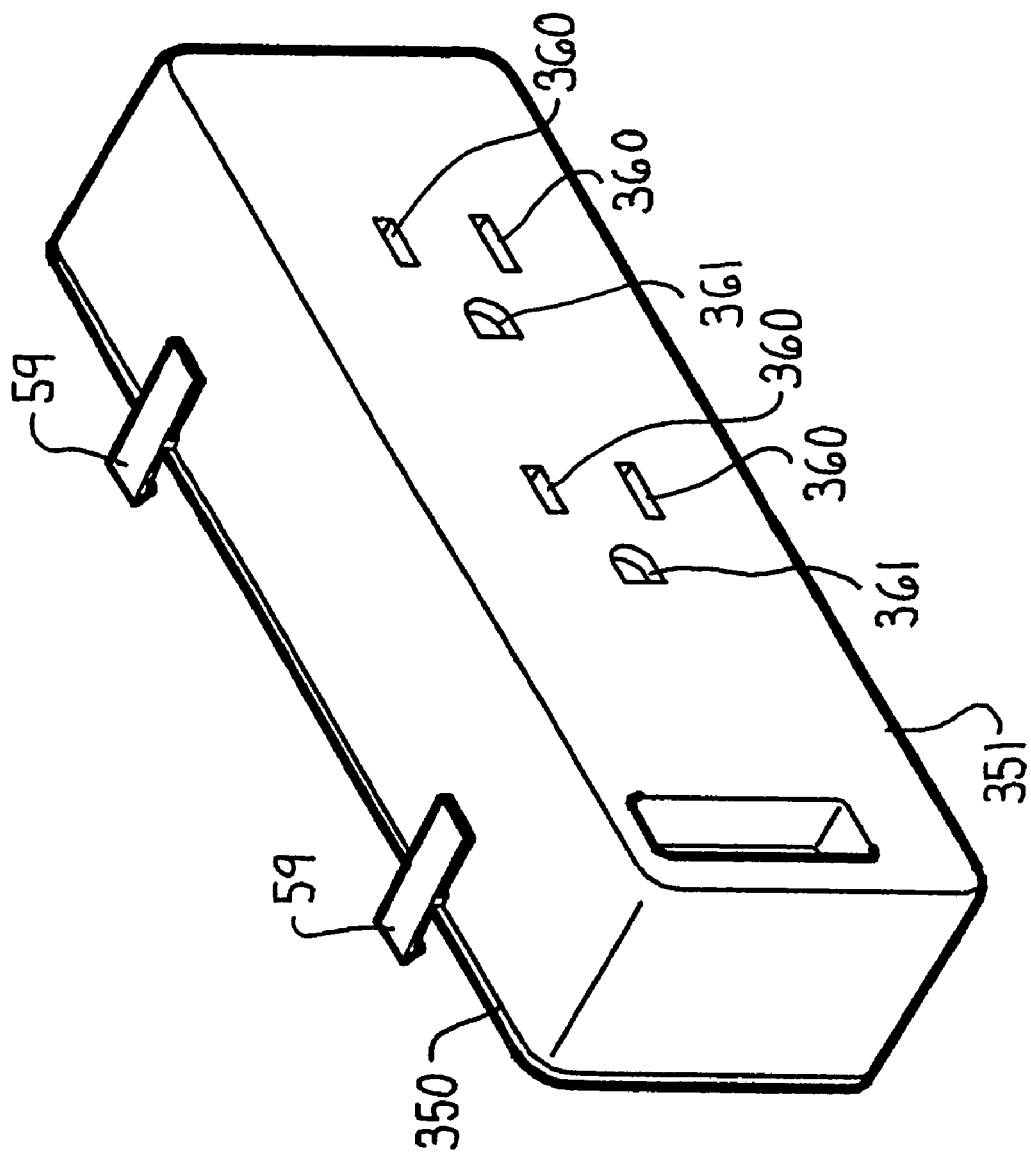
FIG. 58 is a perspective view of a receptacle.
Figure 59:
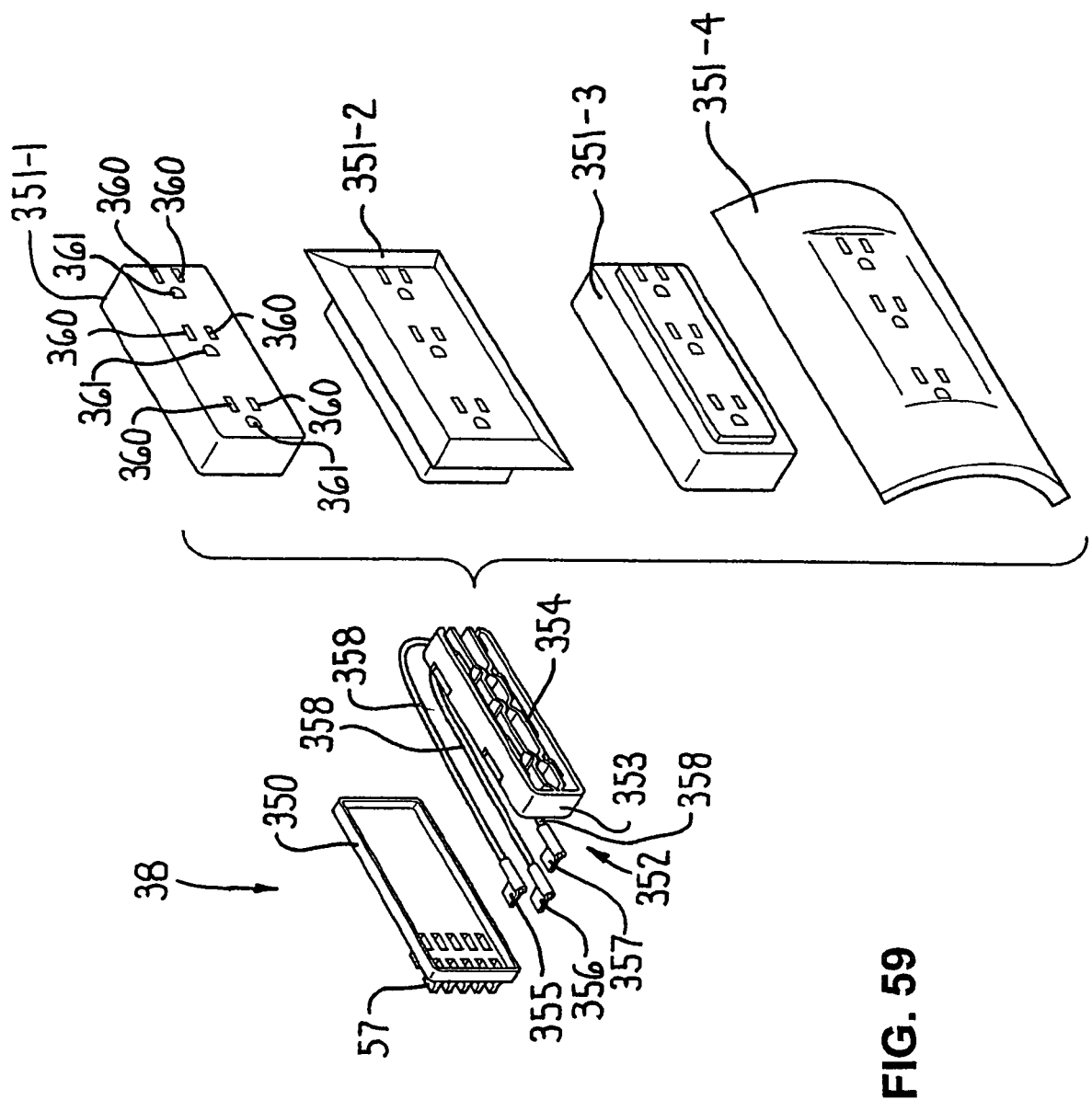
FIG. 59 is an exploded view of the receptacle illustrating a plurality of face plates for the receptacle housing.
Figure 60:
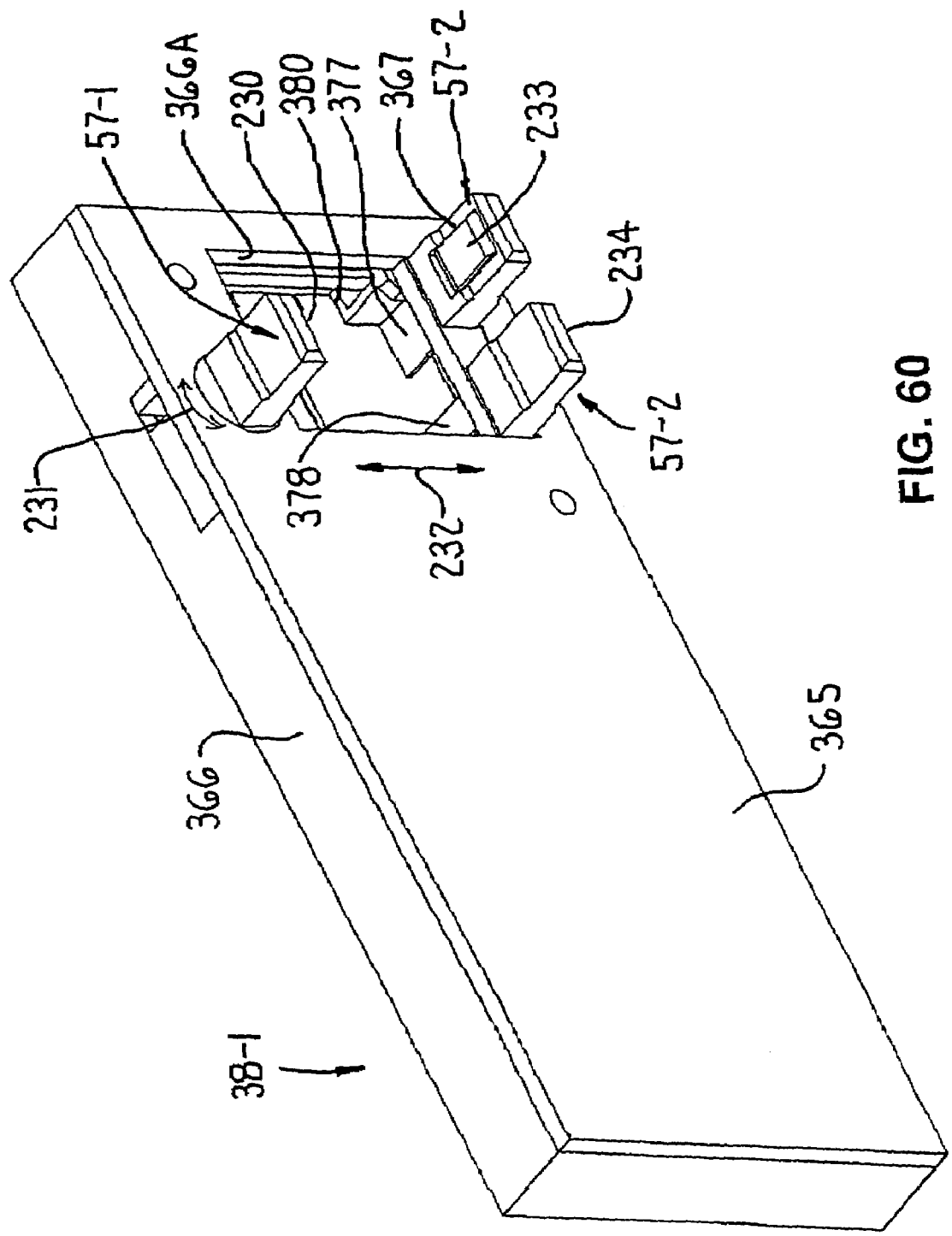
FIG. 60 is a rear perspective view of a second type of receptacle.

In FIGS. 58 and 59, one version of a receptacle 38 is illustrated. This receptacle 38 has a base plate 350 and an interchangeable receptacle cover 351. Generally, the base plate 350 is formed with two vertical rows of fixed posts 57 projecting rearwardly therefrom which posts 57 open inwardly into the receptacle interior. The posts 57 may be formed with mounting flanges 59 like those described above.

The receptacle 38 also includes a conductor strap unit 352 comprising an insulative housing 353, a plurality of elongate, conductive straps 354 received in the housing 353 and electrical contacts 355, 356 and 357 which are connected to the straps 354 by wires 358.

The conductive straps 354 are accessible through the receptacle cover 351 through the line and neutral openings 360 and the ground openings 361 formed in the cover 351. Three straps 354 are provided corresponding to line, neutral and ground and are connected to the contacts 355, 356 and 357. The receptacle 38 is pre-wired by inserting the contacts 355-357 into appropriate openings of the post 57. For example, the contacts 355-357 may be inserted into the post 57 so as to define the contacts 240, 242 and 243 of FIG. 36. The positions of these contacts 355-357 can be varied to pre-wire the receptacle for connection to a selected circuit being carried by a PDA 35-2 or another type of PDA.

Alternate receptacle covers 351 may be provided such as 351-1, 351-2, 351-3 and 351-4. With these different receptacle covers, the identical arrangement of the base plate 350 and the conductor strap unit 352 is used.

Referring to FIGS. 60-65, a receptacle 38-1 is illustrated which includes a rotatable ground unit and a slideable circuit selector. In particular, the receptacle 38-1 includes a base plate 365 and a cover 366. The base plate 355 includes the rotatable post 57-1 which is rotatable as indicated by reference arrow 231. Also, the base plate 365 includes a window 366A, to which is slideably mounted the posts 57-2. One post 57-2 has an upward opening open side 367 through which the contact 233 is accessible. The other post 57-2 opens downwardly in the opposite orientation and has the contact 234 accessible therethrough.

Figure 61:
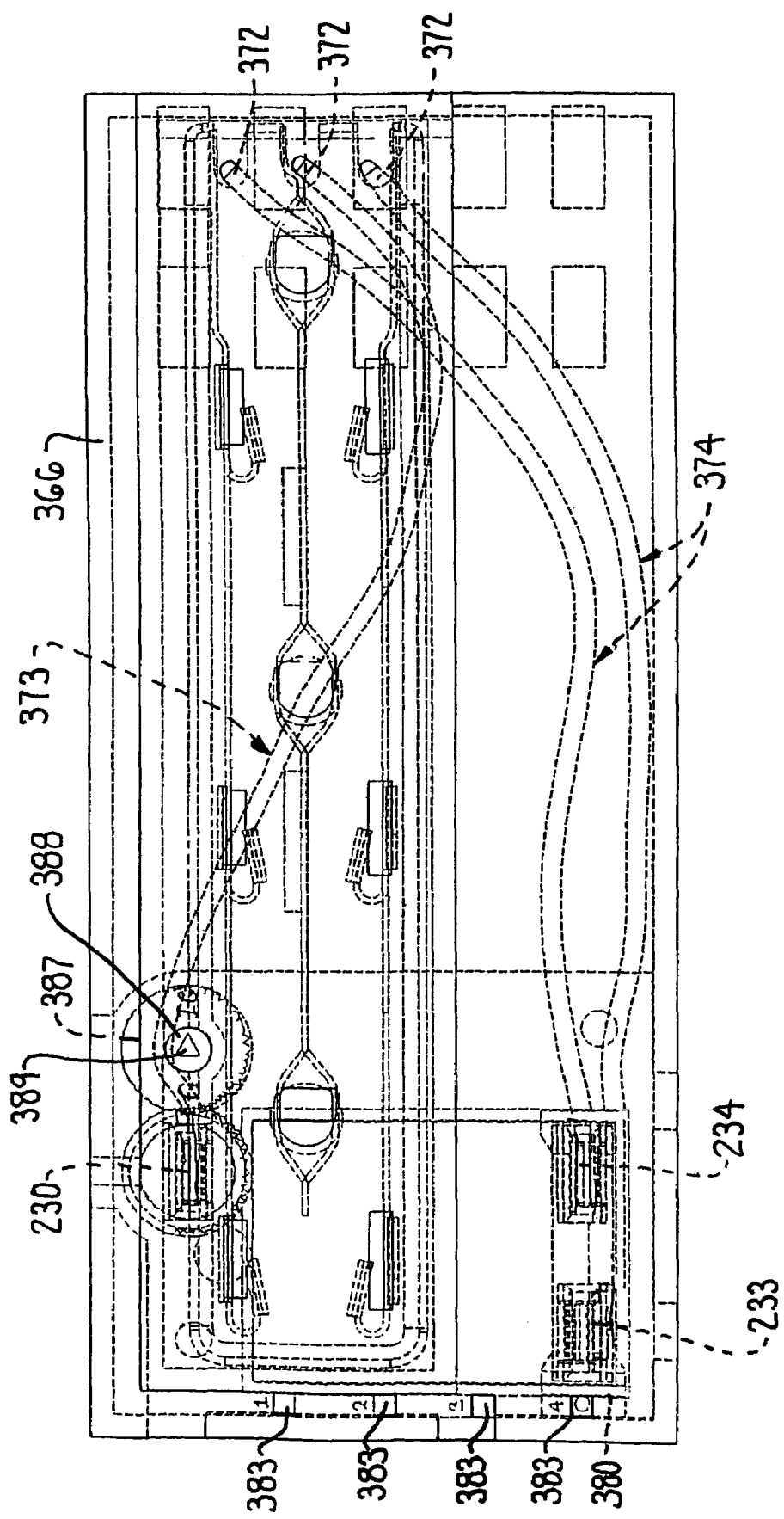
FIG. 61 is a front view of the receptacle of FIG. 60.
Figure 62:
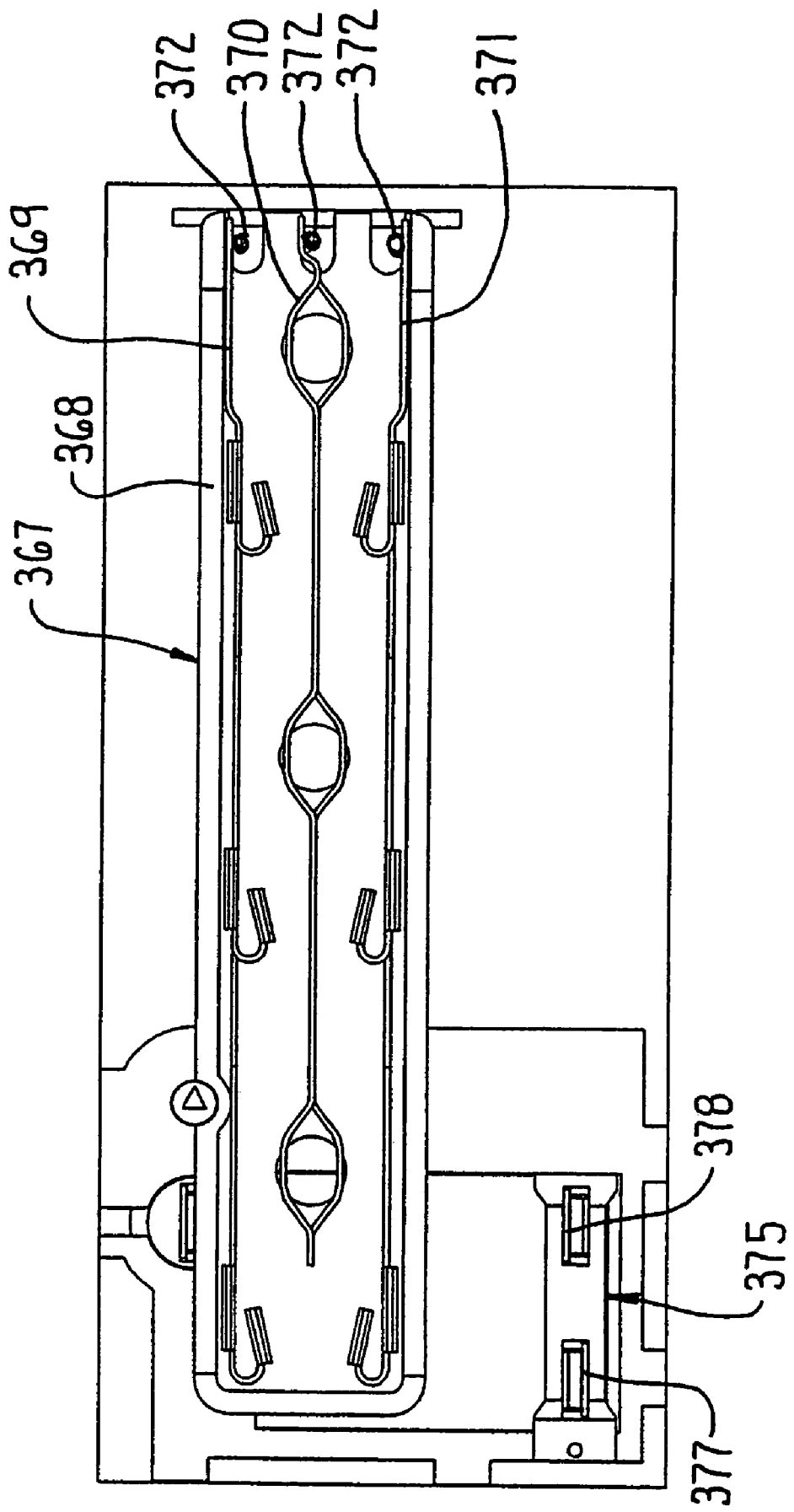
FIG. 62 is a front view of the receptacle having the receptacle housing removed therefrom.
Figure 63:
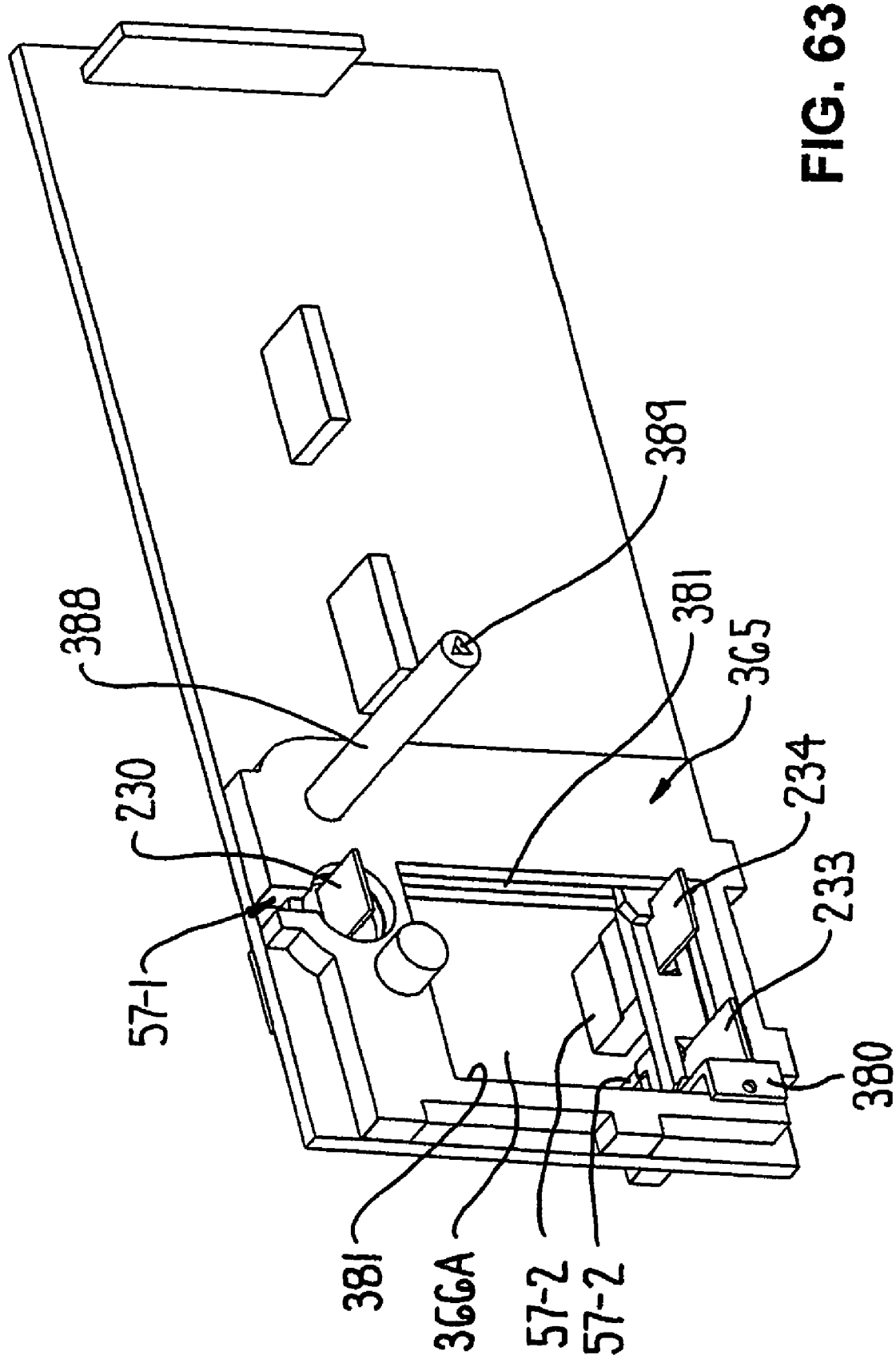
FIG. 63 is a perspective view of the base plate of the receptacle.

Referring to FIGS. 61 and 62, the receptacle 38-1 includes a conductor strap unit 367 which comprises an insulative housing 368 in which is mounted three conductive straps 369, 370 and 371. Strap 370 is a ground strap while straps 369 and 371 correspond to line and neutral. The straps 369-371 have mounting terminals 372 at the ends thereof, which connect to wires 373 and 374. These wires 373 and 374 have the contacts 230, 233 and 234 connected thereto.

Figure 64:
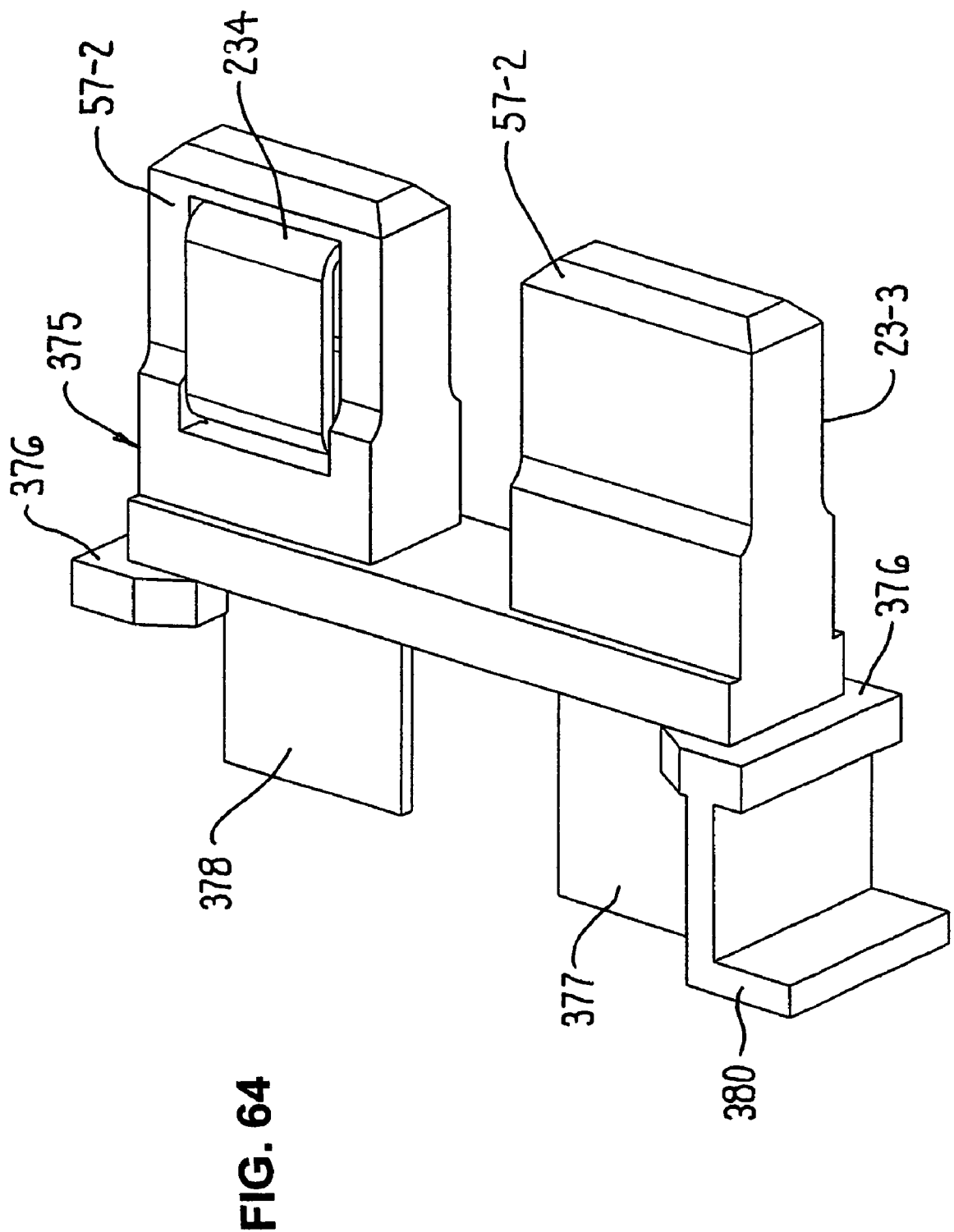
FIG. 64 is a perspective view of a slidable contact assembly.

Referring to FIG. 64, a slide block 375 is illustrated, which has two guide flanges 376 on the opposite sides thereof, and the post 57-2 projecting therefrom. The post 57-2 has the contacts 233 and 234 projecting in opposite directions. The contacts 233 and 234 respectively include mounting terminals 377 and 378 on the inner ends thereof. These mounting terminals 377 and 378 are connected respectively to the wires 373 and 374. The slide block 375 also includes an indicator flange 380. The base plate 365 is formed with guide slots 381 along the opposite side edges of the window 366A, wherein the guide flanges 376 slide within the slots 381 in a vertical direction. Additionally, the indicator flange 380 is located proximate to visual indicators 383 on the receptacle cover 366. The indicators correspond to the vertical position so the slide block 375 which corresponds to the specific circuit being connected to. In other words, the slide block 375 is moveable between four positions in which circuits 1-4 may be engaged, as illustrated in FIG. 34.

Figure 65:
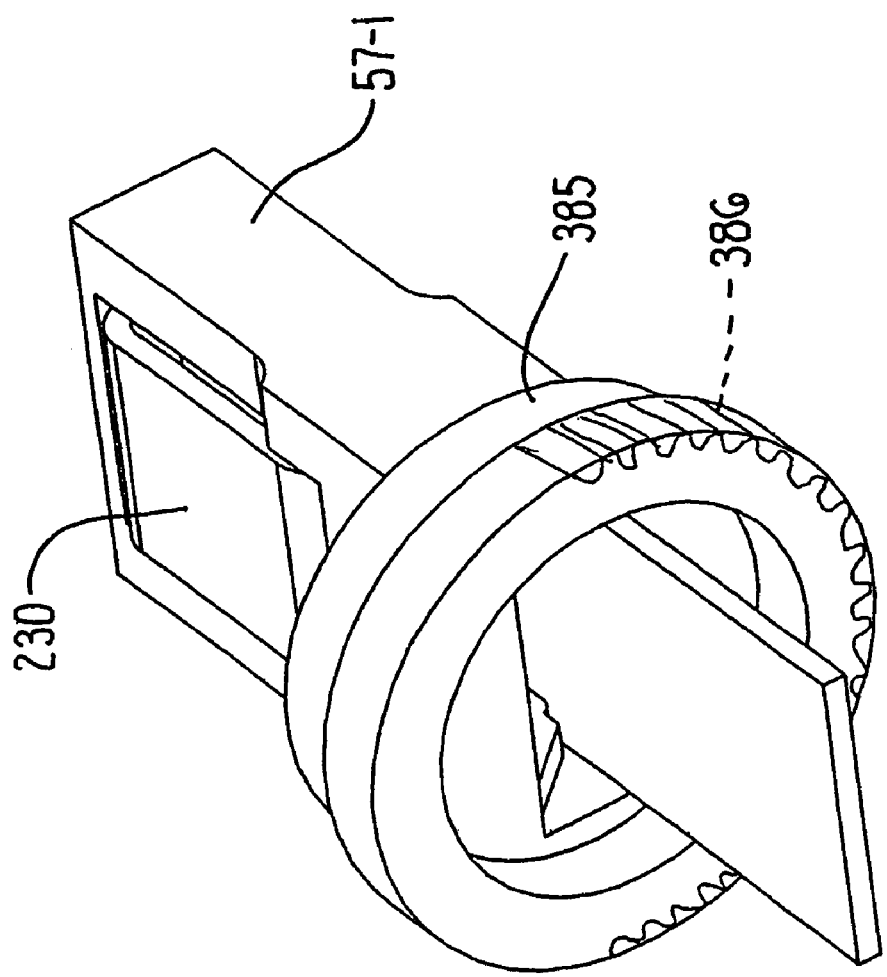
FIG. 65 is a perspective view of a rotatable ground contact assembly.

As for the rotatable post 57-1, this post has the contact 230 accessible therethrough. Referring to FIG. 65, the rotatable post 57-1 has a rotation collar 385 and a toothed portion 386 along at least a portion of the circumference thereof. The toothed portion 386 engages a driven gear 387, which driven gear 387 (FIG. 61) has an indicator pin 388 projecting coaxially therefrom. The indicator pin 388 has an indicator arrow 389 thereon, which points at surface indicia on the cover 366 so as to indicate whether the post 57-1 is engaged with the ground or the isolated ground. By rotating the post 57-1 in the direction of arrow 231, the post 57-1 drives the driven gear 387 to rotate the indicator post 388.

The receptacle 38-1 thereby has a rotatable ground and a slideable contact assembly, which allows for ready selection of the ground and circuit to which the receptacle 38-1 is connected. This adjustment may be in the field and may even be re-adjusted at a later date.

Referring to FIGS. 66-83, a further power distribution system 400 is illustrated therein, which system uses similar components and manufacturing techniques. In particular, the power distribution system 400 includes a power distribution assembly 401, which is formed with the same manufacturing process as that described herein. In particular, the PDA 401 includes an insulated casing 402, which is formed with multiple groups 403 and 404 of openings 405.

Figure 67A:
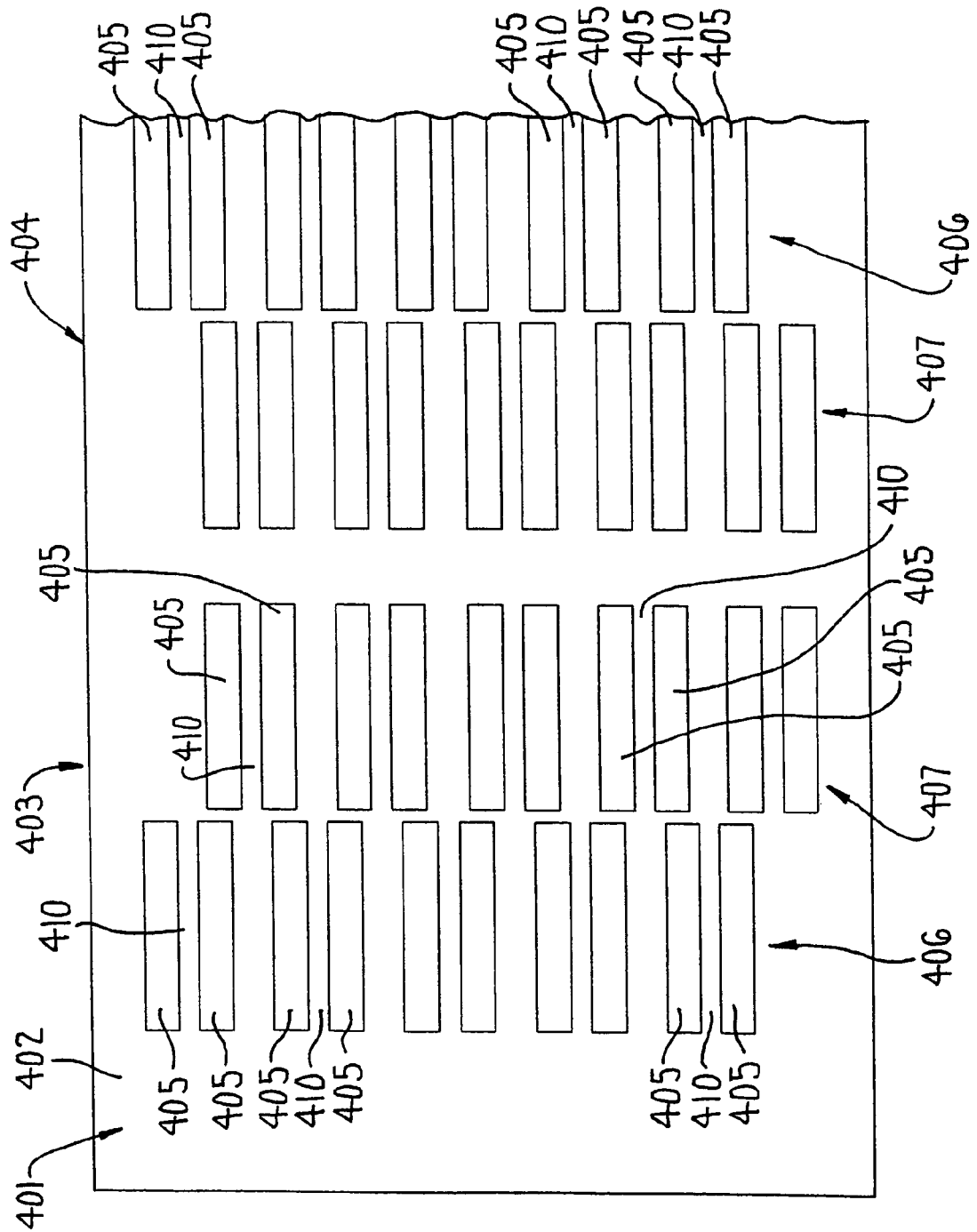
FIG. 67A is an enlarged front view of an end of the PDA.

Referring to FIG. 67A, each opening group 403 includes a first vertical row 406 of the apertures 405 and a second vertical row 407 of additional apertures 405. The row 406 of apertures 405 is at a higher elevation relative to the second row 407.

The adjacent group 404 of openings is formed similar to the group 403 in that group 404 includes a row 407 of apertures and another row 406 of apertures 405. However, the row 406 is located to the right of row 407 in group 404, which is opposite to the orientation of the rows 406 and 407 in the group 403. Thus, groups 403 and 404 are similar except that the higher elevation row 406 is located on different sides of their respective lower elevation rows 407.

With respect to the individual openings 405 of each row 406 or 407, each vertically adjacent pair of openings 405 is separated by a bridge or land of insulative material 410 which extends laterally across and vertically separates each vertically adjacent pair of openings 405. The openings 405 are formed in the same manner as the openings described previously in that during the extrusion process of the PDA 401, the individual openings 405 are punched into the insulative material of the casing 402.

Figure 67B:
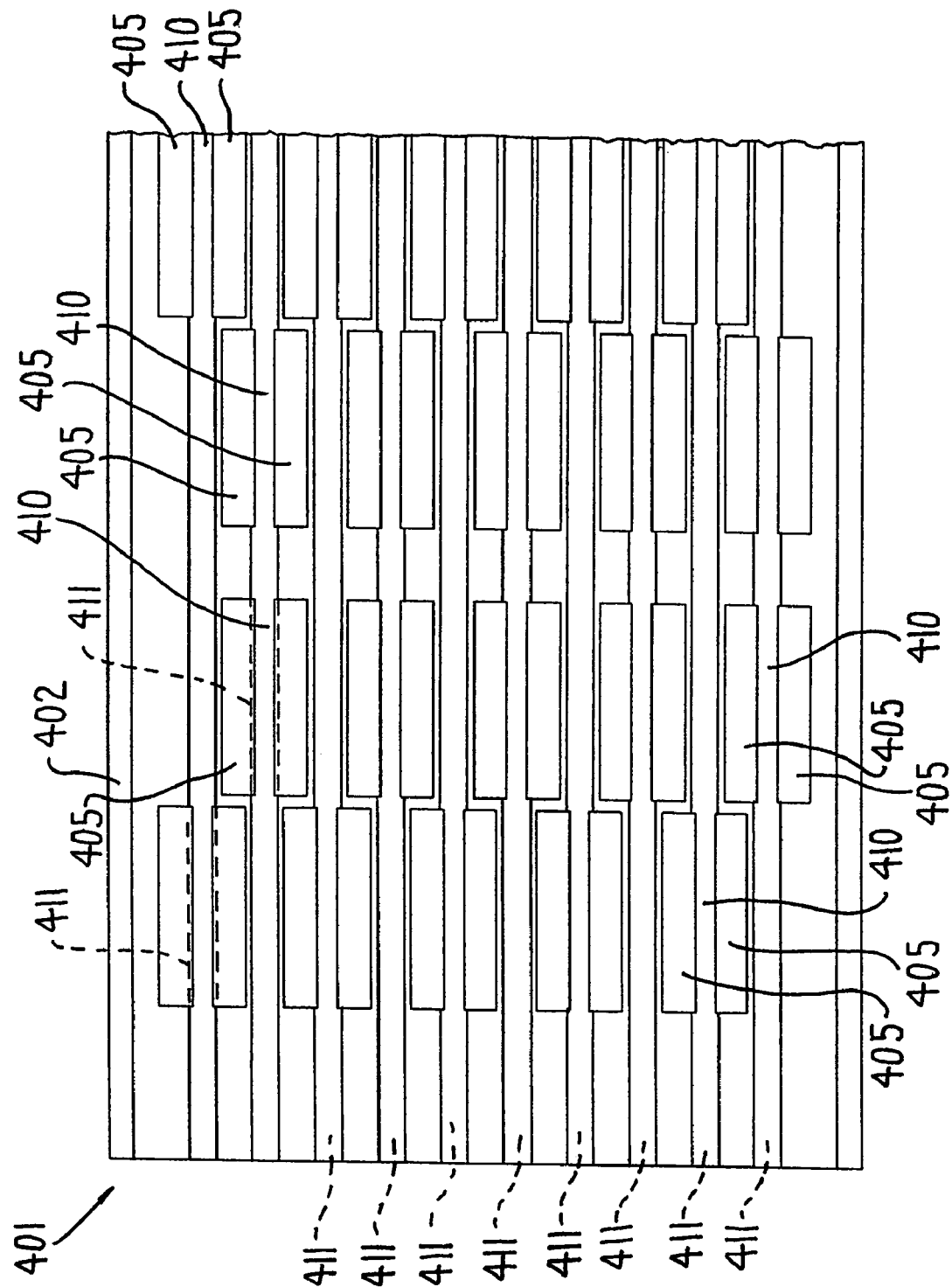
FIG. 67B is a front view of FIG. 66 illustrating conductors extending therethrough.

Referring to FIG. 67B, the casing 402 of the PDA 401 is formed internally with a plurality of parallel grooves extending along the entire length of the PDA 401, in which a plurality of conductors 411 are received. Each conductor 411 extends the entire length of the PDA and extends below the bridge 410 disposed between an adjacent pair of openings 405. The conductor 411 for each pair of openings 405 is accessible therethrough and may be accessed through each of said openings 405.

Figure 68:
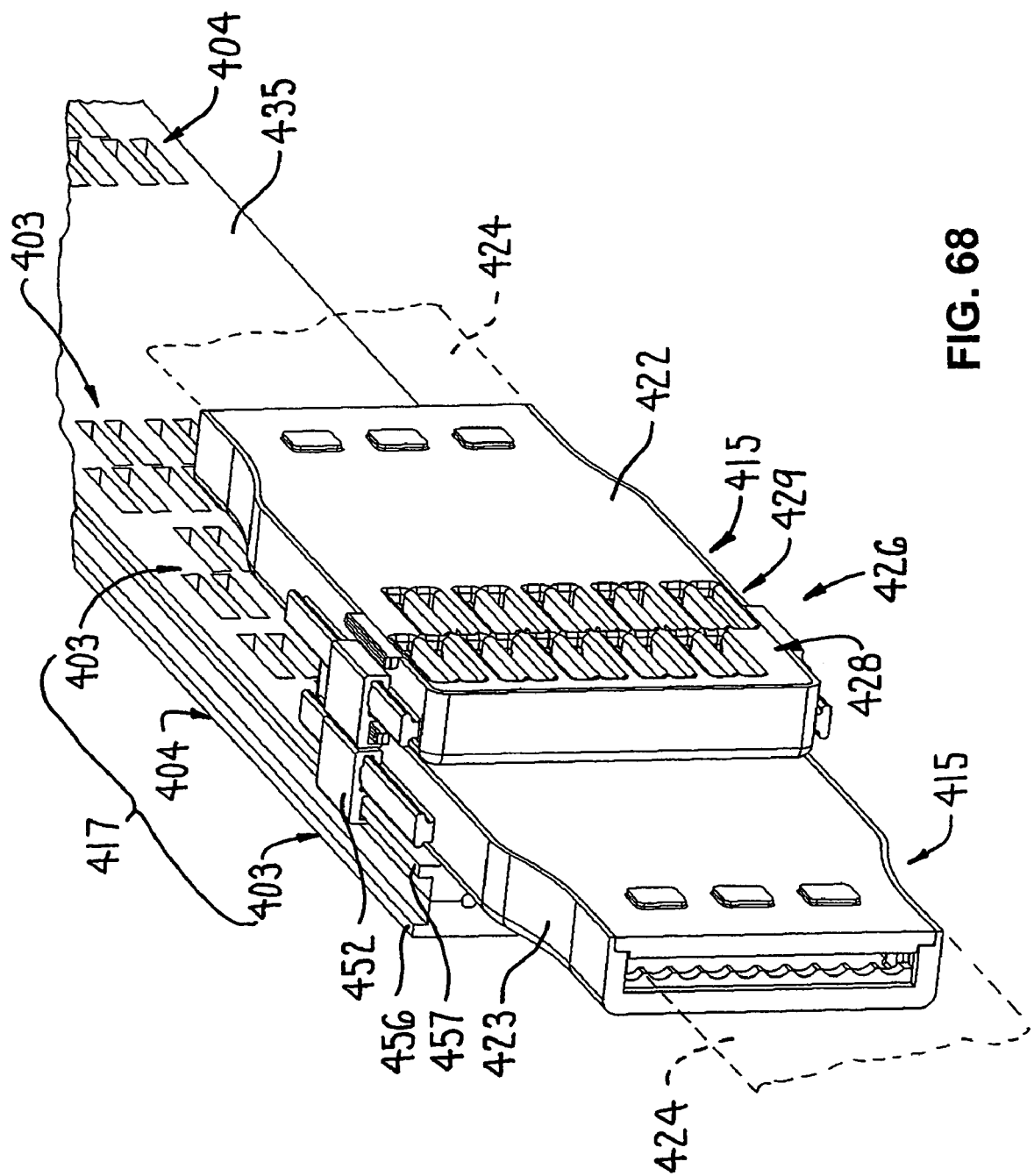
FIG. 68 is a perspective view of two flex connectors connected to the PDA.
Figure 69:
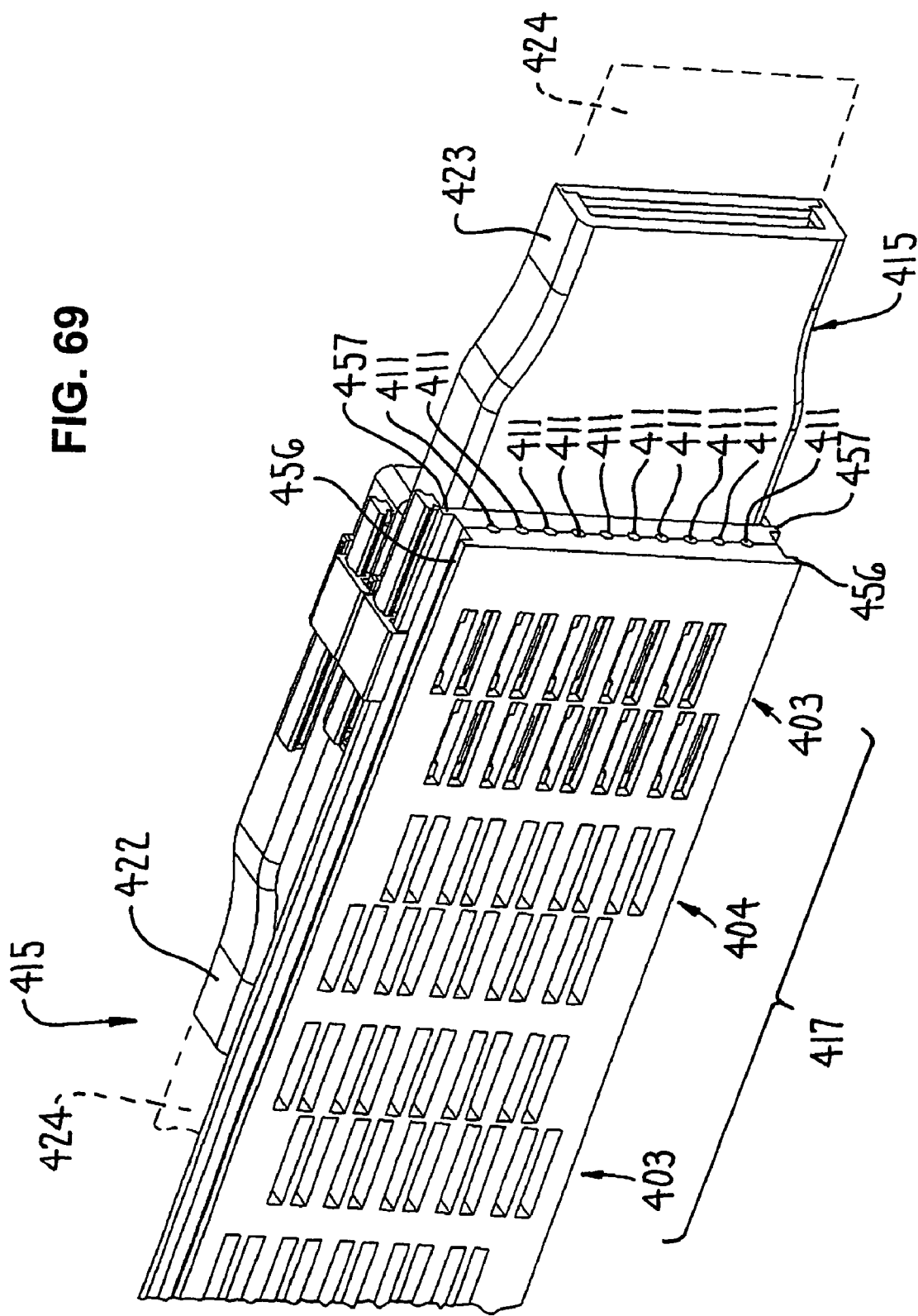
FIG. 69 is a rear perspective view of the flex connectors and PDA of FIG. 69.

Referring again to FIG. 66, the PDA 401 is formed with a set of three opening groups at each opposite end which are associated with each other and used to electrically connect serially adjacent PDAs 401 together through a flex connector 415 (FIGS. 68 and 69). Additionally, intermediate pairs of groups are associate with each other for the mounting of receptacles.

Specifically, the PDA 401 includes two intermediate grouping pairs 416 which each comprise an opening group 403 and an opening group 404. On the left end of the PDA 401, a group set 417 is provided on the left end 418 of the PDA 401. The group set 417 comprises a spaced apart pair of groups 403 with a group 404 disposed therebetween. The opposite right end 419 of the PDA 401 includes a further group set 420 which comprises a spaced apart pair of groups 404 having another opening group 403 disposed centrally therebetween.

More particularly, each PDA 415 includes a pair of connector plugs 422 and 423 at the opposite ends thereof, which are joined together by a bendable conductor body 424, which includes electrical conductors extending therethrough.

The plug 422 includes a group 426 of openings 427, which group 426 is defined by two vertical rows 428 and 429 of openings 427. The row 428 is at a higher elevation relative to the row 429 such that the opening group 426 has substantially the same configuration as the PDA opening group 403.

Figure 70:
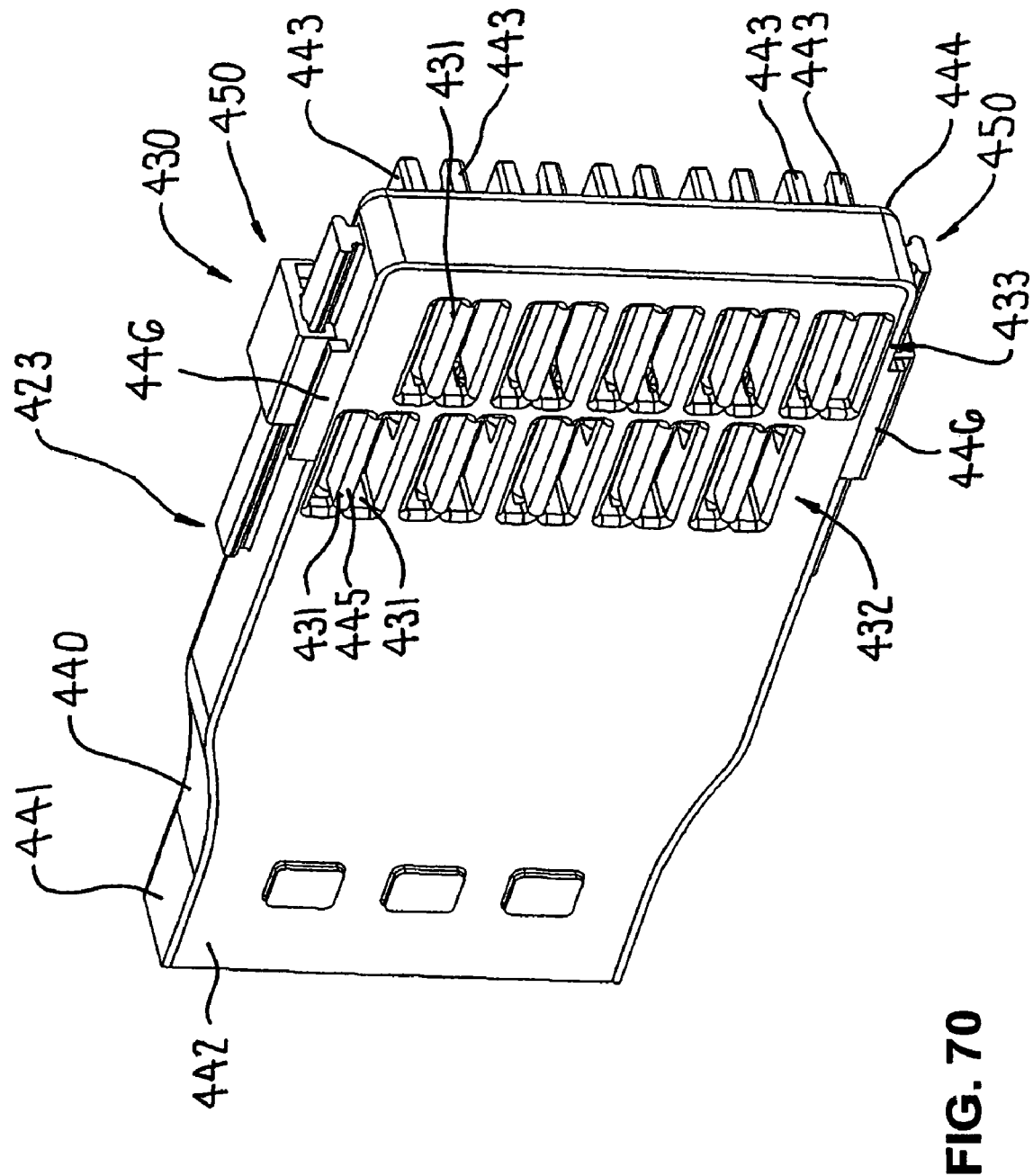
FIG. 70 is a front perspective view of a connector plug for the flex connector.

The plug 423 as illustrated in FIG. 70 similarly includes a group 430 of openings 431, which are arranged in two vertical rows 432 and 433, with row 432 being at a higher elevation. As such, the opening group 430 on the right end connector plug 423 is structurally and functionally similar to the opening group 403 described above.

The group set 417 and the group set 420 allow the flex connector 415 to be used on different sides of the PDA 401. Specifically, when the flex connector 415 is on the front PDA side 435, the plug 423 may be connected to either of the groups 403 in the group set 417. The plug 422 on the opposite end thereof would then be connected to the opening group 403 in the group set 420 on the serially adjacent PDA 401.

If the flex connector 415 is flipped over and used on the opposite side of the PDA 401, the opening groups 426 and 430 would be oriented in an opposite orientation which corresponds to the opening groups 404. As such, the flex connector 415 would have the plug 423 connected to the opening group 404 of the group set 417, while the opposite end plug 422 would be connected to either of the opening groups 404 in the group set 420 on a serially adjacent PDA 401. Use of three opening groups 403 and 404 for each group set 417 or 420 allows two adjacent PDAs 401 to be positioned at two different modular distances from each other, which distances correspond to the thickness of the wall panel in a three-way connection such that the power distribution system 400 is usable in either a two-way connection such as in FIG. 3, or a three-way connection such as in FIG. 2.

Specifically, as to the connector plugs 422 and 423, these components are formed substantially the same as each other and thus, while the following discussion is directed more specifically to the connector plug 423, this discussion also applies to the plug 422.

Figure 79:
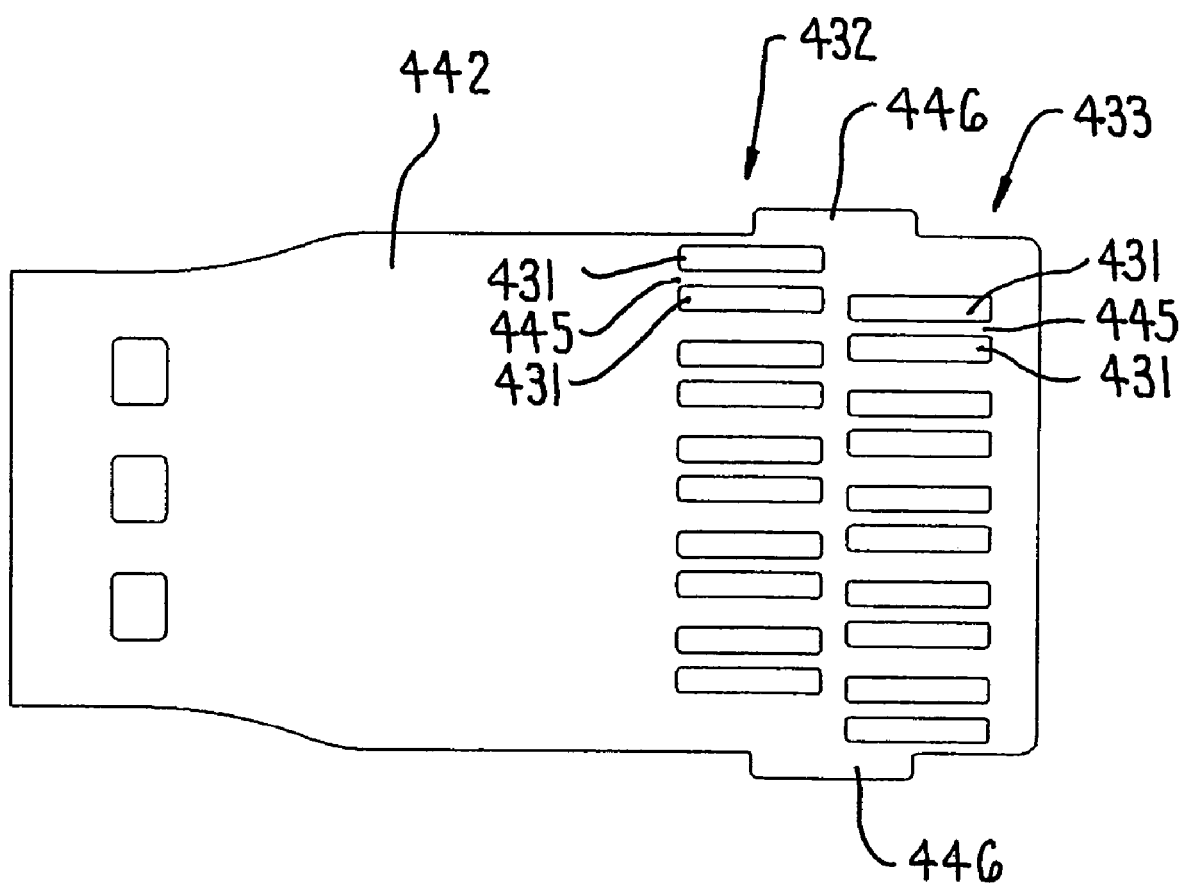
FIG. 79 is a plan view of a cover for the plug housing.

Referring to FIG. 70, the connector plug 423 includes a plug housing 440 defined by a housing base 441 and a housing cover 442. The plug housing 440 generally includes the opening group 430 formed in the cover 442 and also includes a plurality of contact posts 443 which project from an inside face 444 of the housing base 441. More particularly as to the cover 442, the cover 442 is illustrated in FIGS. 70 and 79. It is formed flat with the two rows 432 and 443 of openings 431 formed therein. Openings 431 are vertically spaced apart and generally arranged in pairs, wherein each pair of openings 431 is separated by a bridge or land 445. Additionally, locking flanges 446 project vertically from the upper and lower edges of the cover 442.

Figure 71:
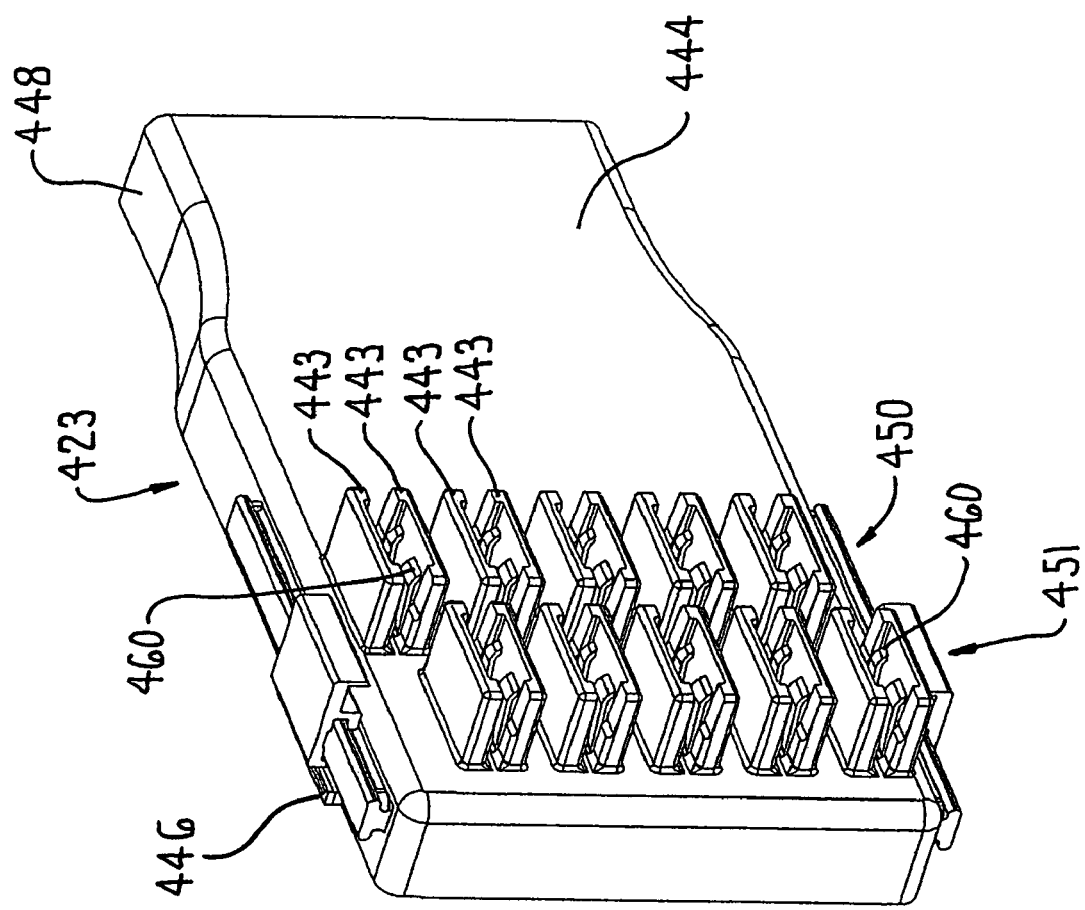
FIG. 71 is a rear view of the connector plug.

Referring to FIG. 71, the base 442 has a peripheral side wall 448 and a main wall 449 from which the individual posts 443 project. The posts 443 are arranged in two vertical rows 450 and 451 having the same relative spacing as the openings 431 and specifically the vertical rows 432 and 433 thereof. The posts 443 are arranged in pairs of such posts 443 which are substantially identical to each other but arranged as mirror images in vertically spaced relation. The pairs of posts 443 are vertically spaced apart so as to fit within a corresponding pair of openings. For example, the posts 443 may fit into the openings 405 of the PDA 401 with the material bridge 410 being received between the posts 443. Alternatively, when one flex connector 415 is connected to another such as illustrated in FIGS. 68 and 69, the posts 443 would fit within the openings 427 of the connector plug 422, with a material bridge 455 being slideably received between the associated pair of posts 443.

More particularly, as to FIGS. 71-75, each post 443 has a rectangular opening 455 adjacent to an inside face thereof on the interior of the base 441. Each associated pair of openings 445 is separated by a rib 456.

Additionally, each rib 456 extends and terminates at a support block 457.

Figure 72:
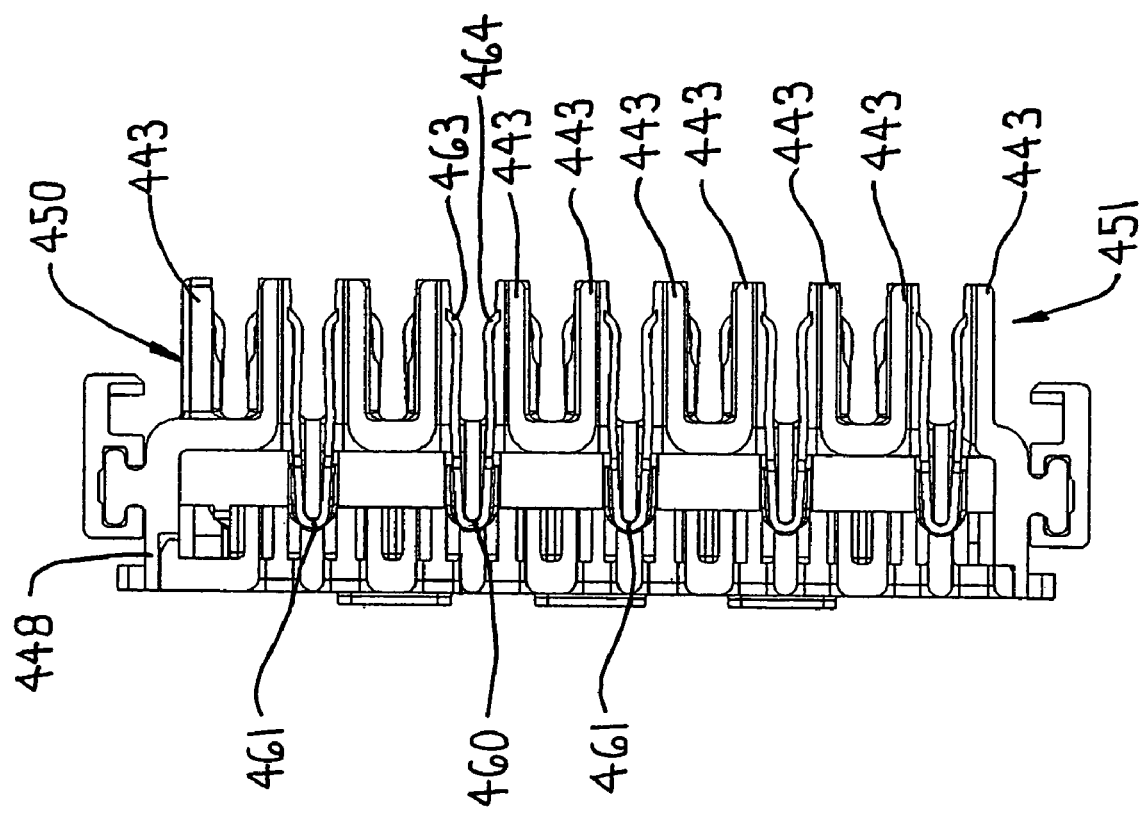
FIG. 72 is an end cross section of the connector plug.
Figure 73:
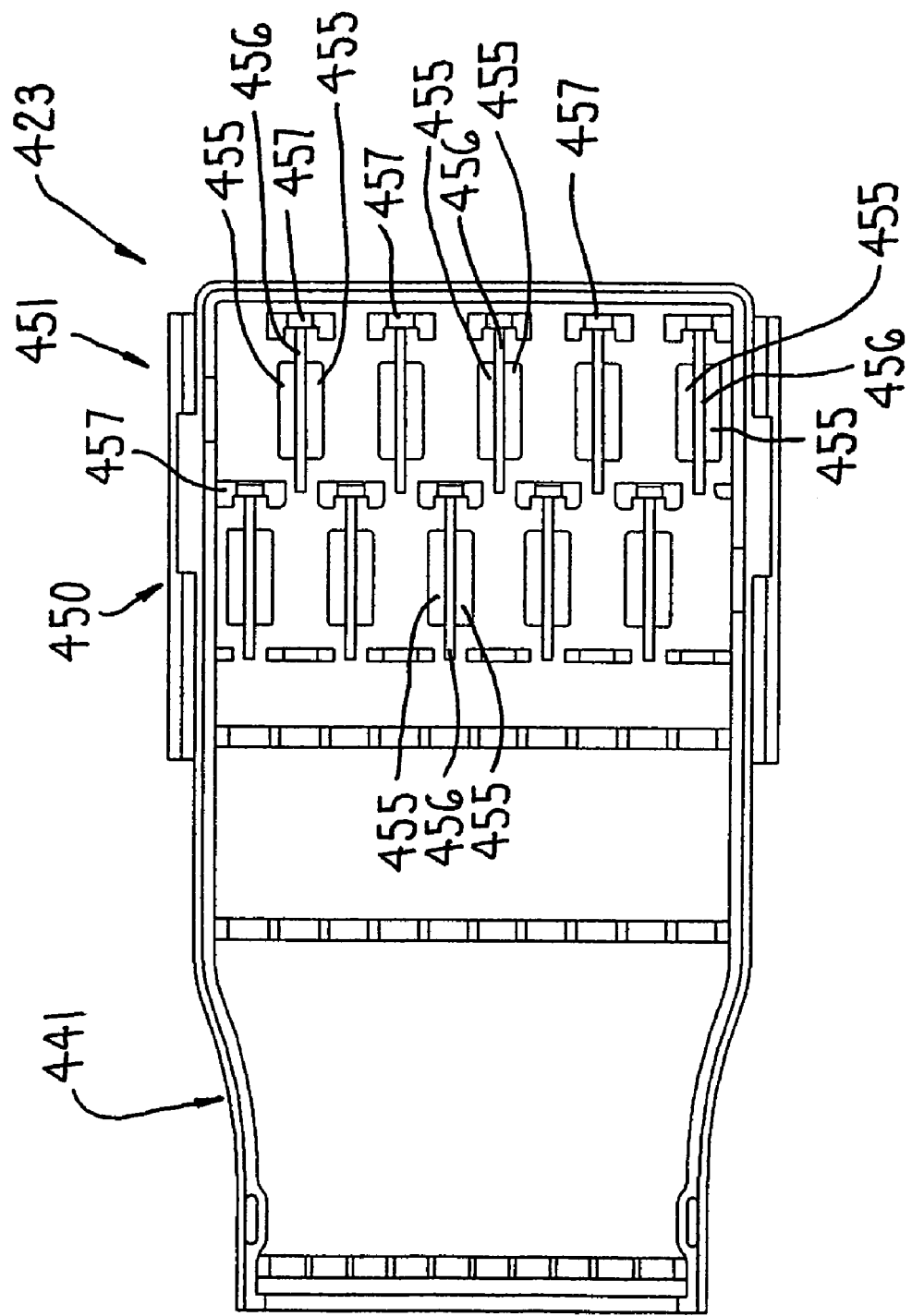
FIG. 73 is a plan view of a plug housing.
Figure 74:
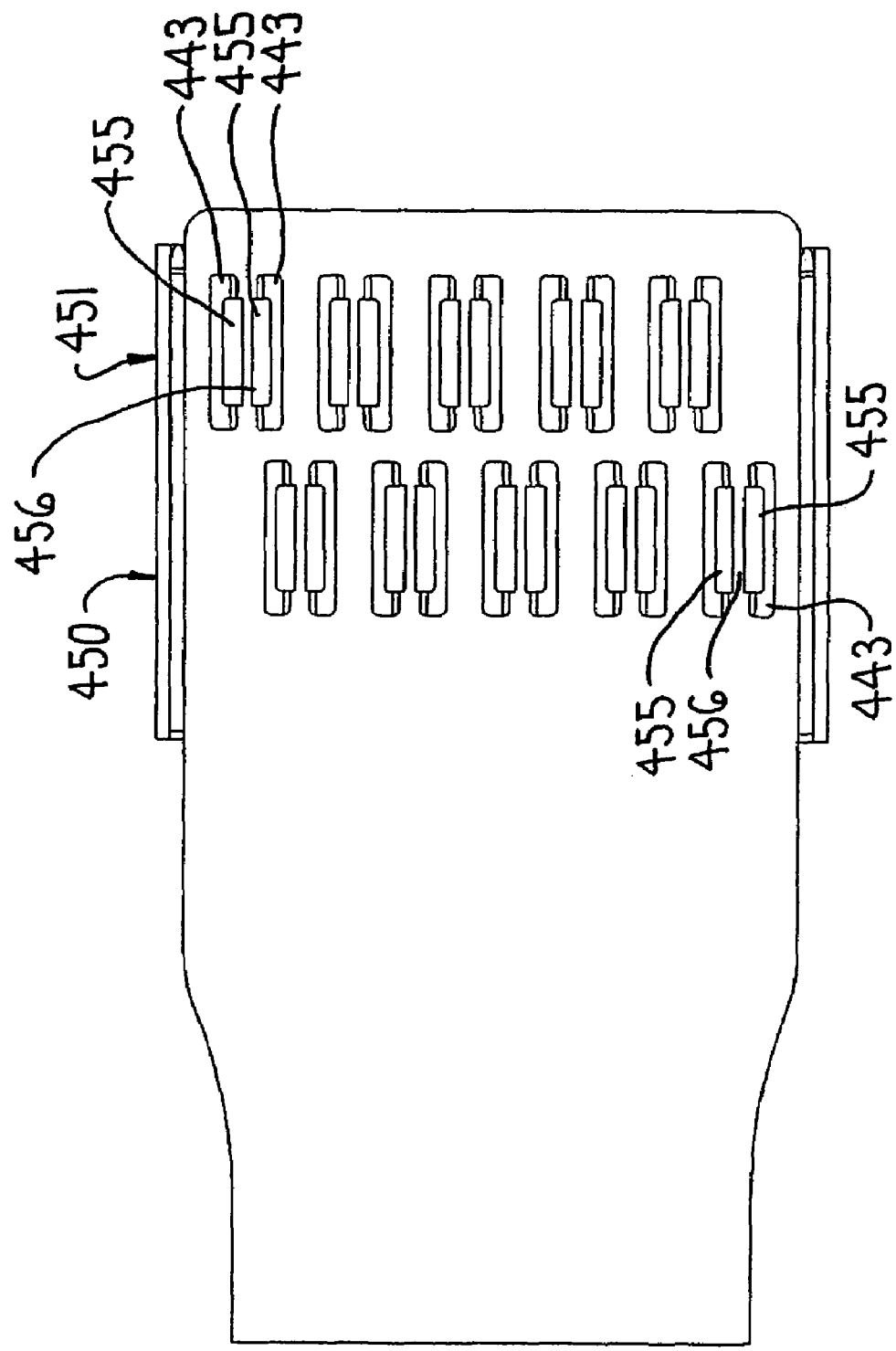
FIG. 74 is a bottom view of the plug housing.
Figure 75:
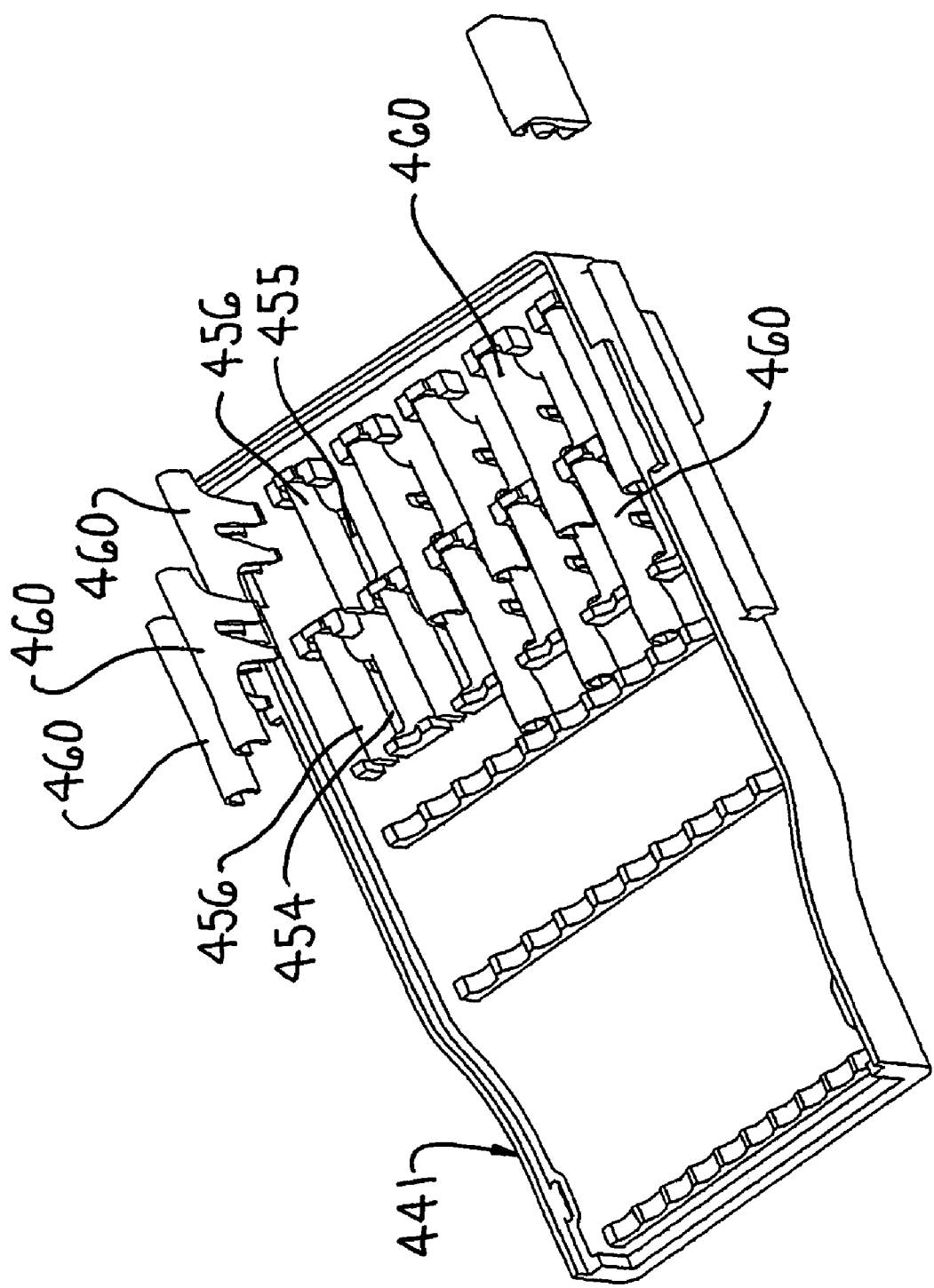
FIG. 75 is a perspective view of the plug housing.
Figure 76:
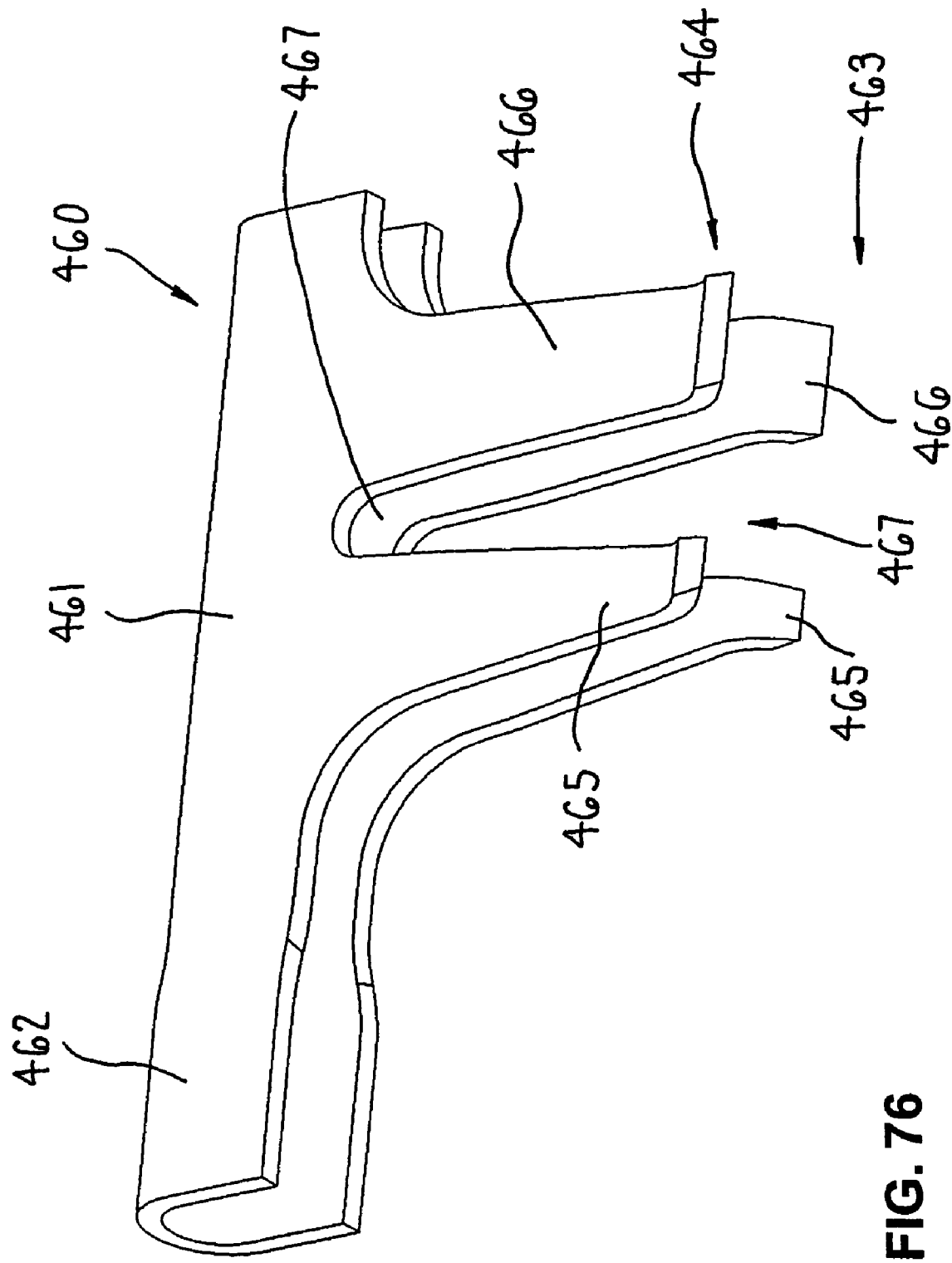
FIG. 76 is a perspective view of an electrical contact.
Figure 77:
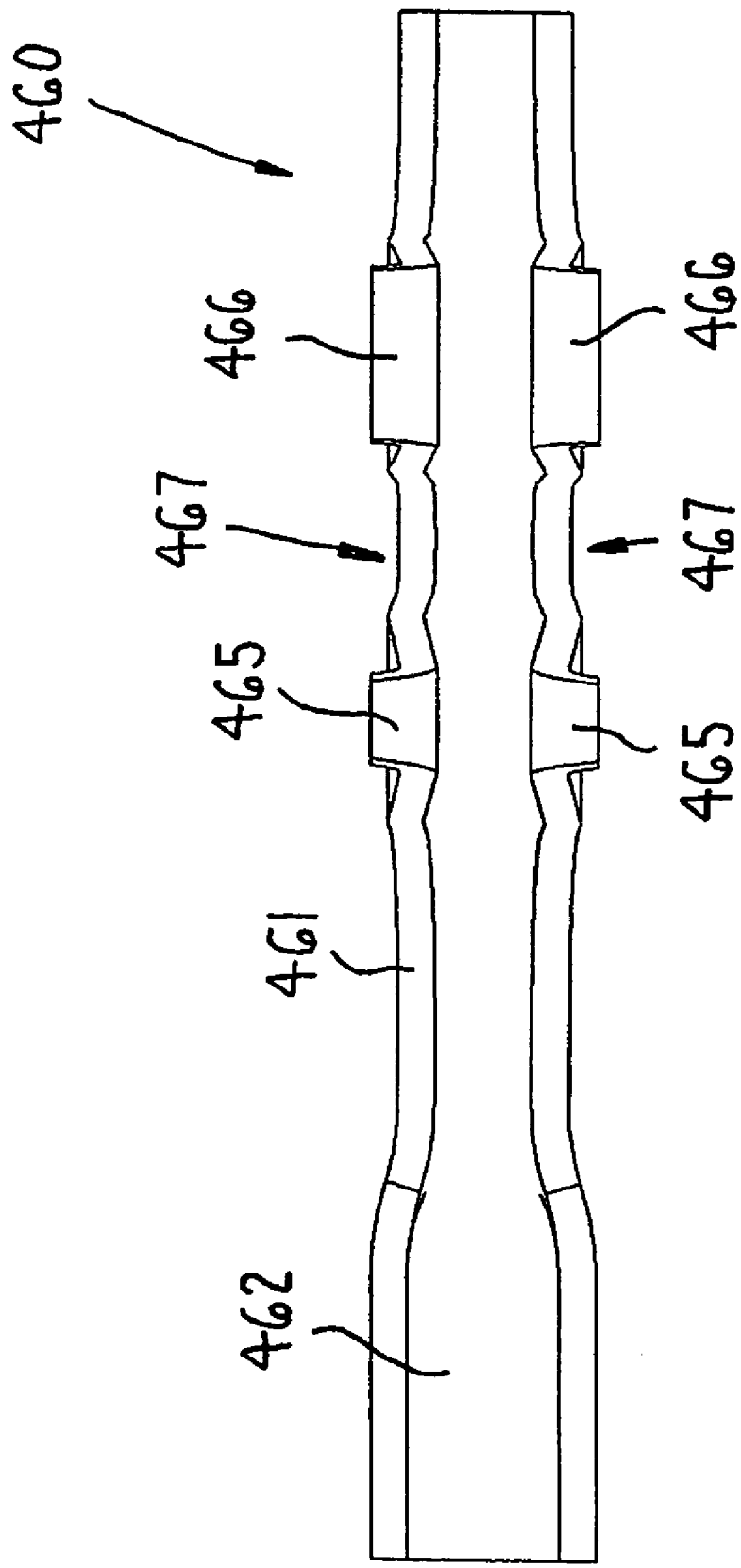
FIG. 77 is a bottom view of the electrical contact.
Figure 78:
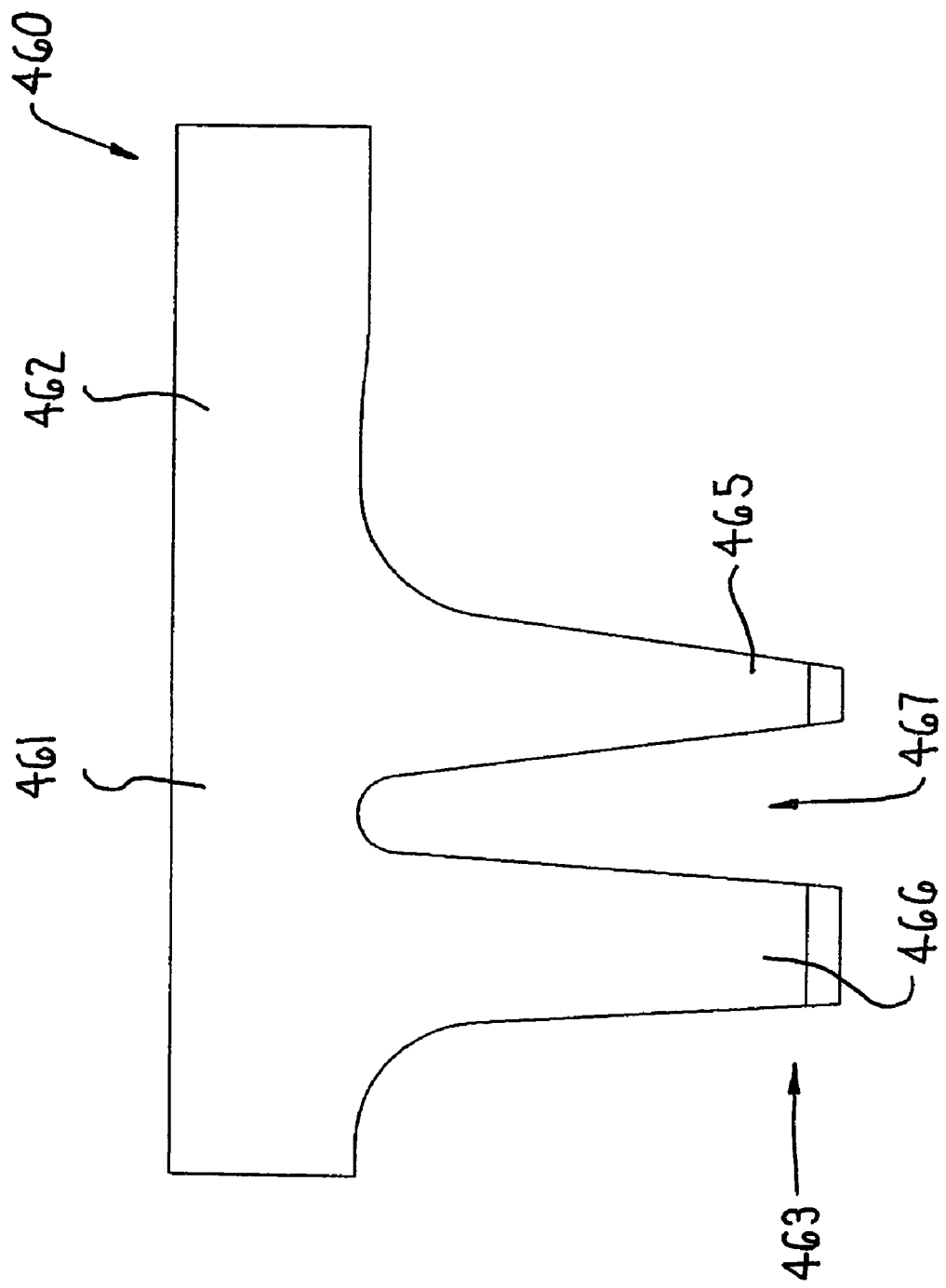
FIG. 78 is a rear view of the electrical contact.

Referring to FIG. 76, a generally U-shaped contact body 460 is mounted on each support rib 456. The front end of each contact body 460 fits within the support block 457 and is restrained from movement thereby. The contact body 460 is illustrated in further detail in FIGS. 76-78 and is formed from a U-shaped barrel or spine section 461 having an enlarged semicylindrical conductor seat 462 at one end thereof. The conductor seat 462 is adapted to receive a conductor wire therein and which seat 462 is soldered to the free end of the wire. Additionally, a pair of contact prongs 463 and 464 project downwardly from the barrel 461. Each pair of prongs 463 and 464 comprises a narrow prong 465 and a wide prong 466 which are separated from each other by a gap 467. The prongs 465 and 466 are configured to mechanically control distortion of the contact body 460 during soldering of wire to the wire seat 462. When fitted into the housing base 441, each pair of prongs 463 and 464 is inserted through a corresponding one of the openings 455 and is supported by the post 443 as seen in FIGS. 71 and 72.

Figure 82:
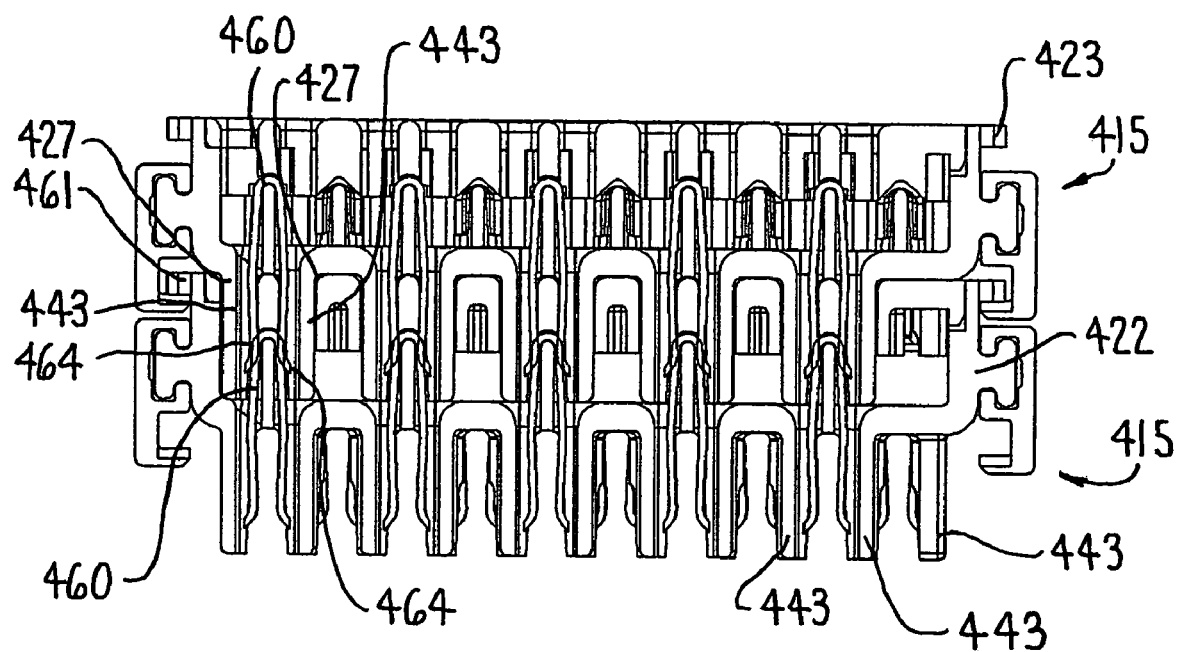
FIG. 82 is a cross-sectional end view.

When assembled together, the barrel portion 461 of each contact body is exposed within the interior and when the cover 442 is mounted in place, the barrel portions 461 are accessible through the openings 431 in the cover 442. Therefore, when joining two flex connectors 415 together such as in FIG. 80, the flex connectors can be electrically interconnected by engagement of the posts 443 therein. More particularly, FIG. 82 illustrates a connector plug 423 connected to the connector plug 422 of the other flex connector 415. For the flex connector 422, the prongs 443 thereof are exposed with the contact body 460 positioned for use. Additionally, the posts 443 of the plug 423 fit into a pair of openings 427. This allows the pairs of prongs 463 and 464 to resiliently fit over the barrel 461 of the lower contact body 460. Thus, the two plugs 422 and 443 are electrically connected together.

Figure 80:
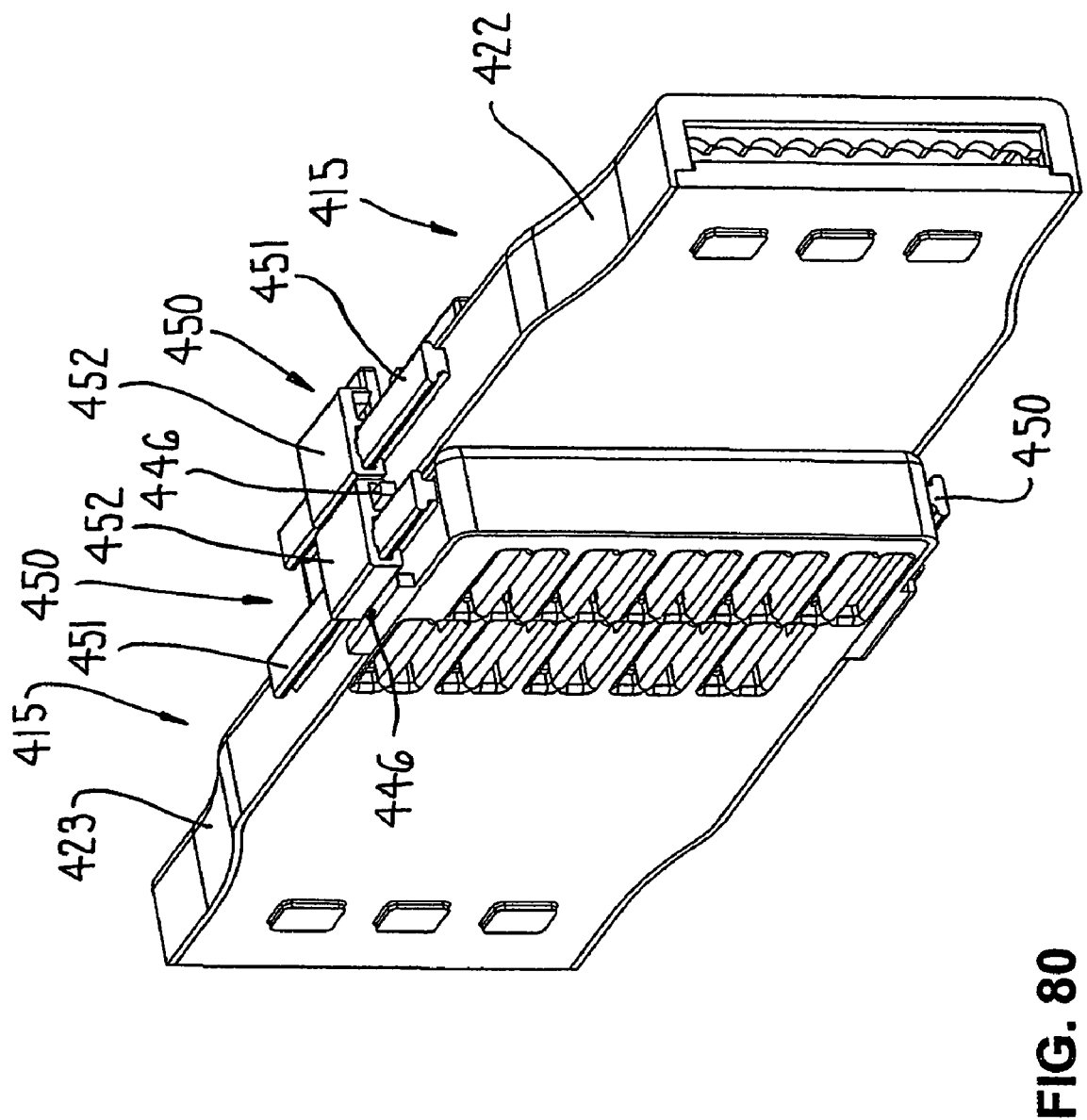
FIG. 80 is a perspective view of two flex connectors interconnected together.
Figure 81:
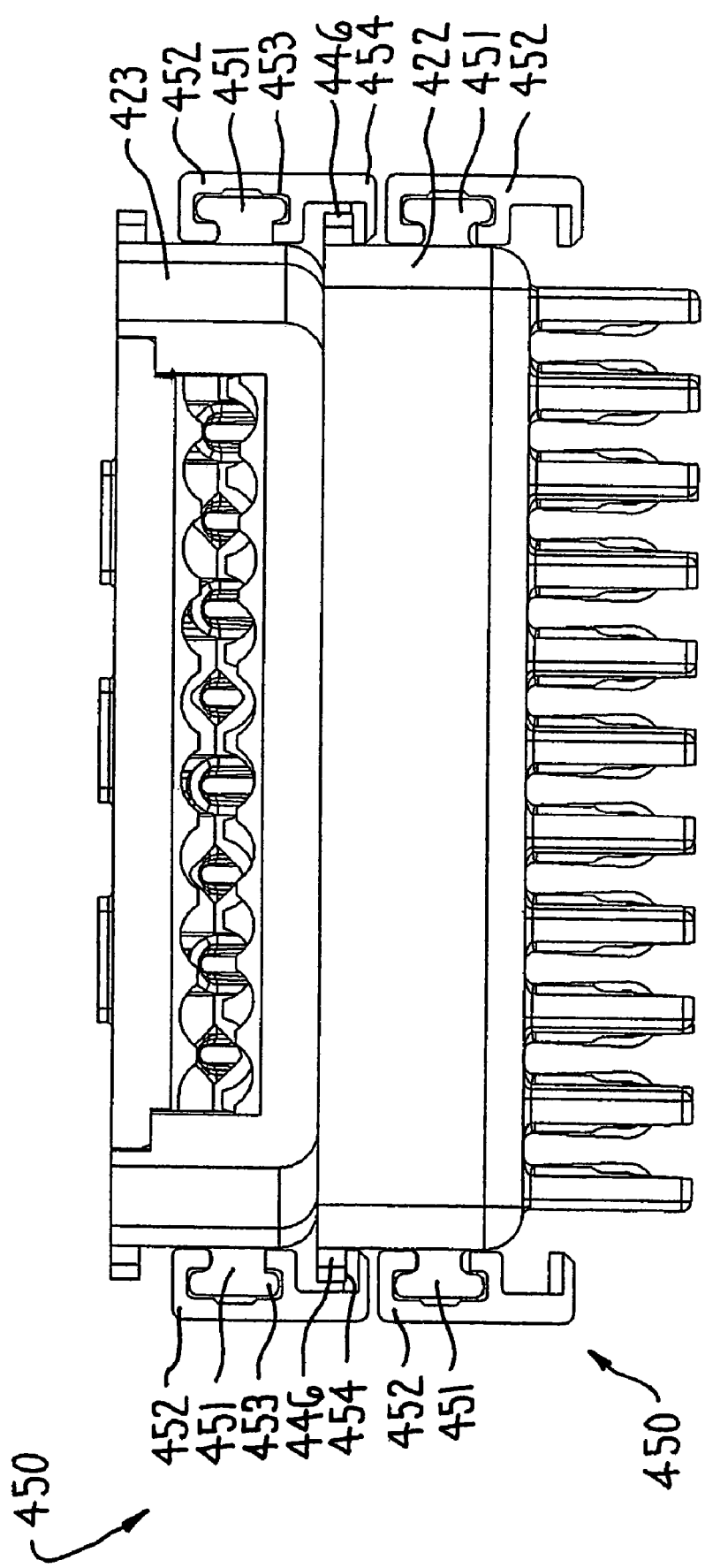
FIG. 81 is an end view thereof.

Referring to FIGS. 70, 71 and 80, each connector plug 422 or 423 includes latching devices 450 on the upper and lower edges thereof. As seen in FIGS. 80 and 81, each latching device comprises a T-shaped guide rail 451 and the locking flange 446 which is disposed parallel to but spaced sidewardly from the guide rail 451. Further, a slideable latch 452 is slideably connected to the rail 451 so as to be movable therealong. The latch 452 includes a groove 453 which fits over the guide rail 451. The latch 452 further includes a locking flange 454 which slides over and lockingly engages the flange 446 to prevent separation of the two plugs 422 and 423. When the two plugs 422 and 423 are fitted together, the latch 452 is then slid along the guide rail 451 until the flange 454 slides over and engages the flange 446. Thus, all of the components can be positively locked together.

Referring to FIG. 68, the same latch 452 also may be used to engage one of two locking ribs 456 or 457 which extend along both of the opposite side edges of the PDA 401.

In addition to the foregoing, each plug 422 or 423 may be fitted to the PDA 401 by insertion of the posts 443 into the openings 405. The prongs 463 and 464 spread apart as they pass over the bridge 410 between the openings 405 and then resiliently spring back together into contact with the respective conductor 411.

The system 400 functions similar to the above described power distribution system 10 such that further discussion of the system components such as a branch connector or a receptacle is not required.

Referring to FIGS. 83-85, an additional power distribution assembly construction is illustrated therein wherein power distribution assembly 470 structurally and functionally operates substantially the same as the power distribution assemblies described above. The PDA 470 embodies additional inventive features in the structure and manufacture thereof.

Figure 66:
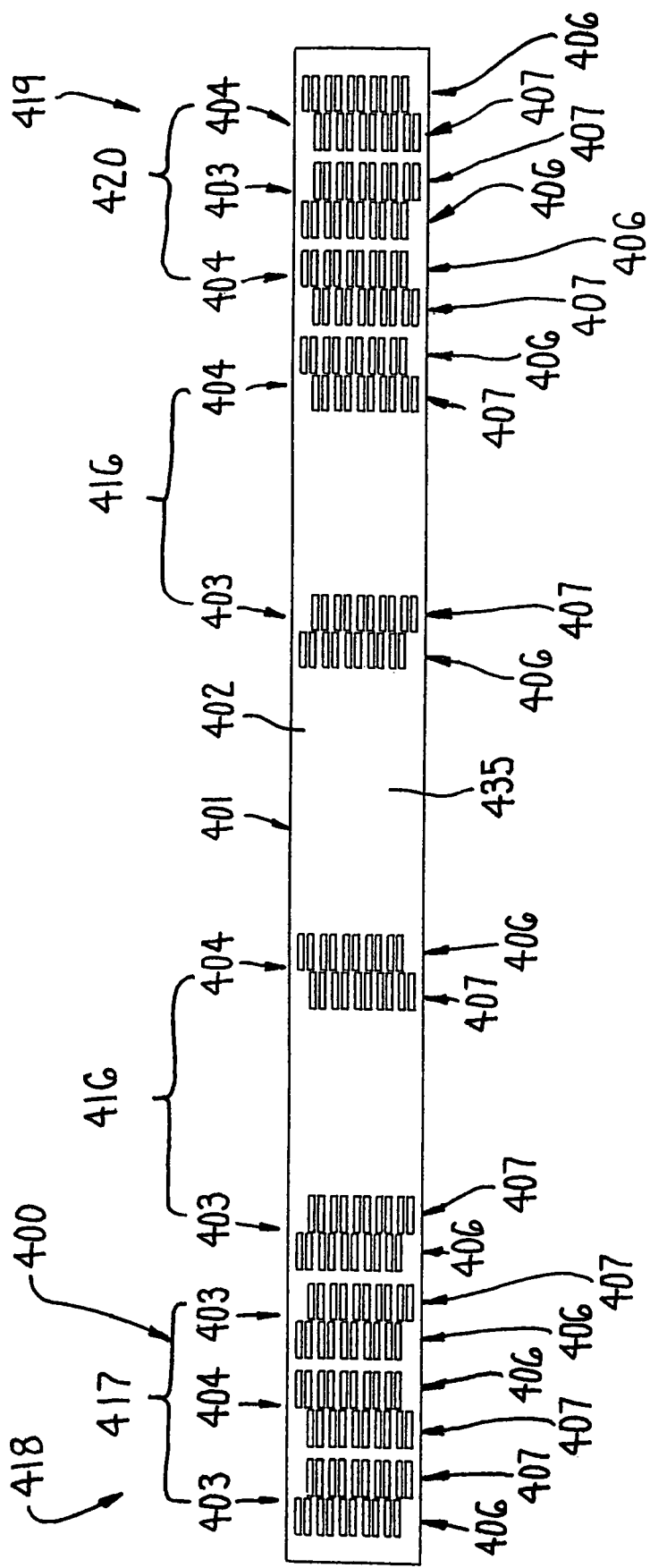
FIG. 66 is a front view of a power distribution assembly of a further power distribution system.

More particularly, the PDA 470 includes groups 471 of openings 472 which are arranged in a substantially similar pattern to those groups of openings illustrated in FIG. 66. In this arrangement, each opening 472 that provides access to a conductor is defined by a first opening half 473 and a second opening half 474 wherein each interior electrical conductor 476 extends between a pair of opening halves 473 and 474. Therefore, each opening 472 in effect is defined by two opening halves 473 and 474 and the openings 472 in one column of the grouping 471 are aligned in side by side relation with the respective openings 472 of the next adjacent row of openings. However, they still functionally operate the same as that described above in that the receptacles, flex connectors, jumpers and other components engage with these openings 472 and have posts that are staggered and engage with a staggered pattern of the openings 472. Further the pattern of PDA openings allows the staggered configuration of the connectors to plug-in from either side of PDA.

Referring to FIG. 84, the PDA 470 preferably is formed of a one-piece extruded construction with the cross sectional shape illustrated in FIG. 84. This profile includes a plurality of upstanding parallel ribs 475 which extend along the entire length of the PDA 470 and separate the respective opening halves 473 and 474 one from the other. These ribs 475 thereby span the opening halves 473 and 474 and overlie the electrical conductor 476 (FIG. 84) which extends therebetween. Thus, when a receptacle or the like is plugged into an opening 472, the fingers of an electrical contact engage or straddle the opposite sides of the conductor 476.

Each conductor 476 spans the entire length of the PDA 470 through the parallel, rectangular bores 477 provided therein. The rectangular bores 477 are formed during the extrusion process and thereafter the conductors 476 are slid longitudinally therein. As seen in FIG. 85, the four corners of the rectangular bores 477 are disposed radially outwardly of the conductor 476 and provide the additional function of receiving any access plastic material or debris which might be generated within the bore 477 during insertion of the conductor 476 or during the extrusion process. As such, each conductor 476 is in four-point contact with the side walls of the bore 477 which reduces friction during the insertion process.

As to the thickness of the PDA 470, this PDA 470 has a maximum thickness defined by the terminal side faces 478 of the ribs 475 which thereby defines a maximum thickness for the PDA which thickness generally corresponds to the thickness of the PDA's described above. These surfaces 478 define the face against which the receptacles abut when engaged therewith.

The PDA 470 also includes inwardly extended grooves 480 (FIG. 84) which define the narrowest PDA thickness with intermediate PDA surfaces 481 being defined between the bottom face 482 of the grooves 480 and the outer faces 478 of the ribs 475. The faces 481 and 482 thereby define a thin region through which the opening halves 473 and 474 may be formed by mechanical punching through the extruded PDA material. This provides an improved profile during the manufacturing process such that less material is used during extrusion of the PDA 470 and punching is made easier by the thinner regions.

In this manner, the PDA 470 is formed which PDA is adapted for engagement by the various components described herein.

Turning next to FIGS. 86-90, an additional PDA construction is illustrated wherein the PDA 500 is formed with a two-piece extruded profile. More particularly, the PDA 500 has a similar arrangement of opening groups 501 wherein each opening 502 is defined by opening halves 503 and 504. Here again the openings 502 are formed in side by side relation but are engaged in a staggered manner by a receptacle, flex connector or the like.

The PDA 500 is formed by a thin body section 505 and has a plurality of upstanding ribs 506 and 507 with relatively thin flat lands 508 and 509 being formed therebetween. Referring to FIG. 87, the PDA 500 is defined by opposed extrusion halves 510 which are formed identical to each other but mate together in inverted relation as seen in FIG. 87. The extrusion halves 510 include rectangular bores 511 therethrough like the rectangular bores described above which each receive an electrical conductor 512 longitudinally therethrough.

Referring to FIG. 88, the PDA 500 is grooved as illustrated in FIG. 88 to define a mounting bracket groove 515 which generally extends vertically. A number of such grooves 515 are provided spaced apart from each other depending upon the number of mounting brackets needed to mount a particular length of PDA to a wall panel or other furniture component. Each groove 515 is provided in pairs on opposite sides of the PDA 500 and allow for a mounting bracket to be clamped therebetween against the uniform flat face of the groove 515. The ribs 507 and 508, however, still extend between such grooves 515.

Referring more particularly to FIGS. 89 and 90, the ribs 506 and 507 define the maximum thickness of the PDA 500, against which the system component such as a receptacle abuts when mounted thereto. These extrusion halves 510 thereby define the opening halves 503 and 504 therein which extend entirely through the thickness of the PDA 500. These opening halves 503 and 504 are separated from each other by horizontal bridge sections 516 which align longitudinally with the electrical conductor 512 that extends through the rectangular bores 511. Some of these bridge portions 516 align with the ribs 506 or 507 while others do not in the region of the flat lands 508 and 509.

Referring to the single extrusion half 510 illustrated in FIG. 90, this extrusion half 510 includes the structures described above and further has an inside face 520 which is grooved so as to define a bore section 521 that defines one half of the rectangular conductor bore 511. Additionally, this inside face 520 includes energy directors 522 which project inwardly to an apex and are configured to facilitate sonic welding of the extrusion halves 510 together. During assembly, the extrusion halves 510 are first extruded as a single piece as seen in FIG. 590 and then two opposed bearing halves 510 are disposed together in facing relation and ultrasonically welded wherein the energy directors 522 are disposed alternatingly as seen in FIG. 89 and serve to contact the other extrusion half 510 and assist in fusing the two extrusion halves 510 together during the assembly process.

The rectangular shape of each bore 511 causes less friction on the conductor wire being inserted therethrough while the square shape is easier to extrude and maintain the size thereof during this process. Additionally, the open spaces at the corners define dumping regions or pockets for debris. This debris may result from the punching process when punching the openings wherein burrs may extend into the bore, or may result from scraping of the conductor along the bore surfaces during longitudinal insertion through the bore 511. Also, with the two piece construction of FIGS. 89 and 90, the ultrasonic weld process may result in excess material flow into the bores which excess material may flow or squirt into these bores 511.

The construction of FIGS. 86-90 provides an improved PDA construction 500 which provides an improved result during the punching process and construction of the PDA 500.

Referring to FIGS. 91-96, a third type of PDA construction is illustrated which essentially uses a one-piece extrusion wherein the post-receiving openings instead are defined by insert assemblies 542 that fit within relatively large windows within a PDA 530.

More particularly, the PDA 530 is illustrated with three such windows 531, 531 and 533 being present in various sizes. The single opening 531 is adapted to receive two inserts 535 and 536 to define an insert assembly 542 which inserts 535 and 536 together define a respective group 537 of openings 538. Inserts 535 and 536 thereby define the same pattern of openings as described above relative to the PDA's 470 (FIG. 83) and 500 (FIG. 86). These openings 538 essentially have opening halves separated by bridges 539 that overly the conductor 540 that extends through the length of the PDA 530. In FIG. 91, an end of the conductor 540 is illustrated just prior to insertion into a corresponding bore 541 in the PDA 530. The inserts 535 and 536 are discussed in further detail herein. It will be understood that while a single width insert assembly 542 is provided, this insert assembly 542 may be provided as a double-width for the opening 532 or a triple-width for the opening 533 either of which would have additional opening groups 537.

Referring to FIG. 92, the PDA extrusion 530 is formed with a pattern of ribs 545 and grooves 546 which primarily are provided to improve the extrusion process. The ribs 545 define the maximum thickness of the PDA 530 while the grooves 546 define the minimum thickness thereof at the groove surface 546A.

In the region disposed between each opposite pair of such ribs 545, a rectangular conductor bore 547 is provided which is substantially similar to those bores described above and further discussion thereof is not believed to be required. Notably, these bores 547 are rotated 45° from the orientation of the bores 477 shown previously. Either orientation may be applied to all the PDA constructions disclosed herein and provide the same advantages relative to debris. These parallel bores 547 are adapted to receive the conductors 540 longitudinally through the entire length of the PDA 530.

Figure 93:
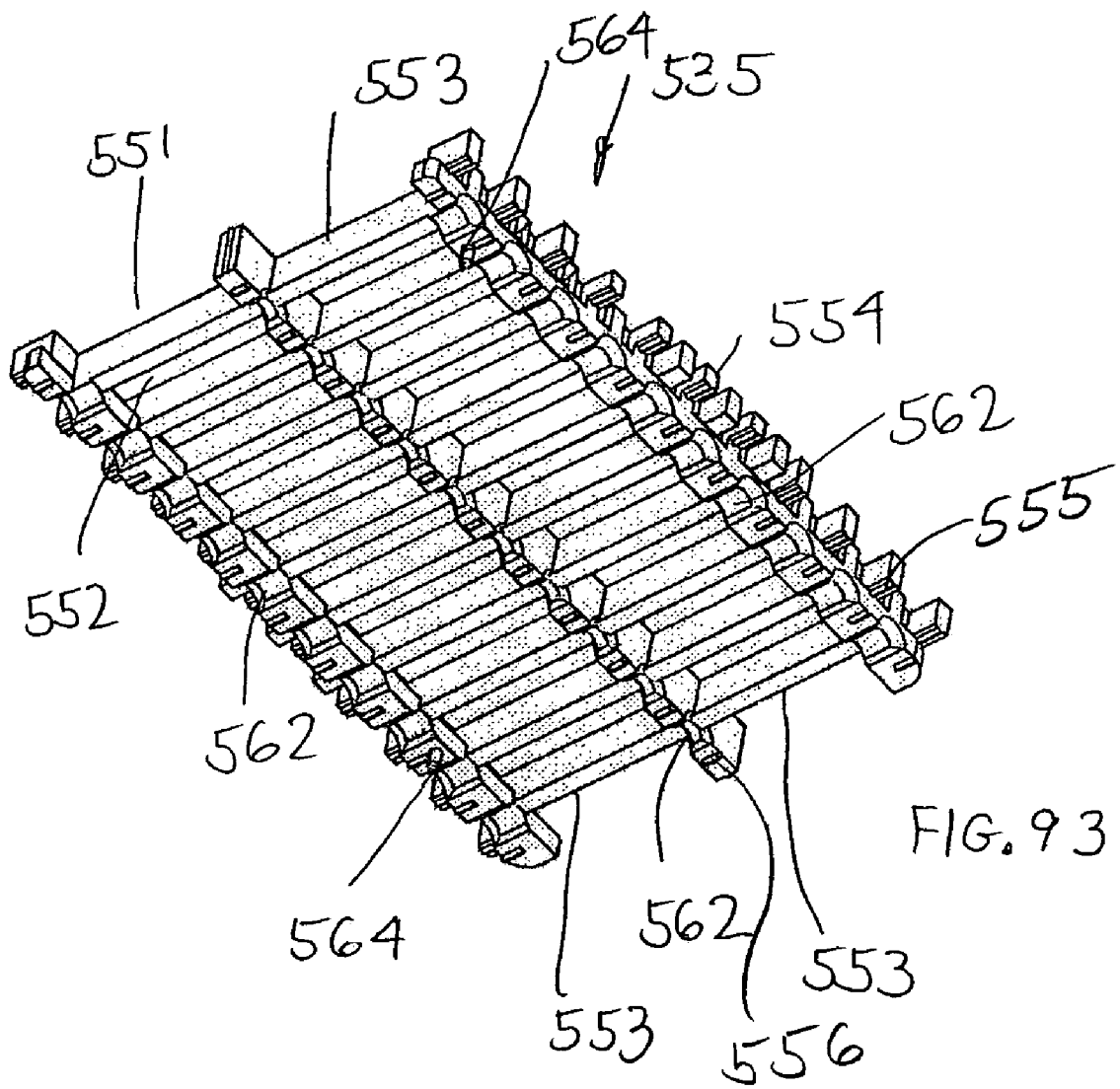
FIG. 93 is an inside isometric view of the first insert.
Figure 94:
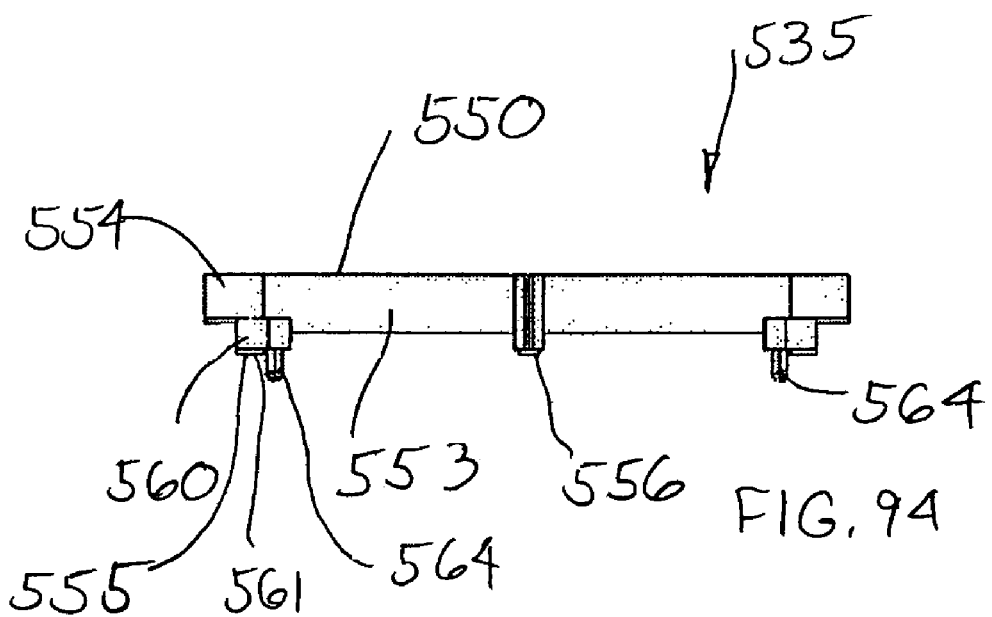
FIG. 94 is a top view of the insert.
Figures 95, 96:
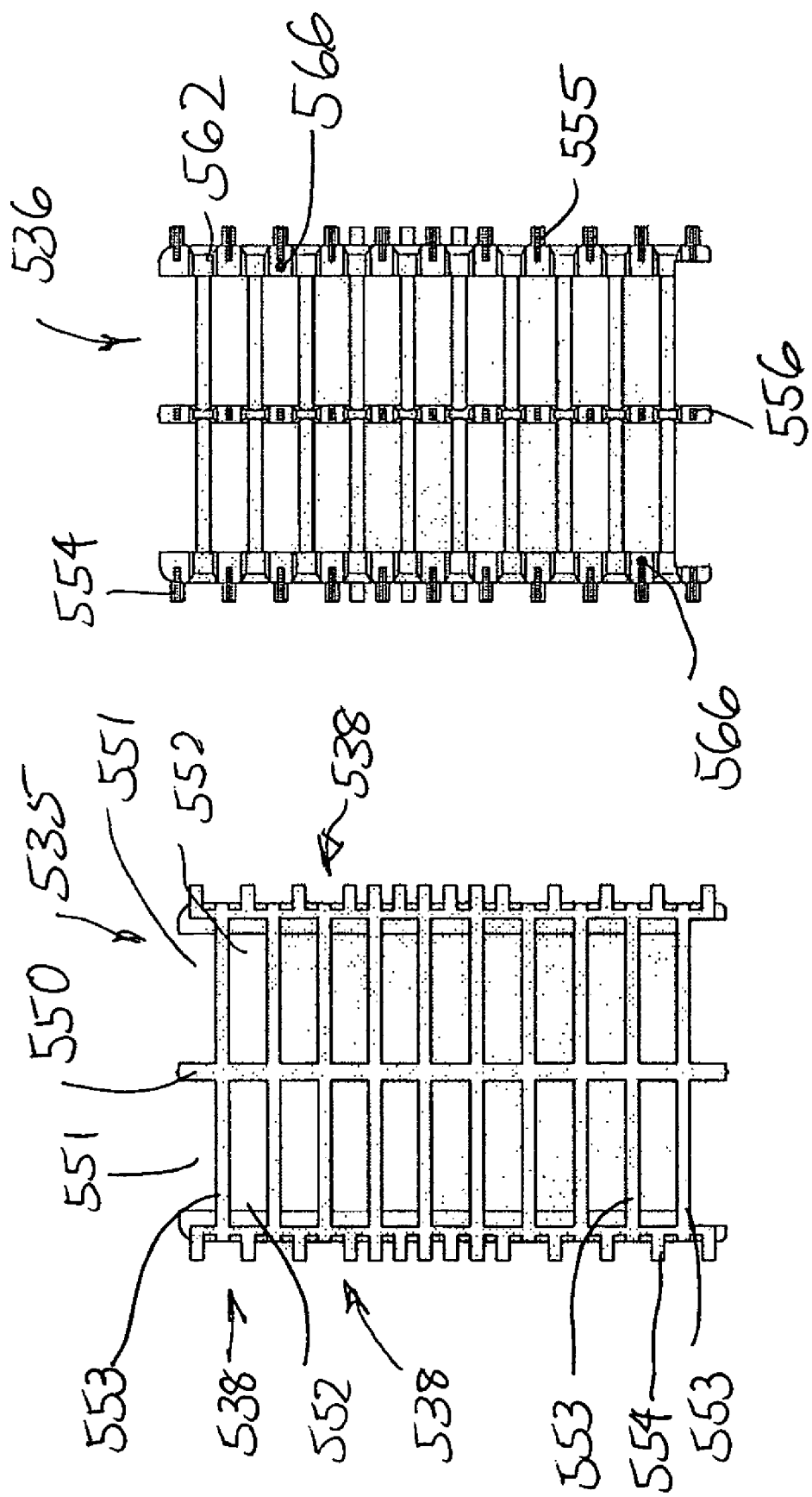
FIG. 95 is an outside view of the insert.
FIG. 96 is an inside view of a second insert that mates with the first insert of FIG. 93.

Referring to FIGS. 93-95, the first insert 535 is illustrated. This insert 535 is adapted to be received within the respective opening 531 while resting against the face of the PDA 530. In this regard, insert 535 includes an outer face 550 in which the opening halves 551 and 552 are provided in vertically aligned pairs to essentially define an opening 538. A plurality of such opening halves are provided to define a plurality of openings 538 which are aligned in vertical grooves and also arranged in side by side relation. This allows for staggered engagement by the staggered posts of the receptacles as fully described above. Each of these opening halves 551 and 552 are separated by a bridge portion 553 which is adapted to overlie a respective conductor 540.

A plurality of additional locator flanges 554 are provided which are each located between an adjacent pair of the bridged portions 553. The locator flanges 554 are each adapted to fit into a respective one of the PDA grooves 546 and abut against the bottom groove face 546A (FIG. 92) to thereby locate the insert 535 within the opening 531 so that the bridged portions 553 of the insert 535 overlie and are aligned with their respective conductors 540. The bottom or interior face of each flange 554 includes an energy director 555 while additional energy directors 556 are provided in the middle of the insert 535. These allow for ultrasonic welding of the flanges 554 to the groove face 546A by the directors 555 and the opposing inserts 535 and 536 directly together by the directors 556.

Additionally as seen in FIG. 94, the insert 535 is formed with a generally rectangular projecting portion 560 that is adapted to closely fit within the rectangular PDA window 531. The inside face 561 of this projecting portion includes arcuate grooves 562 which generally align with the bridged portions 553 and receive the conductors 540 such that the conductors 540 are sandwiched within these grooved portions 562 between the inserts 535 and 536.

To align the inserts 535 and 536 when fitting together, a pair of connector posts 564 are provided which project inwardly or rearwardly. Referring to FIG. 96, the opposite second insert 536 is formed substantially identical to the first insert 535 as described above and thus has common structural features. However the insert 536 includes a pair of alignment bores 566 which are adapted to receive the posts 564. The insert 536 also includes the same arrangement of energy directors 555 and 556. Thus, the inserts 535 and 536 are inserted into their respective window 531 from opposite sides of the PDA 530, aligned and then rigidly affixed together by welding to enclose the window 531 and to provide a PDA assembly 530 which functions similar to those PDA's described above.

With the above described arrangements, several PDA constructions are illustrated in FIGS. 83-96.

Also, additional improved components for the power distribution system are described hereinafter.

Referring to FIGS. 98-99, an improved flex connector 600 is illustrated. This flex connector 600 includes a pair of connector plugs 601 and 602 at the opposite ends thereof which are joined together by a bendable or flexible conductor body 603. Each plug 601 and 602 includes a group 604 (FIG. 99) of openings 605, which group 604 is defined by two vertical rows of such openings 605 in substantially the same pattern as that described above. Hence, the discussion of such components as already described above is equally applicable to the flex connector 600 and a detailed discussion of the structure and function is not believed to be required. Notably, however, the openings 605 are generally staggered.

Additionally, each plug 601 and 602 includes a staggered set of contact posts 606 (FIGS. 97 and 98). These posts 606 are also provided in a staggered relation that corresponds to the opening 605 and are adapted to engage any of the openings described above relative to the PDA's 470, 500 and 530. Each of these posts 606 is split so as to straddle the conductors of the above described PDA's from opposite sides. A more detailed discussion of such components is not required herein.

Each plug 601 and 602 generally is defined by a plug housing 610 and a cover 611. Referring to the plug housing 610 as illustrated in FIGS. 100-102, this plug housing 610 defines a hollow interior 612 defined by bottom wall 613 and a side wall 614. A bottom wall 613 includes the slotted posts 606 projecting downwardly therefrom. These posts 606 are defined by post sections 615 that are provided in pairs and define a slot 616 therebetween. Further, these posts 606 are aligned with the access openings 618 which are provided in a staggered relation for engagement with a corresponding staggered set of openings in the PDA's 470, 500 and 530.

The housing sidewall 614 also includes a pair of latches 620 that are integrally formed in cantilevered relation with the sidewall 614. These latches 620 have a hooked end portion 621 and a depressible finger pad 622 which may be pressed toward the side wall 614 to pivot the hook 621 outwardly and allow for disengagement of the plug 601 or 602 from the respective PDA or another component to which it may be engaged.

Referring to FIG. 99, the housing 610 is adapted to receive a plurality of contacts or terminals therein. Preferably, the plugs 601 and 602 include a plurality of short terminals 625 and a plurality of long terminals 626 which are arranged in alternating relation. As such, each connector in 627 or 628 is aligned with each other as seen in FIG. 99 for uniform engagement with the conductors 629 of the conductor body 603. These terminals 625 and 626 are illustrated in further detail in FIGS. 108 and 109 and are provided with four contact fingers 630 that essentially define a quad-point configuration such as that discussed previously. It is noted that the barrel 631 or 632 of the respective terminals 625 or 626 are adapted for engagement with another terminal of another system component as will be described in further detail herein. The common reference numeral 630 is used to identify any of the contact fingers referenced above.

To locate the terminals 625 or 626 within the plug housing 610, a plurality of alignment ribs 635, 636, 637 and 638 are provided. The ribs 635 and 637 are provided in aligned pairs for cooperation with the long contact terminal 626 while the ribs 636 and 638 are provided in pairs for cooperation with the short terminals 625.

To secure the cover 611 in place, the plug housing 610 also includes connector posts 640 about the periphery thereof which project upwardly and project through the cover 611. Referring more particularly to FIGS. 103 and 104, the cover 611 includes corresponding connector bores 641 through which they post 640 are received. The posts 640 may then be mechanically deformed such as by heat-staking or cold forming to secure the cover 611 fixedly on the housing 610.

The housing 611 includes the above-identified post openings 605 therethrough which openings 605 are defined by rectangular opening halves 643 and 644. These opening halves 643 and 644 thereby permit access to the terminal barrels 631 and 632 of the respective terminals 625 or 626.

Referring to FIG. 110, a representative cross section of either of the terminals 625 or 626 is illustrated with the contact fingers 630 projecting downwardly therefrom. These contact fingers 630 are illustrated in an initial undeflected position as indicated by the cross-hatching. However, when the plugs 606 are inserted into the respective openings of the PDA's described above, these fingers 630 are deflected outwardly by the PDA conductor such as conductor 476 to the condition identified by phantom outline reference lines 630. Initially, even when the plugs 601 or 602 are engaged with a respective PDA, an additional system component may be engaged thereto through the openings 605. Hence, FIG. 110 illustrates an additional contact 625 or 626 engaged therewith as indicated in the position 650 wherein the contact fingers 630 engage the respective terminal barrel 631 or 632. In this manner, the system components may be stacked one on top of the other since these plugs 601 and 602 include both male connectors and female connectors.

Figure 105:
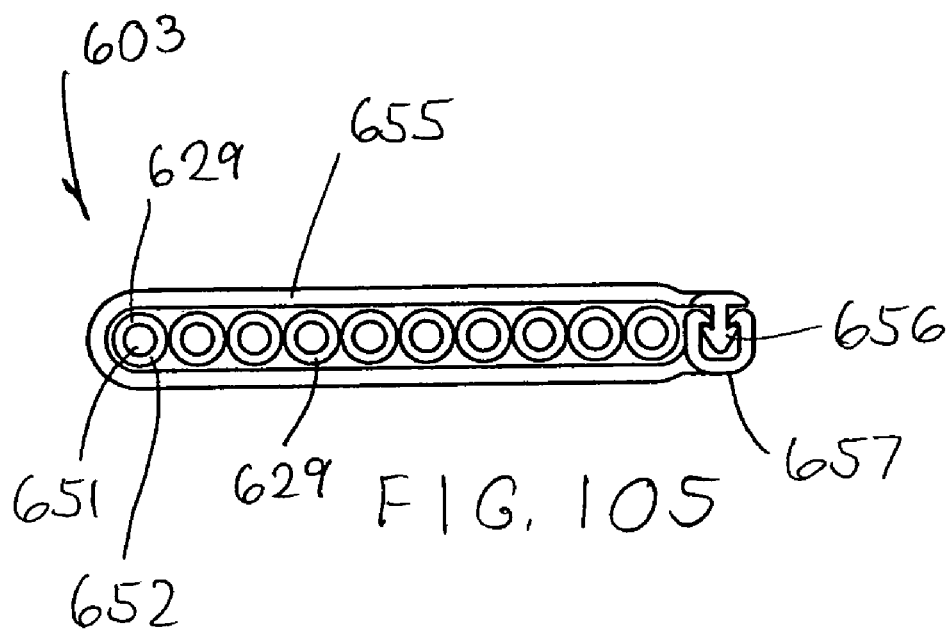
FIG. 105 is an end view of a conductor body for the flex connector having a foldable cable carrier or sleeve.

More particularly as to FIGS. 99 and 105-107, the conductor body 603 includes a plurality of individual conductor wires 629 extending longitudinally therethrough that are each engaged with a respective one of the terminals 625 or 626 at each opposite end. In this regard, FIG. 105 illustrates a plurality of such wires 629 which are each defined as having an interior conductor 651 surrounded by a wire sheath 652. Individual wires 629 are each connected to a respective pair of such terminals 625 or 626 and then arranged in a bore as illustrated in FIG. 105.

An outer wire carrier 655 is provided as a foldable enclosure having a snap-fit rib 656 extending along one edge thereof and a corresponding groove 657 along the other edge there which engage within each other as seen in FIG. 105. Thus, this cable carrier 655 may be folded over the wires 629 and then snapped to a closed position.

Figure 106:
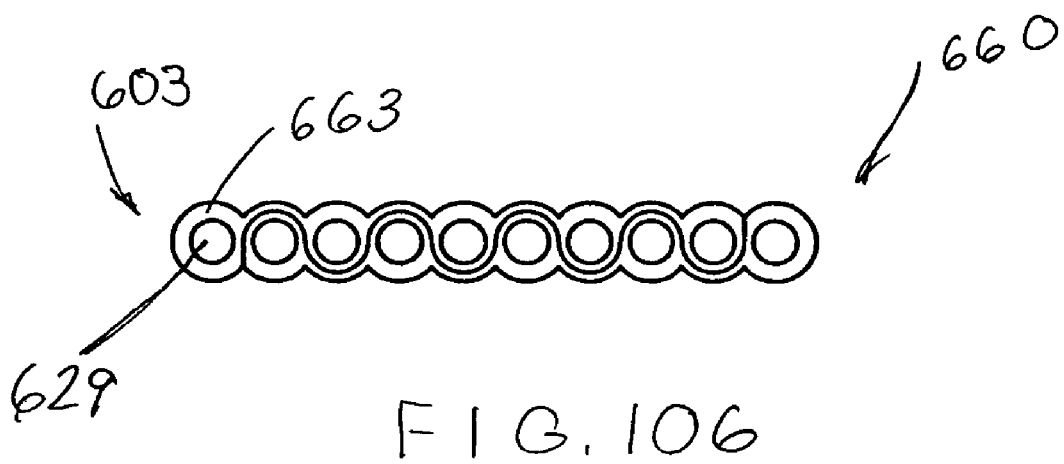
FIG. 106 is an end view of a festoon conductor body having interfitting festoon sections.
Figure 107:
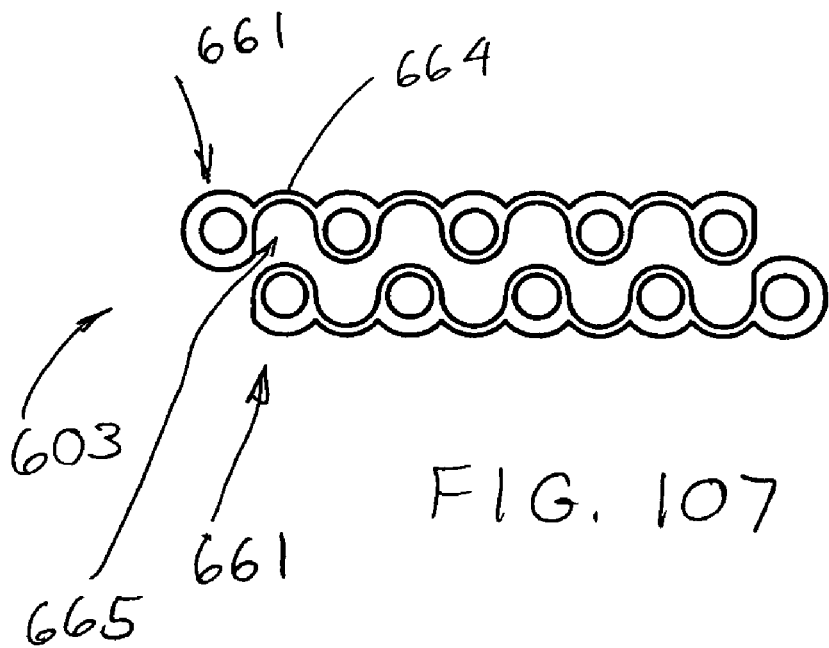
FIG. 107 is an exploded view of the festoon conductor body.

Referring to FIGS. 106 and 107, the conductor body 603 alternatively may be formed with a festoon configuration. This festoon cable 660 is formed from two cable sections 661 which are formed identical to each other but are inverted in opposing relation as seen in FIG. 107 so as to be mated together to define the festoon cable assembly illustrated in FIG. 106. Each cable section 661 has a plurality of spaced apart conductor wires 662 extending along the longitudinally length thereof which are enclosed or over molded by molded plastic 663 as an insulator. Each wire 662 is joined by a thin intermediate wall 664 which thereby defines a wire-receiving groove 665 therein. A plurality of such grooves 665 are provided which are each adapted to tightly receive a corresponding wire of the other cable section 661 as seen in FIGS. 106 and 107. As such, the cable sections 661 are first sidewardly offset as seen in FIG. 107 and then tight fittingly engaged together as seen in FIG. 106. When engaged together, the wires 662 have free ends which extend outwardly from the plastic over molded material as seen generally in FIG. 99 so that the free end of the wire 629 may be secured to a respective one of the terminals 625 and 626. As such, each of the wires 629 projects outwardly of the outer insulative layer 663 or the carrier 655 wherein the opposite free ends of each wire each have a respective terminal 625 or 626 fixedly secured thereto to define an electrical connection therebetween.

During the assembly process, the cable section 603 has its opposite ends threaded inwardly into the plug housings 610 as seen in FIG. 99 and then the cover 611 is secured thereto to effectively clamp the end of the cable carrier 603 to define a rigidly interconnected assembly of the plugs 601 and 602 and the conductor carrier 603.

As such, the above-described plug connector 601 is assembled and is useable with the above-described PDA's for 470, 500 and 530.

Referring to FIGS. 111-114, a conduit-type connector 700 is illustrated which is formed substantially the same as the flex connector 601 except that an intermediate conduit section 701 is provided between plugs 702 and 703 provided at the opposite ends thereof.

The plug 702 and 703 are formed substantially similar to the above-described plugs 601 and 602 and thus a detailed discussion relative thereto is not required. However, generally, each plug 702 and 703 includes a plug housing 704 to which is mounted a cover 705 by connector posts 706 and each cover 705 includes a group 707 of opening 708 therein in a staggered arrangement.

Figure 113:
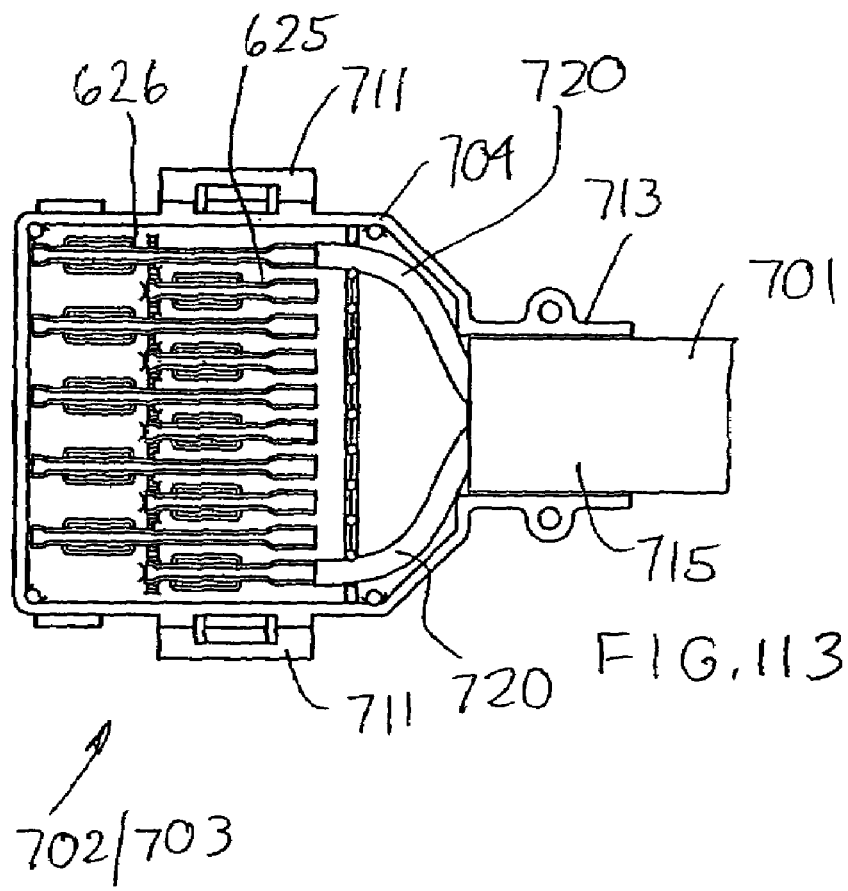
FIG. 113 is a front view of the connector plug or end connector with a housing cover removed.
Figure 114:
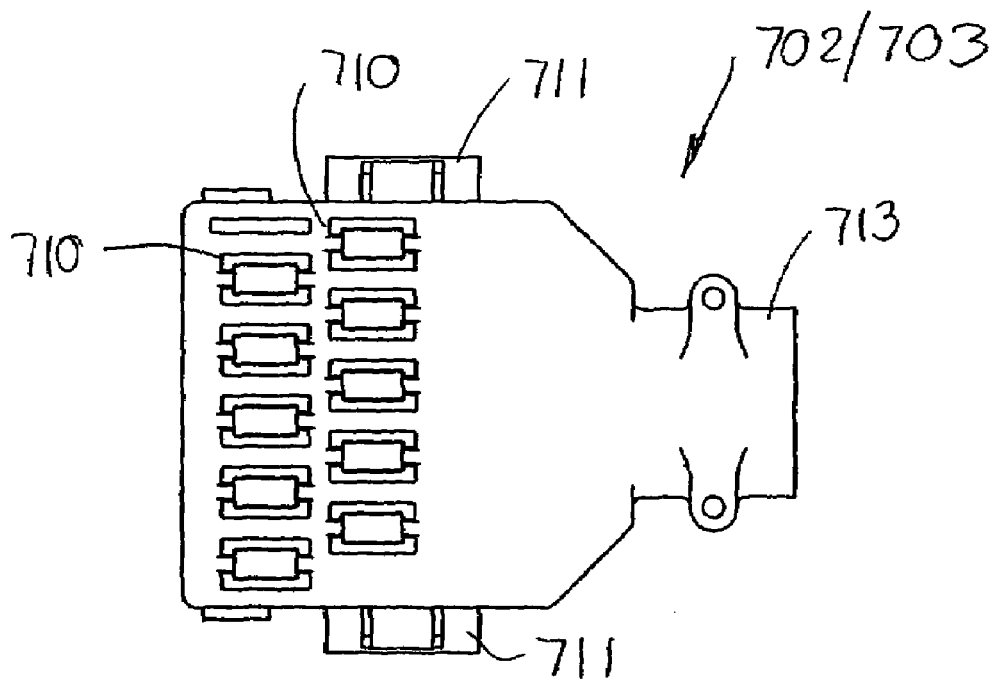
FIG. 114 is an inside view of the connector plug.
Figure 115:
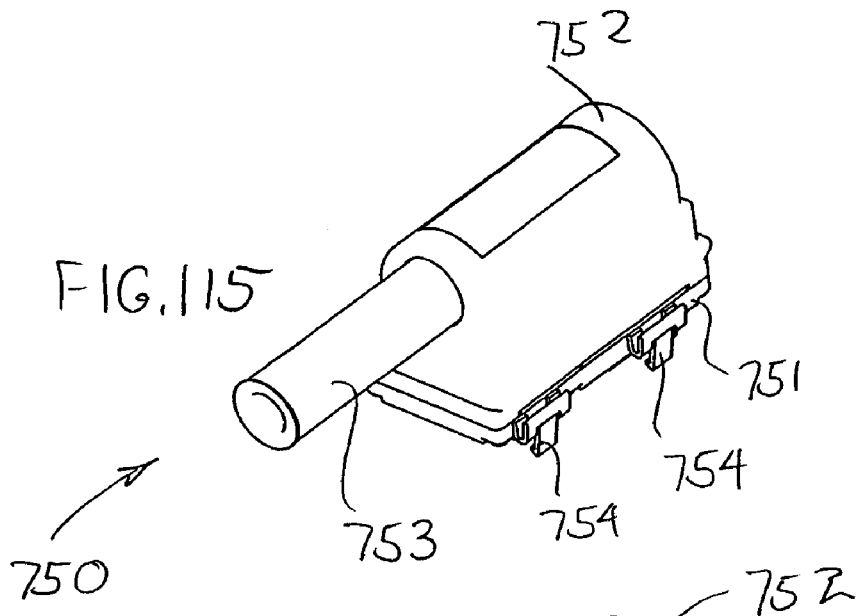
FIG. 115 is an isometric view of an in-feed connector.
Figure 116:
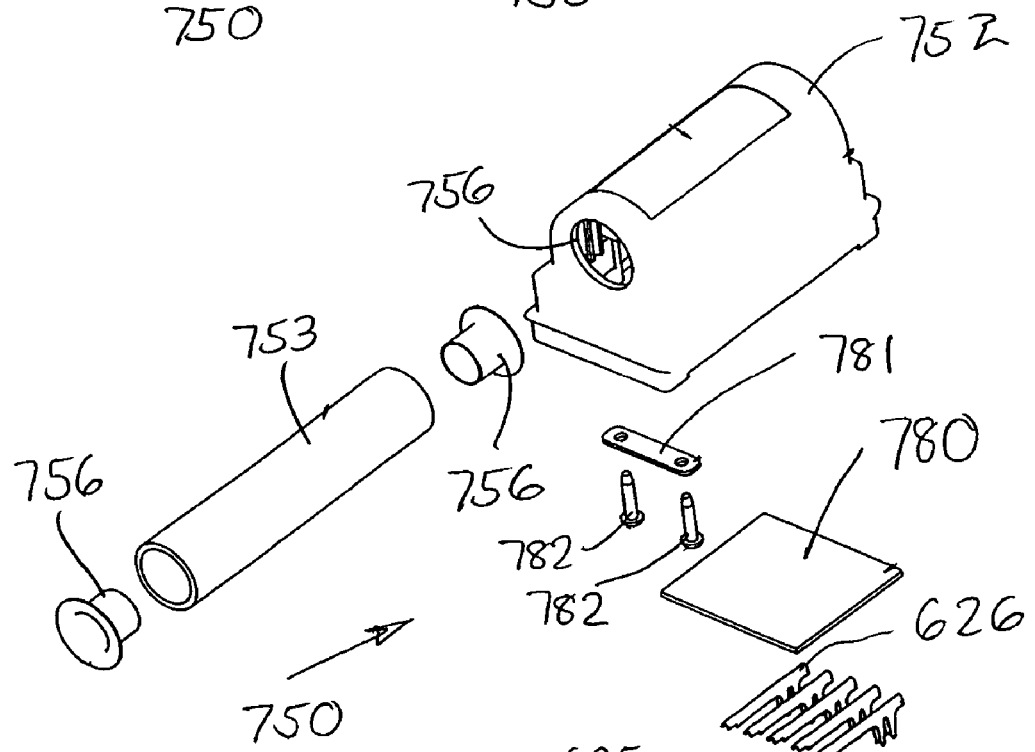
FIG. 116 is an exploded view of the in-feed connector.
Figure 124:
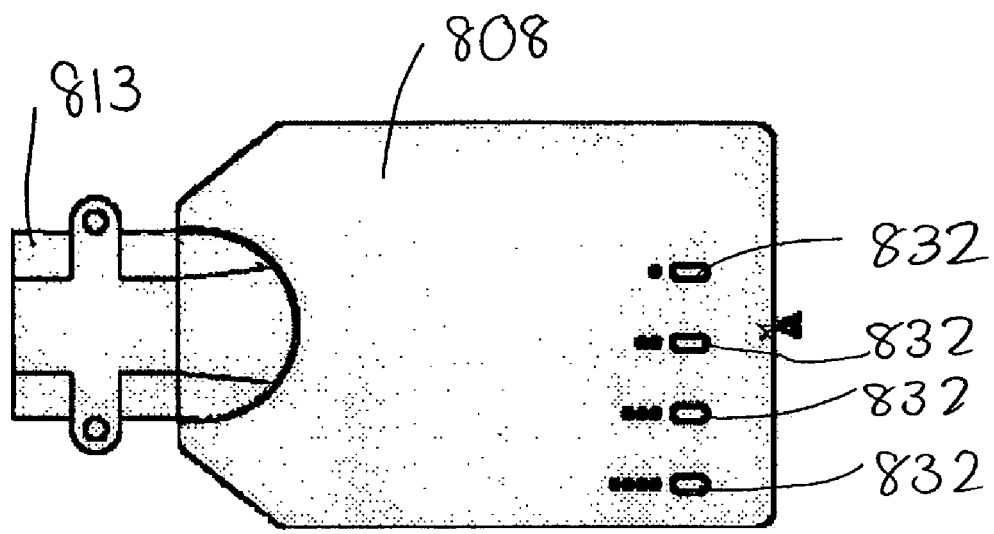
FIG. 124 illustrates a top cover.

Referring to FIGS. 113 and 114, the housing 704 further includes terminal containing posts 710 projecting downwardly therefrom in a staggered configuration, wherein the housing 704 also includes latches 711 on the sides thereof for engagement with a PDA or another system component.

To secure the intermediate conduit 701 in place, the housing 704 also includes a clamp seat 713 which essentially defines a conduit clamp 714 (FIG. 111) that allows for fixed clamping engagement of the distal end of the conduit in 715.

Within the housing 704 as seen in FIG. 113, a plurality of the long terminals 626 and the short terminals 625 are provided which terminals 625 and 626 are fixedly engaged with the free ends of wires 720 that extend through the conduit 701. Two such wires 720 are illustrated in FIG. 113 with it being understood that one wire 720 is provided and fixed to each of the contact terminals 625 and 626.

Thus, this conduit connector 700 is formed substantially the same as the flex connector except for the differences in the wire carrying member namely the conduit 701.

Referring to FIGS. 115-118, an in-feed assembly 750 is illustrated which is adapted to supply electrical circuits to the PDA's described above. Generally, the in-feed assembly 750 has a bottom housing 751 and an outer housing 752 that includes a cable conduit 753 projecting outwardly therefrom. The bottom housing 751 includes four latches 754 formed similar to those latches described above which latches 754 engage a PDA or even another system component such as a flex connector. The housing 752 is a semi-cylindrical cover which includes a hole 756 through which the conduit 753 and the in-feed wires extend. These wires are not illustrated with it being understood that such wires are formed substantially the same as the above-described wires such as those carried through conduit 701. A pair of cylindrical wire guides 756 are provided in the opposite ends of the conduit 753 to protect the wiring carried therethrough.

More particularly as to the bottom housing, this bottom housing 751 includes a plurality of upstanding posts 757 in a staggered array that corresponds to the posts already described above. These posts 757 include passages 758 which project vertically therethrough for receipt of the short contacts 625 and the long contacts 626 (FIG. 116) therein. The seating of these contacts 625/626 is more clearly illustrated in FIG. 119 wherein the prongs 630 project downwardly for receipt of a PDA conductor into the slot 759 that is defined through the center of the respective post 757.

To maintain the terminals 625 and 626 generally in alignment within the housing 751, the bottom housing wall 760 includes associated pairs of alignment ribs 761, 762, 763 and 764 which function similar to the above-described ribs in the flex connector housing 610 (FIG. 100). Additionally the wire guide flange 770 is provided (FIG. 118) which includes a plurality of side by side upward-opening pockets 771 in which individual wires of the conduit 753 are supported.

Once the contacts 625 and 626 are seated within the post passages 758, a strain relief plate 780 (FIGS. 116 and 119) is placed over the contacts 625 and 626 and secured to the housing 751 by sonic welding or fasteners.

In addition to the foregoing, an additional clamp bracket 781 is secured to the cover 752 by fasteners 782 to further secure the wires within the cover 752. In this manner, the terminal 625 and 626 may be supplied with power through the conduit wiring which power is then connected to a PDA or other system component and thereby supplies this component with power through multiple circuits.

The above-described system components primarily connect to all of the available circuits and make such circuits accessible through the various groups of openings. As such, the above-described receptacles selectively engage with the conductors and any of the selected circuits so that a receptacle may tap off any one of the available circuits.

Referring to FIG. 120, however, a selectable circuit jumper 800 is illustrated having a plug 801 which contains a slideable post block 802 that may be slid across the width of the plug 801 for selected engagement with any available circuit. This jumper plug 801 has a cable 803 connected thereto and a coupler 804 that may be connected to a desirable circuit component such as a light or other powered fixture. This cable 803 contains a plurality of conductor wires 805 extending therethrough.

More particularly as to FIG. 121, the plug 801 includes a plug housing 807, a cover 808 and a slide block 809 that is slideable across the width of the housing 807. This plug block 809 contains short terminal 625 and long terminal 626 therein which are connected to the wires 805 in a configuration described in further detail herein. Also, at least two of these wires are connected to a single slide block 810 to allow for the selection of a desired circuit.

FIG. 122 illustrates a similar configuration with the same housing 807, and cover 808 wherein a double slide block 811 is illustrated therein for connection to two sets of hot and neutral PDA conductors. Notably the cover 808 and the housing 807 each include a clamp seat 813 and 814 which are alignable in a opposing relation and are drawn together by fasteners 815 to clamp the proximal end of the cable 803 therein.

Figure 123:
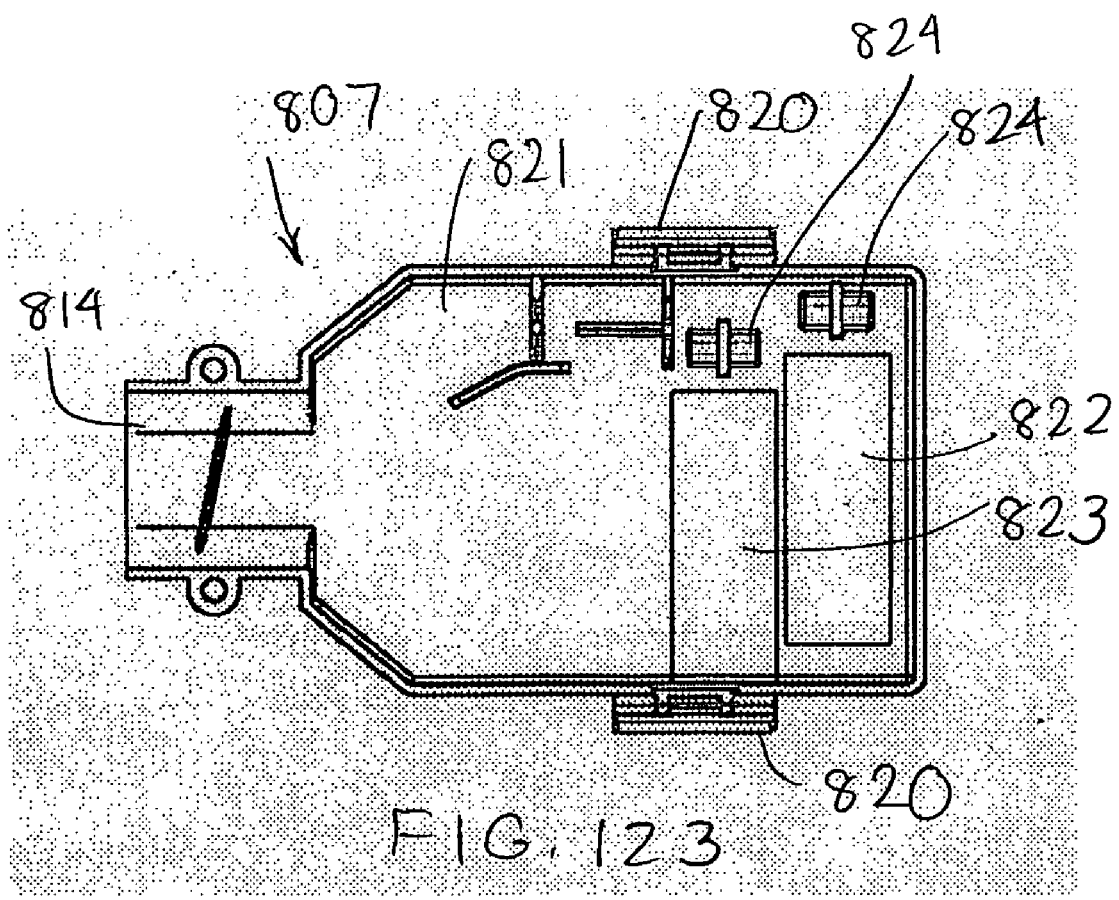
FIG. 123 illustrates the interior of the jumper housing.
Figure 125:
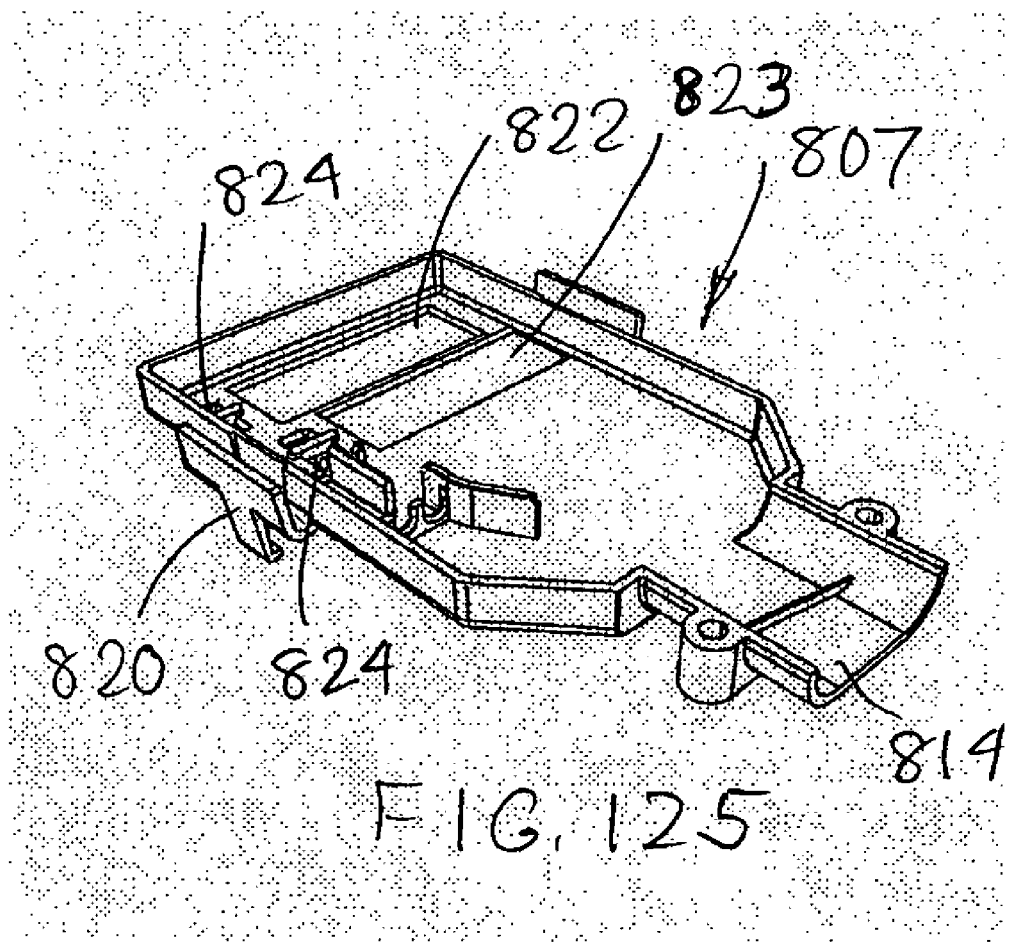
FIG. 125 is an isometric view of the jumper housing.
Figure 126:
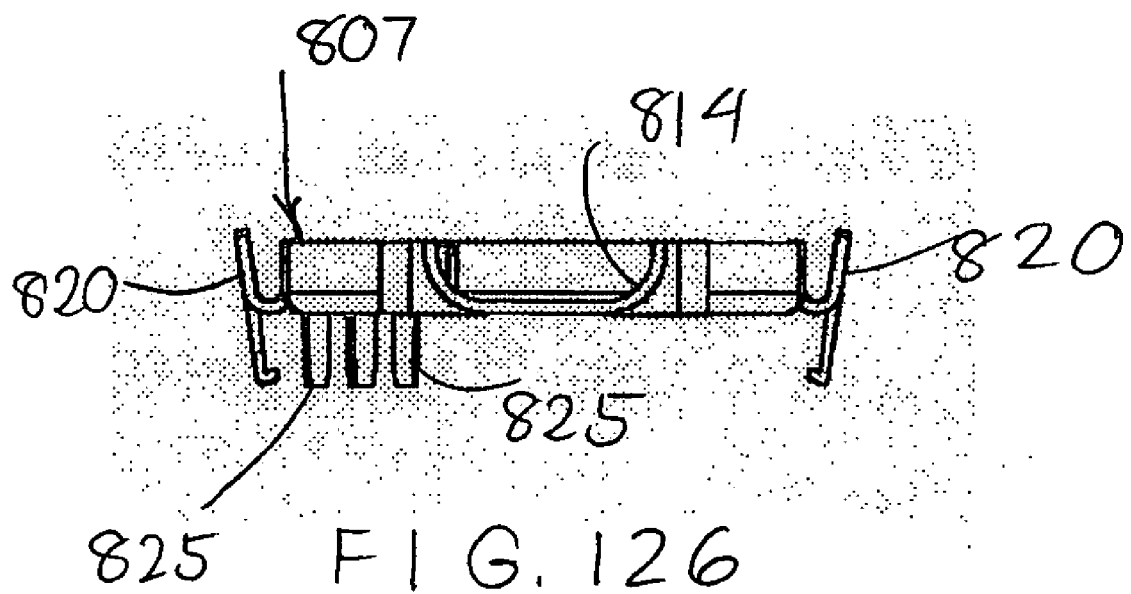
FIG. 126 is an end view of the jumper housing.
Figure 127:
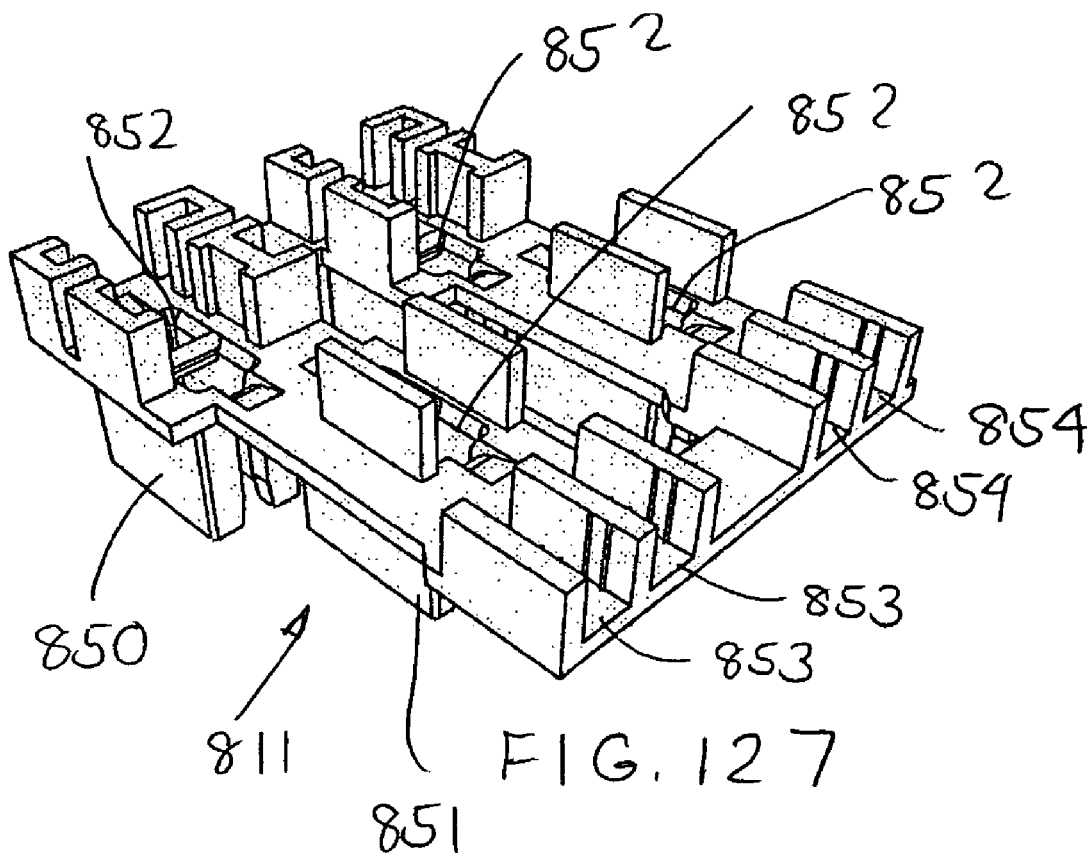
FIG. 127 is an isometric view of a double slider block.
Figure 128:
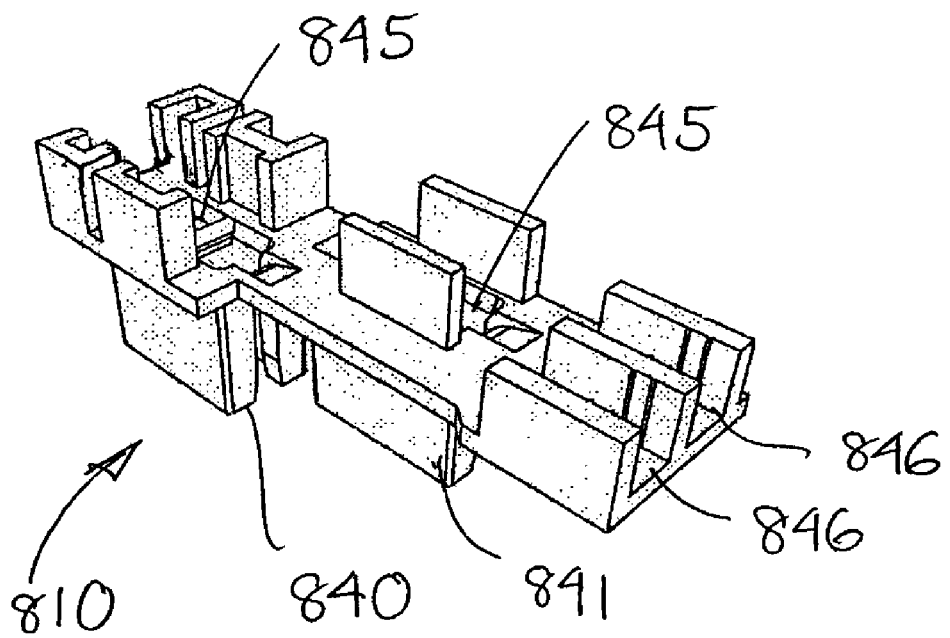
FIG. 128 is an isometric view of a single slider block.

Referring to FIG. 123, the housing 807 includes a pair of latches 820 like those described above. The bottom housing wall 821 is formed with a pair of staggered elongate guide slots 822 and 823 which slideably receive either one of the slide blocks 810 or 811 therein. Also, a pair of small openings 824 are provided which open downwardly into a pair of slotted posts 825 that are arranged in staggered relation. These posts 825 are substantially the same as those described above and are adapted to engage openings in a PDA, flex connector or other similar system component. These posts 825 are stationery and are adapted to receive their respective short terminal 625 or long terminal 626 therein. Thus, the wires 830 and 831 (FIGS. 121 and 122) are stationery and their associated terminal 625 and 626 also remain stationery since they extend through the stationery posts 825. These wires are adapted for engagement with the ground wires, such as those contained in a PDA.

Also, the top cover 808 is provided so as to be fitted downwardly onto the housing 807. A plurality of indicator ports 832 are provided in this cover 808 to provide an indication of the position of the slide block 810 or 811 within the housing 807. The slide blocks 810 and 811 are respectively illustrated therein. The single slide block 810 is provided with two of such slotted posts 840 and 841 into which one short terminal 625 and one long terminal 626 are illustrated. These terminals are connected to respective wires 842 and 843 so as to tap off a single circuit from a PDA or the like. The post 840 and 841 on the slide block 810 have respective passages 845 into which the terminals 625 or 626 are received. Additionally a pair of wire guides 846 are provided into which the aforementioned wires 842 and 843 are laid. This slide block 810 is slideably fitted into the windows 822 and 823 and is slideable therealong so as to selectively engage corresponding openings in the PDA and thereby tap off the circuit defined thereby.

Referring to the double slide block 811, this slide block includes two pairs of posts 850 and 851 to define four post passages 852 extending vertically. Here again two pairs of wire guides 853 and 854 are provided to receive the pairs of wires 855 and 856.

Therefore during sliding of either of the slide blocks 810 or 811, the respective wires 842, 843, 855 and 856 are allowed to bend and permit free sliding of these blocks 810 and 811 to selectively position the posts 840/841 and 850/851 for engagement with selected openings with a PDA. As such, selected circuits may be tapped off for a system component 860 (FIG. 120) which may be a light, outlet box, desktop power module or other fixture.

The selectable jumper 800 provides a structure for selectively tapping off single or double circuits to other system components. In this manner, this selectable jumper 800 also could be used to route selected circuits downstream of a ten-wire circuit, possibly to additional PDA's having less wires contained therein such as a six-wire circuit. Other objects and purposes of the invention, and variations thereof, will be apparent upon reading the following specification and inspecting the accompanying drawings.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A power distribution system for longitudinally elongate raceways comprising:

power distribution modules which are elongate in a longitudinal direction so as to be mountable in and extend longitudinally along raceways, said power distribution modules having a plurality of conductors extending longitudinally therethrough in said longitudinal direction which comprise common, neutral or ground conductors to define a plurality of electrical circuits carried longitudinally through said power distribution module;

a first one of said power distribution modules including a plurality of groups of first openings which are longitudinally spaced apart from each other and open in a sideward direction transverse to said longitudinal direction wherein each group of first openings is arranged in a first opening pattern and provides sideward access to said electrical conductors which extend in said longitudinal direction and are transversely exposed in said sideward direction; and at least a second one of said power distribution modules including at least one group of second openings on a front module face thereof which faces in said sideward direction wherein said second openings open sidewardly and have a same configuration as said first openings with a same size and shape and are arranged in said first opening pattern to provide access sidewardly to said conductors that are exposed therein, and further including electrical contacts electrically connected to said conductors and each having a projecting contact part projecting sidewardly from a back module face thereof, which said back module face faces sidewardly opposite to said front module face, said projecting contact parts being arranged in a first contact pattern corresponding to said first opening pattern so as to be insertable sidewardly into said first openings and engageable sidewardly with said exposed conductors of said first power distribution module through said group of first openings thereof to electrically connect said conductors of said first and second power distribution modules while said second openings remain exposed in said sideward direction which permit simultaneous connection of another said second power distribution module thereto; and a receptacle having receptacle contacts projecting sidewardly from a sideward-facing back receptacle face thereof which are arranged in said first contact pattern so as to be alternatively engagable sidewardly with any of said groups of said first and second openings of said first and second power distribution modules, and said second power distribution module being simultaneously engagable with said first power distribution module, by said projecting contact parts thereof, and with said receptacle, by said second openings thereof, said receptacle including plug openings on an exterior receptacle face thereof which open sidewardly and are arranged in a second opening pattern different from said first opening pattern and permit electrical connection of a plug of electrical equipment with said receptacle contacts.

2. The power distribution system according to claim 1, wherein a third one of said power distribution modules serves as an additional power distribution module which is able to be alternately connected to said first and second power distribution modules, said third power distribution module including electrical contacts electrically connected to said conductors thereof and each having a projecting contact part projecting sidewardly from a sideward-facing back module face thereof, wherein said projecting contact parts of said third power distribution module are arranged in said first contact pattern so as to be able to be alternatively engaged sidewardly with said group of first openings of said first power distribution module and said group of second openings of said second power distribution module to electrically connect said conductors of said third power distribution module with said conductors of either alternative one of said first and second power distribution modules.

3. The power distribution system according to claim 2, wherein said third power distribution module includes at least one group of sideward-opening third openings having a same configuration as said first and second openings with a same size and shape and arranged in said first opening pattern to provide access to said conductors therein, said receptacle having said receptacle contacts projecting from said back receptacle face defined by the other said side face thereof which are arranged in said first contact pattern so as to be alternatively engageable with any of said groups of said first, second and third openings of said first, second and third power distribution modules.

4. The power distribution system according to claim 3, wherein said first power distribution module includes said plurality of said groups of said first openings wherein said second power distribution module is engageable with any one of said groups of said first openings and said receptacle is engageable with any one of said groups of said first, second and third openings of said first power distribution module, said second power distribution module and said third power distribution module.

5. The power distribution system according to claim 1, wherein said electrical contacts of said second power distribution module have interior contact parts which are exposed sidewardly through said group of second openings thereof through said front module face.

6. A power distribution system for building raceways comprising:

a main power distribution module having opposite ends and a longitudinal length extending from and between said opposite ends, said main power distribution module comprising an extruded insulative housing extending between and defining said opposite ends which have respective terminal end faces, said housing comprising two longitudinal housing halves which said housing halves each have a one-piece construction having an end-wise constant profile as viewed from one said end face of said housing half and extending continuously along the length thereof from and between said opposite end faces wherein the housing halves are joined together so as to have a uniform end-wise cross-sectional profile along the length thereof, said main distribution module including a plurality of elongate conductor wires which extend between said opposite ends and are confined between said housing halves wherein at least one of said housing halves include groups of first openings which open sidewardly through said housing half to expose portions of said conductor wires wherein each of said groups of first openings is arranged in a first opening pattern; and a secondary power distribution module having a plurality of electrical conductors therein and a plurality of electrical contacts which project from a back face of said secondary power distribution module and are arranged in a first contact pattern corresponding to said first opening pattern so as to be insertable within a respective one of said groups of first openings of said main power distribution module for engagement with said exposed portions of said conductor wires.

7. The power distribution system according to claim 6, wherein said main power distribution module has opposite side faces defined by said housing halves which are uniformly planar along the longitudinal length of the main power distribution module between said opposite ends and are disposed in parallel planar relation along the length of said main power distribution module from and between said opposite end faces, said first openings being formed in said side faces.

8. The power distribution system according to claim 7, wherein said housing halves are hinged along a longitudinal edge thereof and folded together wherein said conductor wires are confined therebetween.

9. A power distribution system for installation in building raceways comprising:

a first power distribution module having a plurality of electrical conductors extending therethrough that define a plurality of circuits which comprise common, neutral and ground conductors, said first power distribution module including first access parts having a first configuration which define a group of openings arranged in a first pattern providing access to said conductors of said first power distribution module;

a second power distribution module having a plurality of electrical conductors therein, and having second access parts having a second configuration different from said first configuration which permits mating of said first configuration with said second configuration, wherein said first and second configurations are matable together while respectively preventing mating of said first configuration with said first configuration and said second configuration with said second configuration, said second access parts defining openings which are arranged in said first pattern and provide access to said conductors, said second access parts being arranged in said first pattern so as to be adapted for mating engagement with said first access parts to electrically connect said conductors of said first and second distribution modules, said second distribution module further respectively including additional first access parts formed with said first configuration arranged in said first pattern to provide access to said conductors of said second power distribution module; and a third power distribution module having electrical conductors extending longitudinally therethrough and including additional second access parts which define openings and are formed with said second configuration in said first pattern to permit mating engagement alternatively with either said corresponding first access parts of said second power distribution module or said first power distribution module;

wherein said first configuration is one of a female configuration and a male configuration and said second configuration is the other of said female configuration and said male configuration.

10. The power distribution system according to claim 9, wherein said third power distribution module further includes a group of openings defined by additional first access parts having said first configuration arranged in said first pattern.

11. The power distribution system according to claim 10, wherein said first power distribution module extends longitudinally and has a plurality of said first access parts with said first configuration in said first pattern along the length thereof to permit engagement of said second access parts of said second power distribution module with any of said groups of openings.

12. The power distribution system according to claim 11, wherein said second power distribution module has electrical contacts which includes first and second sections thereof that are exposed respectively through said first and second access parts thereon.

13. The power distribution system according to claim 12, wherein said first and second access parts on said second power distribution module are disposed on opposite side faces thereof which face sidewardly in opposite directions and said electrical contacts extend sidewardly such that opposite ends thereof are exposed through said groups of said openings on said opposite side faces.

14. A power distribution system comprising:

a main power distribution module having a plurality of conductors extending longitudinally therethrough in a longitudinal direction which define a plurality of electrical circuits having common, neutral and ground wires, at least one side face of said main power distribution module facing sidewardly, transverse to said longitudinal direction, and including a group of female openings which open sidewardly and are arranged in a first pattern so as to expose side portions of said conductors; and a plurality of secondary power distribution modules which are engageable directly with each other and directly with said main power distribution module, each of said secondary power distribution modules including a plurality of conductors extending longitudinally therethrough in said longitudinal direction, which said conductors include electrical contacts disposed within said secondary power distribution module, each said secondary power distribution module further including a plug unit having a group of male projections on one plug face which enclose but permit access to first portions of said electrical contacts and are arranged in said first pattern so as to be insertable sidewardly within said female openings of said main power distribution module to engage said electrical contacts with said conductors of said main power distribution module, each said secondary power distribution module further including a group of female openings on an opposite plug face thereof, which open sidewardly and expose second portions of said electrical contact and are arranged in said first pattern to permit engagement directly with said male projections of another of said secondary power distribution modules, said male projections and said female openings of said secondary power distribution module permitting simultaneous engagement of said secondary power distribution module directly with and intermediately between said main power distribution module and another of said secondary power distribution modules.

15. The power distribution system according to claim 14, wherein a receptacle is provided which includes male projections having exposed electrical contacts therein wherein said male projections are arranged in said first pattern so as to be engageable with said female openings of any of said main and said secondary power distribution modules to complete an electrical connection therebetween, each said secondary power distribution module being simultaneously engagable with said main distribution module and said receptacle.

16. A power distribution system for building raceways comprising:
  a main power distribution module having a plurality of parallel electrical conductors extending longitudinally through an insulative housing, said housing including at least one group of openings in a first pattern which provides access to all of said conductors, said openings each have upper and lower edges, and said group of openings being defined by a plurality of vertical rows of openings which are arranged in parallel, side-by-side relation to define said first pattern wherein each adjacent pair of adjacent openings are horizontally aligned with each other with said upper edges being aligned with each other and said lower edges being aligned with each other such that each said pair of adjacent openings provides access to a first said conductor along said upper edges of said pair of said adjacent openings and a second said conductor along said lower edges of said pair of said adjacent openings; and
  a secondary power distribution module comprising a plurality of electrical conductors contained within a housing and electrical contacts which project from a back face of said secondary power distribution module in a contact pattern corresponding to said first pattern, said contacts being arranged in two vertical rows corresponding to said vertical rows of said openings of said main distribution module wherein each sidewardly adjacent pair of said contacts have exposed contact portions which face in opposite vertical directions exteriorly of said housing, said contacts being engageable with said openings wherein one of each said pair of said contacts engages said first conductor in one said opening and the other of said pair of contacts engages said second conductor in the sidewardly adjacent one of said pair of said adjacent openings.

17. The power distribution system according to claim 16, wherein said contacts on said secondary power distribution module are enclosed by insulative posts wherein said contacts are exposed on only one side of said posts with said contacts of each sidewardly adjacent pair thereof being exposed in said opposite directions.

18. A power distribution system for longitudinally elongate raceways comprising:
  power distribution modules which are elongate in a longitudinal direction so as to define a module length extending lengthwise from end to end and be mountable in and extend longitudinally along raceways, said power distribution modules having opposite lengthwise extending side faces which define a module width, and having a plurality of conductors extending longitudinally therethrough in said longitudinal direction which comprise common, neutral or ground conductors to define a plurality of electrical circuits carried longitudinally through said power distribution module along said module length;
  a first one of said power distribution modules including a plurality of groups of first openings which open widthwise from one said side face in a sideward direction transverse to said longitudinal direction wherein said groups of said first openings are longitudinally spaced apart from each other along said module length to define a plurality of connection locations along said one side face, and wherein each group of first openings is arranged in a first opening pattern and provides access to said electrical conductors which extend in said longitudinal direction and are transversely exposed in said sideward direction; and
  at least a second one of said power distribution modules including at least one group of second openings on a front module face defined by one said side face thereof which faces in said sideward direction wherein said second openings open sidewardly and have a same configuration as said first openings with a same size and shape and are arranged in said first opening pattern to provide access sidewardly to said conductors that are exposed therein, and further including electrical contacts electrically connected to said conductors and each having a projecting contact part projecting sidewardly from a back module face defined by the other said side face thereof, which said back module face faces sidewardly opposite to said front module face, said projecting contact parts being arranged in a first contact pattern corresponding to said first opening pattern so as to be insertable sidewardly into said first openings and engageable sidewardly with said exposed conductors of said first power distribution module through said group of first openings thereof to electrically connect said conductors of said first and second power distribution modules while said second openings remain exposed in said sideward direction for simultaneous connection of another said second power distribution module thereto; and
  a receptacle having receptacle contacts projecting sidewardly from a sideward-facing back receptacle face thereof which are arranged in said first contact pattern so as to be alternatively engagable sidewardly with any of said groups of said first and second openings of said first and second power distribution modules, and said second power distribution module being simultaneously engagable with said first power distribution module, by said projecting contact parts thereof, and with said receptacle, by said second openings thereof, said receptacle including plug openings on an exterior receptacle face thereof which open sidewardly and are arranged in a second opening pattern different from said first opening pattern and which permit electrical connection of a plug of electrical equipment with said receptacle contacts.

* * * * *